US012029164B2

(12) United States Patent
Calmer

(10) Patent No.: US 12,029,164 B2
(45) Date of Patent: Jul. 9, 2024

(54) STALK ROLL WITH MULTIPLE FLUTES OF DIFFERENT LENGTHS

(71) Applicant: Marion Calmer, Lynn Center, IL (US)

(72) Inventor: Marion Calmer, Lynn Center, IL (US)

(73) Assignee: CALMER HOLDING COMPANY, LLC, Lynn Center, IL (US)

( * ) Notice: Subject to any disclaimer, the term of this patent is extended or adjusted under 35 U.S.C. 154(b) by 370 days.

(21) Appl. No.: 17/305,584

(22) Filed: Jul. 9, 2021

(65) Prior Publication Data

US 2022/0151152 A1 May 19, 2022

Related U.S. Application Data

(63) Continuation of application No. 15/699,820, filed on Sep. 8, 2017, now Pat. No. 11,071,252, which is a continuation-in-part of application No. 15/225,171, filed on Aug. 1, 2016, now Pat. No. 10,039,232, which is a continuation-in-part of application No. 14/206,710, filed on Mar. 12, 2014, now Pat. No. 9,668,414, which is a continuation-in-part of (Continued)

(51) Int. Cl.
*A01D 45/02* (2006.01)

(52) U.S. Cl.
CPC .................................. *A01D 45/025* (2013.01)

(58) Field of Classification Search
CPC .................................................... A01D 45/025
See application file for complete search history.

(56) References Cited

U.S. PATENT DOCUMENTS 1,429,168 A 9/1922 Vaughan
1,456,569 A 5/1923 Reece et al.
(Continued)

FOREIGN PATENT DOCUMENTS

DE 3612224 A1 10/1987
DE 19855526 C1 6/2000
(Continued)

OTHER PUBLICATIONS

Biggar, H. Howard, "The Old and the New in Corn Culture," Yearbook of the United States Department of Agriculture, 1918, Retrieved from the Internet 2017, 1 page.
(Continued)

*Primary Examiner* — Alicia Torres
(74) *Attorney, Agent, or Firm* — McKee, Voorhees and Sease, PLC

(57) ABSTRACT

A stalk roll may be configured to be mounted upon a stalk roll drive shaft of a corn harvesting header, wherein the stalk roll drive shaft has a generally square cross-sectional shape. The stalk roll may comprise a main cylinder with a plurality of flutes extending radially from the main cylinder along the length of the main cylinder. A taper may be positioned toward the front end of the main cylinder. The flutes may be configured such this with differing edges to facilitate stalk movement into and through the ear separation zone to the plant separation zone. The flutes may be configured such that a bladeless area proximate to the nose cone on each of two stalk rolls of an opposing pair cooperate to form at stalk engagement gap in at least one moment in time per revolution of the stalk rolls.

3 Claims, 111 Drawing Sheets

Related U.S. Application Data application No. 13/327,398, filed on Dec. 15, 2011, now Pat. No. 9,560,804.

(60) Provisional application No. 62/385,173, filed on Sep. 8, 2016, provisional application No. 62/281,096, filed on Jan. 20, 2016, provisional application No. 61/778,118, filed on Mar. 12, 2013.

(56) References Cited

U.S. PATENT DOCUMENTS 1,558,774 A 10/1925 Barnes
1,717,305 A 6/1929 Beckman
1,827,216 A 10/1931 Synck
1,894,412 A 1/1933 Neighbour
1,964,579 A 6/1934 Hyman
2,264,565 A 12/1941 Coultas et al.
2,333,901 A 11/1943 Swenson
2,379,822 A 7/1945 Mitchell et al.
2,456,404 A 12/1948 Good
2,491,195 A 12/1949 Messenger et al.
2,527,786 A 10/1950 Barkstrom
2,534,665 A 12/1950 Greeley
2,534,685 A 12/1950 Shrader
2,575,120 A 11/1951 Peel
2,604,750 A 7/1952 Fergason
2,616,236 A 11/1952 Hartley
2,825,195 A 3/1958 Smith
2,826,031 A 3/1958 Hansen
2,870,593 A 1/1959 Anderson
2,899,794 A 8/1959 Hadley
2,934,877 A 5/1960 Fowler
2,961,820 A 11/1960 Hadley
3,101,579 A 8/1963 Karlsson et al.
3,101,720 A 8/1963 Karlsson
3,174,484 A 3/1965 Anderson
3,222,852 A 12/1965 Ward et al.
3,271,940 A 9/1966 Ashton et al.
3,304,702 A 2/1967 Russell
3,462,928 A 8/1969 Schreiner et al.
3,496,708 A 2/1970 Bornzin
3,517,490 A 6/1970 Mathews
3,520,121 A 7/1970 Ashton et al.
3,524,308 A 8/1970 Spry
3,524,309 A 8/1970 Bartlett
3,528,233 A 9/1970 Martner et al.
3,528,234 A 9/1970 Kowalik et al.
3,584,444 A 6/1971 Sammann et al.
3,585,789 A 6/1971 Blanshine et al.
3,589,110 A 6/1971 Schreiner et al.
3,599,409 A 8/1971 Whitney et al.
3,633,348 A 1/1972 Sears et al.
3,646,737 A 3/1972 Grant
3,705,481 A 12/1972 Willett
3,705,485 A 12/1972 Toomer
RE27,554 E 1/1973 Ashton et al.
3,707,833 A 1/1973 Sutton
3,736,733 A 6/1973 Fell et al.
3,737,676 A 6/1973 Fletcher et al.
3,759,021 A 9/1973 Schreiner et al.
3,831,356 A 8/1974 Maiste et al.
3,832,836 A 9/1974 Anderson
3,858,384 A 1/1975 Maiste et al.
3,885,375 A 5/1975 Solterbeck
3,961,466 A 6/1976 Martin et al.
3,982,385 A 9/1976 Hyman
4,084,396 A 4/1978 Fritz et al.
4,086,749 A 5/1978 Greiner et al.
4,106,270 A 8/1978 Weigand et al.
4,106,271 A 8/1978 Carey et al.
4,115,983 A 9/1978 Barnes et al.
4,219,990 A 9/1980 Hill
4,227,366 A 10/1980 Pucher
4,233,804 A 11/1980 Fischer et al.
4,244,162 A 1/1981 Pucher
4,266,392 A 5/1981 Knepper et al.
4,327,544 A 5/1982 McDuffie et al.
4,333,304 A 6/1982 Greiner et al.
RE31,063 E 10/1982 Greiner et al.
RE31,064 E 10/1982 Shriver
4,377,062 A 3/1983 Slattery
4,429,516 A 2/1984 Erickson
4,434,606 A 3/1984 Rhodes et al.
4,445,314 A 5/1984 Gust
4,531,351 A 7/1985 Sousek
4,598,535 A 7/1986 Sousek
4,612,757 A 9/1986 Halls et al.
4,771,592 A 9/1988 Krone et al.
4,845,930 A 7/1989 Dow
5,009,061 A 4/1991 Heuling
5,040,361 A 8/1991 Briesemeister
5,060,464 A 10/1991 Caron
5,161,356 A 11/1992 Pick
5,269,126 A 12/1993 Kalverkamp
5,282,352 A 2/1994 Schoolman
5,330,114 A 7/1994 Trenkamp et al.
5,404,699 A 4/1995 Christensen et al.
5,464,371 A 11/1995 Honey
5,528,887 A 6/1996 Nagy et al.
5,680,750 A 10/1997 Stefl
5,704,202 A 1/1998 Calmer
5,775,076 A 7/1998 Mossman
5,784,869 A 7/1998 Rayfield
5,787,696 A 8/1998 Wiegert et al.
5,799,483 A 9/1998 Voss et al.
5,878,559 A 3/1999 Cooksey et al.
5,878,560 A 3/1999 Johnson
5,878,561 A 3/1999 Gunn
5,881,541 A 3/1999 Silver et al.
5,884,464 A 3/1999 McMillen
5,911,673 A 6/1999 Johnson
5,924,269 A 7/1999 McMillen
5,934,054 A 8/1999 Landeis
6,009,061 A 12/1999 Davis et al.
6,050,071 A * 4/2000 Bich .................... A01D 45/025
56/104
6,116,005 A 9/2000 Chamberlain
6,216,428 B1 4/2001 Becker et al.
6,226,969 B1 5/2001 Becker
6,237,312 B1 5/2001 Becker
6,237,314 B1 5/2001 Boll
6,330,782 B1 12/2001 Digman et al.
6,412,259 B1 7/2002 Wiegert
7,104,038 B2 9/2006 Calmer
7,237,373 B2 7/2007 Resing et al.
7,373,767 B2 5/2008 Calmer
7,716,908 B2 5/2010 Christensen et al.
7,788,890 B2 9/2010 Cressoni
7,874,134 B1 1/2011 Hoffman
7,886,510 B2 2/2011 Calmer
7,992,371 B2 8/2011 Rieck et al.
8,171,708 B2 5/2012 Calmer
8,196,380 B2 6/2012 Carboni
8,220,237 B1 7/2012 Calmer
8,371,914 B2 2/2013 Cressoni
8,464,505 B1 6/2013 Calmer
8,857,139 B1 10/2014 Calmer
8,863,487 B2 10/2014 Calmer
9,554,511 B1 1/2017 Calmer
9,560,804 B1 2/2017 Calmer
9,668,414 B2 6/2017 Calmer
D803,271 S 11/2017 Fredricks et al.
10,038,232 B2 7/2018 Dang et al.
10,039,232 B2 8/2018 Calmer
10,045,483 B2 8/2018 Calmer
10,172,286 B2 1/2019 Schloesser et al.
10,334,783 B2 7/2019 Walker et al.
10,420,281 B2 9/2019 Calmer
10,537,058 B2 1/2020 Ehle
10,785,911 B2 9/2020 Calmer
10,874,052 B2 12/2020 Gramm et al.
2003/0172639 A1 9/2003 Calmer
2004/0016219 A1 1/2004 Calmer
2004/0123577 A1 7/2004 Resing et al.

(56) References Cited

U.S. PATENT DOCUMENTS

| | | | |
|---|---|---|---|
| 2005/0120695 | A1 | 6/2005 | Calmer |
| 2006/0174603 | A1 | 8/2006 | Mossman |
| 2007/0180806 | A1 | 8/2007 | Calmer |
| 2007/0266689 | A1 | 11/2007 | Calmer |
| 2008/0156446 | A1 | 7/2008 | Sekiya |
| 2009/0025353 | A1 | 1/2009 | Christensen et al. |
| 2010/0043371 | A1 | 2/2010 | Rieck et al. |
| 2010/0071336 | A1 | 3/2010 | Christensen et al. |
| 2010/0072036 | A1 | 3/2010 | Brown et al. |
| 2010/0218474 | A1 | 9/2010 | Calmer |
| 2011/0011048 | A1 | 1/2011 | Hoffman |
| 2011/0146217 | A1 | 6/2011 | Carboni |
| 2011/0146218 | A1 | 6/2011 | Carboni |
| 2012/0291410 | A1 | 11/2012 | Silver et al. |
| 2014/0182255 | A1 | 7/2014 | Calmer |
| 2016/0174461 | A1 | 6/2016 | Walker et al. |
| 2016/0174462 | A1 | 6/2016 | Walker |
| 2016/0174463 | A1 | 6/2016 | Barry |
| 2016/0338268 | A1 | 11/2016 | Calmer |
| 2017/0055447 | A1 | 3/2017 | Missotten et al. |
| 2017/0055449 | A1 | 3/2017 | Missotten et al. |
| 2017/0188517 | A1 | 7/2017 | Schloesser et al. |
| 2017/0196168 | A1 | 7/2017 | Ricketts et al. |
| 2018/0168103 | A1 | 6/2018 | Calmer |
| 2018/0242524 | A1 | 8/2018 | Baye et al. |
| 2018/0352740 | A1 | 12/2018 | Albinger et al. |
| 2019/0230859 | A1 | 8/2019 | Walker et al. |
| 2020/0000036 | A1 | 1/2020 | Coon et al. |
| 2020/0236854 | A1 | 7/2020 | Tiessen et al. |

FOREIGN PATENT DOCUMENTS

| | | | |
|---|---|---|---|
| DE | 102005054998 | A1 | 5/2007 |
| DE | 102011118207 | A1 | 5/2013 |
| EP | 0846409 | A1 | 6/1998 |
| EP | 943229 | A1 | 9/1999 |
| FR | 2599931 | A1 | 12/1987 |
| FR | 2784263 | A1 | 4/2000 |
| WO | 0030427 | A1 | 6/2000 |
| WO | 2012152866 | A1 | 11/2012 |
| WO | 2014165192 | A1 | 10/2014 |
| WO | 2017023851 | A1 | 2/2017 |

OTHER PUBLICATIONS

Calmer BT Chopper and Residue Management Upgrade Kits and Components, Retrieved from the Internet: <URL: https://www.calmercornheads.com/bt.chopper-upgrade-kits/>, 19 pages.
Corn Head Parts, JD Harvest Parts Catalog, 2016, pp. 60.
Installation and Operating Instructions, Model 402, 303, 304 & 404 Com Head, 2017, pp. 28-30.
Instructions 360 Chainroll, John Deere 600 Series 2012+, 360 Yield Center, Dec. 2017, Version 5, 7 pages.
International Search Report and Written Opinion in PCT/US2013/072635, mailed Mar. 20, 2014, 9 pages.
International Search Report and Written Opinion in PCT/US2014/024716, mailed Jul. 7, 2014, 11 pages.
King, Alan C., "Allis-Chalmer 1918-1969: an Informal History," 1989, 62 pages.
Operator's Manual, 234 Sweet Com Harvester', International Harvestor Co., 1969, pp. 7-15.
Operator's Manual, 700 Series Com Heads for 815 and 915 Combines, International Harvestor Co., 1973, pp. 8-9.
Operator's Manual, 800 Series Com Heads, International Harvestor Co., 1978, pp. 14-15.
Operator's Manual, John Deere No. 227 Corn Picker Two-Row Mounted, 2017, 9 pages.
Operator's Manual, McCormick International 234 Corn Harvestor, McCormick International, 1996, pp. 8-9.
Pre-Delivery Instructions, John Deere 210 Com Attachment, John Deere, 1963, pp. 37-38.
RowMax Stalk Rolls, John Deere website, Jul. 2020, 6 pages.
RowMax, John Deere Winter Parts Catalog, 2018, pp. 32.
U.S. Pat. No. 730,671 A, issued Jun. 9, 1903 to G. D. Luce.
U.S. Pat. No. 799,237 A, issued Sep. 12, 1905 to Sterns F. Jones.

* cited by examiner

FIG. 1A
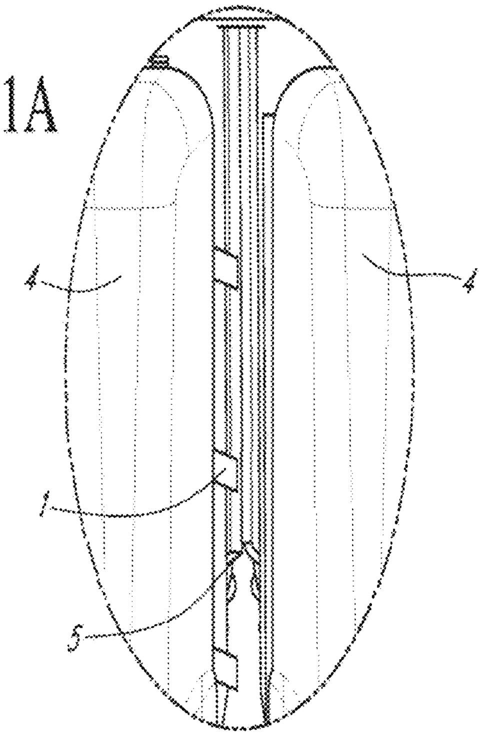
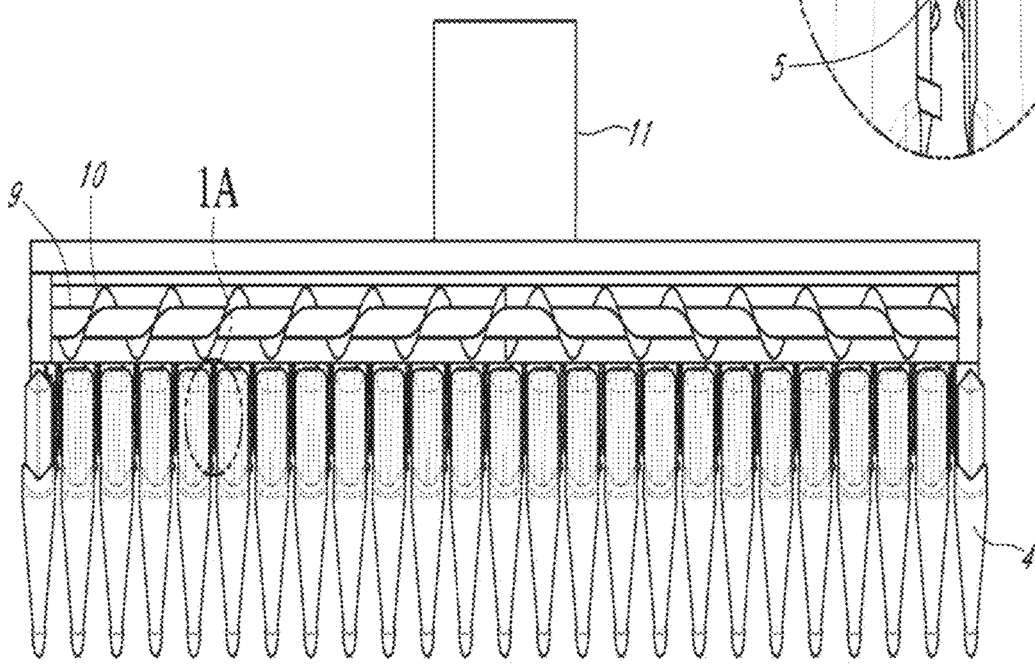
FIG. 1
(PRIOR ART)

STALK ROLL WITH MULTIPLE FLUTES OF DIFFERENT LENGTHS

CROSS REFERENCE TO RELATED APPLICATIONS

This application is a Continuation Application of U.S. Ser. No. 15/699,820, filed on Sep. 8, 2017, which is a Continuation-in-Part of U.S. Ser. No. 15/225,171, filed on Aug. 1, 2016, now U.S. Pat. No. 10,039,232, issued Aug. 7, 2018, which is a Continuation-in-Part of U.S. Ser. No. 14/206,710, filed Mar. 12, 2014, which is a Continuation-in-Part of U.S. Ser. No. 13/327,398, filed Dec. 15, 2011, now U.S. Pat. No. 9,560,804, issued Feb. 7, 2017, which claim priority under 35 U.S.C. § 119 to provisional application U.S. Ser. No. 62/385,173, filed Sep. 8, 2016, U.S. Ser. No. 62/281,096, filed Jan. 20, 2016, and U.S. Ser. No. 61/778,118, filed Mar. 12, 2013, all of which are herein incorporated by reference in their entirety.

FIELD OF THE INVENTION

The apparatus described herein is generally applicable to the field of agricultural equipment. The embodiments shown and described herein are more particularly for improved harvesting of corn plants.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX

Not Applicable

BACKGROUND OF THE INVENTION

Modern agriculture techniques require that during separation of a corn plant ear (or "ear") from a corn plant or corn plant stalk (or "stalk"), corn harvesting machines optimize the following considerations: (1) increase the rate of ear separation; (2) increase the speed at which stalks are ejected from the row unit; (3) retain minimal amounts of material other than ears ("MOTE") in the heterogeneous material being delivered to the harvesting machine for threshing; and, (4) lacerate, cut, and/or penetrate the shell of the stalk to expose the internal portions for accelerated decomposition of the stalk.

As shown in FIG. 1, modern corn headers are provided with a plurality of row crop dividers for retrieving, lifting, and directing the rows of stalks toward their respective corn plant engagement chambers. The corn plant engagement chamber is defined herein as the portion of the corn head row unit that engages the stalk and separates the ear from the corn plant. FIG. 1A shows the top view of two stalk rolls found in the prior art. Gathering chains located in the corn plant engagement chamber draw the stalks and/or ears towards the header. Stalk rolls located beneath the gathering chains pull the stalks rapidly downward, returning the stalk to the field. These stalk rolls are typically powered by a gearbox. As the stalk rolls rotate, the flutes on the stalk rolls engage and pull the stalks downward. Two stripper plates located above the stalk rolls, with one stripper plate on either side of the corn row, are spaced wide enough to allow the stalks and leaves to pass between them but narrow enough to retain the ears. This causes the ears to be separated from the corn plant as the stalk is pulled down through the stripper plates. The stalk rolls continue to rotate and eject the unwanted portions of the corn plant below the corn plant engagement chamber, thereby returning the unwanted portions of the corn plant to the field.

The performance of stalk rolls found in the prior art, as shown in FIGS. 3-5, has been found to be less than optimal. Attempts at increasing stalk roll performance and increasing ear separation speed have been made by increasing rotational speed of the stalk rolls. These attempts have been largely unsuccessful because stalk rolls having uniform length flutes rotating at high speeds simulate a solid rotating cylinder (sometimes referred to as an "egg-beater effect"), which restricts entry of the corn plant into the corn plant engagement chamber. The diameter of the simulated rotating cylinder is approximately equal to the distance from the tip of a first flute on a given stalk roll to the tip of a second flute oriented closest to 180 degrees from the first flute (i.e., two opposed flutes on a given stalk roll). This rotating-cylinder effect prevents individual flutes from engaging the stalk and restricts corn plants from entering the corn plant engagement chamber. Thus, stalk engagement is hindered and the corn plant hesitates and does not enter the corn plant engagement chamber.

The prior art has attempted to increase the performance of cutting or chopping stalk rolls by simply adding more flutes to the stalk rolls. In prior art applications, this reduces the performance of the stalk rolls because during rotation of the stalk rolls, a semi-continuous wall of steel restricts entry of the stalk into the corn plant engagement chamber, as noted above. Adding flutes decreases the likelihood of a stalk entering the space between two opposing stalk rolls. That is, as more flutes are added to the stalk roll, rotation of the stalk roll causes the stalk roll to more closely simulate a rotating cylinder. When viewed along the axis of rotation of the stalk roll (the direction from which the stalk rolls would approach the stalk), adding more flutes restricts the ability of the stalks to enter the corn plant engagement chamber due to interference from the ends of the flutes.

When the gathering chain paddle passes above the stripper plates and engages a stalk that is restricted from entering the corn plant engagement chamber, the gathering chain paddle will likely break or sever the stalk prior to ear separation. Stalk severance prior to ear separation increases intake of MOTE to the harvesting machine, thereby increasing horsepower and fuel requirements. Difficulty in stalks entering the area between to stalk rolls may also cause ear separation to take place near the opening of the row unit and allow loose ears to fall to the ground, thereby becoming irretrievable.

FIG. 3 shows prior art opposing stalk roll designs utilizing six flutes that inter-mesh and overlap. When the flutes of this type engage the stalk, the flutes alternately apply opposing force. This knife-edge relationship causes at least two problems. First, the corn plants are violently tossed from side to side causing premature separation of loosely attached ears, thereby permitting the ear to fall to the ground and become irretrievable. Second, the stalk is cut or snapped at a node causing long, unwanted portions of the stalk and leaves to stay attached to the ear and remain in the row unit. This increases the amount of MOTE the harvesting machine must process. This problem is compounded as the number of row units per corn head is increased.

FIG. 4 shows the prior art stalk roll design with intermeshing knife edges as described in U.S. Pat. No. 5,404,699. As shown, the stalk rolls have six outwardly extending integral flutes. Each flute has a knife edge that is provided with a leading surface and a trailing surface. The leading surface of the knife edge has a ten degree forward (with respect to the rotation of the stalk roll) slope and the trailing surface has a thirty degree reverse slope (with respect to the rotation of the stalk roll), both of which slopes are defined with respect to a line extending through the vertex of the knife edge and the central longitudinal axis of the stalk roll. Therefore, the leading surface is steeper than the trailing surface of each knife edge. The radially extending flutes are interleaved with one another in an intermeshing-type arrangement. The stalk rolls may be mounted in a cantilevered arrangement; or alternatively, in an arrangement employing nose bearings. The stalk roll comprises a cylindrical shell formed by two semi-cylindrical pieces that are clamped about a drive shaft. Bolts extend between the two semi-cylindrical pieces to pull the pieces together, thereby clamping the stalk rolls to the drive shaft.

This design, upon restricted engagement of the stalk roll with the stalk, allows the knife edges to cut stalks before pulling the stalks through the stripper plates to separate the ear from the stalk, effectively leaving the upper portion of the corn plant free to float in the corn row unit as shown in FIG. 3. This requires the harvesting machine threshing components to process a substantial portion of the stalk, which increases harvesting machine horsepower and fuel requirements.

FIG. 5 shows the design disclosed by U.S. Pat. No. 6,216,428, which is a stalk roll having bilaterally symmetric flutes with knife edges that are adjacent and overlap in the shear zone area. This design produces a shearing and cutting of the stalk using a scissor configuration produced by the leading and trailing edges of the opposing knife-edged flutes. Again, the stalks are cut off prior to ear separation. This is sometimes referred to as a "scissor effect" and also results in the need to process increased amounts of MOTE.

Case IH corn heads built prior to development of U.S. Pat. No. 6,216,428 used stalk rolls having four knives that are bolted to a solid shaft. Adjacent stalk rolls are registered with one another so that as the stalk rolls are rotated, the knives of the opposing stalk rolls are also opposing rather than intermeshing. In an opposing arrangement, the knives come into contact with opposite sides of the stalk at the same general height of the stalk, thereby lacerating the stalk for accelerated decomposition. It is important that the blades are correctly registered with one another, and that the blades are correctly spaced from one another. The stalk rolls used on Case IH corn heads require nose bearings at the forward end (with respect to the direction of travel of the harvesting machine during threshing) of the stalk rolls to operate properly and may not be mounted in a cantilevered arrangement.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 1 is a top view of one embodiment of a corn head that contains a cross auger, a feeder house, a frame, and multiple row units of the prior art.

FIG. 1A is an exploded top view of a portion of one row unit of FIG. 1 of the prior art showing a portion of the corn plant engagement chamber.

FIG. 51B is a side view of the stalk roll shown in FIG. 51A.

FIG. 51C is top view of the stalk roll shown in FIGS. 51A and 51B.

FIG. 51D is a longitudinal cross-sectional view of the stalk roll shown in FIGS. 51A-51C.

FIG. 52A is a perspective view of the right stalk roll shown in FIGS. 50A-50E.

FIG. 52B is a side view of the stalk roll shown in FIG. 52A.

FIG. 52C is top view of the stalk roll shown in FIGS. 52A and 52B.

DETAILED DESCRIPTION—ELEMENT LISTING

Figure 2:
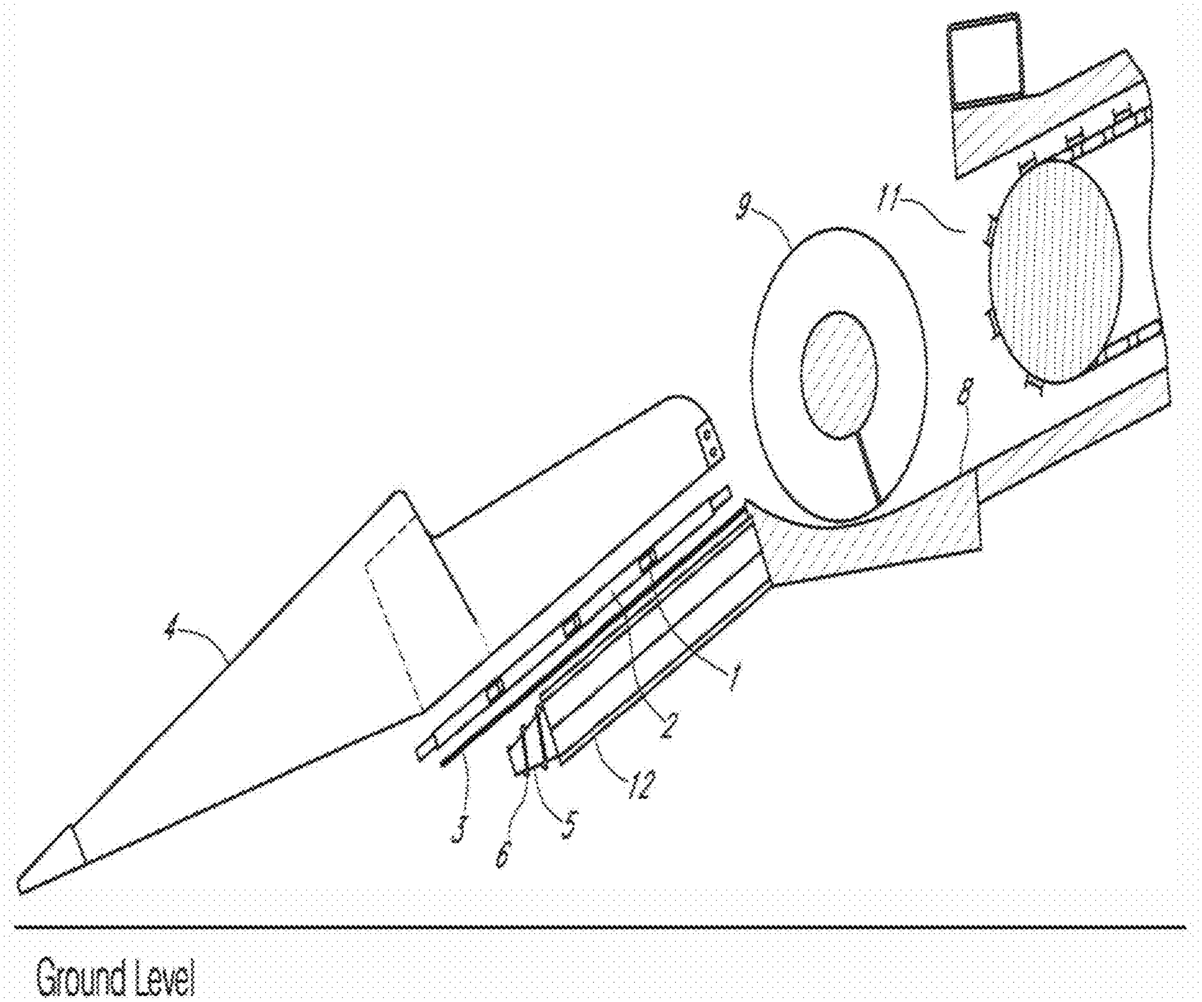
FIG. 2 is a cross-sectional view along the plane of A-A of one row unit, the cross auger, the cross auger trough, the feeder house, and the gathering chain from FIG. 1, as disclosed in the prior art.
Figure 3:
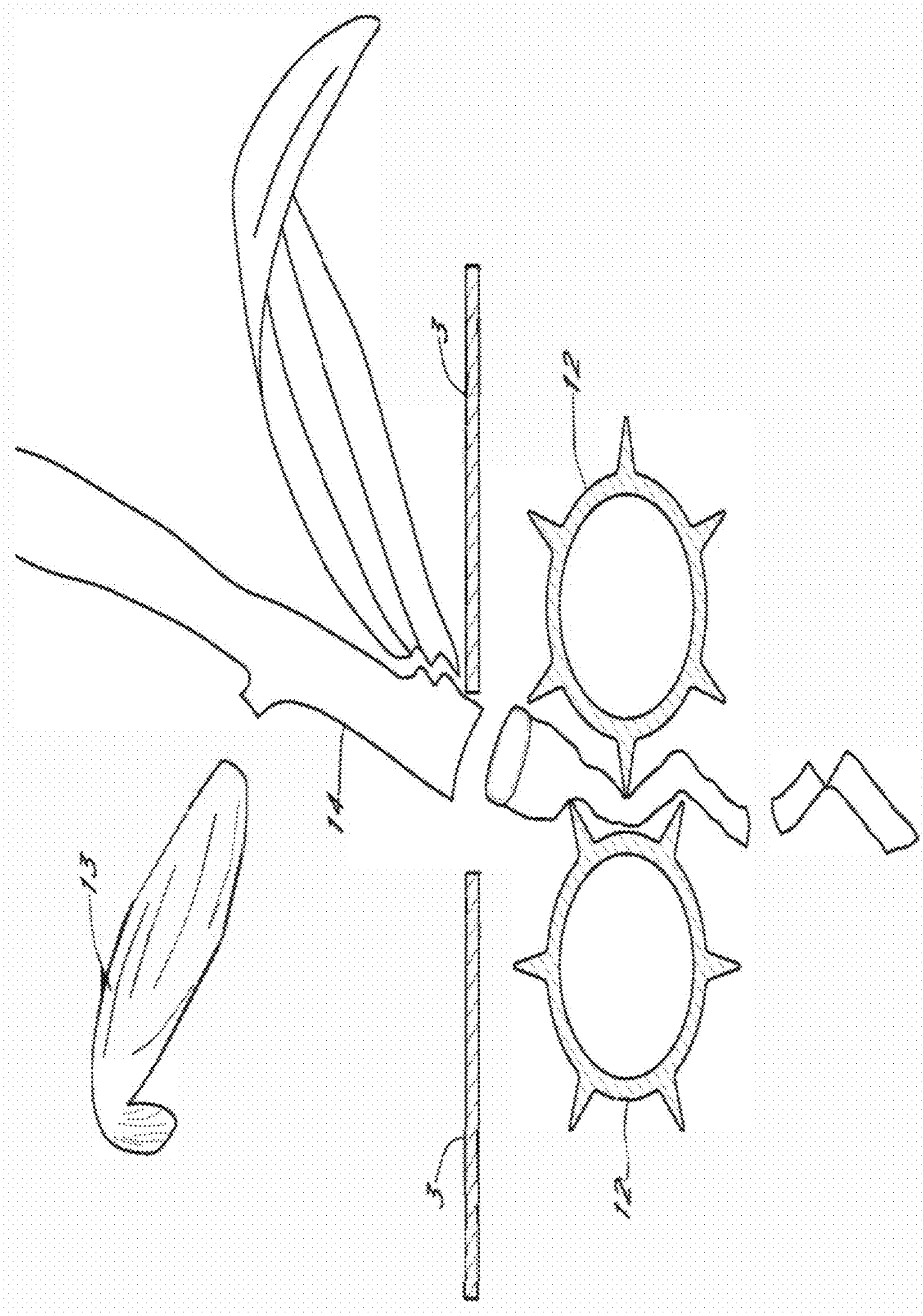
FIG. 3 is a cross-sectional view of a portion of the corn head shown in FIG. 1 along the plane F highlighting the stalk rolls and stripper plates of one row unit of the prior art engaged with and shearing a corn plant.
Figure 4:
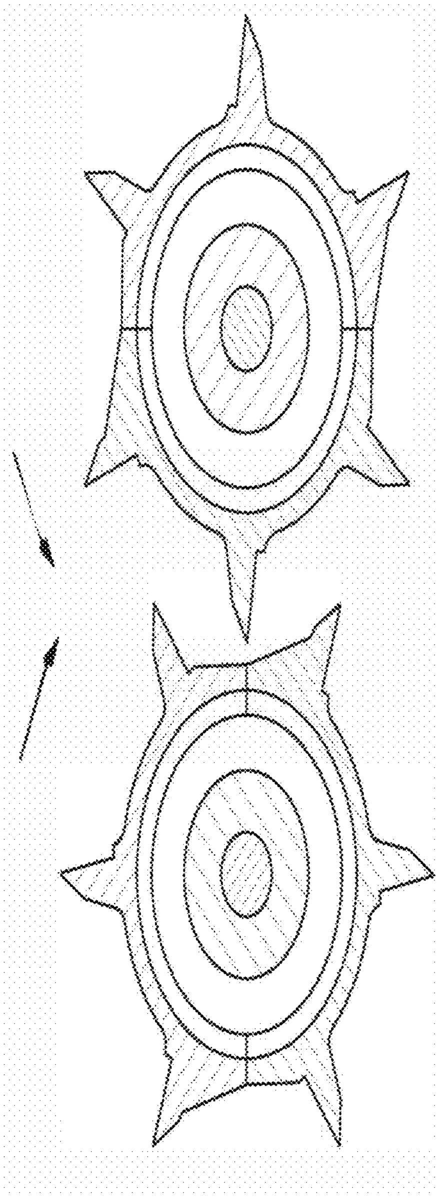
FIG. 4 is an end view of a pair of cutting-type stalk rolls as disclosed in the prior art.
Figure 5:
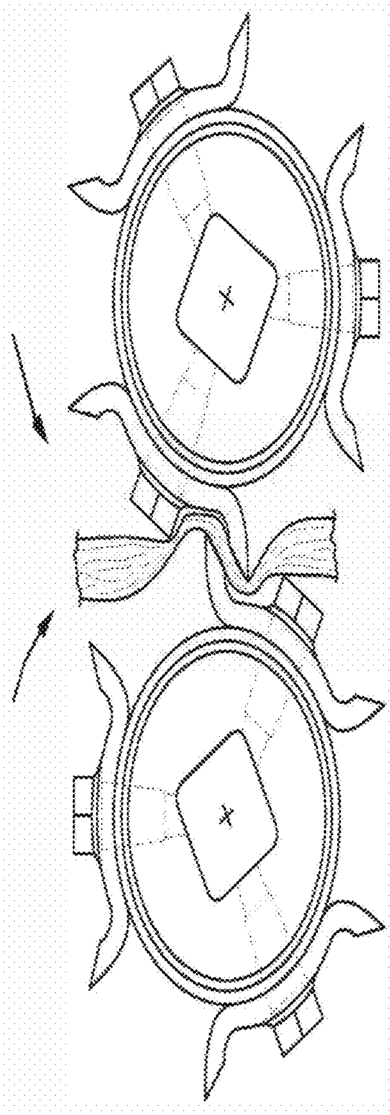
FIG. 5 is an end view of a pair of shearing-type stalk rolls as disclosed in the prior art.

| ELEMENT DESCRIPTION | ELEMENT # |
|---|---|
| Gathering chain paddle | 1 (110) |
| Gathering chain | 2 (120) |
| Stripper plate | 3 (130) |
| Row divider | 4 (100) |
| Nose cone | 5 |
| Transport vane | 6 (170) |
| Stalk slot | 7 |
| Cross auger trough | 8 (200) |
| Cross auger | 9 (220) |
| Cross auger fighting | 10 (230) |
| Feeder house | 11 |
| Stalk roll (Prior Art) | 12 |
| Ear | 13 (300) |
| Outer shell of stalk | 14 (321) |
| First (right) stalk roll | 15 |
| Second (left) stalk roll | 16 |
| Cylindrical shell | 17 |
| First flute | 18 |
| Second flute | 19 |
| Third flute | 20 |
| Fourth flute | 21 |
| Knife edge | 22 |
| Leading surface | 23 |
| Trailing surface | 24 |
| Stalk engagement gap | 25 |
| Fifth flute | 26 |
| Semi-cylindrical shell (Upper) | 27 |
| Semi-cylindrical shell (Lower) | 28 |
| Stalk roll drive shaft | 29 |
| Annular ridge | 30 |
| Short bolt hole | 31 |
| Short bolt | 32 |
| Sixth flute | 33 |
| Bolt receiver | 34 |
| Long bolts | 36 |
| Long bolt hole | 37 |
| Intermediate drive shaft | 38 |
| Drive shaft bolt | 39 |
| Small pin | 40 |
| Large pin | 41 |
| Row unit cover | 100 |
| Ear separation chamber | 140 |
| Short flute | 180 |
| Tapered flute | 181 |
| Intermediate flute | 182 |
| Long flute | 183 |
| Stalk roll | 190 (192) |
| Underside of leaf | 310 |
| Stalk | 320 |
| Stalk outer shell | 321 |
| First grasp point | 322 |
| Second grasp | 323 |
| Stalk cut point | 324 |
| Stalk piece | 326 |
| Stalk node | 330 |
| Stalk roll | 400 |
| Nose cone | 410 |
| Flighting | 412 |
| Sleeve | 414 |
| Recess | 420 |
| Bladeless area | 422 |
| Main cylinder | 430 |
| Retainer | 432 |
| Full flute | 440 |
| Hybrid flute | 440a |
| Axial face | 441 |
| Flute edge | 442 |
| Radius | 443 |

-continued

| ELEMENT DESCRIPTION | ELEMENT # |
|---|---|
| Leading surface | 444 |
| Trailing surface | 445 |
| Leading wall | 446 |
| Trailing wall | 447 |
| Beveled edge | 448 |
| Flute base | 449 |
| Aperture | 449a |
| Base bevel | 449b |
| Reduced flute | 450 |
| Second reduced flute | 450a |
| Short flute | 460 |
| Notch | 462 |
| Axial point | 464 |
| Hub assembly | 470 |
| Aperture | 471 |
| Flange | 472 |
| Shelf | 472a |
| Engagement surface | 473 |
| Recessed surface | 474 |
| Central bore | 475 |
| Coupler section | 475a |
| Slot | 476 |
| End ring | 478 |
| Stalk roll | 400' |
| Aperture | 402' |
| Anchor | 402a' |
| Support member | 404' |
| Planar surface | 404a' |
| Relief | 404b' |
| Bladeless area | 422' |
| Main cylinder | 430' |
| Taper | 434' |
| Full flute | 440' |
| Hybrid flute | 440a' |
| Axial face | 441' |
| Flute edge | 442' |
| Sharp edge | 442a' |
| Blunt edge | 442b' |
| Radius | 443 |
| Leading surface | 444' |
| Trailing surface | 445' |
| Leading wall | 446' |
| Trailing wall | 447' |
| Beveled edge | 448 |
| Reduced flute | 450' |
| Second reduced flute | 450a' |
| Short flute | 460' |
| Notch | 462' |
| Axial point | 464' |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes— from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. The term "stalk roll" 15, 16, 190, 192, 400, 400' and "flute" 440, 440*a*, 450, 450*a*, 460, 440', 440*a'*, 450', 450*a'*, 460' may be used interchangeably when referring to generalities of configuration and/or corresponding components, aspects, features, functionality, methods and/or materials of construction, etc. thereof, whether separately employed or incorporated into a stalk roll 15, 16, 190, 192, 400, 400', flute 440, 440*a*, 450, 450*a*, 460, 440', 440*a'*, 450', 450*a'*, 460' row unit, and/or corn header, unless explicitly stated otherwise. "Stalk roll" and "flute" as used herein are not limited to any specific aspect, feature, and/or configuration thereof, and may include any stalk roll having one or more inventive feature disclosed herein unless so indicated in the following claims.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

1. Stalk Rolls with a Stalk Engagement Gap

Referring now to the drawings, wherein like reference numerals designate identical or corresponding parts throughout the several views, the general operation of corn heads having stalk rolls mounted thereon of the type illustrated in FIGS. 6-9 is similar to the operation of corn heads using stalk rolls 12 of the prior art (as illustrated in FIGS. 1-5). As used herein, "left" and "right" are defined from the perspective of a corn plant with respect to a harvesting machine.

Figure 11:
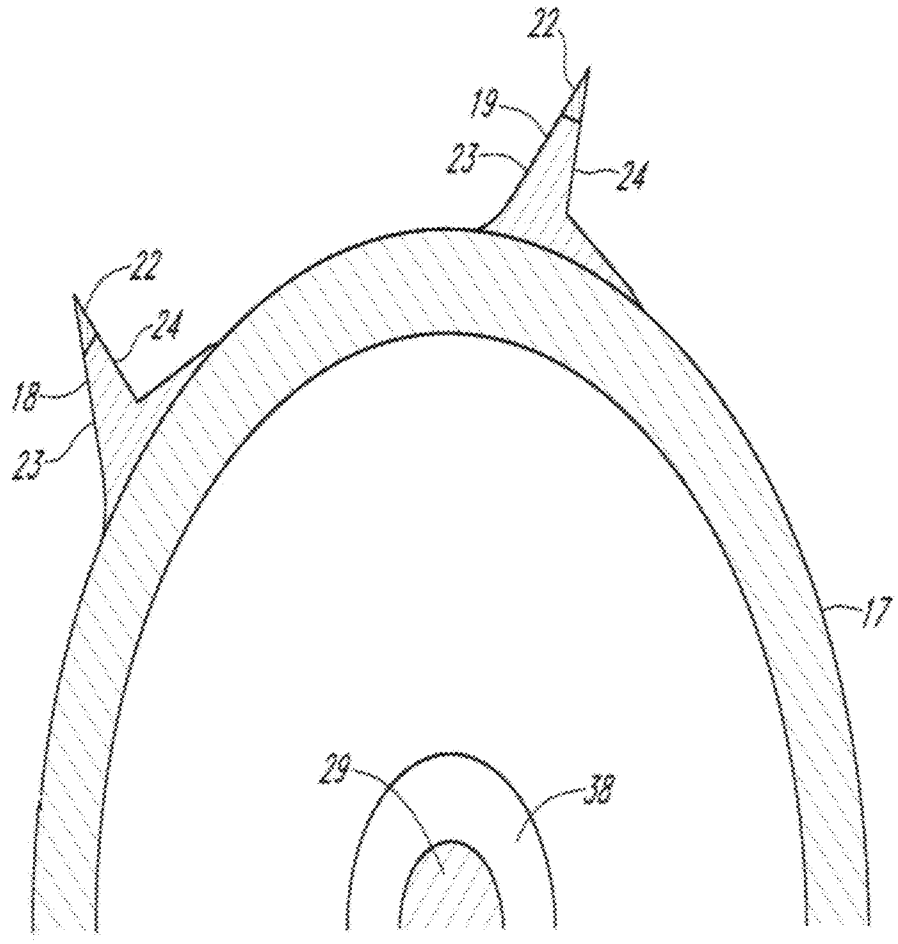
FIG. 11 is an end view of an opposing pair of one illustrative embodiment of the present art stalk rolls illustrating flutes with knife edges.

The power source for this corn head row unit is provided from a stalk roll drive shaft 29 through a gearbox, as described in the prior art and is well known to those skilled in the art and not pictured herein. Each corn head row unit on a corn header is provided with a first and second stalk roll 15, 16 arranged parallel to one another to make an opposing pair. The first and second stalk rolls 15, 16 are provided with nose cones 5 having transport vanes 6. Immediately behind the nose cones 5 are cylindrical shells 17 having a first, second, third, and fourth flute 18, 19, 20 and 21, respectively, mounted along the length of the first and second stalk rolls 15, 16 (as can easily be seen in FIG. 6). Each flute 18, 19, 20, 21 may further be provided with a knife edge 22, as is shown in detail in the embodiment depicted in FIG. 11. The knife edges 22 are substantially parallel to the central longitudinal axis of the cylindrical shell 17. As shown in the embodiment in FIGS. 6-9, the stalk rolls 15, 16 may be mounted in the cantilevered manner for rotation by their respective stalk roll drive shafts (not shown), thereby eliminating the need for support brackets or nose bearings.

As with corn headers employing stalk rolls 12 of the prior art, the stalk rolls 15, 16 of the present disclosure pull the stalk 320 in a downward motion, causing the ears 13 to contact the stripper plates 3 and separate from the stalk 320. The flutes 18, 19, 20, 21 affixed to the stalk rolls 15, 16 may also act to lacerate or crush the stalk 320, and also facilitate ejection of the stalk 320 from the corn plant engagement chamber. Gathering chain paddles 1 affixed to gathering chains 2 transport the loose ears 13 to the cross auger trough 8. The cross auger 9 moves the ears 13 from the cross auger trough 8 to the feeder house 11, which moves the ears 13 into the remainder of the harvesting machine for further processing, all of which is well known to those skilled in the art.

Figure 8:
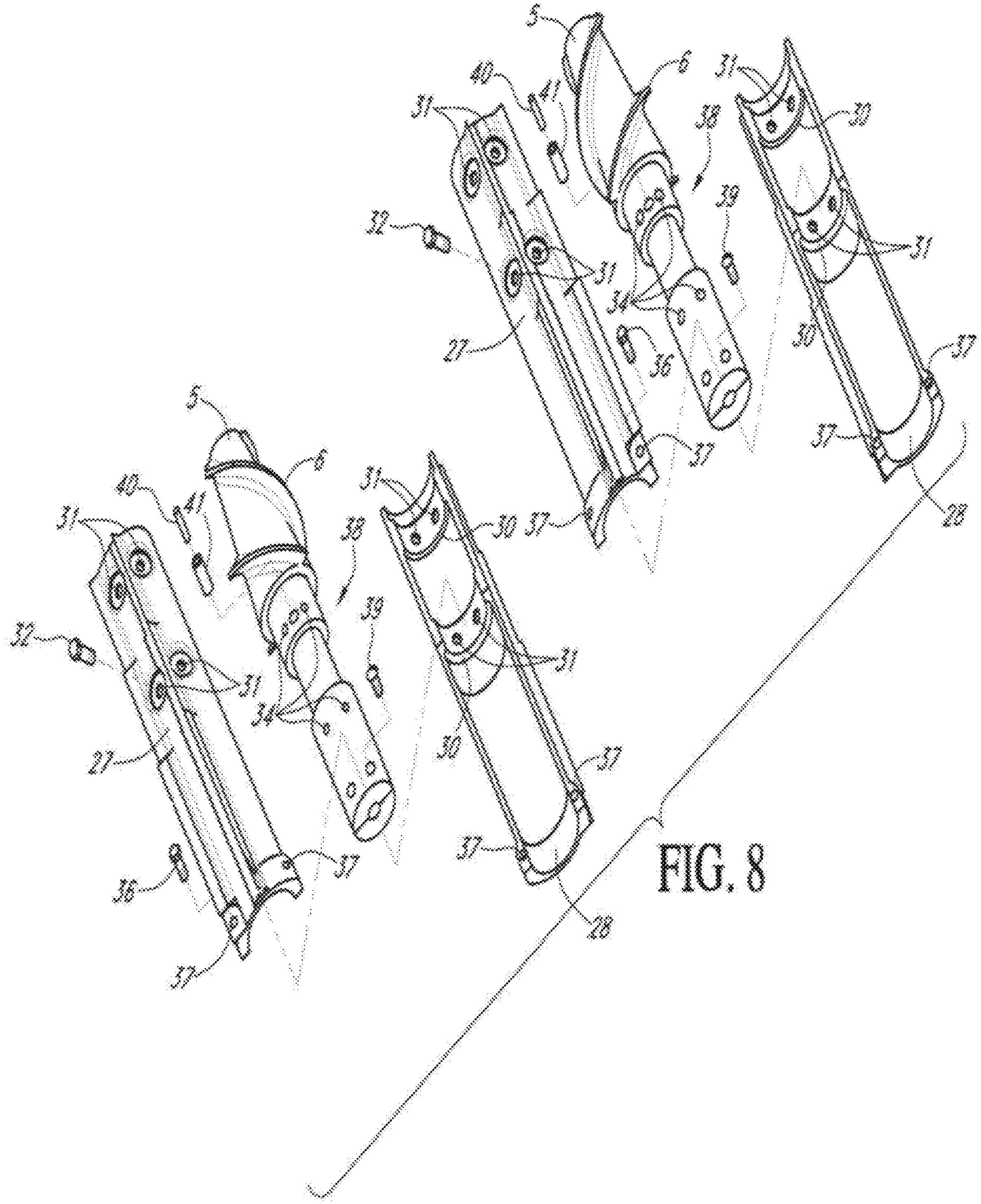
FIG. 8 is an exploded view of a pair of stalk rolls shown in FIGS. 6 & 7.

In an embodiment not pictured herein, the stalk rolls 15, 16 may be manufactured as one piece adapted for engagement upon the stalk roll drive shaft 29. In another embodiment, the first and second stalk rolls 15, 16 may be built as two continuous, integral, semi-cylindrical shells to be bolted to a stalk roll mounting base (not shown) into which the stalk roll drive shaft 29 is inserted, as is best illustrated in FIG. 8. The cylindrical shell 17 may be comprised of two semi-cylindrical shell pieces, an upper semi-cylindrical shell 27 and a lower semi-cylindrical shell 28, that are bolted to the intermediate drive shaft 38. The long bolt holes 37 and long bolts 36 with nuts or other securing members, along with the short bolt holes 31, short bolts 32, and bolt receivers 34, form a structure for mounting the cylindrical shell 17 to the intermediate drive shaft 38, which then may be mounted to the stalk roll drive shaft 29.

FIG. 8 best illustrates the mounting structure for an embodiment employing semi-cylindrical shells 27, 28. In one embodiment, each semi-cylindrical shell 27, 28 is fashioned with two inwardly extending annular ridges 30 having short bolt holes 31. Short bolts 32 pass through the short bolt holes 31 and engage bolt receivers 34 located on an intermediate drive shaft 38. Long bolts 36 pass through the long bolt holes 37 of two corresponding upper and lower semi-cylindrical shells 27, 28, and with a nut or other securing member clamp the semi-cylindrical shells 27, 28 together around the intermediate drive shaft 38. The intermediate drive shaft 38 is clamped to the stalk roll drive shaft 29 by drive shaft bolts 39. In addition, a small pin 40 and a large pin 41 prevent relative rotation between the intermediate drive shaft 38 and the stalk roll drive shaft (not shown in FIG. 8).

Each semi-cylindrical shell 27, 28 may be manufactured having at least two integral flutes. In one embodiment, the flutes are then machined to define the knife edge 22. Each knife edge 22 has a leading surface 23 and a trailing surface 24 that form an acute angle between them of approximately forty degrees, as shown in the embodiment pictured in FIG. 11. The leading surface is a rearward (with respect to the direction of rotation of one of the stalk rolls 15, 16 of an opposing pair) sloping surface, sloping approximately ten degrees from a line passing through the central longitudinal axis of the cylindrical shell 17 and the vertex of the knife edge 22. The trailing surface 24 is a forward (with respect to the direction of rotation of one of the stalk rolls 15, 16 of an opposing pair) sloping surface, sloping approximately thirty degrees from a line passing through the central longitudinal axis of the cylindrical shell 17 and the vertex of the knife edge 22. Other slopes and angles of the leading surface 23 and the trailing surface 24 may be used without departing from the spirit or scope of the stalk roll 15, 16. As is well known to those skilled in the art, tungsten carbide may be applied to the trailing surfaces 24 to make the knife edges 22 self-sharpening. Although not shown, the layer of tungsten carbide is generally between three and twenty thousandths of an inch thick and is induction hardened.

As illustrated in FIGS. 6-9, the flutes 18, 19, 20, 21 of the opposing first and second stalk rolls 15, 16 are offset to one another but not interleaved. As those of ordinary skill in the art will appreciate, though not pictured, the stalk roll design disclosed herein may also be implemented with a rounded flute edge or edge that does not have knife-like characteristics. Accordingly, the scope of the stalk roll 15, 16 is not limited by type of edge fashioned on the flute or the specific cross-sectional shape of the flute.

The present art alleviates the impediment to flow of stalks 320 into the corn plant engagement chamber (which impediment is a result of the egg-beater effect, as described above) by creating at least one stalk engagement gap 25 in the stalk slot 7 per revolution of the stalk roll 15, 16, which is explained in detail below. When the stalk engagement gap 25 is present, corn plant entry into the corn plant engagement chamber is not restricted.

Figure 9A:
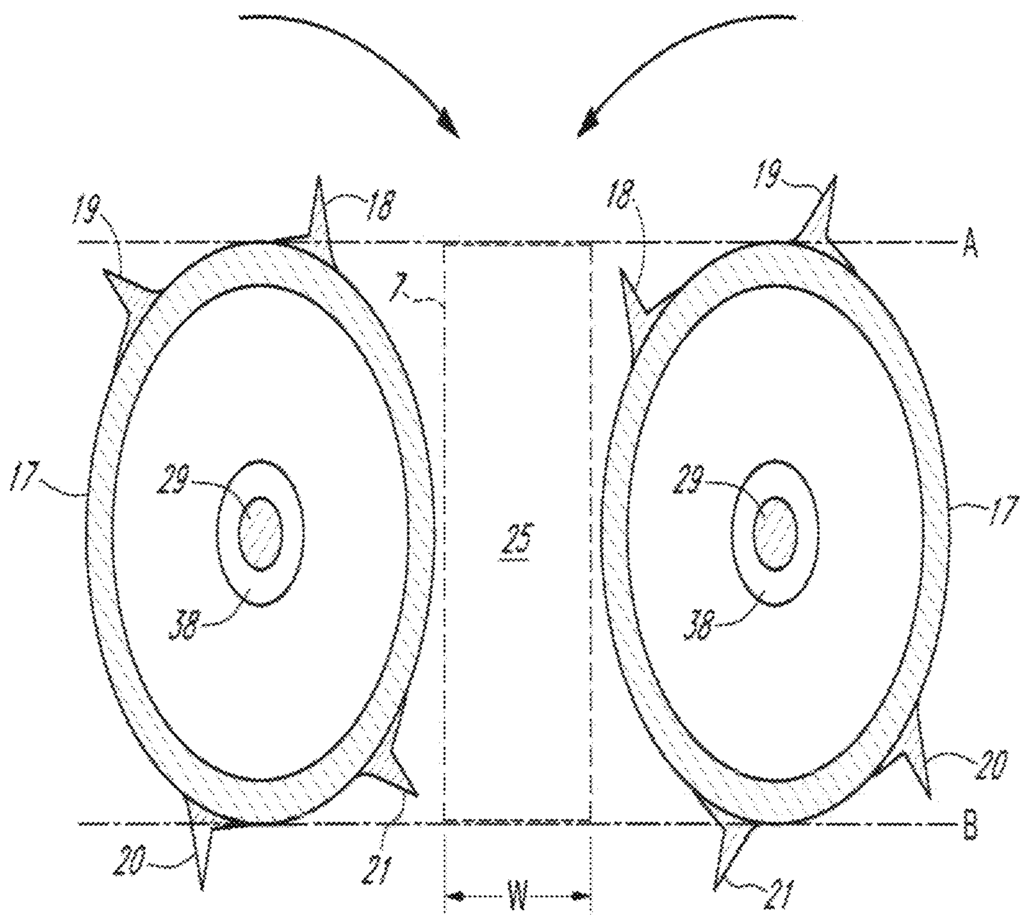
FIG. 9A is an end view of an opposing pair of one illustrative embodiment of the present art stalk rolls positioned to illustrate a first moment during which the stalk engagement gap is present.
Figure 9B:
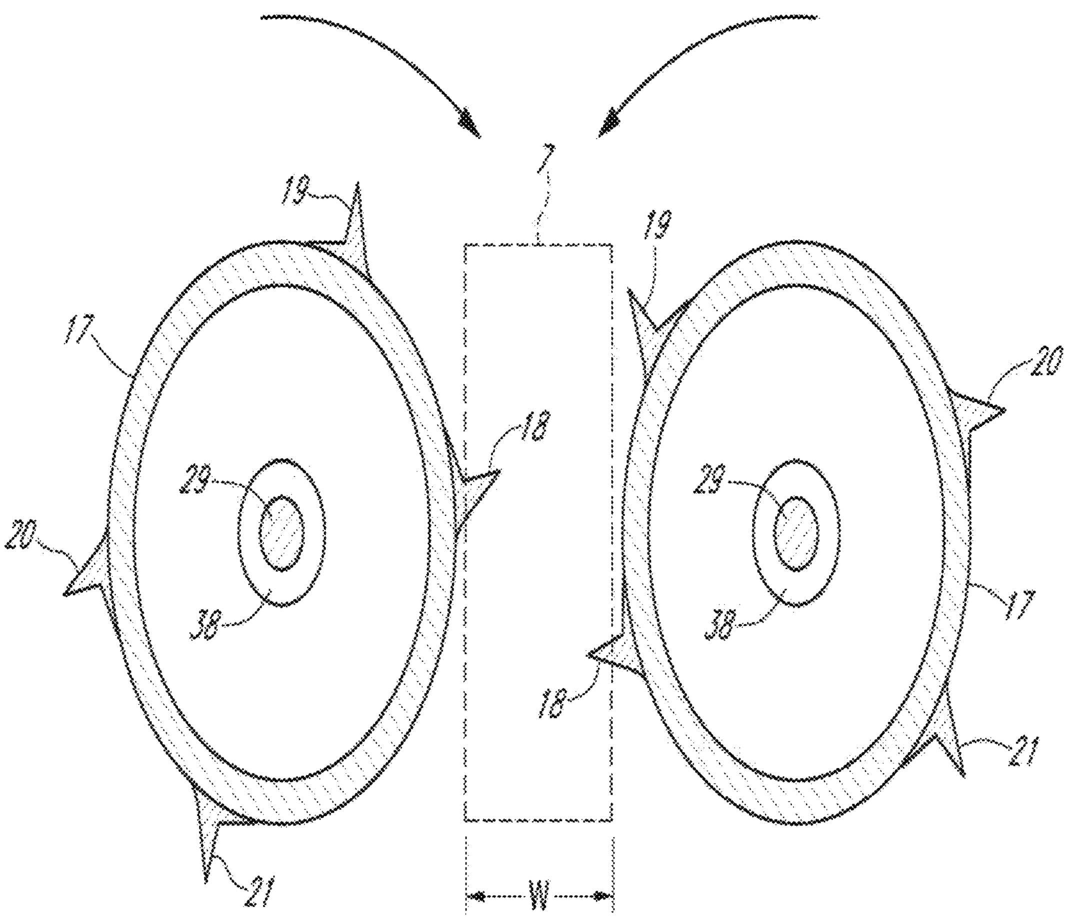
FIG. 9B is an end view of an opposing pair of one illustrative embodiment of the present art stalk rolls at a moment in time later than that depicted in FIG. 9A showing the stalk rolls rotated so that the stalk engagement gap is no longer present due to the first opposing flutes positioned in the stalk slot.
Figure 9C:
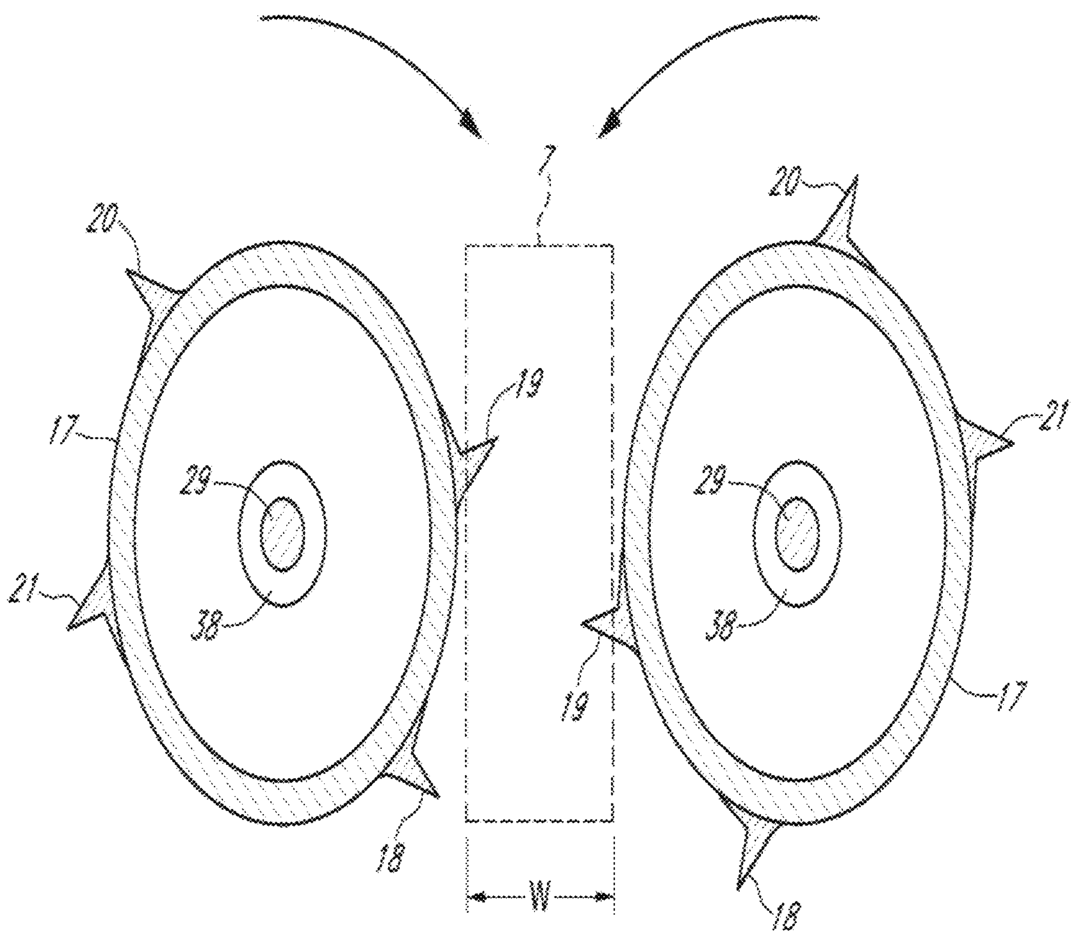
FIG. 9C provides an end view an opposing pair of one illustrative embodiment of the present art stalk rolls at a moment in time later than that depicted in FIG. 9B showing the stalk rolls rotated so that the stalk engagement gap is not present due to the second opposing flutes positioned in the stalk slot.
Figure 9D:
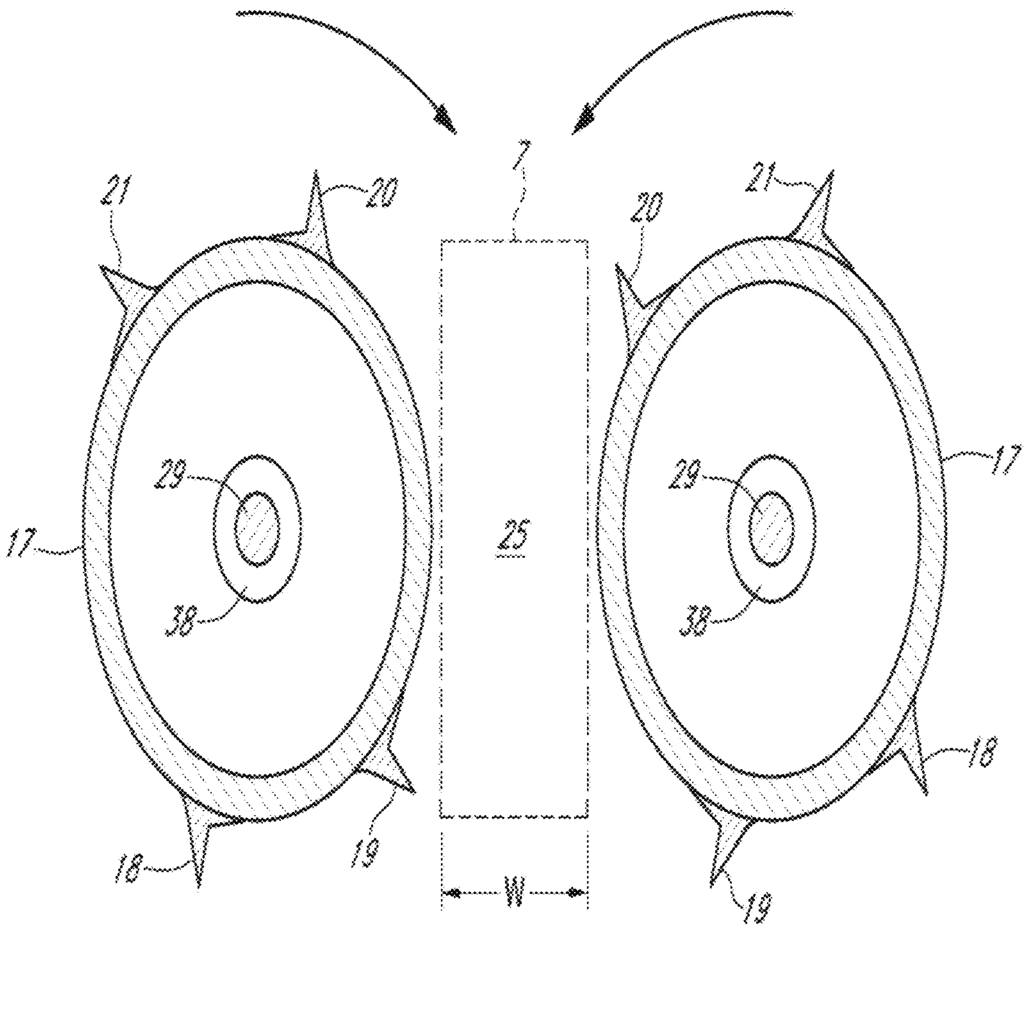
FIG. 9D is an end view of an opposing pair of one illustrative embodiment of the present art stalk rolls at a moment in time later than that depicted in FIG. 9C showing the stalk rolls rotated to a position where the stalk engagement gap is present for the second time during one revolution of the stalk rolls.
Figure 9E:
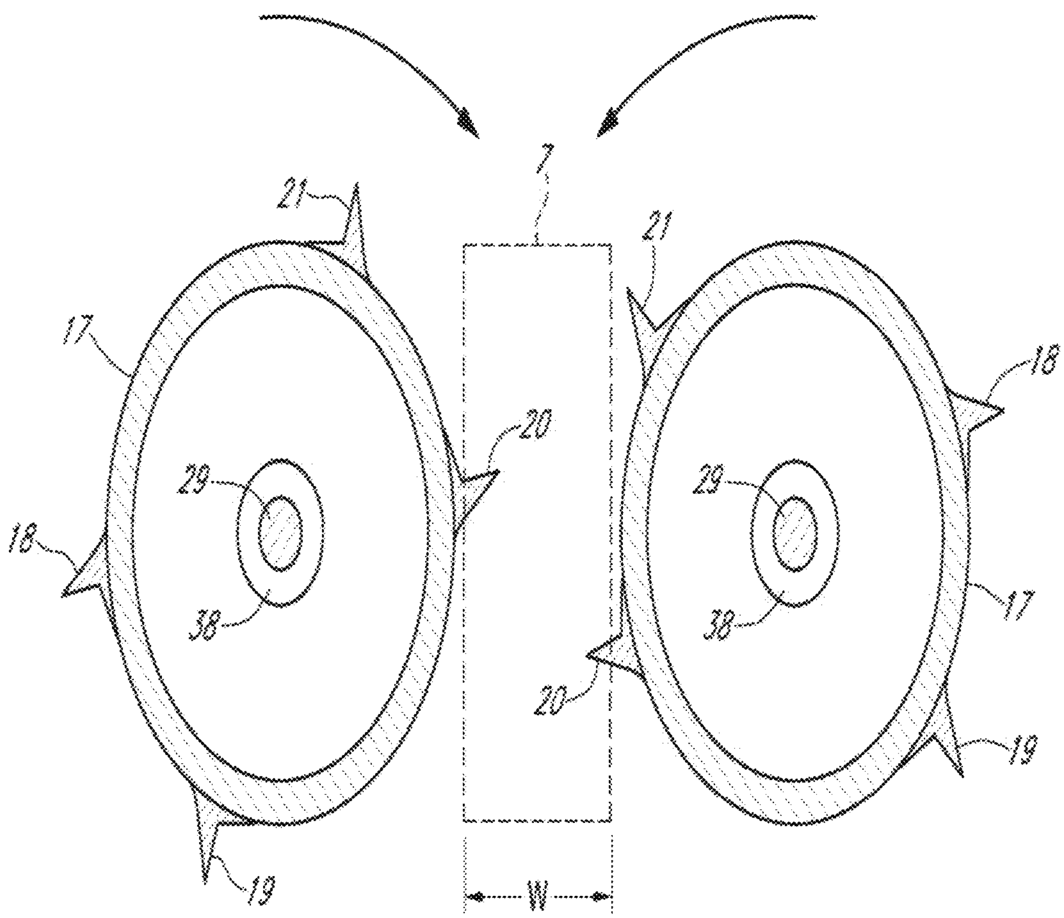
FIG. 9E is an end view of an opposing pair of one illustrative embodiment of the present art stalk rolls at a moment in time later than that depicted in FIG. 9D showing the stalk rolls rotated so that the stalk engagement gap is no longer present due to the third opposing flutes positioned in the stalk slot.
Figure 9F:
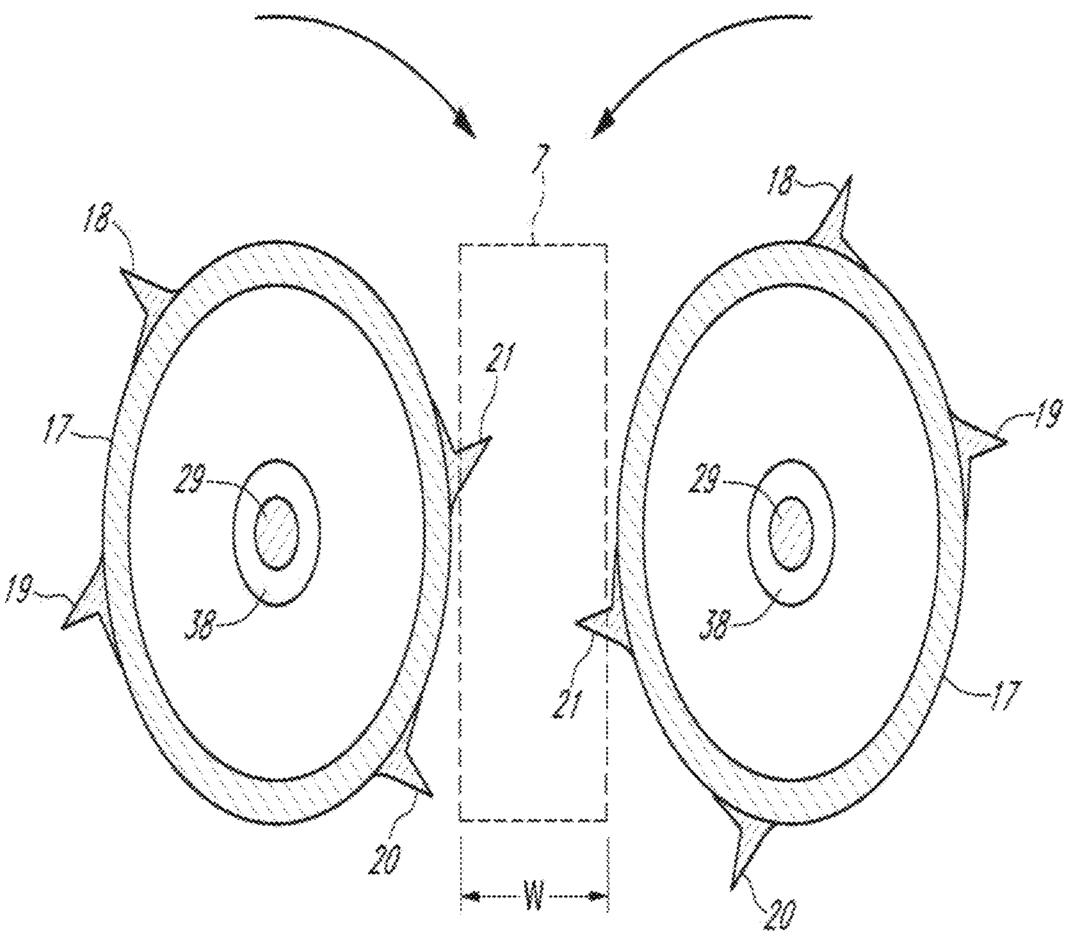
FIG. 9F is an end view of an opposing pair of one illustrative embodiment of the present art stalk rolls at a moment in time later than that depicted in FIG. 9E showing the stalk rolls rotated so that the stalk engagement gap is not present due to the fourth opposing flutes positioned in the stalk slot.
Figure 10:
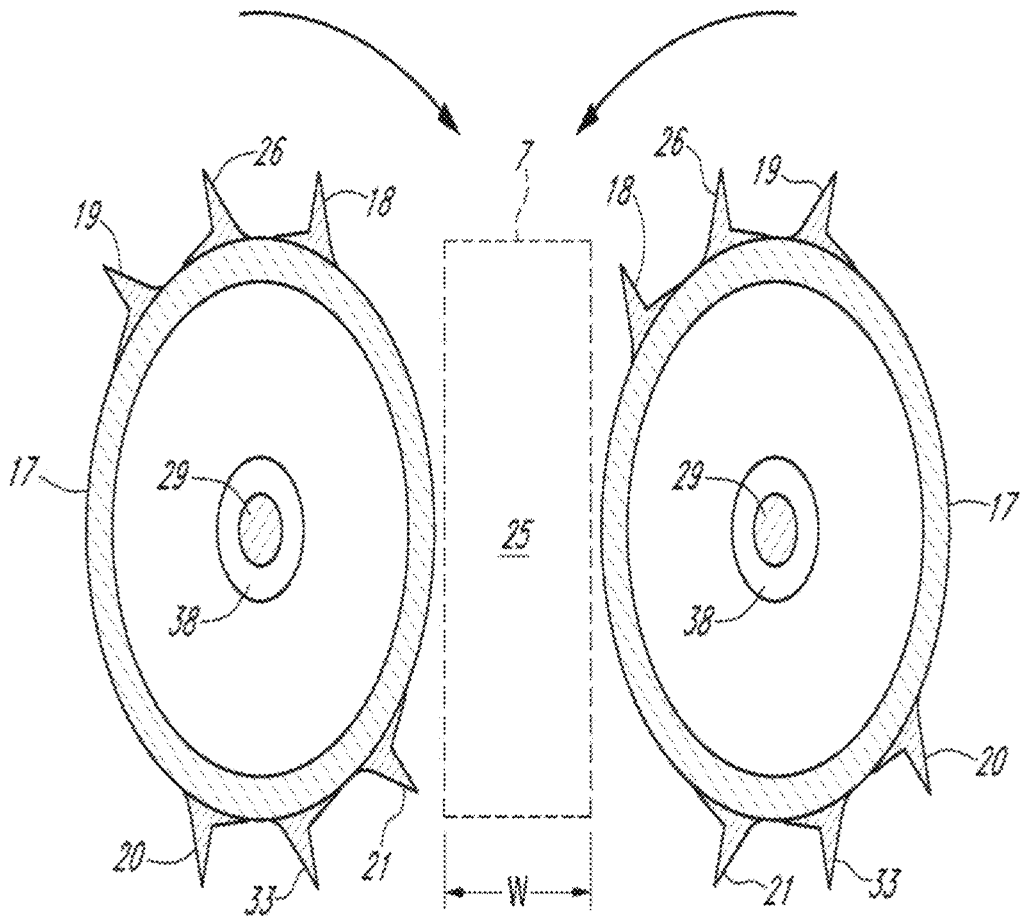
FIG. 10 is an end view of a another illustrative embodiment of an opposing pair of the present art stalk rolls having fifth and sixth flutes with a rotational position corresponding to the position of the stalk rolls in FIG. 9A.

As may be seen for the embodiment in FIGS. 9A-9F, the width of the stalk slot 7 is defined as the distance between the inner periphery of the cylindrical shells 17 of the opposing stalk rolls 15, 16, which width is denoted "W" in FIGS. 9A-10. Other embodiments described in detail below include an recess 420, which may affect the width of the stalk slot 7. The height of the stalk slot 7 is essentially infinite, though in practicality the ground surface provides a lower limit. The stalk engagement gap 25, as shown in FIGS. 9A, 9D, and 10, is then defined as the moment(s) during revolution of the first and second stalk rolls 15, 16 in which none of the flutes 18, 19, 20, 21 of the first or second stalk roll 15, 16 are positioned within the stalk slot 7. FIGS. 9B, 9C, 9E, and 9F illustrate the stalk slot 7 after the stalk engagement gap 25 is closed.

FIGS. 9A-9F provide six views of the stalk slot 7 at six different moments during one revolution of the stalk rolls 15, 16, with the direction of rotation of the stalk rolls 15, 16 indicated by the respective arrows. As will be explained in detail below, the embodiment shown in FIGS. 9A-9F is configured so that the stalk engagement gap 25 is present at two different moments in time during one revolution of the stalk rolls 15, 16; and as will be apparent to those skilled in the art, this is but one of many embodiments the stalk rolls 15, 16 may take. Throughout one revolution of the stalk rolls 15, 16, at any point in time, the flutes 18, 19, 20, 21 may be engaged in five different modes of action upon a stalk 320 at any point along the axial length of the flute 18, 19, 20, 21 (depending on the location and orientation of the flutes 18, 19, 20, 21 and the particular embodiment). The five modes of action upon the stalk 320 are: (1) unrestricted entry of the stalk 320 into the corn plant engagement chamber (which occurs at the moment in time shown in FIGS. 9A and 9D, although restricted entry may occur at other moments in time); (2) flute 18, 19, 20, 21 or knife engagement with the stalk 320 (which may occur at moments in time shown in FIGS. 9B, 9C, 9E, and 9F, but may also occur at other moments in time); (3) lacerating and crushing of the stalk 320 by the flutes 18, 19, 20, 21 or knives (which may occur at the moments in time shown in FIGS. 9B, 9C, 9E, and 9F, but may also occur at other moments in time); (4) ear separation and stalk 320 ejection (which may occur at moments in time shown in FIGS. 9B, 9C, 9E, and 9F, but may also occur at other moments in time); (5) stalk 320 release by the stalk rolls 15, 16 for lateral travel of the stalk 320 (which most often occurs at moments in time shown in FIGS. 9A and 9D, but may also occur at other moments in time).

FIG. 9A shows the stalk engagement gap 25, and illustrates that when the stalk engagement gap 25 appears, no flutes 18, 19, 20, 21 are located in the stalk slot 7. When the stalk rolls 15, 16 are in this position a stalk 320 (not shown) may freely enter the stalk slot 7 and the corn plant engagement chamber with no restriction. The stalk engagement gap 25 also allows stalks 320 already positioned between the stalk rolls 15, 16 to travel in a lateral direction to compensate for the forward motion of the harvesting machine to which the corn head is attached.

FIG. 9B shows the stalk slot 7 at a later moment in time after the stalk rolls 15, 16 have rotated from their positions shown in FIG. 9A. FIG. 9B shows that at this point, the first flute 18 of each stalk roll 15, 16 has moved into the stalk slot 7 so that there is no stalk engagement gap 25, and the first flutes 18 of the respective stalk rolls 15, 16 now engage any stalk 320 between the stalk rolls 15, 16. This engagement may serve to lacerate or crush the stalk 320, or to pull the stalk 320 downward through the corn plant engagement chamber and subsequently eject the stalk 320 depending on the specific embodiment.

FIG. 9C shows the stalk slot 7 at still a later moment in time wherein the second flute 19 of each stalk roll 15, 16 has moved into the stalk slot 7 so that there is still no stalk engagement gap 25. The second flutes 19 of each respective stalk roll 15, 16 now engage any stalk 320 between the stalk rolls 15, 16. This engagement may serve to lacerate or crush the stalk 320, or to pull the stalk 320 downward through the corn plant engagement chamber and subsequently eject the stalk 320 depending on the specific embodiment.

FIG. 9D provides a snapshot of the stalk slot 7 at a moment in time later than the moment depicted in FIG. 9C, and shows the stalk engagement gap 25 present for the second time during this revolution of the stalk rolls 15, 16. The stalk engagement gap 25 is present since no flutes 18, 19, 20, 21 are positioned within the stalk slot 7 when the stalk rolls 15, 16 are positioned as in FIG. 9D, and a stalk 320 (not shown) may again freely enter the stalk slot 7 and the corn plant engagement chamber with no restriction. Again, the stalk engagement gap also allows stalks 320 already positioned between the stalk rolls 15, 16 to travel in a lateral direction to compensate for the forward motion of the harvesting machine to which the corn head is attached.

FIG. 9E shows the stalk slot 7 at a later moment in time from the moment shown in FIG. 9D wherein the third flute 20 of each stalk roll 15, 16 has moved into the stalk slot 7 so that there is no stalk engagement gap 25. At this point, the third flutes 20 of the respective stalk rolls 15, 16 now engage any stalk 320 between the stalk rolls 15, 16. As with similar moments in time already explained, this engagement may serve to lacerate or crush the stalk 320, or to pull the stalk 320 downward through the corn plant engagement chamber and subsequently eject the stalk 320 depending on the specific embodiment.

FIG. 9F shows the stalk slot 7 at still a later moment in time wherein the fourth flute 21 of each stalk roll 15, 16 have moved into the stalk slot 7 so that there is still no stalk engagement gap 25. Here, the fourth flutes 21 of the respective stalk rolls 15, 16 engage any stalk 320 between the stalk rolls 15, 16. Again, this engagement may serve to lacerate or crush the stalk 320, or to pull the stalk 320 downward through the corn plant engagement chamber and subsequently eject the stalk 320 depending on the specific embodiment. As will be apparent to those skilled in the art, the next snapshot in time of the stalk slot 7 according to the pattern indicated by FIGS. 9A-9F will be identical to FIG. 9A, and would provide the last view of one full revolution of the stalk rolls 15, 16.

FIGS. 6-9 show an illustrative embodiment wherein the stalk rolls 15, 16 and their respective flutes 18, 19, 20, 21 are configured so that two stalk engagement gaps 25 appear per revolution of the stalk rolls 15, 16. As those of ordinary skill in the art will appreciate, the stalk rolls 15, 16 and their respective flutes 18, 19, 20, 21 may be configured so that nearly any number of stalk engagement gaps 25 appear per revolution of the stalk rolls 15, 16. For example, although not shown in the figures herein, one of ordinary skill in the art could easily add a fifth flute to the stalk rolls 15, 16 between the fourth and first flutes 18, 21 on each stalk roll 15, 16; and thereby reduce the number of stalk engagement gaps 25 per revolution of the stalk rolls 15, 16 from two to one.

In the illustrative embodiment shown in FIGS. 6-9, two structural features are necessary to create two stalk engagement gaps 25 per revolution of the stalk rolls 15, 16. First, the flutes 18, 19, 20, 21 of each stalk roll 15, 16 must be positioned around the circumference of the stalk roll 15, 16 in a non-equidistant manner. That is, the circumferential distance between the first flute 18 and fourth flute 21 is greater than the circumferential distance between the third flute 20 and fourth flute 21 on each stalk roll 15, 16. Likewise, the circumferential distance between the second flute 19 and third flute 20 is greater than the circumferential distance between the first flute 18 and second flute 19 of each stalk roll 15, 16. However, this may be achieved using flutes 18, 19, 20, 21 of different lengths so as to vary the circumferential distance between terminal ends of flutes 18, 19, 20, 21. Second, the first stalk roll 15 of an opposing pair is positioned on its respective stalk roll drive shaft 29 so that it is slightly advanced (with respect to rotational positions of the flutes 18, 19, 20, 21) compared to the second stalk roll 16 of the pair. During operation, the stalk rolls 15, 16 operate at the same rotational speed so that the difference in positioning is maintained throughout operation. Because the stalk rolls 12 of the prior art and the flutes thereon are not configured to yield any stalk engagement gaps 25, they essentially create a wall of rotating steel as previously described, which restricts the entry of the stalk 320 into stalk slot 7 and the corn plant engagement chamber.

FIG. 10 provides an end view of another embodiment of stalk rolls 15, 16. In this embodiment, a fifth flute 26 is added between the first flute 18 and second flute 19 so that the distance between the first flute 18 and the fifth flute 26 is equal to the distance between the second flute 19 and the fifth flute 26. A sixth flute 33 has also been added between the third flute 20 and the fourth flute 21 so that the distance between the third flute 20 and the sixth flute 33 is equal to the distance between the fourth flute 21 and the sixth flute 33. FIG. 10 depicts a moment when the stalk engagement gap 25 is present, thereby allowing stalks 320 to enter the corn plant engagement chamber. In this embodiment, as in the embodiment shown in FIGS. 9A-9F, the stalk engagement gap 25 appears twice per revolution of the stalk rolls 15, 16.

Figure 6:
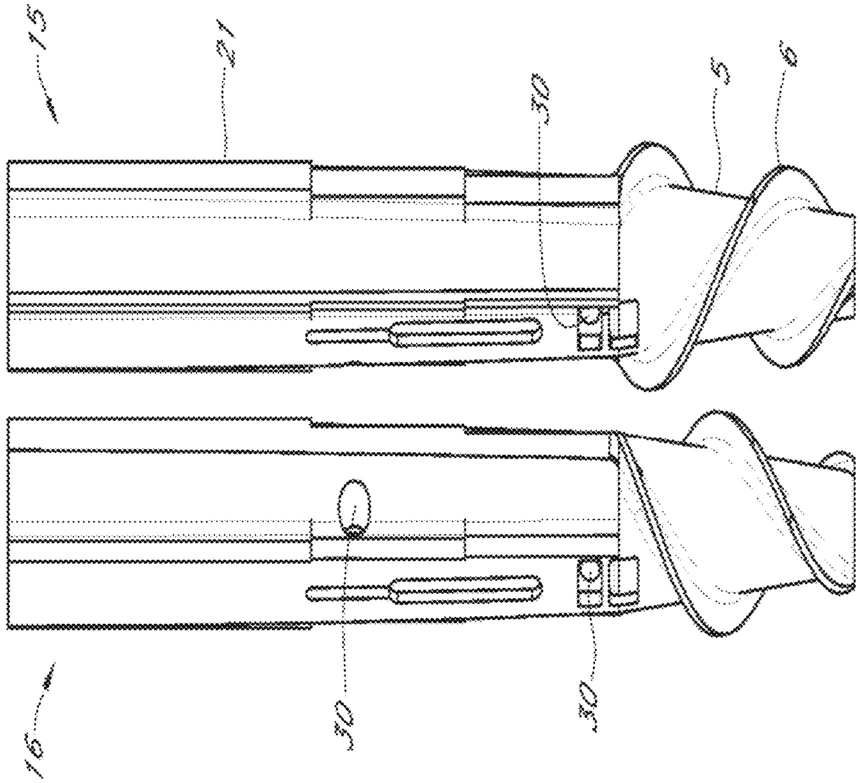
FIG. 6 is a top view of an illustrative embodiment of a pair of opposing stalk rolls incorporating certain aspects of the present disclosure.
Figure 7:
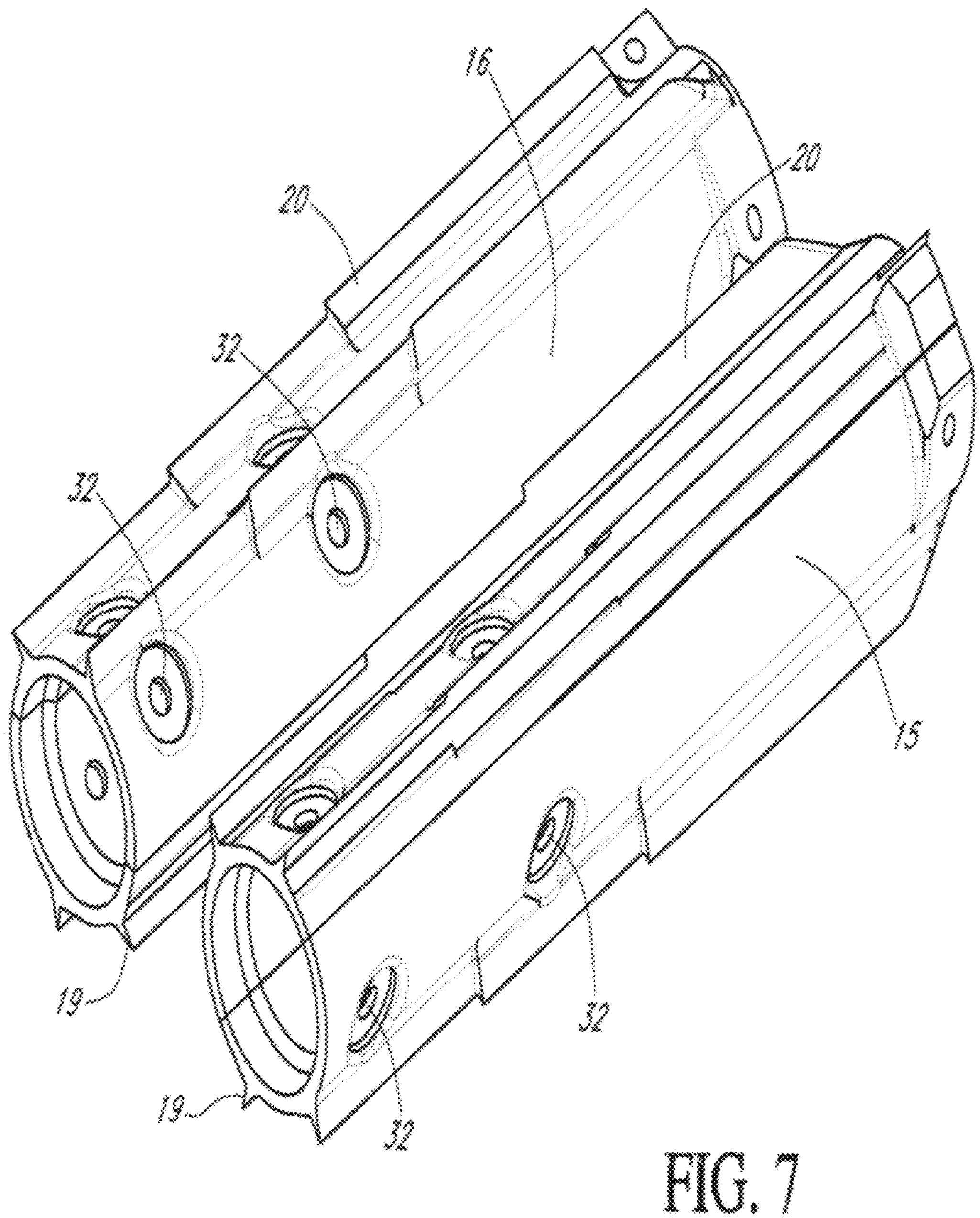
FIG. 7 is a perspective view of an illustrative embodiment of a pair opposing of stalk rolls incorporating certain aspects of the present disclosure, wherein the nose cones have been removed for clarity.

In an alternative embodiment not shown herein, additional flutes that have a smaller axial length as compared to the axial length of flutes 18, 19, 20, 21 could be placed between all or some of flutes 18, 19, 20, 21. (Alternatively some of the original flutes 18, 19, 20, 21 could be fashioned with a smaller axial length than the axial length of adjacent flutes 18, 19, 20, 31.) Here, the additional flutes would not extend the entire distance of the cylindrical shell 17. Instead, the additional flutes would only extend along the cylindrical shell 17 from a point proximal to the end of the cylindrical shell 17 closest to the cross auger 9 (which may be the same point from which the flutes 18, 19, 20, 21 extend, as shown in FIG. 6) to a point distal from the cross auger 9, but not the entire length of the cylindrical shell 7 up to the interface between the cylindrical shell 17 and the nose cone 5. That is, the additional flutes would not extend radially from the cylindrical shell 17 on a portion of the cylindrical shell 17 that is distal from the cross auger 9 (and also distal to the connection between the stalk roll drive shaft 29 and the corn header). This embodiment facilitates stalk rolls 15, 16 that are configured so as to provide a stock engagement gap 25 along a predetermined axial portion of the stalk rolls 15, 16 that first engage the stalk 320 (i.e., a portion distal from the cross auger 9) while still providing more flutes to engage the stalk 320 in the corn plant engagement chamber on a portion of the stalk rolls 15, 16 proximal to the corn header (which may assist in decomposition of the stalk 320 and harvesting speed).

As is apparent from the embodiment shown in FIG. 10, the specific number and orientation of flutes 18, 19, 20, 21, 26, 33 employed on a stalk roll 15, 16 may vary. Therefore, the precise number of flutes 18, 19, 20, 21, 26, 33 employed in a particular embodiment, or the specific orientation thereof in no way limits the scope of the present stalk roll 15, 16. As long as the flutes 18, 19, 20, 21, 26, 33 are oriented upon the stalk rolls 15, 16 and the stalk rolls 15, 16 are orientated with respect to each other such that at least one stalk engagement gap 25 appears during one revolution of the stalk rolls 15, 16, the specific orientation or number of flutes 18, 19, 20, 21, 26, 33 are not limiting to the scope of the present stalk roll 15, 16. Furthermore, what is referred to herein as a cylindrical shell 17 of the stalk rolls 15, 16 need not be fashioned as a perfect cylinder; rather, it may be fashioned so that the cross-sectional area changes along the axial length (e.g., tapered), or be fashioned with any cross-sectional shape that performs in a relatively satisfactory manner.

2. Other Stalk Rolls with a Stalk Engagement Gap

Another embodiment of a pair of stalk rolls 190 implementing a stalk engagement gap 25 is shown in FIGS.

Figures 12, 13:
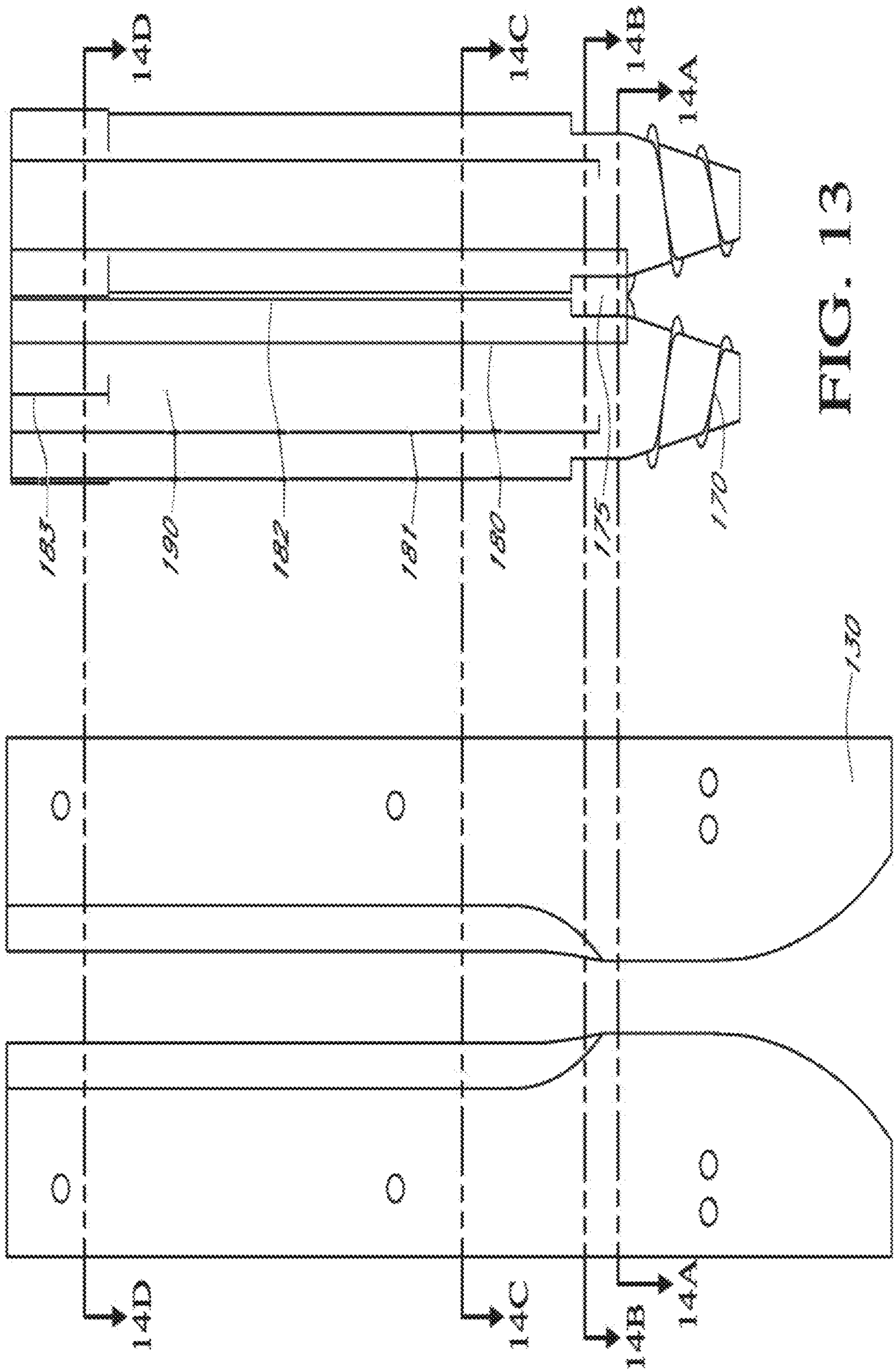
FIG. 12 is a top view of an illustrative embodiment of a pair of stripper plates that may be used with various embodiments of the present art stalk roll showing various zones along the length of the stripper plates.
FIG. 13 is a top view of another illustrative embodiment of a pair of stalk rolls according to the present disclosure showing various zones along the length of the stalk rolls.

13-14E. A pair of beveled stripper plates 130 is shown in FIG. 12, and lines B-B, C-C, D-D, and E-E represent various zones along the lengths of the stripper plates 130 and stalk rolls 190. The stalk rolls 190 and stripper plates 130 from FIGS. 12 and 13 are shown in cross section at various positions along the lengths thereof in FIGS. 14B-14E. The embodiment of the stalk rolls 190 and stripper plates 130 shown in FIGS. 12-14E are configured to create four distinct (but interrelated and overlapping) zones along the lengths thereof, each of which zone performs a separate function and purpose within the row unit. The combination of zones, relationships, and sub-function are designed to improve the performance of the corn head and harvesting machine by allowing better material flow through the row unit, reducing congestion and MOTE levels through the row unit, conveying systems, and the harvesting machine; thereby improving harvesting machine speeds and efficiencies. The four (4) current interrelated overlapping zones are the Alignment, Entry, Ear Separation, and Post-Ear Separation Plant Ejection Zones.

A. The Alignment Zone

Figure 14A:
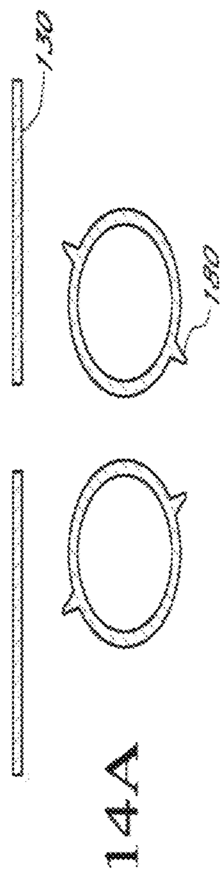
FIG. 14A is a cross-sectional view of the stripper plates and stalk rolls from FIGS. 12 & 13, respectively, at line 14A.
Figure 14B:
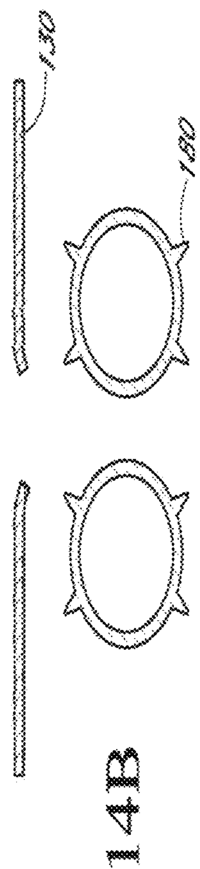
FIG. 14B is a cross-sectional view of the stripper plates and stalk rolls from FIGS. 12 & 13, respectively, at line 14B.
Figure 20:
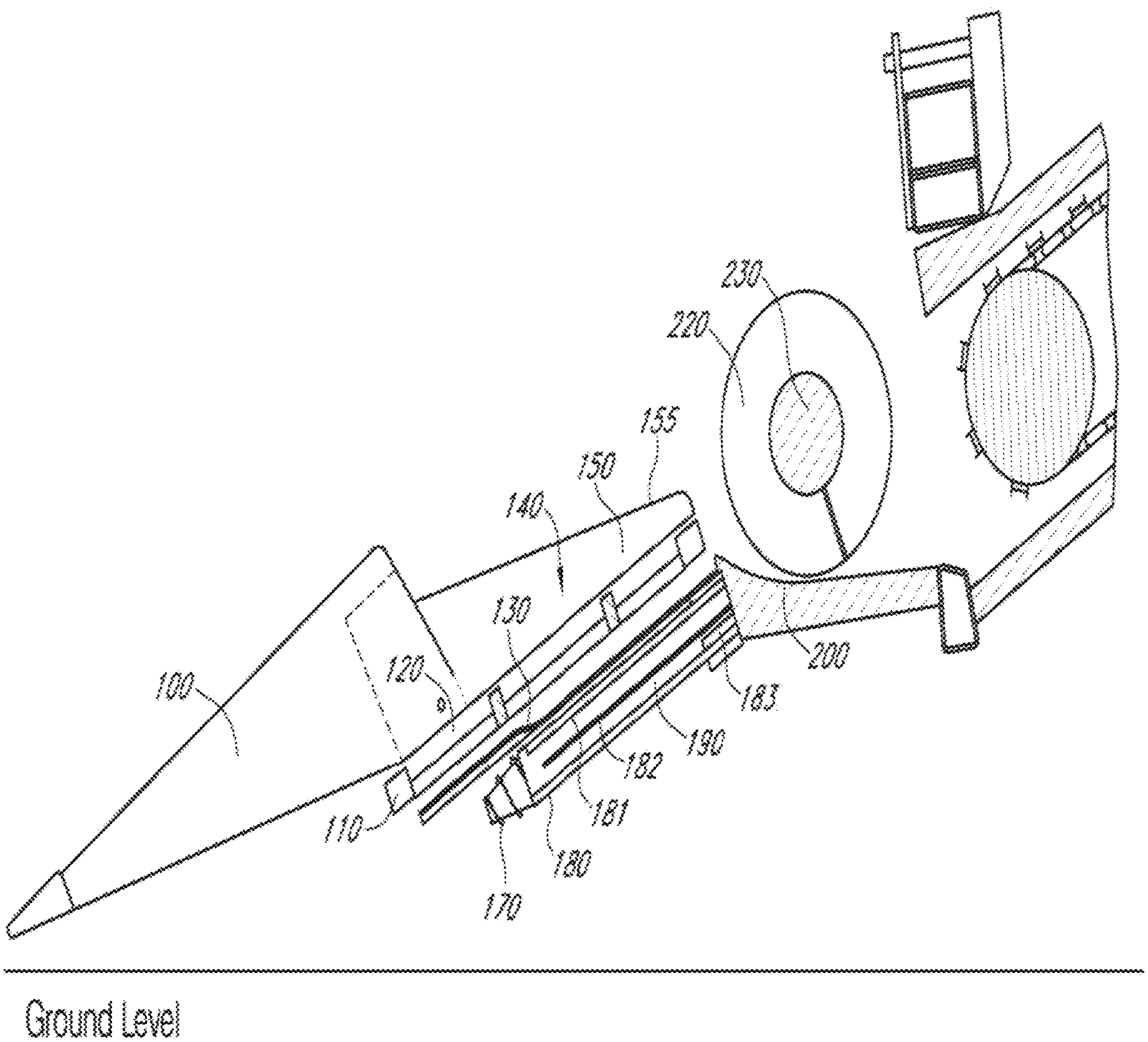
FIG. 20 is a cross-sectional view of one illustrative embodiment of a corn head incorporating certain aspects of the present disclosure.

In the embodiment pictured in FIGS. 12-14E, the Alignment Zone is generally about the line B-B toward the front of the stalk rolls 190 and adjacent the nose cones 5, which is best shown in FIGS. 13 and 14B. In some embodiments, the Alignment Zone extends along the stalk rolls 190 from the front of the nose cones 5 to the line B-B. The purposes of this zone are to align, direct, and gather the corn plant for conveyance to the Entry and/or Ear Separation Zone with the ear 300 intact and positioned for recovery with minimal MOTE. In the Alignment Zone of the embodiment of the stripper plate 130 shown in FIGS. 12 and 14B-14E, the stripper plates 130 are substantially flat, as best shown in FIGS. 12 and 14B. This reduces the tendency of ears 300 to wedge below the stripper plates 130. The transport vanes 170 on the nose cones 4 in front of the Alignment Zone serve to guide stalks 320 into the ear separation chamber 140, which is best shown in FIG. 20. The rotating transport vanes 170 may be either timed or non-meshing, so as to provide positive material flow in tough, damp, or high-speed harvesting conditions. One function of the transport vanes 170 generally is to center the stalk 320 in the ear separation chamber 140.

The stalk rolls 190 shown in FIGS. 13-14E also incorporate a stalk slot 7 in which a stalk engagement gap 25 occurs intermittently. The stalk slot 7 and stalk engagement gap 25 as defined for this embodiment of stalk rolls 190 is the same as those defined for the embodiment of stalk rolls 15, 16 shown in FIGS. 9-10. This embodiment of stalk rolls 190 facilitates a stalk engagement gap 25 that occurs along a specific length of the stalk rolls 190. As shown in FIG. 14B, the stalk engagement gap 25 first occurs toward the front of the stalk rolls 190 in the Alignment Zone and extends along the entire length thereof (which length is shown in FIG. 13). This facilitates simple transport of the stalk 320 from the nose cones 5 to the ear separation chamber 140 between the stalk rolls 190. The stalk engagement gap 25 in the Alignment Zone is formed by placing two short flutes 180 separated by 180 degrees on each stalk roll 190, such that the short flutes 180 are arranged in a knife-to-knife configuration. Another function of the transport vanes 170 is to ensure that the stalk 320 does not fall forward out of the stalk engagement gap 25.

B. The Entry Zone

Figure 14C:
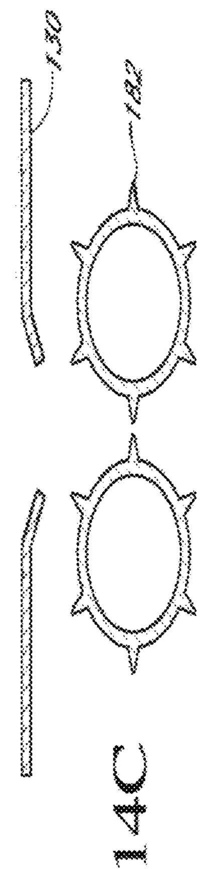
FIG. 14C is a cross-sectional view of the stripper plates and stalk rolls from FIGS. 12 & 13, respectively, at line 14C.

In the embodiment pictured in FIGS. 12-14E, the Entry Zone is generally about the line C-C toward the front of the stalk rolls 190, but behind the Alignment Zone, which is best shown in FIGS. 13 and 14C. In some embodiments, the Entry Zone extends along the stalk rolls 190 from the line C-C to the front portion of the stalk rolls 190 at the terminus of any intermediate flutes 182, which are described in detail below. The primary purpose of this zone is to allow entry of the stalk 320 into the ear separation chamber 140 between the stalk rolls 190. The rate at which stalks 320 are accepted into the row unit is a major factor in determining harvesting speed.

As explained above, prior art teaches that to increase the rate of entry, the rotating speed of the stalk roll 12 must be increased, which merely increases the egg-beater effect. If the stalk 320 is not pinched in the Entry Zone, the stalk 320 stalls in the row unit, which stalling allows the rotating flute edges to sever the stalk 320. This stall also causes the stalk 320 to lean away from the row unit. Consequently, ear separation often occurs near the opening of the row unit, such that loose ears 300 fall to the ground and become irretrievable.

A stalk engagement gap 25 is also present in the Entry Zone in this embodiment of the stalk rolls 190, which is best shown in FIG. 14C. The short flutes 180 in the Alignment Zone extend into the Entry Zone, and the stalk engagement gap 25 in the Entry Zone is formed by placing two additional short flutes 180 adjacent to the short flutes 180 from the Alignment Zone. As shown in FIG. 14C, the four short flutes 180 are not equally spaced about the periphery of the stalk rolls 190, but instead are positioned in groups of two. This facilitates the stalk engagement gap 25 in the Entry Zone since adjacent short flutes 180 in each pair are close enough to each other that a stalk engagement gap 25 is present at least once during a full revolution of the stalk rolls 190. In this embodiment a stalk engagement gap 25 is present twice during a full revolution in both the Alignment Zone and Entry Zone, as is evident from FIGS. 14B and 14C.

C. The Ear Separation Zone

Figure 14D:
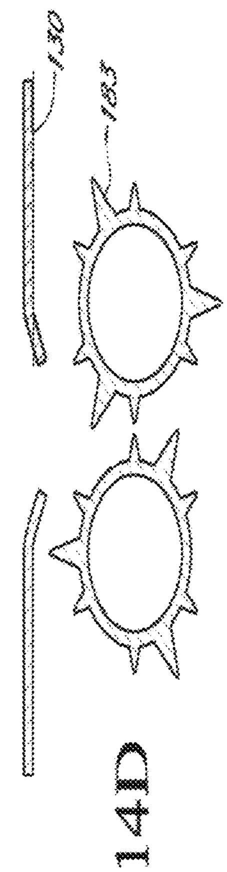
FIG. 14D is a cross-sectional view of the stripper plates and stalk rolls from FIGS. 12 & 13, respectively, at line 14D.

In the embodiment pictured in FIGS. 12-14E, the Ear Separation Zone is generally about the line D-D on the front half of the stalk rolls 190, which is best shown in FIGS. 13 and 14D. In some embodiments, the Ear Separation Zone extends along the stalk rolls 190 from the terminus of an intermediate flute 182 toward the front of the stalk rolls 190 to the terminus of a long flute 183, which is described in detail below. Generally, the Ear Separation Zone extends along a greater length of the stalk rolls 190 than does any other zone. The primary purpose of this zone is to separate the ear 300 from the stalk 320 and prevent any ears 300 from falling forward out of the row unit. In this zone, the embodiment of the stalk rolls 190 shown herein pull the stalk 320 through the stripper plates 130 without prematurely severing the stalk 320. The maximum vertical speed at which the stalk rolls 190 consume the stalk 320 is determined by the damaging occurring to the ear 300 at a given speed, and will vary from one variety of corn to the next.

As best shown in FIGS. 13 and 14D, intermediate flutes 183 that extend radially further from the stalk roll 190 than short flutes 180 may be positioned in the Ear Separation Zone. Because the intermediate flutes 183 are radially longer than the short flutes 180, stalk rolls 190 engage stalks 320 more securely in this zone, which is evident from FIG. 14D. In the embodiment shown in FIGS. 12-14E, like the short flutes 180, the intermediate flutes 182 are not intermeshed but opposed with minimal clearance so that as a flute 180, 182 on one stalk roll 190 begins to engage the stalk 320, the opposing flute 180, 182 on the other stalk roll 190 engages the stalk 320 at a point on the horizontally opposite side of the stalk 320. This balanced engagement action reduces lateral stalk 320 whipping, which whipping can dislodge and toss the ear 300 from the stalk 320, or cause the stalk 320 to prematurely break or sever. The balanced engagement action allows the stalk rolls 190 to evenly pull the stalk 320 down so that the stripper plates 130 may rapidly separate the ear 300 from the stalk 320 in the Ear Separation Zone.

Also apparent from FIG. 14D is the fact that the Ear Separation Zone does not include a stalk engagement gap 25. This is because the intermediate flutes 182 are positioned in the space between the two groups of short flutes 180 present in the Entry Zone. Accordingly, in the pictured embodiment a total of six flutes 180, 182 are present in the Ear Separation Zone, and they are equally spaced about the periphery of the stalk roll 190, such that each flute 180, 182 is separated by sixty degrees. The two short flutes 180 in each pair in the Entry Zone are also separated by sixty degrees, and each pair of short flutes 180 is separated from the other by 120 degrees. A stalk engagement gap 25 is not required in the Ear Separation Zone because at this point the stalk 320 is securely positioned between the two stalk rolls 320 and the danger of the stalk 320 falling forward out of the ear separation chamber 140 has been alleviated. That is, the egg beater effect previously described has been eliminated by providing a stalk engagement gap 25 in the Alignment and Entry Zones.

D. The Post-Ear Separation Plant Ejection Zone

In the embodiment pictured in FIGS. 12-14E, the Post-Ear Separation Plant Ejection Zone is generally about the line E-E toward the back of the stalk rolls 190, which is best shown in FIGS. 13 and 14E. In some embodiments, this zone extends along the stalk rolls 190 from the start of a long flute 183 to the terminus of a long flute 183 toward the back of the stalk roll 190, which is described in detail below. The primary purpose of this zone is to rapidly eject the stalk 320 from the row unit to minimize interference between MOTE and ears 300. No specific speed ratio controls the operating speed of this zone. After ear separation, increasing stalk 320 ejection speed effectively reduces MOTE entering the threshing (kernel separation) area of the harvesting machine, thereby increasing threshing efficiency and capacity.

As shown in FIGS. 13 and 14E, this zone may include a plurality of long flutes 183, three of which are shown on each stalk roll 190. The long flutes 183 extend radially further from the stalk roll 190 than any other flutes 180, 182. Within this zone, the long flutes 183 may be both meshing and non-meshing so as to create a high-speed clean out zone. The stalk rolls 190 may also be aerodynamically designed to create a suction effect so that unattached MOTE from the ear separation chamber 140 is pulled downward and returned to the field. The Post-Ear Separation Plant Ejection Zone may also be configured to sever, crush, chop, or otherwise manipulate the stalk 320 to speed decomposition thereof. The various functions of this zone may be achieved through different orientations and/or configurations of flutes 180, 182, 183 in the zone, as well as the number of flutes 180, 182, 183 therein. Accordingly, the scope of the stalk rolls 190 is not limited by the number of flutes 180, 182, 183 in any zone, nor it is limited by the configuration and/or orientation of flutes 180, 182, 183 in any zone.

As shown in FIGS. 12 and 14E, this zone may be configured as a clean-out zone by adding short lengths of long flutes 183 between the short and/or intermediate flutes 180, 182. Using inter-meshing long flutes 183 allows faster ejection of small diameter stalks 320, normally found at the upper-most portion of the corn plant. The intermeshing long flutes 183 of stalk rolls 190 or 192 are aerodynamically designed and assembled to create a down draft through the ear separation chamber 140, which further enhances removal of any MOTE.

The short flutes 180, intermediate flutes 182, and/or long flutes 183 may be integrally formed with one another such that a short flute 180 and/or intermediate flute 182 is formed by removing a portion of a long flute 183. As a corollary, a short flute 180 may be formed by removing a portion of an intermediate flute 182. Conversely, the various flutes 180, 182, 183 may be separately formed. Additionally, short and/or intermediate flutes 180, 182 present in either the Alignment or Entry Zones may extend to the Ear Separation and Post-Ear Separation Plant Ejection Zones, as shown in the embodiment in FIGS. 13-14E.

The height and width of the stalk engagement gap 25 have been defined previously herein with respect to FIGS. 9-10. The length of the stalk engagement gap 25 may vary from one embodiment of stalk rolls 190 to the next. For example, in the embodiment of stalk rolls 190 pictured in FIGS. 13-14E, the stalk engagement gap 25 extends from the Alignment Zone to the front of the Ear Separation Zone, which is less than half the overall length of the stalk rolls 190. However, in other embodiments of the stalk rolls 190, the length of the stalk engagement gap 25 may be different. Accordingly, the scope of the stalk rolls 190 as disclosed and claimed herein is in no way limited by the length of the stalk engagement gap 25.

As described and specifically claimed in other patents and patent applications owned by Applicant, the stripper plates 130 used with any of the stalk rolls 15, 16, 190, 400 or any other stalk rolls 130 may be beveled along their lengths, as shown in FIGS. 12 and 14B-14E. The stripper plates 130 as shown herein have a rounded or contoured surface to emulate the arched under side of the corn leaf 310 with two positive effects. First, this allows the corn leaf to stay attached to the stalk 320, reducing the level of MOTE retained in the ear separation chamber 140. Secondly, this shape also improves separation of the husk from the ear 300, further reducing the level of MOTE in the ear separation chamber 140. As shown in FIGS. 14B and 14C, the stripper plates 130 are substantially flat in the Alignment and Entry Zones, which reduces ear 300 wedging below stripper plates 130, and above the transport vanes 170 of the stalk rolls 190 when ears 300 are being gathered from near ground level. As shown in FIGS. 14D and 14E, in the Ear Separation and Post-Ear Separation Plant Ejection Zones the stripper plates 130 are normally directly above the fluted portion of stalk rolls 190 and are slightly curved down. This curve may specifically emulate the arched portion or underside of leaf 310. This improved curved shape allows smooth flow of unwanted portions of the corn plants to pass between stripper plates 130 and exit the ear separation chamber 140 while retaining the ear 300.

Figure 18:
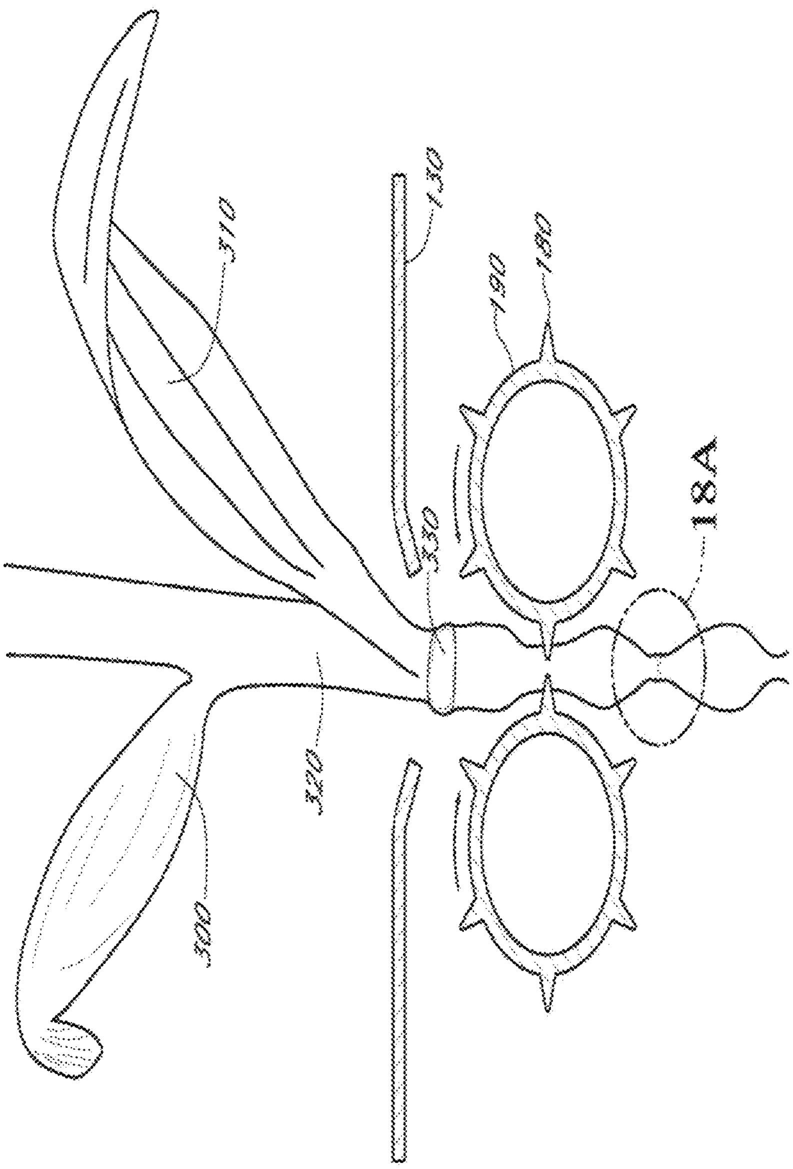
FIG. 18 is a cross-sectional view of FIG. 13 along line 14D with a stalk engaged with the stalk rolls.

As shown in FIG. 18, the embodiment shown in FIGS. 12-14E allows the flutes 180, 182, 183 and stripper plates 130 to positioned closely to one another, which reduces the amount of MOTE retained in the ear separation chamber 140 in the event that stalk 320 separation (which is defined as a cutting of the stalk 320, or other action that causes a portion of the stalk 320 to be separated from another portion thereof) takes place before ear 300 separation.

Figure 16:
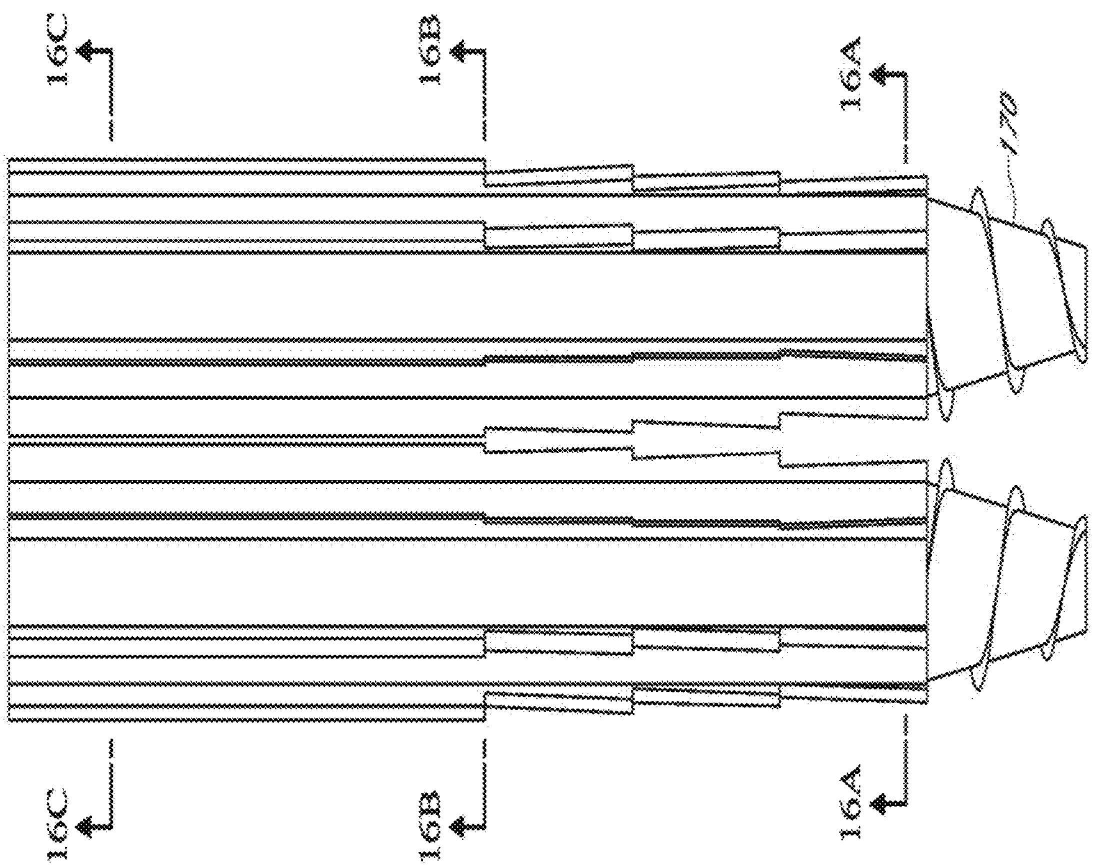
FIG. 16 is a top view of another illustrative embodiment of stalk rolls incorporating certain aspects of the present disclosure having stepped flutes showing various zones along the length of the stalk rolls.
Figure 16A:
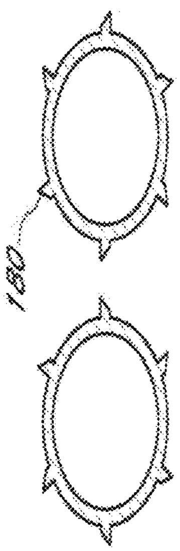
FIG. 16A is a cross-sectional view of the stalk rolls from FIG. 16 at line 16A.
Figure 16B:
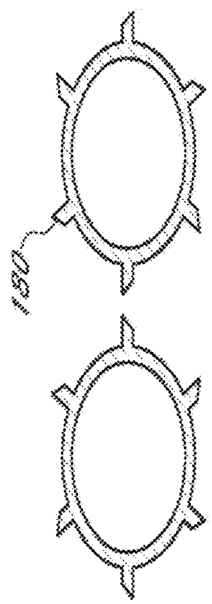
FIG. 16B is a cross-sectional view of the stalk rolls from FIG. 16 at line 16B.
Figure 16C:
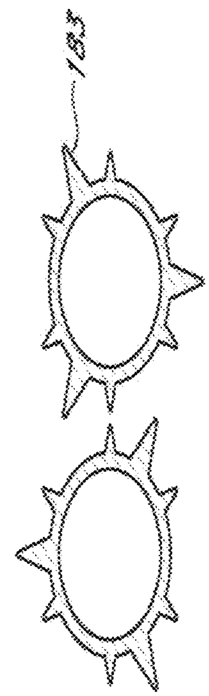
FIG. 16C is a cross-sectional view of the stalk rolls from FIG. 16 at line 16C.

FIGS. 16-16C show another embodiment of stalk rolls 190 featuring certain aspects of the present disclosure. In this embodiment, the short flutes 180 (adjacent the area bisected by line A-A and best shown in FIG. 16A) of the stalk rolls 190 are opposed with one another so that they meet during operation. They do not, however, ever touch during normal operation. The distance between the stalk rolls 190 decreases along their length from line A-A to line B-B as shown by FIGS. 16A-16C. Additionally, long flutes 183 are positioned on the stalk rolls 190 adjacent the back thereof about line C-C. This configuration provides optimum balanced pressure against the stalk 320 in certain conditions to first engage the stalk 320 and then pull it down while penetrating the stalk outer shell 321, thus avoiding stalk whip during engagement of the stalk 320.

In this embodiment of stalk rolls 190, the short and intermediate flutes 180, 183 may be integrally formed with one another and distinguished from one another via a stair-step configuration. The distance between opposing flutes 180, 182, 183 may be reduced in discrete increments along the length of the stalk rolls 190, as best shown in FIG. 16. These stalk rolls 190 could also be configured to have a stalk engagement gap 25 as previously described. Furthermore, any of the stalk rolls 15, 16, 190, 400 described or pictured herein may have any number of flutes 180, 181, 182, 183 extending radially any suitable distance from the stalk roll 15, 16, 190, 400, and may have a combination of tapered flutes 181 and other flutes 180, 182, 183. For example, in one embodiment of a stalk roll 190 not pictured herein, the Ear Separation Zone may include flutes 180, 182, 183 having four different radial dimensions, with tapered flutes 181 interspersed there about. Accordingly, the scope of the stalk rolls 15, 16, 190, 400 as disclosed and claimed herein is not limited by the number of different radial dimensions by which flutes 180, 181, 182, 183 extend from the stalk rolls 190. In another embodiment of the stalk rolls 190, the distance between the flutes 180, 182, 183 may be reduced discretely but there may also be a taper between those discrete points.

3. Tapered Stalk Rolls

A further improvement described herein compromises tapering the stalk rolls to modify the configuration of the Entry Zone to further improve performance of the Entry Zone. The tapered stalk rolls 192 shown in FIGS. 15-15C exploit a natural attribute present in standing corn—the diameter of the stalk 320 at its base (i.e., ground level) is larger than its diameter toward the tip or tassel. The largest gap between the tapered stalk rolls 192 is at the entry to the stalk rolls 192 near the front; the smallest gap is at the point of exit of the stalk rolls 192 near the rear. This taper in the stalk rolls 192 balances the outward forces created by the stalk 320 against the tapered flutes 181 and the inward force of the tapered flute 181 against the stalk 320. An imbalance of the forces can create a pulsation in the stalk rolls 192 during operation. This pulsation creates a moment about the gearbox that can produce premature failure in the gearbox or its supporting mechanisms. Tapering the stalk rolls 192 reduces the potential for pulsation while promoting entry of the stalks 320 between the stalk rolls 192 and allowing aggressive engagement between the stalk rolls 192 and the stalk 320. The tapering may be achieved by changing the diameter of the stalk rolls 192 along their length or the radial distance that the tapered flutes 181 extend from the stalk roll 192.

Figure 15:
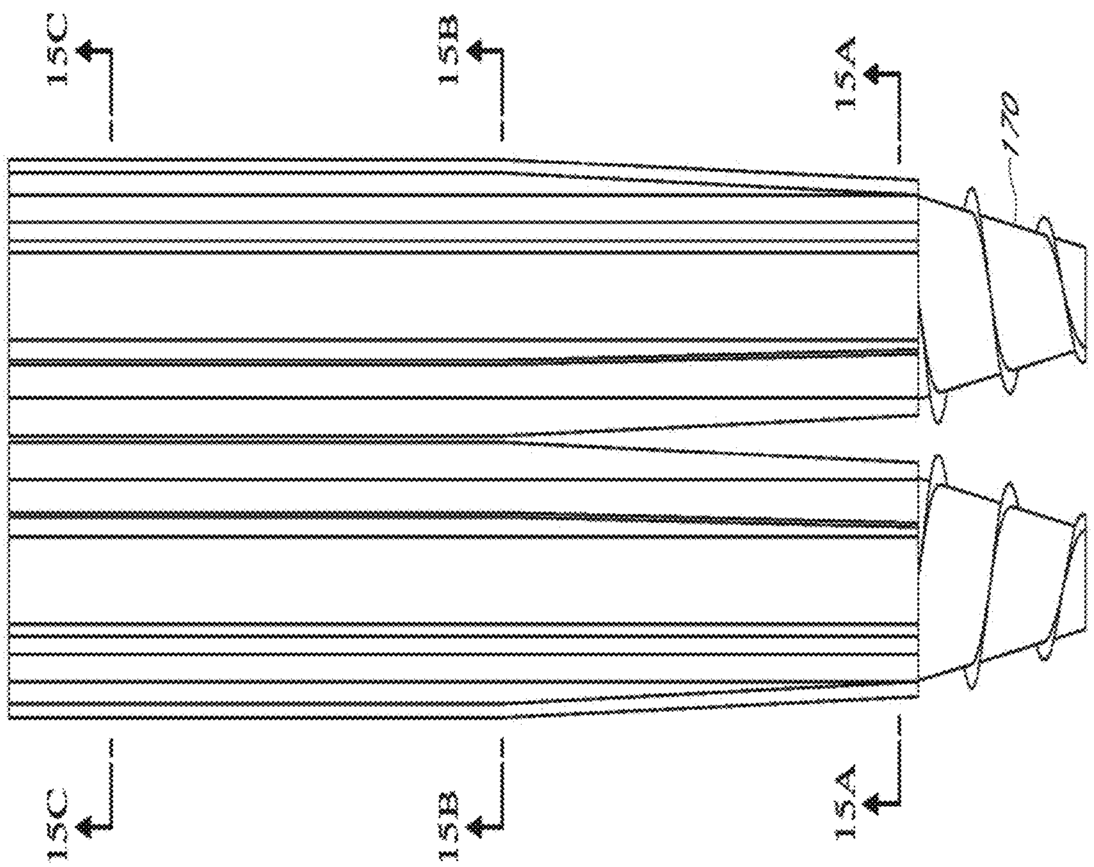
FIG. 15 is a top view of another illustrative embodiment of stalk rolls incorporating certain aspects of the present disclosure having tapered flutes showing various zones along the length of the stalk rolls.
Figure 15A:
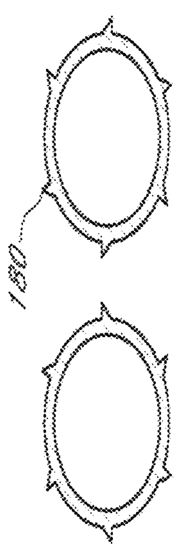
FIG. 15A is a cross-sectional view of the stalk rolls from FIG. 15 at line 15A.
Figure 15B:
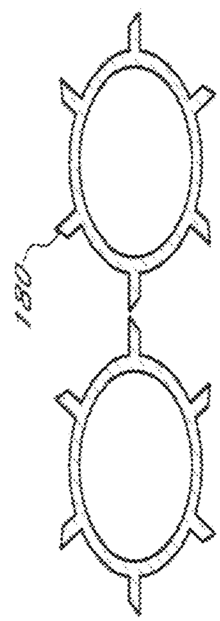
FIG. 15B is a cross-sectional view of the stalk rolls from FIG. 15 at line 15B.
Figure 15C:
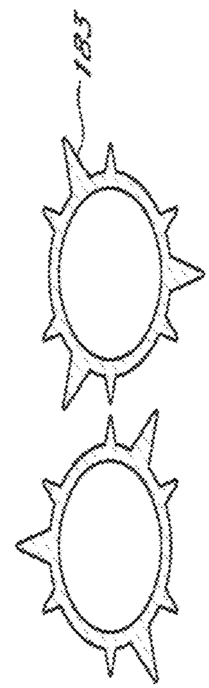
FIG. 15C is a cross-sectional view of the stalk rolls from FIG. 15 at line 15C.

The embodiment of stalk rolls 192 having tapered flutes 181 shown in FIGS. 15-15C are configured for the tapered flutes 181 in the Alignment/Entry Zone (the area about line A-A) and Ear Separation Zones (the area about line B-B) to be opposed, as clearly shown in FIGS. 15B and 15A. Conversely, the tapered flutes 181 in the Post-Ear Separation Plant Ejection Zone (the area about line C-C) are intermeshing, as best shown in FIG. 15C. During operation, as a stalk 320 is engaged by the stalk rolls 192, the distance between the tapered flutes 181 and the opposing stalk roll 192 is reduced, thereby increasing penetration of the stalk 320 by the tapered flutes 181 and exerting continuous pressure against the stalk 320 during engagement.

Figure 17:
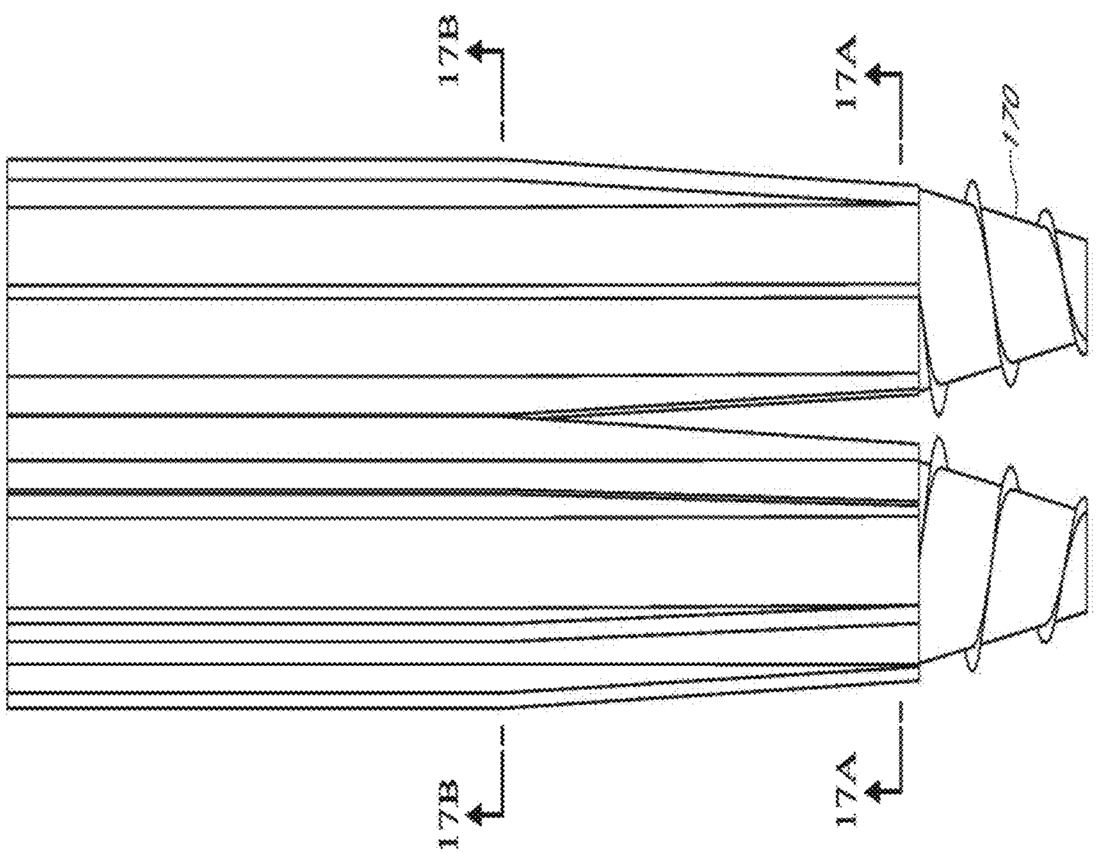
FIG. 17 is a top view of another illustrative embodiment of stalk rolls incorporating certain aspects of the present disclosure having tapered flutes showing various zones along the length of the stalk rolls.
Figure 17A:
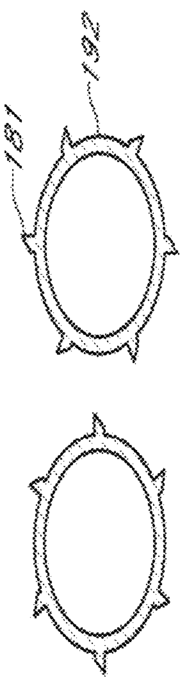
FIG. 17A is a cross-sectional view of the stalk rolls from FIG. 17 at line 17A.
Figure 17B:
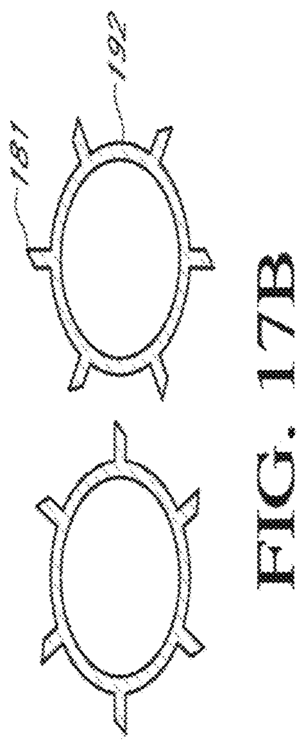
FIG. 17B is a cross-sectional view of the stalk rolls from FIG. 17 at line 17B.

Another embodiment of stalk rolls 192 having tapered flutes 181 is shown in FIGS. 17-17B. In this embodiment, all the tapered flutes 181 are intermeshing with one another, as is clearly shown in FIGS. 17A and 17B. In this embodiment of stalk rolls 192, the various zones previously described are comingled such that clear boundaries between the zones do not exist. Instead, the transition from one zone to the next is smooth and seamless. However, any embodiment of tapered stalk rolls 192 may be configured with a stalk engagement gap 25 by simply removing a portion of certain tapered flutes 181.

Both the tapered stalk rolls 192 and the stalk rolls 190 shown in FIGS. 13, 14, and 16 are configured to achieve variable circumferential speeds along the length of the stalk rolls 190, 192. There are at least three critical circumferential speed ratios related to ground speed for optimum high efficiency harvesting. The three critical speed ratios are: (1) Harvesting machine ground speed to row unit horizontal gathering chain speed 120 (the gathering chain 120 speed must be the same as or faster than the ground speed); (2) Harvesting machine ground speed to the speed at which the transport vanes 170 horizontally guide stalks 320 into the ear separation chamber 140; and, (3) harvesting machine ground speed to row unit vertical ear separation speed. The vertical ear separation speed (sometimes referred to as vertical stalk speed) must be the same as or faster than the ground speed. However, the maximum vertical stalk speed before ear 300 separation is the highest speed at which the ears 300 are not damaged upon impact within the row unit. Each of these critical speed ratios constrains the operating speed of each zone described herein. Operating outside the critical speed ratio constraints within each zone produces sub-optimal performance.

Optimizing all the critical speed ratios, as required by high-speed, high-yield, and/or harvesting in leaning, lodged, or broken stalk 320 conditions, may require the effective circumferential speed and interaction of the multi-length, multi-angled, multi-fluted, multi-vaned stalk rolls 15, 16, 190, 192, 400 described in each in zone to vary while accomplishing the functions described in each zone. Applicant understands that the various speed ratios are interrelated and effective row unit designs must recognize and incorporate these varied speed ratios to ensure corn plant(s) remain vertical or lean slightly toward the corn head upon engagement. Harvesting corn plants in this manner promotes ear separation in the targeted Ear Separation Zone and away from the front of the row unit. Targeting ear separation in this zone, and manner, reduces losses from ears 300 falling forward out of the corn head row unit and onto the ground; thereby becoming irretrievable.

4. Recessed Stalk Rolls

Figure 21A:
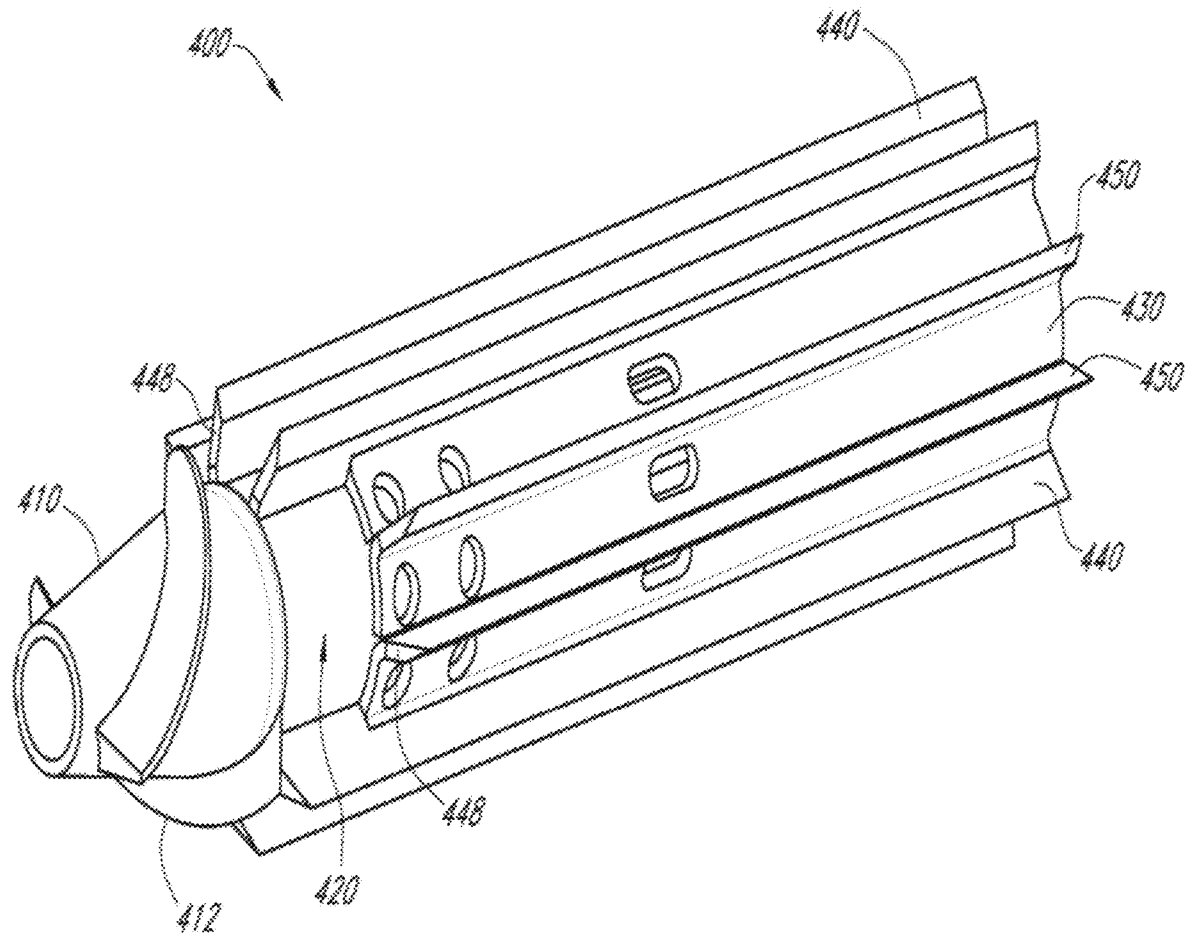
FIG. 21A is a perspective view of a first illustrative embodiment of a stalk roll having a recess.
Figure 21B:
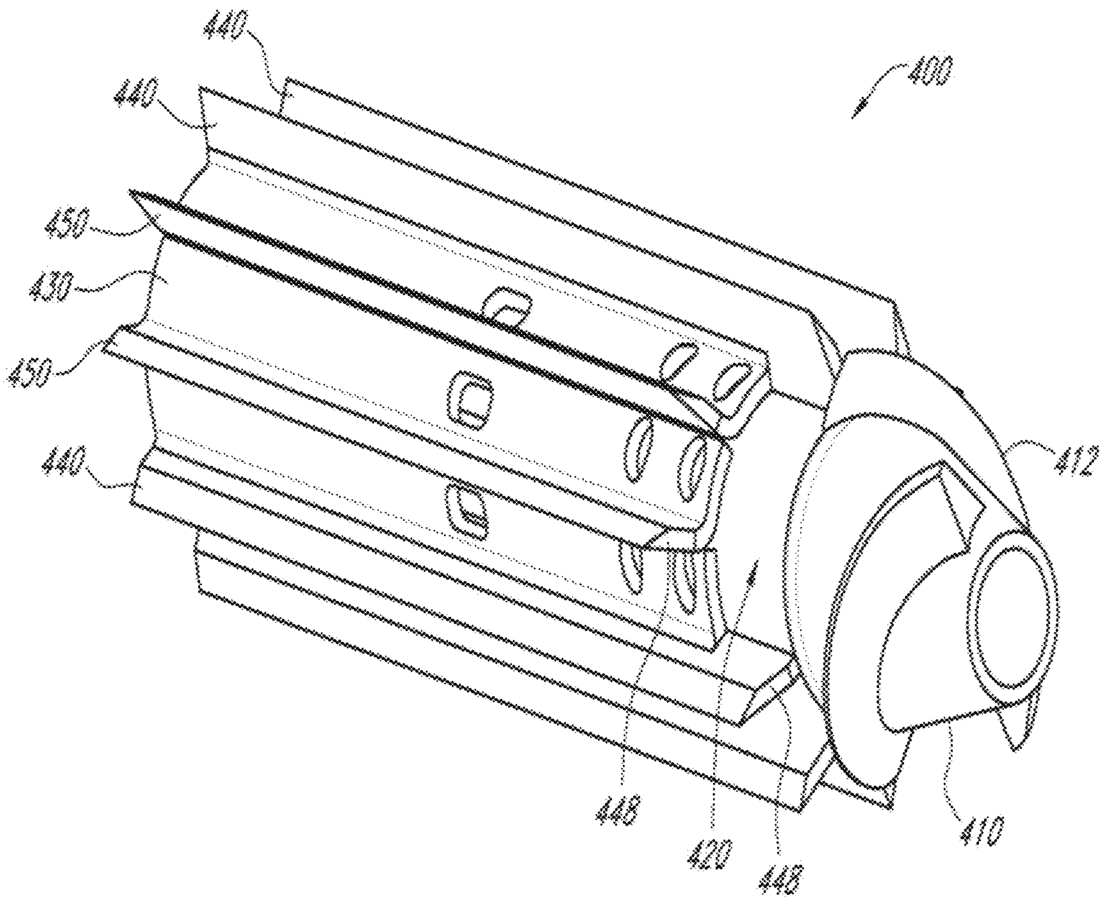
FIG. 21B is a second perspective view of the first illustrative embodiment of a stalk roll having a recess.

Another embodiment of a stalk roll 400 having a stalk engagement gap 25 is shown in FIGS. 21-22. FIGS. 21A and 21B provide corresponding perspective views of the stalk roll 400, which is designed to be one of a pair of opposed, counter-rotating stalk rolls 400 mounted to a corn head row unit in a manner previously described. The stalk rolls 400 are shown with nose cones 410 having fighting 412 attached thereto. Typically, the nose cone 410 is shaped substantially as a cone, as shown in the embodiments of stalk rolls 400 pictured herein. The fighting 412 is configured to guide stalks 320 into the ear separation chamber 140 as previously described. FIGS. 21-22 illustrate a first embodiment of a stalk roll 400 having a recess 420, as described in detail below.

Each stalk roll 400 may be formed with a main cylinder 430 having a recess 420 formed therein between the front end of the main cylinder 430 and the nose cone 410 as shown in FIGS. 21A and 21B. The recess 420 may extend along the entire circumference of the stalk roll 400 (i.e., an annular recess 420). The recess 420 may be formed in the nose cone 410, or it may be formed as a separate cylinder that is later affixed to both the main cylinder 430 and the nose cone 410. The diameter of the recess 420 is less than the diameter of either the main cylinder 430 or the rearward end of the nose cone 410, which is apparent from FIGS. 21A and 21B. The length of the recess 420 may vary from one embodiment of the stalk roll 400 to the next, but it is contemplated that for most embodiments the length of the recess 420 will be from 1.5 to 6 inches in length. Additionally, for certain embodiments it is contemplated that the diameter of the recess 420 will vary along its length. Accordingly, the specific dimensions of the recess 420 are in no way limiting.

The embodiment of the stalk rolls 400 shown in FIGS. 21-22 include a total of ten flutes 440, 450, wherein six of those are full flutes 440 and four of those are reduced flutes 450. However, other embodiments of the stalk rolls 400 may have other numbers of full flutes 440 and/or reduced flutes 450 to achieve a different number of total flutes 440, 450 and/or ratio of full flutes 440 to reduced flutes 450. Additionally, the reduced flutes 450 need not be the same length. The flutes 440, 450 extend in a radial direction from the main cylinder 430 and/or recess 420. The flutes 440, 450 in the embodiment shown in FIGS. 21-22 are substantially parallel to the longitudinal axis of the stalk roll 400 and substantially perpendicular to a line tangent to the main cylinder 430 at the flute base 449.

Figure 23:
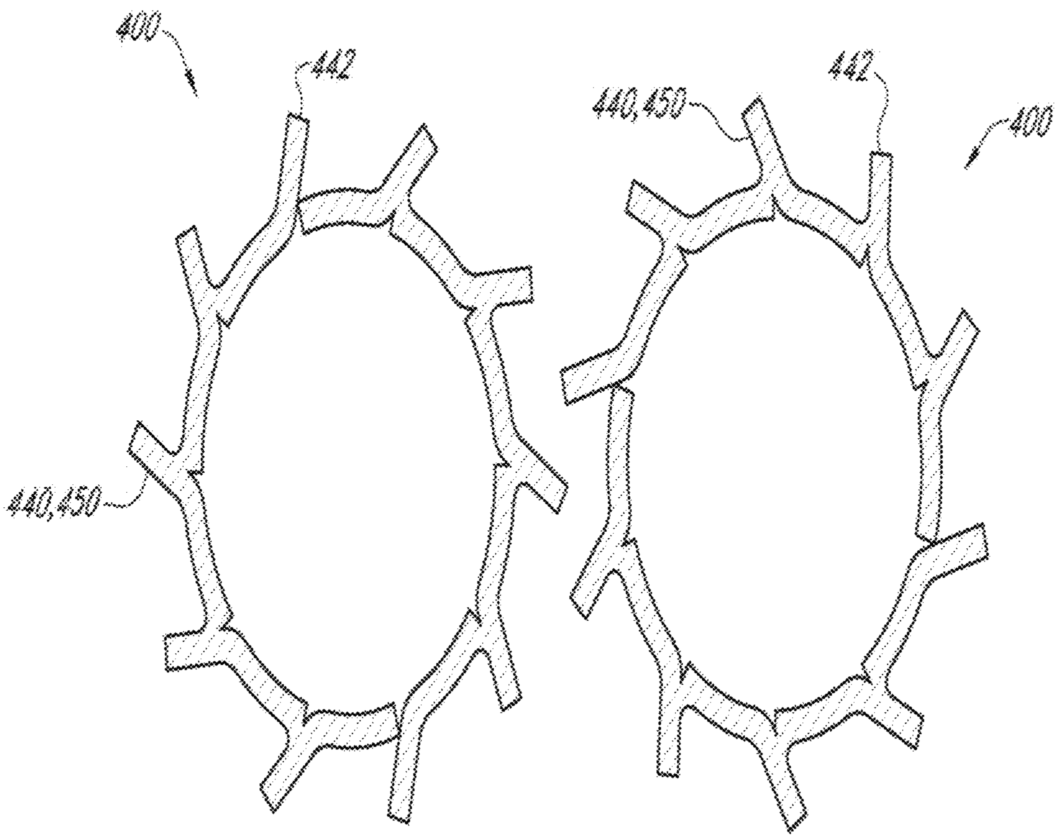
FIG. 23 is a cross-sectional view of a second illustrative embodiment of two stalk rolls having a recess intermeshed with one another.

In a second embodiment of the stalk roll the flutes 440, 450 are oriented differently with respect to lines that are tangent to the main cylinder 430 at the flute base 449. For example, FIG. 23 provides an end view of two stalk rolls 400 intermeshed with one another wherein the flutes 440, 450 are angled forward with respect to the direction of rotation of the stalk rolls 400. Accordingly, the angle of the flutes 440, 450 with respect to lines that are tangent to the main cylinder 430 at the flute base 449 in no way limits the scope of the stalk rolls 400 as disclosed and claimed herein.

In the first embodiment of the stalk roll 400, the full flutes 440 extend from the rearward end of the main cylinder 430 through the recess 420 and to the rearward end of the nose cone 410, as shown in FIGS. 21A and 21B. The reduced flutes 450 may extend from the rearward end of the main cylinder 430 to the rearward end of the recess 420. In the first embodiment of the stalk roll 400, the reduced flutes 450 are oriented in two pairs on opposite sides of the stalk roll 400 and the full flutes 440 are arranged in groups of three on opposite sides of the stalk roll 400. The circumferential distance between the flutes 440, 450 may be equal, and in the first embodiment the flutes 440, 450 are positioned at thirty six degrees from each adjacent flute 440, 450.

Figure 21C:
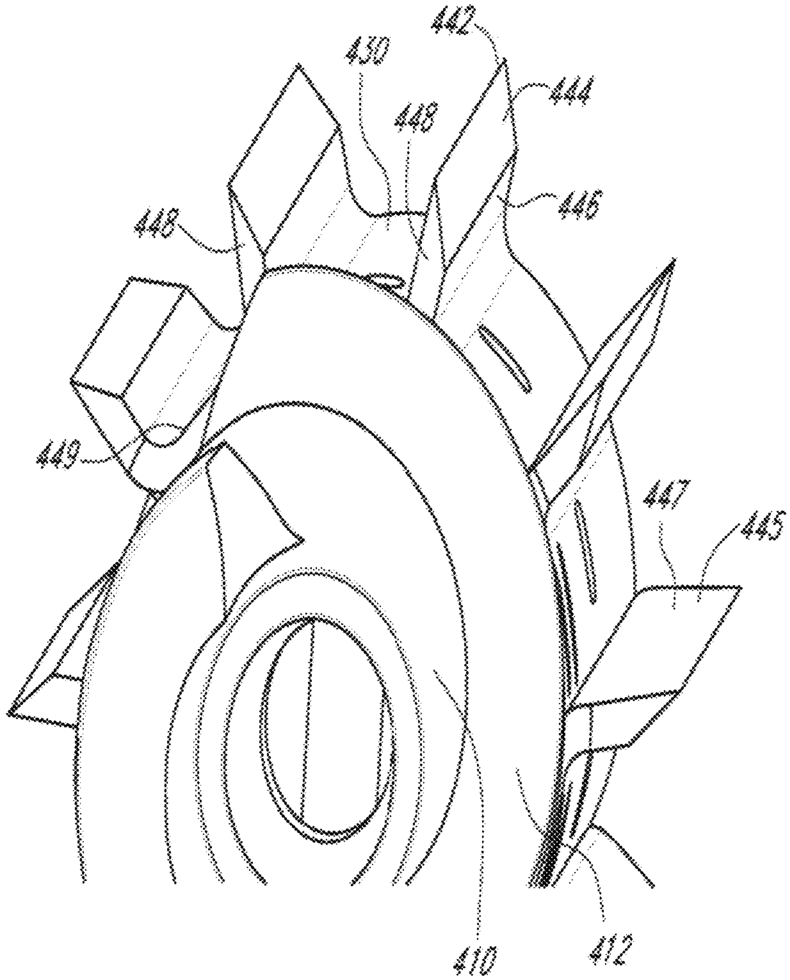
FIG. 21C provides a detailed view of a flute in the first illustrative embodiment of a stalk roll having a recess.
Figure 22A:
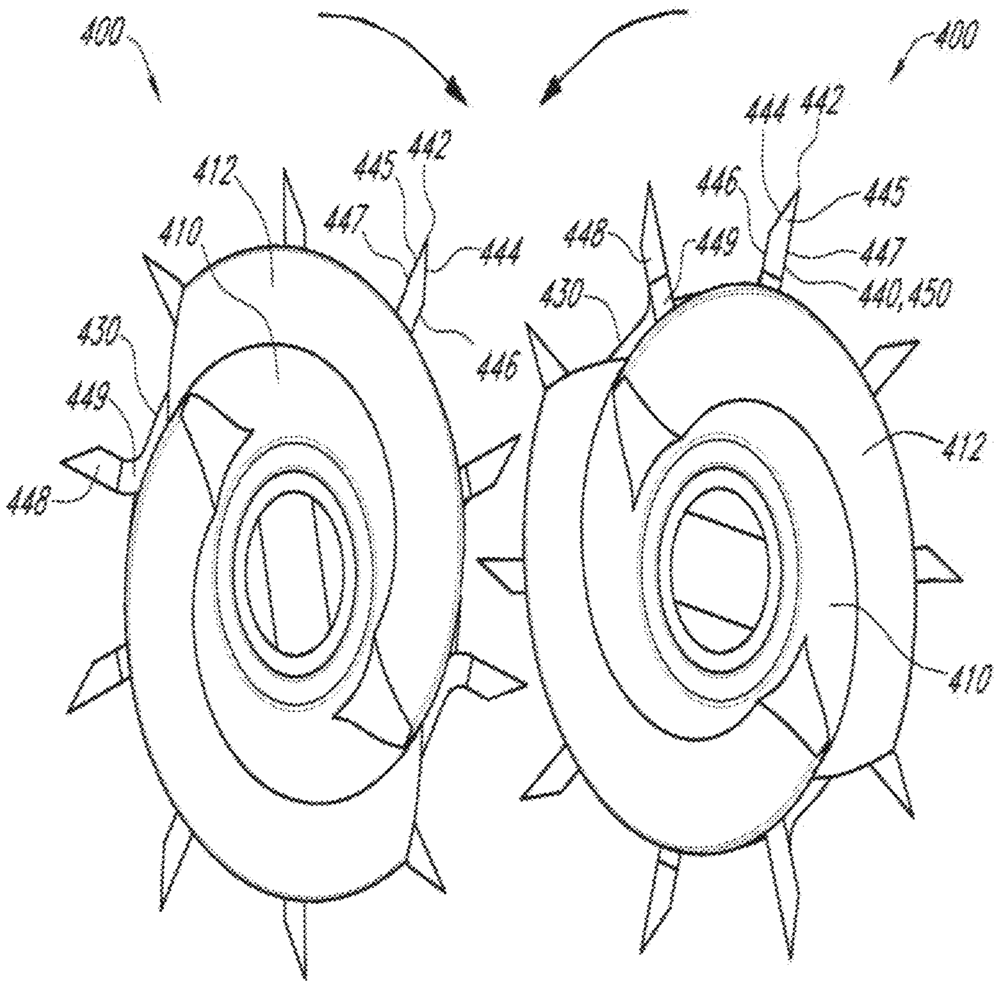
FIG. 22A is an end view of the first illustrative embodiment of two stalk rolls having recesses intermeshed with one another.

A detailed view of the flutes 440, 450 is shown in FIG. 21C. As shown, each flute 440, 450 includes a flute edge 442 at the vertex of a leading surface 444 and a trailing surface 445. The leading and trailing surfaces 444, 445 may be connected to the main cylinder 430 and/or recess 420 (depending on whether it is a full flute 440 or reduced flute 450) with a flute base 449. The flute base 449 may have a leading wall 446 adjacent the leading surface 444 and a trailing wall 447 adjacent the trailing surface 445. In the first embodiment of the stalk roll 400, a pair of stalk rolls 400 is mounted such that stalk roll 400 rotates toward the leading surface 444 and leading wall 446, as shown by the arrows in FIG. 22.

Each flute 440, 450 may be formed with a beveled edge 448 on the front axial surface thereof. In certain conditions, a beveled edge 448 provides easier entry for a stalk 320 into the corn plant engagement chamber. In the embodiment shown in FIGS. 21-22, the beveled edge 448 is angled at 30 degrees with respect to the vertical. However, in other embodiments the beveled edge 448 may be differently configured without limitation.

In the first embodiment of the stalk roll 400 the trailing wall 447 and trailing surface 445 are integral and linear, but may have other configurations in other embodiments of the stalk roll 400. In the first embodiment the leading surface 444 is angled at thirty degrees with respect to the leading wall 446, which also creates an angle of thirty degrees between the leading surface 444 and trailing surface 445 (and trailing wall 447 in the first embodiment). Through testing, Applicant has found that this orientation allows the flutes 440, 452 to effectively secure the stalk 320 during ear 321 removal and subsequently process the stalk 320 for accelerated decomposition. Additionally, this orientation allows the stalk rolls 400 to properly release the stalk 320 after the ear 321 has been removed so that the stalk 320 does not wrap around the stalk roll 400. Other orientations and/or configurations of leading surfaces 444, trailing surfaces 445, leading walls 446, trailing walls 447, and/or flute bases 449 may be used in other embodiments of the stalk roll 400 without limitation.

The embodiment shown in FIG. 23 includes leading and trailing surfaces 444, 445 that are to one another and create a flute edge 442 that is substantially flat, which may be optimal in conditions in which it is desired that the stalk 320 be pulverized rather than cut/lacerated. The angle between the leading and trailing surfaces 444, 445 and the flute edge 442 in the embodiment in FIG. 23 may be different than shown herein without limitation. The optimal configuration will vary at least based on the threshing conditions and plant variety. In the pictured embodiment, the flute edge 442 is perpendicular with respect to both the leading and trailing edges 444, 445 so that the stalk rolls 400 properly release the stalk 320 after processing. However, other configurations will be preferred for other operating conditions.

FIG. 22 shows an end view of two cooperating stalk rolls 400 configured according to the first embodiment. The stalk rolls 400 in this figure are shown substantially as they would appear when mounted on a corn head row unit. As shown, the stalk rolls 400 are mounted such that one pair of reduced flutes 450 on opposing stalk rolls 400 are adjacent one another twice during a full revolution of the stalk rolls 400. This creates two stalk engagement gaps 25 per revolution that extend the length of the recess 420. That is, the length of the stalk engagement gap 25 in the first embodiment of the stalk rolls 400 is equal to the difference in the length between the full flutes 440 and reduced flutes 450, which is also equal to the length of the recess 420. In the first embodiment of the stalk roll 400 having a recess 420, the width of the stalk slot 7 is defined by the distance between the inner peripheries of the main cylinders 430 of the opposing stalk rolls 400. The recess 420 increases the effective width of the stalk engagement gap 25 by two times the difference in diameter between the main cylinder 430 and the recess 420. Furthermore, the recess 420 facilitates the positioning of a stalk 320 between the flute edge 442 of a full flute 440 and the recess 420 when the stalk engagement gap 25 is not present in the stalk slot 7. This ensures that stalks 320 will move rearward along the length of the stalk rolls 400 during harvesting rather than stalling at the front of the stalk rolls 400 or being pushed forward to the nose cone 410. In embodiments of the stalk roll 400 in which the depth of the recess 420 is not constant along its length, the width of the stalk slot 7 is also not constant.

Figure 22B:
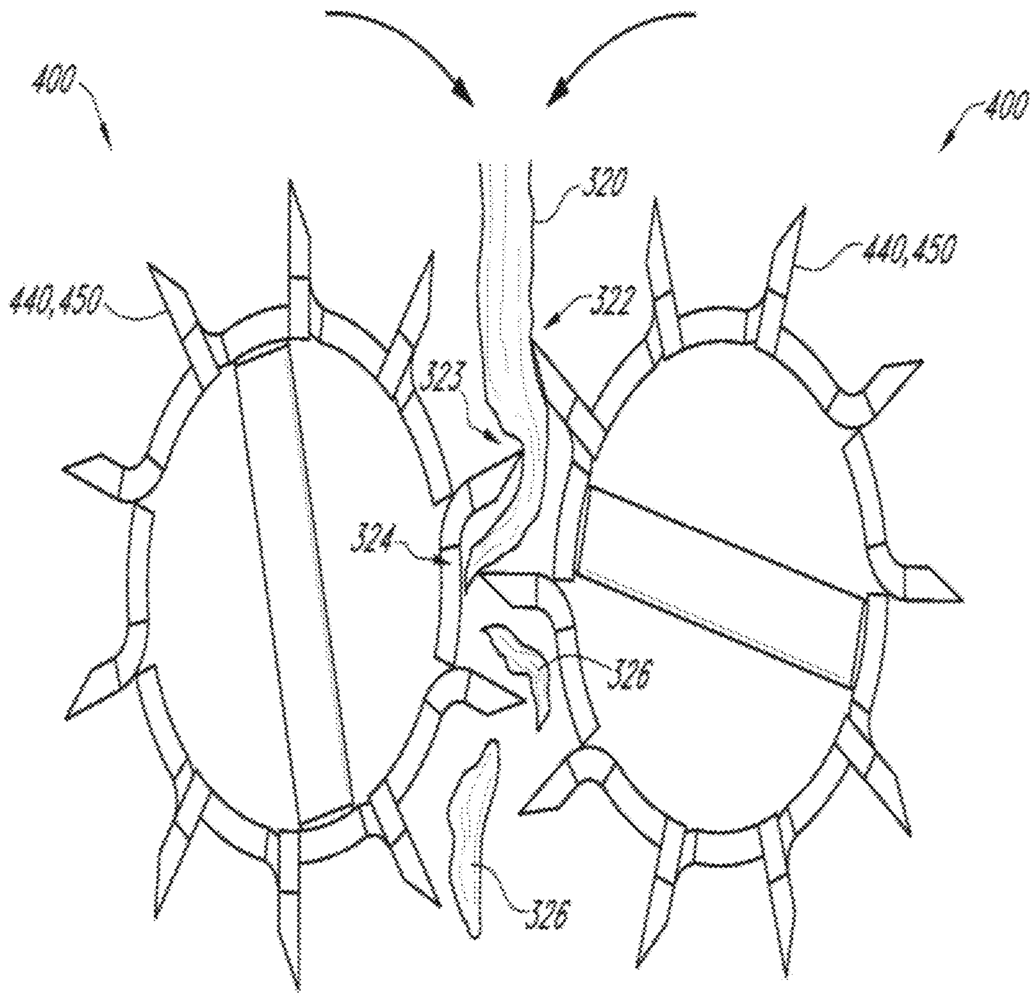
FIG. 22B is another end view of the first illustrative embodiment of two stalk rolls having recesses intermeshed with one another wherein the nose cone has been removed for clarity.

The embodiment of stalk rolls 400 shown in FIGS. 21-22 effectively remove ears 300 from a stalk 320 and also cut the stalk 320 upon ejection from the stalk rolls 400. This is achieved through the simultaneous grasp and control of the stalk 320 by a first pair of flutes 440, 450 while a second flute 440, 450 below the first pair cuts the stalk 320. This situation is shown schematically in FIG. 22B. The first pair of flutes 440, 450 secure the stalk 320 by engaging at it first and second grasp points 322, 323. This grasp and control of the stalk 320 allows another flute 440, 450 positioned below but adjacent the second grasp point 323 to produce a stalk cut point 324. This functionality requires a plurality of flutes 440, 450 spaced less than sixty degrees from adjacent flutes 440, 450. That is, at least seven flutes 440, 450 are required, and the embodiment pictured herein employs ten flutes 440, 450.

Applicant expected stalk rolls 400 as shown in FIGS. 21-22 to increase the amount of MOTE produced during harvesting compared to otherwise-identical six-flute stalk rolls. However, field testing showed that the ten-flute stalk rolls 400 actually produced less MOTE while simultaneously more effectively mutilating the stalk 320 than did the six-flute stalk rolls. Moreover, the ten-flute stalk rolls 400 operated consistently in multiple conditions, including high moisture (e.g., early morning or late evening harvesting), low moisture, and various varieties of corn plants.

The cutting function at the stalk cut point 324 is enhanced by the secure engagement of the stalk 320 at the first and second grasp points 322, 323 and the forward slope of the leading surface 444. Instead of slipping past the flute edge 442 at the stalk cut point 324, the stalk 320 is secured by the first and second grasp points 322, 323 so that the flute edge 442 at the stalk cut point 324 can fully penetrate the stalk 320. This allows the stalk rolls 400 to eject a plurality of stalk pieces 326 that resemble confetti.

Other embodiments of stalk rolls 400 incorporating a recess 420 may have additional or fewer flutes 440, 450 extending other distances along the length of the stalk roll 400. Additionally, any considerations, designs, and/or orientations previously discussed for other stalk rolls 15, 16, 190, 192 may be incorporated with stalk rolls 400 having a recess 420. For example, intermediate flutes 182, tapered flutes 181, and/or long flutes 183 may be positioned on the stalk roll 400 at various positions thereof. Additionally, the considerations of the various zones described in detail above may be incorporated into the design of the stalk rolls 400.

5. Other Row Unit Considerations

As shown in the embodiment of a corn head row unit in FIG. 20 the stalks 320 are lifted and guided toward the row unit by dividers 100. Gathering chain 120 may be formed with enlarged gathering chain paddles 110, which help to direct the stalks 320 and/or ears 300 toward the ear separation chamber 140. The stalks 320 may be further centered into the ear separation chamber 140 by improved stripper plates 130 described in detail above. Enlarged gathering chain paddles 110 have an increased angle relative to the gathering chain 120, which allow the gathering chain paddles 110 to engagement a larger number of stalks 320 and/or corn plants, especially when harvesting leaning and/or lodged corn.

Stalks 320 are gathered and further propelled rearwardly by means of the force imparted by transport vanes 170 on the nose cones 5, which are oppositely wound and strategically timed to be horizontally opposite. The transport vanes 170 positively direct and lock the stalk 320 into the Alignment and Entry Zones, both of which may be configured with a stalk engagement gap 25. Alternatively, the stalk engagement gap 25 may be replaced and/or supplemented with stalk rolls 190 having tapered flutes 181 as shown in FIGS. 15-15C and 17-17B. The strategic lateral speed imparted to the stalk 320 by rotating transport vanes 170 is determined by the angle of the transport vanes 170. This lateral speed may be equal to or faster than the lateral speed imparted to the stalk 320 by gathering chain paddles 110.

In the embodiment of a row unit shown in FIG. 20, the reduced number of enlarged gathering chain paddles 110 increases the conveying capacity of the row unit in the ear separation chamber 140 to carry separated ears 300 rearward. This improved capacity increases the conveying efficiency of the gathering chain paddles 110 to the cross auger trough 200, which contains auger 220 and fighting 230 for conveying ears 300 to the feeder house area.

Figure 18A:
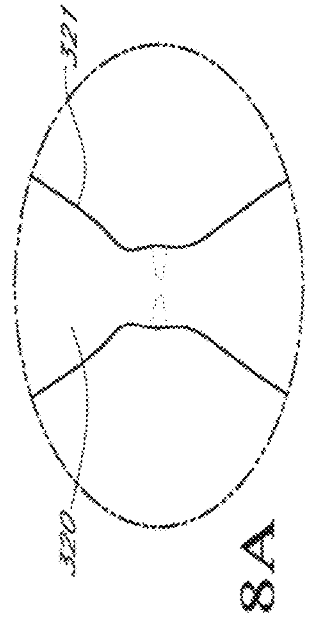
FIG. 18A is a detailed view of the stalk after penetration of the stalk by the stalk roll.

FIGS. 18 and 18A show how the tapered flute-to-flute design stalk rolls 192 may work in certain conditions. As the stalk rolls 192 rotate, the sharpened edges of the flutes 181 penetrate the stalk outer shell 321. The penetration of the tapered flutes 181 combined with the rotation of the stalk rolls 192 may simultaneously pull and lacerate the stalk 320. Because the entire row unit is moving forward during operation, the tapered flutes 181 penetrate deeper and deeper into the stalk 320 as it is pulled down into the row unit. The difference in height between the tapered flutes 181 and the stalk roll 192 results in a continuous compressing/decompressing action against the stalk 320, which may crimp the stalk 320.

Figure 19A:
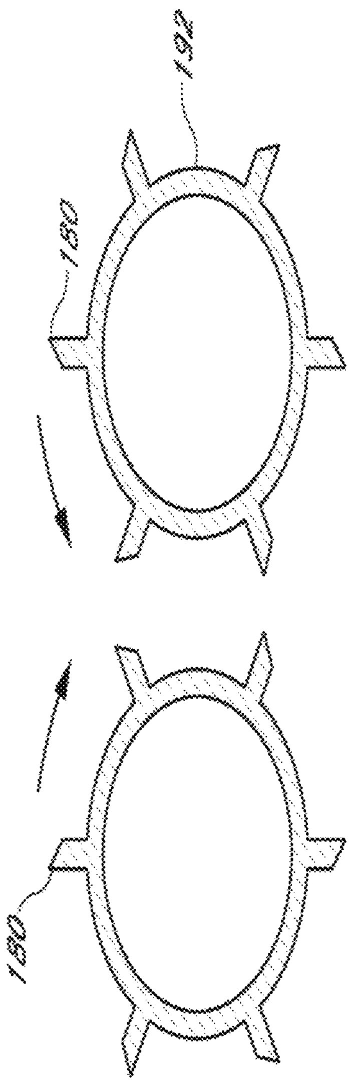
FIG. 19A is a cross-sectional view of another illustrative embodiment of stalk rolls incorporating certain aspects of the present disclosure showing the angle of the flute edges prior to engagement with a stalk.
Figure 19B:
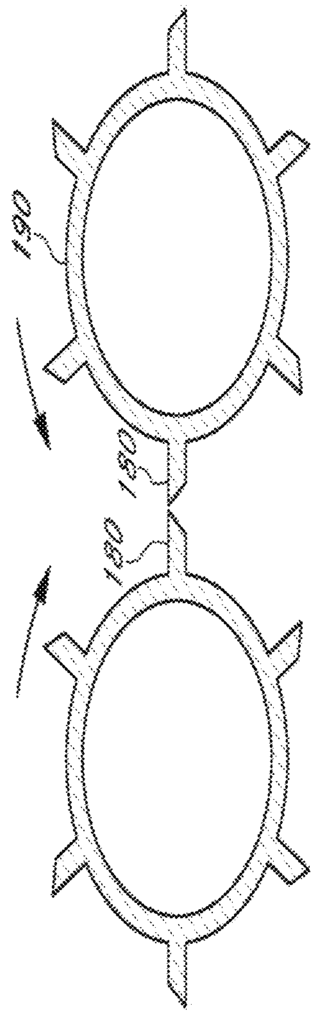
FIG. 19B is a cross-sectional view of the embodiment of stalk rolls shown in FIG. 19A incorporating certain aspects of the present disclosure showing the angle of the flute edges as they would be during engagement with a stalk.

FIGS. 19A and B illustrate the non-meshing stalk rolls 190 as they rotate during operation. In FIG. 18A, flutes 180 are marked at the top of the rotation prior to contact with the stalk 320. As the stalk roll 190 rotates, the edge of the flutes 180 will engage and begin to pinch the stalk 320. In FIG. 19B, flutes 180 have been rotated ninety degrees. The opposing flutes 180 are directly opposite each other. The pressure exerted by flutes 180 on the stalk 320 has lead to penetration of the stalk 320. The rotation of the stalk roll 190 has pulled the stalk 320 down into the corn row unit. Penetration by the flutes 180 is at maximum depth in FIG. 18B. Opposing flutes 180 do not touch each other during the cycle to avoid cutting through the stalk 320 in this embodiment. The angle of the knife edges of the flutes 180 have a predetermined slope, as described. The angle of the slopes are forward with respect to the direction of rotation of the stalk rolls 190.

6. Further Stalk Roll Aspects

Figure 24A:
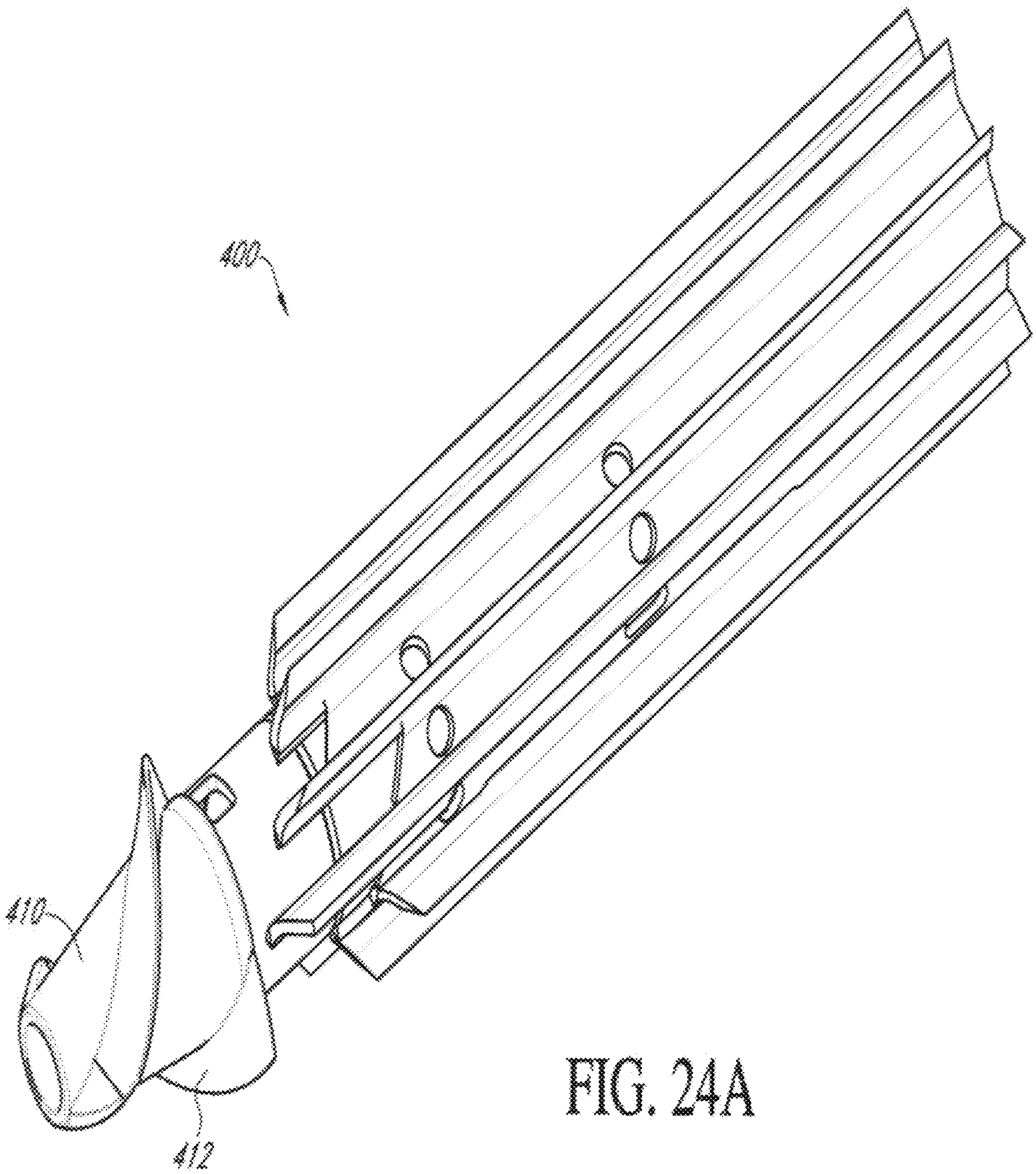
FIG. 24A is perspective view of another illustrative embodiment of a stalk roll that may be employed as the right stalk roll (from the perspective of an operator) may be intermeshed with an adjacent stalk roll to form a pair.
Figure 24B:
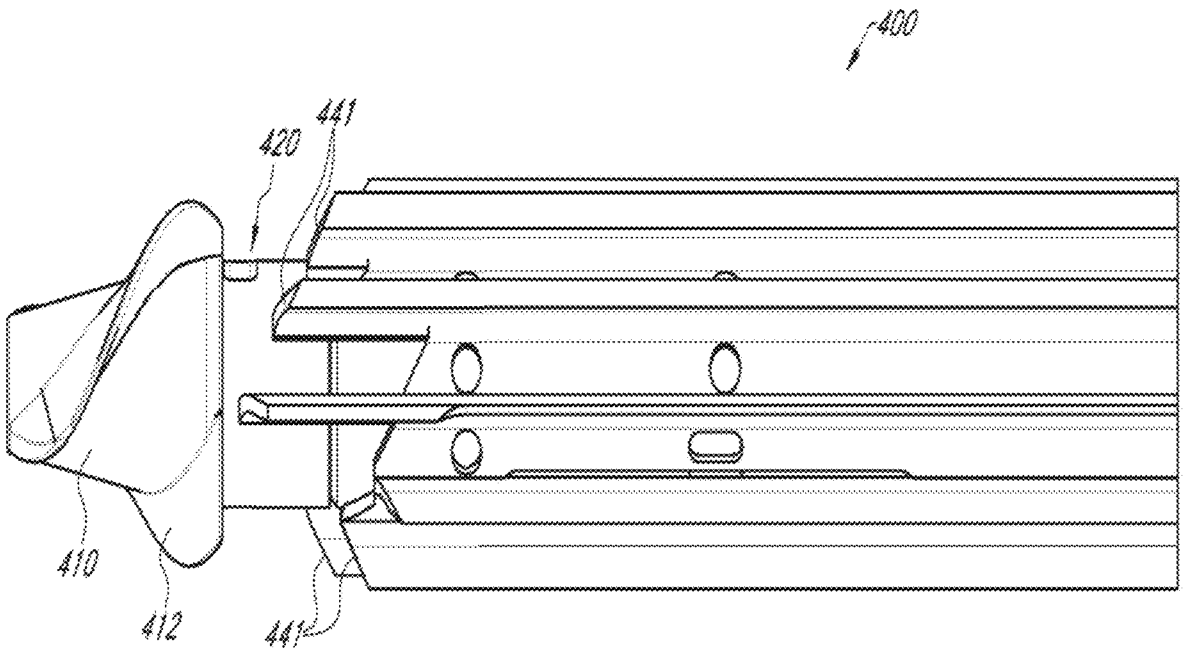
FIG. 24B is a side view of the illustrative embodiment of a stalk roll shown in FIG. 24A
Figure 24C:
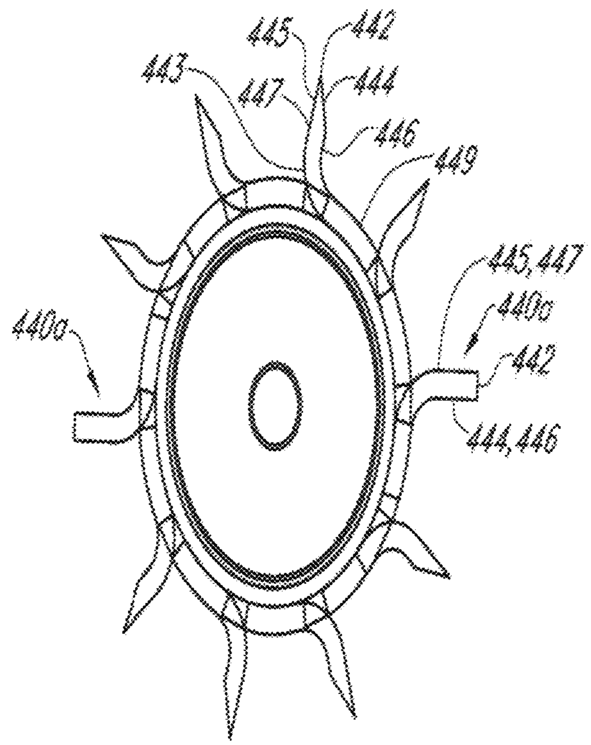
FIG. 24C is an end view of the illustrative embodiment of a stalk roll shown in FIG. 24A with the nose cone removed.
Figure 27A:
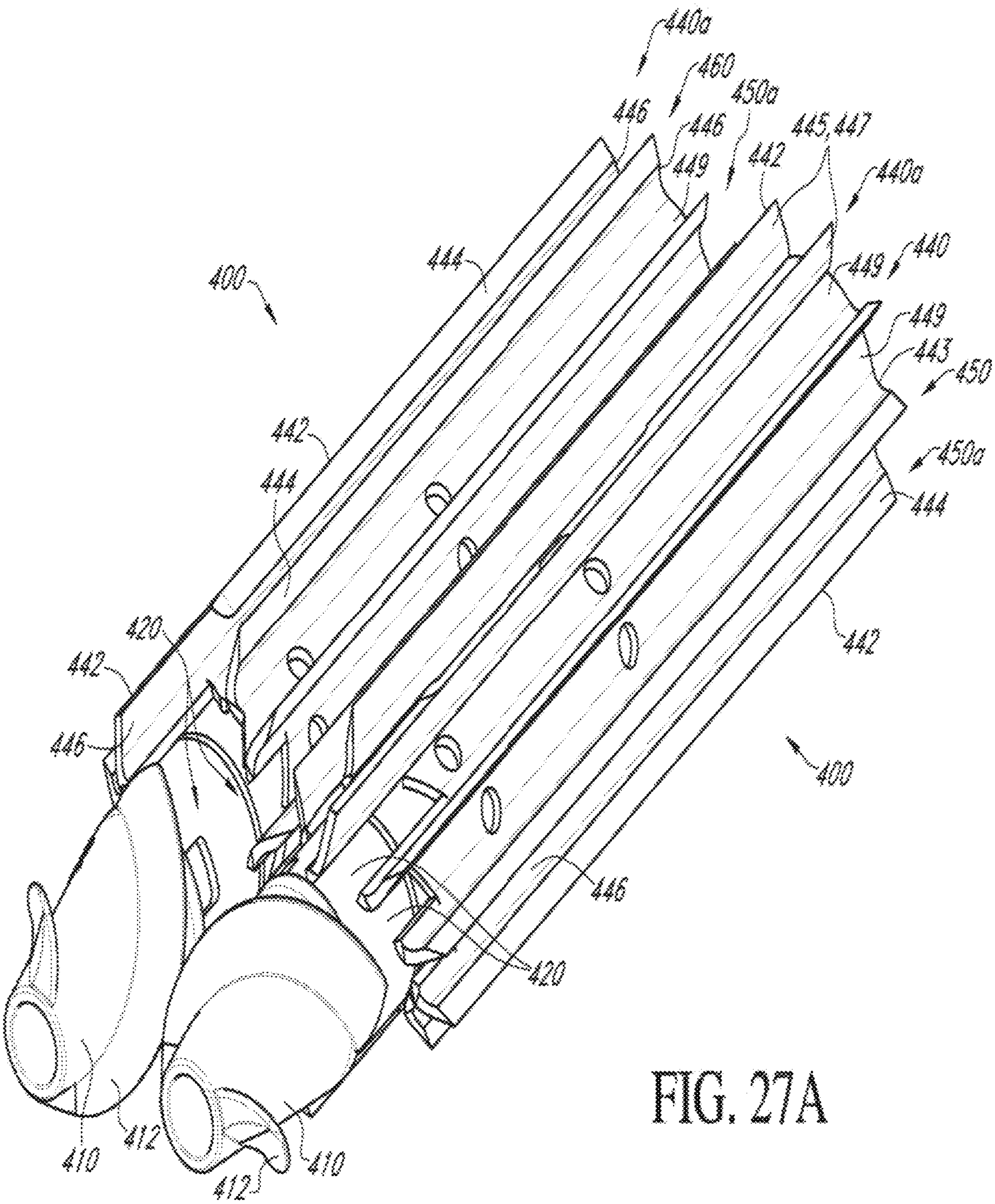
FIG. 27A is a perspective view of the illustrative embodiment of stalk rolls shown in FIGS. 24 and 25 positioned adjacent one another.
Figure 27B:
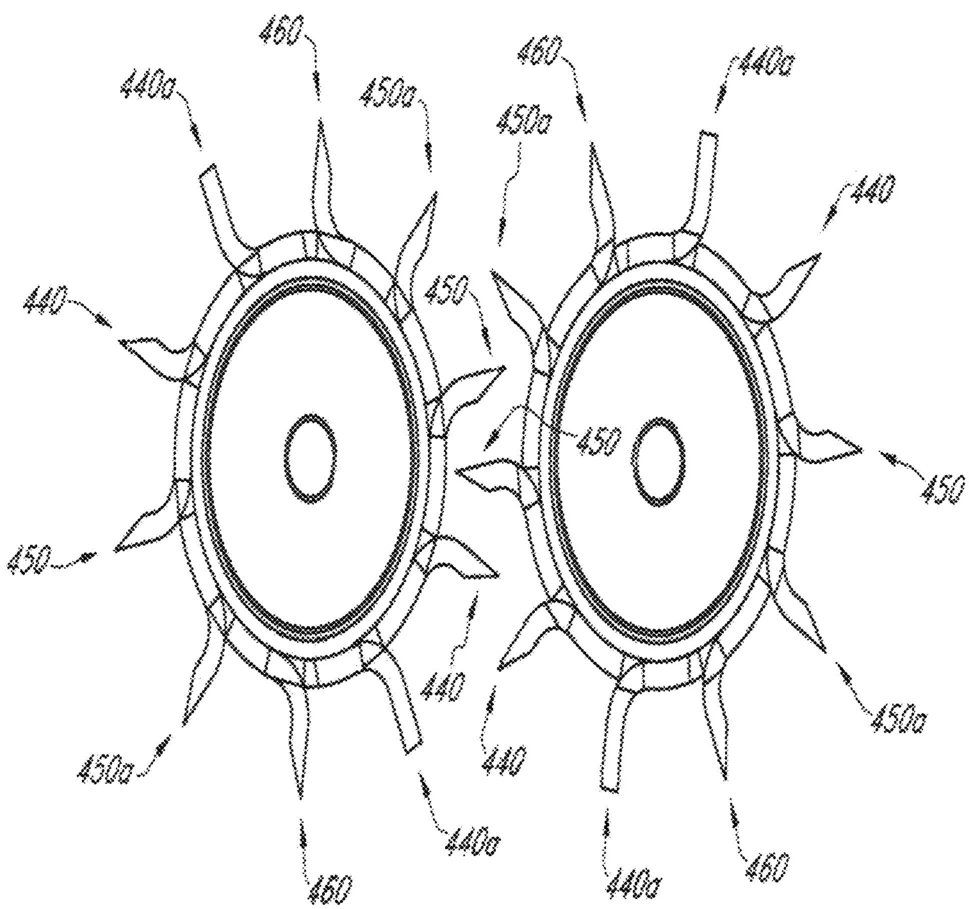
FIG. 27B is an end view of the illustrative embodiment of a stalk roll arrangement shown in FIG. 27A.

Another illustrative embodiment of a stalk roll 400 that may have a recess 420 formed therein is shown in FIGS. 24A-24C. It is contemplated that this particular embodiment of a stalk roll 400 may be specifically adapted for use with either a John Deere brand Series 40-90 corn head and/or a Case-IH 2200 and/or 2400 series corn head. It is contemplated that the stalk rolls 400 shown in FIGS. 28A-28C may be specifically adapted for use with a John Deere brand Series 600 corn head. However, the specific type of corn head for which a stalk roll 400 according to the present disclosure is adapted in no way limits the scope of the stalk roll 400 as disclosed and claimed herein. Accordingly, the various features and/or aspects of the stalk roll 400 according to the present disclosure may be employed on a stalk roll 400 configured for engagement with any corn head, whether currently existing for later developed, without limitation. Additionally, the illustrative embodiment of a stalk roll 400 shown in FIGS. 24A-24C may be especially useful if configured as the right stalk roll 400 (from the vantage of an operator positioned in the harvesting machine with which the stalk roll 400 is engaged, which vantage is used from herein when referring to "right" and/or "left" directions) of a pair of cooperating stalk rolls 400. Conversely, the illustrative embodiment of a stalk roll 400 shown in FIGS. 25A-25C may be especially useful if configured as the left stalk roll 400 of a pair of cooperating stalk rolls 400, which illustrative embodiment of a pair of stalk rolls 400 is shown in FIGS. 27A & 27B. However, the specific relative orientation, configurations, etc. of stalk rolls 400 employing any of the various features disclosed herein in no way limit the scope of the stalk roll 400 as disclosed and claimed herein.

Those of ordinary skill in the art will appreciate how to adapt the features of either illustrative embodiment of a stalk roll 400 shown in FIGS. 24A-24C and/or 25A-25C to configure a pair off cooperating stalk rolls 400, such as the illustrative embodiment thereof shown in FIGS. 27A & 27B. Accordingly, reference to either the illustrative embodiment of a right or left stalk roll 400 in no way limits the broader inventive features disclosed herein, and those features may be adapted to a cooperating stalk roll 400 without limitation.

It will be appreciated by persons of ordinary skill in the art that any stalk roll 400 according to the present disclosure may be engaged with complimentary stalk roll drive shafts 29, which may receive rotational power from a gearbox. The gearbox may have a fixed speed ratio for components receiving rotational power therefrom, or it may have variable speed ratios for any component receiving rotational power therefrom without limitation. Referring now to FIG. 24C, which provides an end view of the embodiment of a stalk roll 400 show in perspective in FIG. 24A with the nose cone 410 removed, that embodiment of a stalk roll 400 may include ten flutes 440, 440*a*, 450, 450*a*, 460 in total. In the embodiment shown, the stalk roll 400 specifically includes two hybrid flutes 440*a*, two full flutes 440, two reduced flutes 450, two second reduced flutes 450*a*, and two short flutes 460. However, other embodiments of the stalk roll 400 according to the present disclosure may have different numbers, orientations, and/or configurations of flutes 440, 440*a*, 450, 450*a*, 460 without departing from the spirit and scope of the stalk roll 400 as disclosed and claimed herein.

In certain illustrative embodiments, each flute 440, 440*a*, 450, 450*a*, 460 may include a flute base 449, which may be angled with respect to each flute 440, 440*a*, 450, 450*a*, 460. The flutes 440, 440*a*, 450, 450*a*, 460 may be integrally formed with the corresponding flute base 449 (as shown in the illustrative embodiments of flutes 440, 440*a*, 450, 450*a*, 460 shown in FIGS. 26A-26G), or they may be separately formed and later engaged with one another. Alternatively, any stalk roll 400 according to the present disclosure may be cast, forged, and/or formed via any other suitable fabrication technique and/or manufacturing method without limitation.

In the illustrative embodiments shown in FIGS. 26A-26G, each flute 440, 440*a*, 450, 450*a*, 460 may include a radius 443 as a transition from the leading and trailing walls 446, 447 of the flute 440, 440*a*, 450, 450*a*, 460 to the corresponding flute base 449. In the pictured embodiments, the radius 443 may be configured such that the angle between the leading and/or trailing walls 446, 447 of a flute 440, 440*a*, 450, 450*a*, 460 and the corresponding flute base 449 is greater than 90 degrees, which is evident from FIGS. 24C, 25C, and 27B. However, the scope of the stalk roll 400 as disclosed and claimed herein is not limited by the specific configuration of the radius 443 and/or the resulting orientation between the leading and/or trailing walls 446, 447 of each flute 440, 440*a*, 450, 450*a*, 460 and corresponding flute base 449, and the scope of the stalk roll 400 extends to all configurations and/or orientations between flutes 440, 440*a*, 450, 450*a*, 460 and corresponding flute bases 449. For certain embodiments, it is contemplated that the radius 443 may be configured such that a flute 440, 440*a*, 450, 450*a*, 460 may be formed from a flat, stock piece of iron without the need to anneal the flute 440, 440*a*, 450, 450*a*, 460.

In certain illustrative embodiments of a stalk roll 400 shown herein, it is contemplated that adjacent flutes 440, 440*a*, 450, 450*a*, 460 may be engaged and/or secured with one another such that adjacent flute bases 449 generally form a cylindrical structure from which the leading and trailing walls 446, 447 of the flutes radially extend. This may be done via engaging a distal end of a first flute base 449 to an adjacent second flute 440, 440*a*, 450, 450*a*, 460 in an area near the radius 443 of the second flute 440, 440*a*, 450, 450*a*, 460. This engagement and/or securement may be accomplished via any suitable structure and/or method, including but not limited to mechanical fasteners, welding, chemical adhesion, and/or combinations thereof without limitation.

As shown in FIGS. 24A-24C, an illustrative embodiment of a stalk roll 400 may include a nose cone 410 on the front portion of the stalk roll 400. Flighting 412 may be engaged with a portion of the nose cone 410. Typically, the nose cone 410 is shaped substantially as a cone, as shown in the embodiments of stalk rolls 400 pictured herein. The fighting 412 may be configured to guide stalks 320 into the ear separation chamber 140 as previously described.

As previously described, each stalk roll 400 may be formed via a plurality of flutes 440, 440*a*, 450, 450*a*, 460 engaged with one another. The plurality of flutes 440, 440*a*, 450, 450*a*, 460 may subsequently be engaged with a hub assembly 470, one illustrative embodiment of which is described in further detail below. The flutes 440, 440*a*, 450, 450*a*, 460, nose cone 410, and hub assembly 470 may be configured such that a recess 420 exists between the front end of one or more flutes 440, 440*a*, 450, 450*a*, 460 and the nose cone 410 as shown in FIG. 24B. The recess 420 may extend along the entire circumference of the stalk roll 400 (i.e., an annular recess 420), or along only a portion thereof. The recess 420 may be formed in the nose cone 410 (e.g., in the sleeve 414 thereof) and/or a portion of the flutes 440, 440*a*, 450, 450*a*, 460, or it may be formed as a separate cylinder that is later affixed to the flutes 440, 440*a*, 450, 450*a*, 460 and/or the nose cone 410. Accordingly, the specific elements of the stalk roll 400 used to create a recess 420 in no way limits the scope of the stalk roll 400 as disclosed and claimed herein.

Figure 26A:
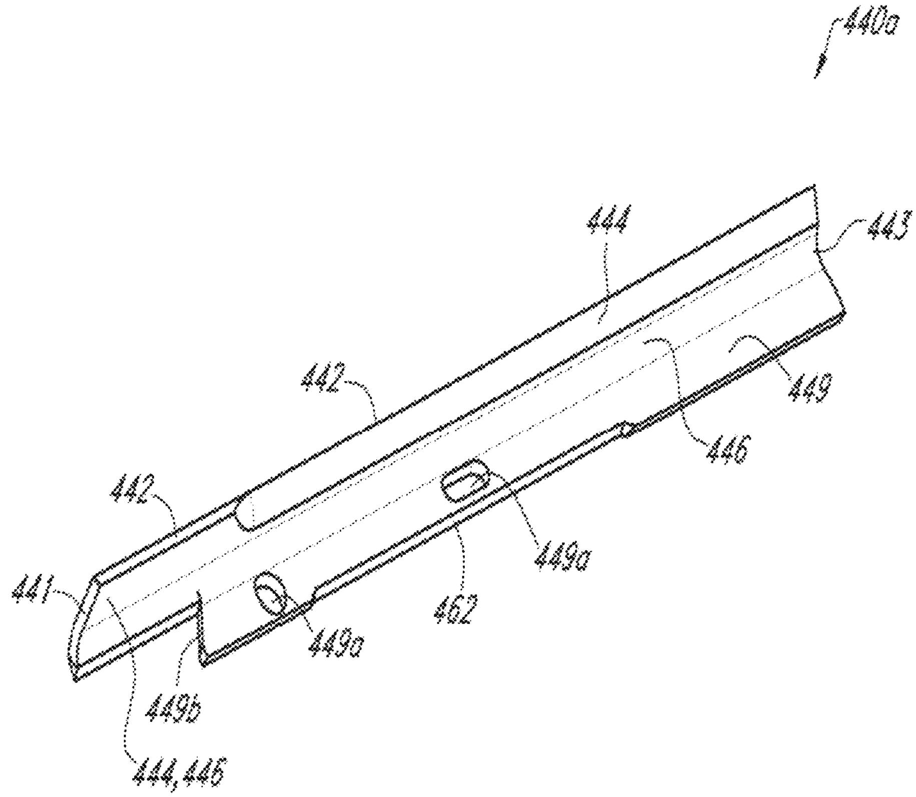
FIG. 26A is a perspective view of an illustrative embodiment of a hybrid flute that may be employed on the stalk roll shown in FIGS. 24A-24C.

An illustrative embodiment of a hybrid flute 440*a* is shown in FIG. 26A. As shown, this embodiment of a hybrid flute 440*a* may include an axial face 441 that is angled backward with respect to the direction of travel of a harvesting machine to create a leading beveled edge 448. In certain embodiments the beveled edge 448 may be advantageously angled at 30 degrees with respect to the vertical. However, in other embodiments the beveled edge 448 may be differently configured without limitation. For example, in other embodiments of the hybrid flute 440*a* the beveled edge 448 may be angled at 20 degrees with respect to the vertical or it may be angled at 45 degrees with respect to the vertical.

Still referring to FIG. 26A, the illustrative embodiment of a hybrid flute 440*a* may include a trailing wall 447 and trailing surface 445 that may be integral and linear, but which may have other configurations in other embodiments of the stalk roll 400. The hybrid flute 440*a* may also include a leading wall 446 and a leading surface 444. As shown, the leading and trailing walls 446, 447 may extend beyond the flute base 449, such that a portion of the leading and trailing walls 446, 447 may be positioned over the exterior surface of the sleeve 414 and/or other portion of the nose cone 410 and/or stalk roll 400. Furthermore, a first portion of the flute edge 442 toward the nose cone 410 may be formed as a blunt edge and a rear portion of the flute edge 442 may be formed as a sharp, knife edge.

The blunt flute edge 442 may be formed via leading and trailing surfaces 444, 445 that are substantially parallel to one another so as to create a flute edge 442 that is substantially flat, which flute edge 442 may be generally perpendicular to the leading and trailing surfaces 444, 445. The sharp flute edge 442 may be formed by angling the leading surface with respect to the leading wall 446. The optimal angle for this will vary depending on the specific harvesting conditions, but it is contemplated that for most applications the optimal angle may be between 2 and 65 degrees. Other orientations and/or configurations of leading surfaces 444, trailing surfaces 445, leading walls 446, trailing walls 447, and/or flute bases 449 may be used in other embodiments of the stalk roll 400 without limitation.

In the stalk roll 40 and flute 440, 440*a*, 450, 450*a*, 460 embodiments pictured in FIGS. 24A-27B, it is contemplated that the blunt flute edge 442 may extend along the length of the stalk roll 400 from an area adjacent the flighting/flute interface backward to an area just past the start of the shortest flute 440, 440*a*, 450, 450*a*, 460 on the stalk roll 400 (which may be the short flute 460 as shown in the illustrative embodiment in FIGS. 24A-27B). This configuration may ensure that the portion of any flute 440, 440*a*, 450, 450*a*, 460 that initially engages a stalk is a blunt flute edge 442 rather than a sharp flute edge 442, which may mitigate wear on the flutes 440, 440*a*, 450, 450*a*, 460.

Figure 25A:
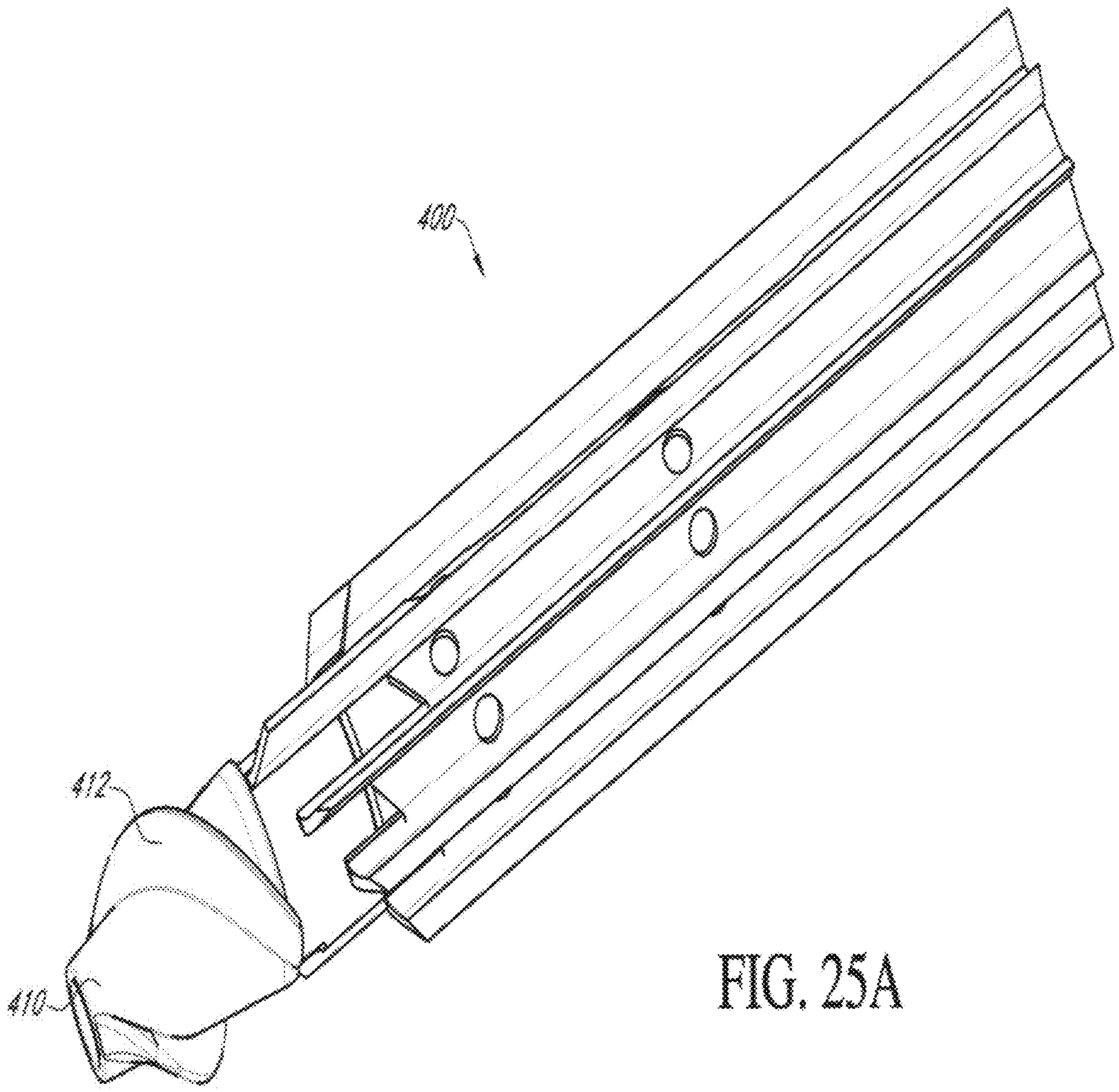
FIG. 25A is a perspective view of an illustrative embodiment of a stalk roll that may be employed as the left stalk roll with the illustrative embodiment of a stalk roll shown in FIGS. 24A-24C to create a cooperating pair.
Figure 25B:
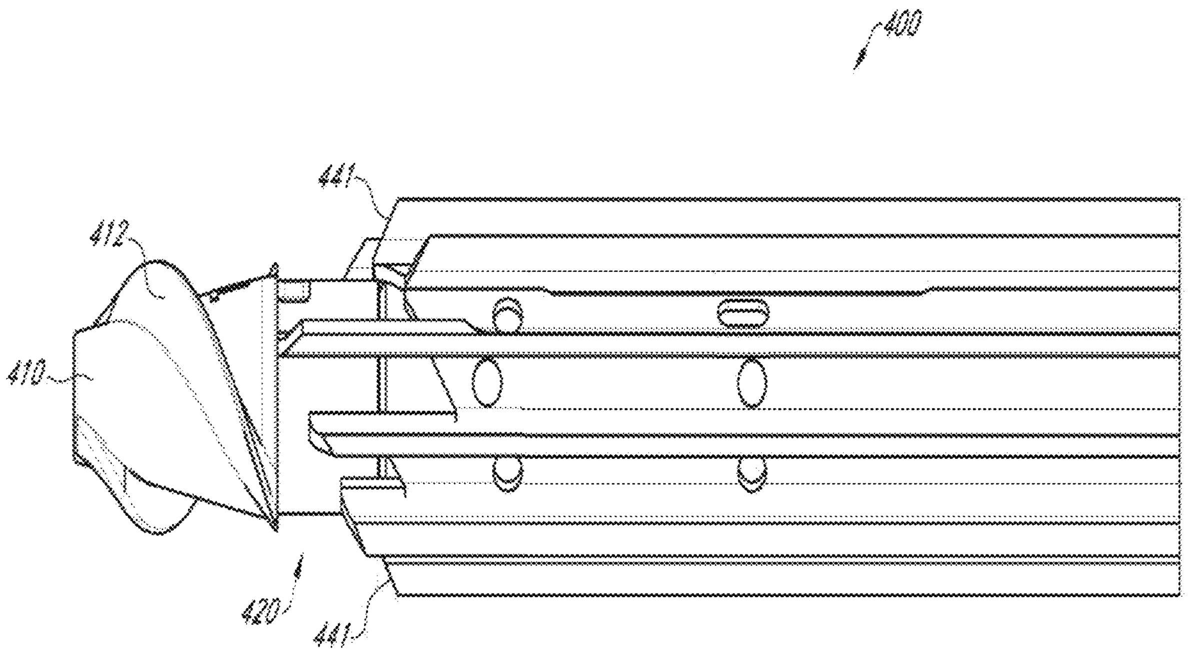
FIG. 25B is a side view of the illustrative embodiment of a stalk roll shown in FIG. 25A.
Figure 25C:
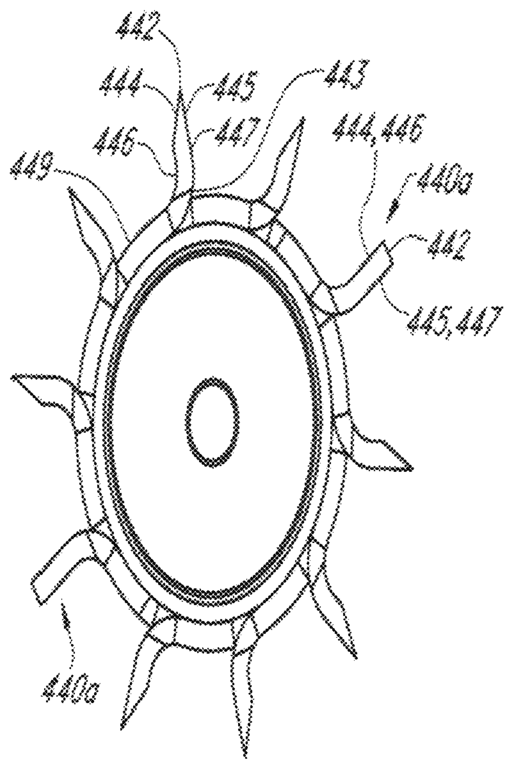
FIG. 25C is an end view of the illustrative embodiment of a stalk roll shown in FIG. 25A with the nose cone removed.
Figure 26B:
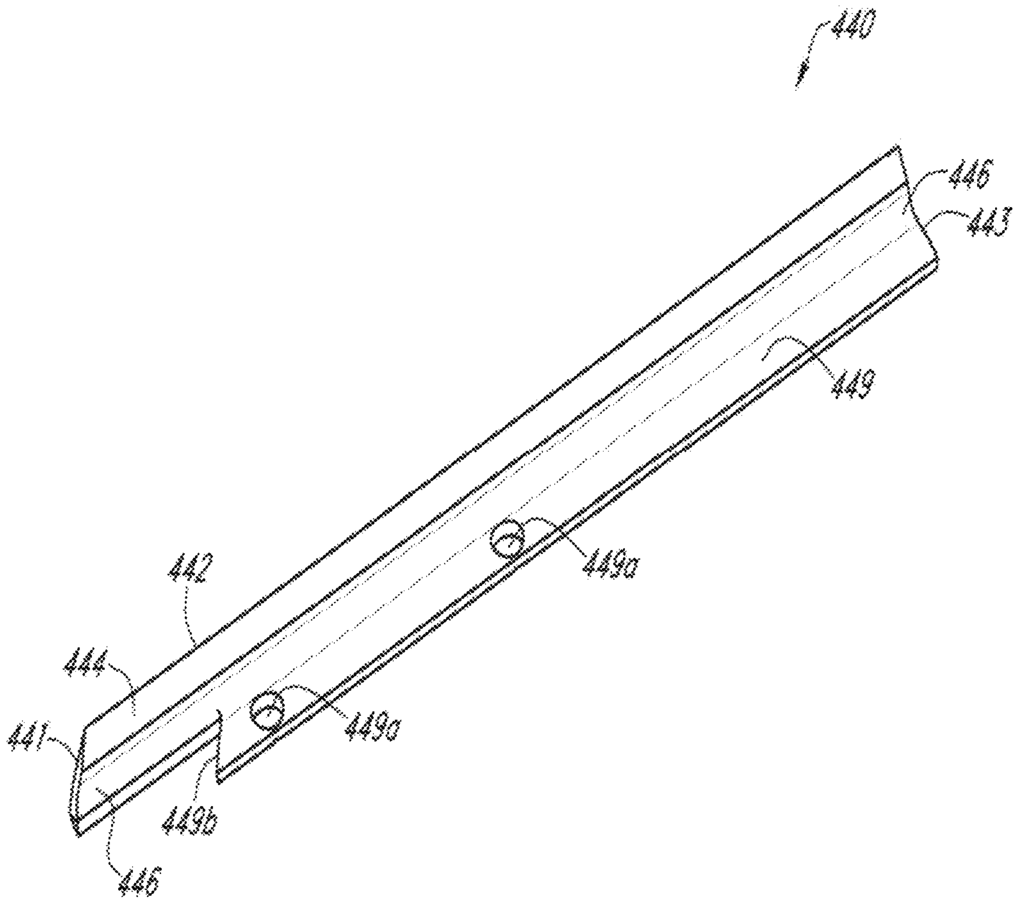
FIG. 26B is a perspective view of an illustrative embodiment of a full flute that may be employed on the stalk roll shown in FIGS. 24A-24C.

An illustrative embodiment of a full flute 440 is shown in perspective view in FIG. 26B. The full flute 440 may be positioned adjacent a hybrid flute 440*a* in the illustrative embodiments of stalk rolls 400 shown in FIGS. 24A-25C, 27A, and 27B, and in which embodiments the full flute 440 may be shorter in length than the hybrid flute 440*a*. The illustrative embodiment of a full flute 440 may include a trailing wall 447 and trailing surface 445 that may be integral and linear, but which may have other configurations in other embodiments of the stalk roll 400. The full flute 440 may also include a leading wall 446 and a leading surface 444. As shown, the leading and trailing walls 446, 447 may extend beyond the flute base 449, such that a portion of the leading and trailing walls 446, 447 may be positioned over the exterior surface of the sleeve 414 and/or other portion of the nose cone 410 and/or stalk roll 400. The entire flute edge 442 of the full flute 440 may be formed as a sharp, knife edge. Alternatively, the full flute 400 may be formed with a portion that includes a blunt flute edge 442 and another portion that includes a sharp flute edge 442 as previously described for the hybrid flute 440*a*.

Figure 26C:
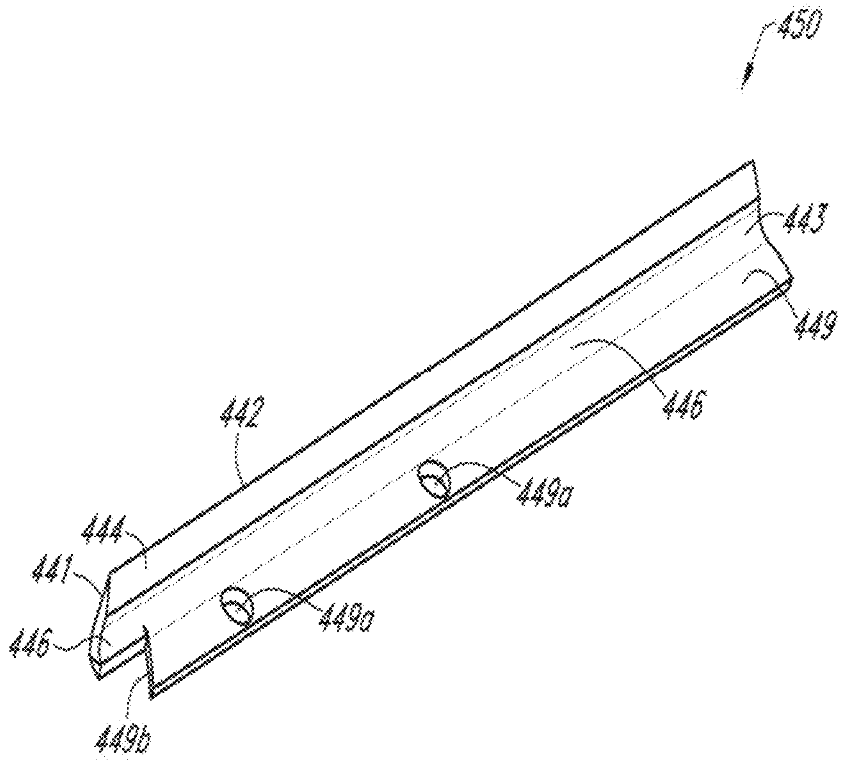
FIG. 26C is a perspective view of an illustrative embodiment of a reduced flute that may be employed on the stalk roll shown in FIGS. 24A-24C.

An illustrative embodiment of a reduced flute 450 is shown in perspective view in FIG. 26C. The reduced flute 450 may be positioned adjacent a full flute 440 in the illustrative embodiments of stalk rolls 400 shown in FIGS. 24A-25C, 27A, and 27B, and in which embodiments the reduced flute 450 may be shorter in length than the full flute 440. The illustrative embodiment of a reduced flute 450 may include a trailing wall 447 and trailing surface 445 that may be integral and linear, but which may have other configurations in other embodiments of the stalk roll 400. The reduced flute 450 may also include a leading wall 446 and a leading surface 444. As shown, the leading and trailing walls 446, 447 may extend beyond the flute base 449, such that a portion of the leading and trailing walls 446, 447 may be positioned over the exterior surface of the sleeve 414 and/or other portion of the nose cone 410 and/or stalk roll 400. The entire flute edge 442 of the reduced flute 450 may be formed as a sharp, knife edge. Alternatively, the reduced flute 450 may be formed with a portion that includes a blunt flute edge 442 and another portion that includes a sharp flute edge 442 as previously described for the hybrid flute 440*a*.

Figure 26D:
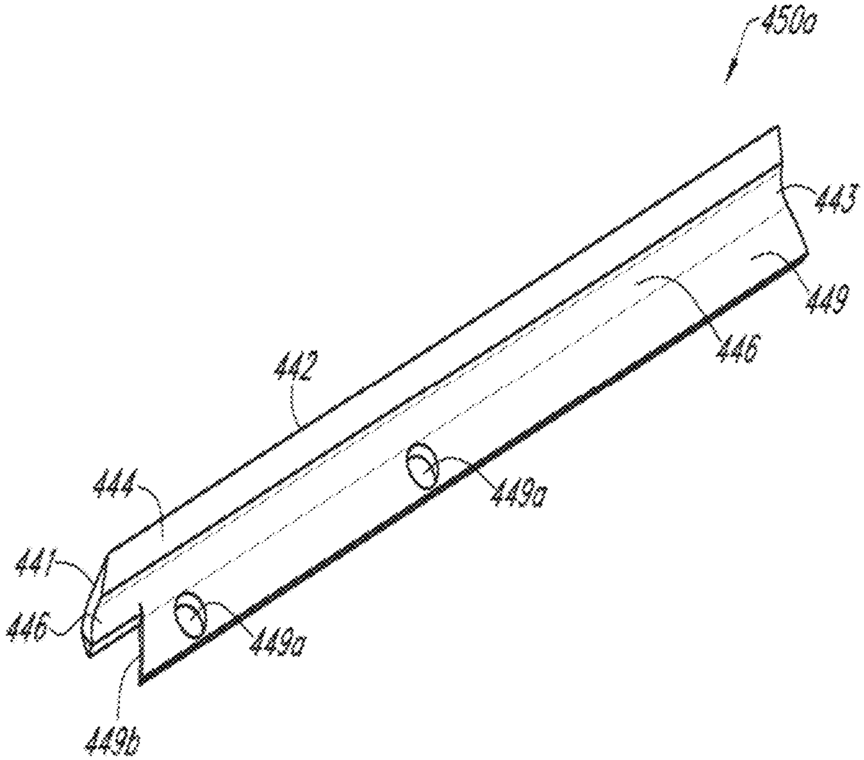
FIG. 26D is a perspective view of an illustrative embodiment of a second reduced flute that may be employed on the stalk roll shown in FIGS. 24A-24C.

An illustrative embodiment of a second reduced flute 450*a* is shown in perspective view in FIG. 26D. The second reduced flute 450*a* may be positioned adjacent a reduced flute 450 in the illustrative embodiments of stalk rolls 400 shown in FIGS. 24A-25C, 27A, and 27B, and in which embodiments the second reduced flute 450*a* may be shorter in length than the reduced flute 450. The illustrative embodiment of a second reduced flute 450*a* may include a trailing wall 447 and trailing surface 445 that may be integral and linear, but which may have other configurations in other embodiments of the stalk roll 400. The second reduced flute 450*a* may also include a leading wall 446 and a leading surface 444. As shown, the leading and trailing walls 446, 447 may extend beyond the flute base 449, such that a portion of the leading and trailing walls 446, 447 may be positioned over the exterior surface of the sleeve 414 and/or other portion of the nose cone 410 and/or stalk roll 400. The entire flute edge 442 of the second reduced flute 450*a* may be formed as a sharp, knife edge. Alternatively, the second reduced flute 450*a* may be formed with a portion that includes a blunt flute edge 442 and another portion that includes a sharp flute edge 442 as previously described for the hybrid flute 440*a*.

Figure 26E:
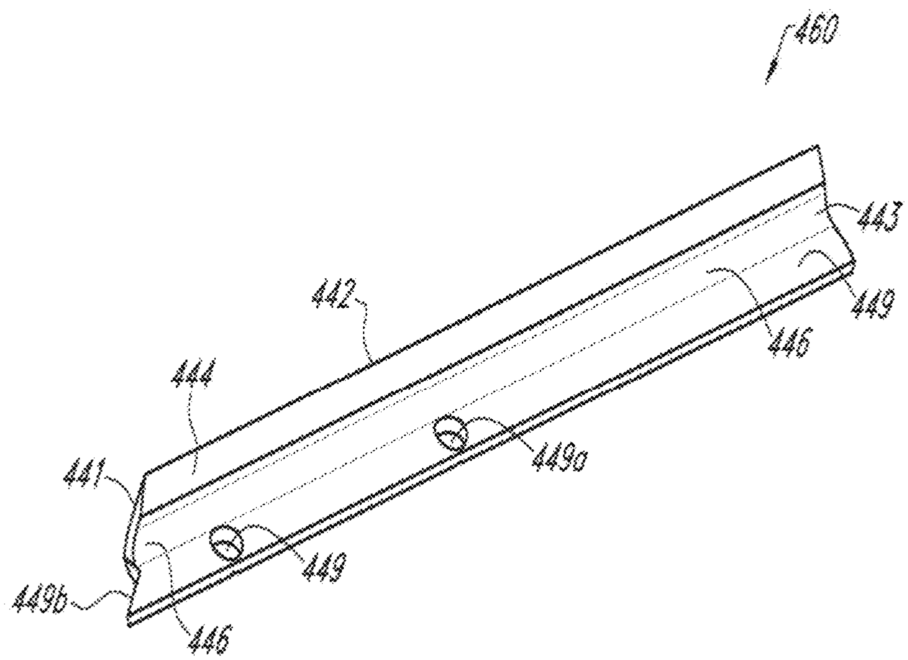
FIG. 26E is a perspective view of an illustrative embodiment of a short flute that may be employed on the stalk roll shown in FIGS. 24A-24C.
Figure 26F:
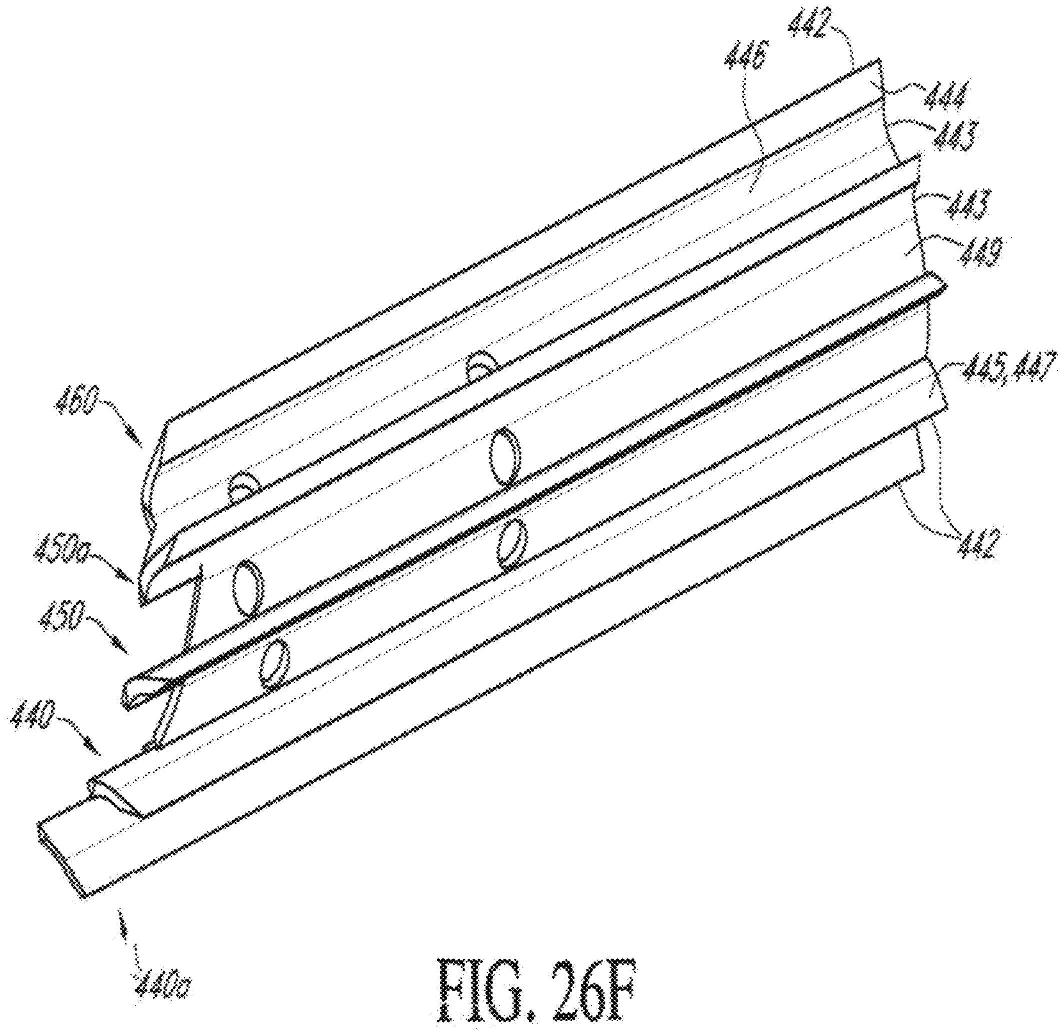
FIG. 26F is a perspective view of the flutes shown in FIGS. 26A-26B positioned relative to one another as shown in the illustrative embodiment of a stalk roll in FIGS. 24A-24C.
Figure 26G:
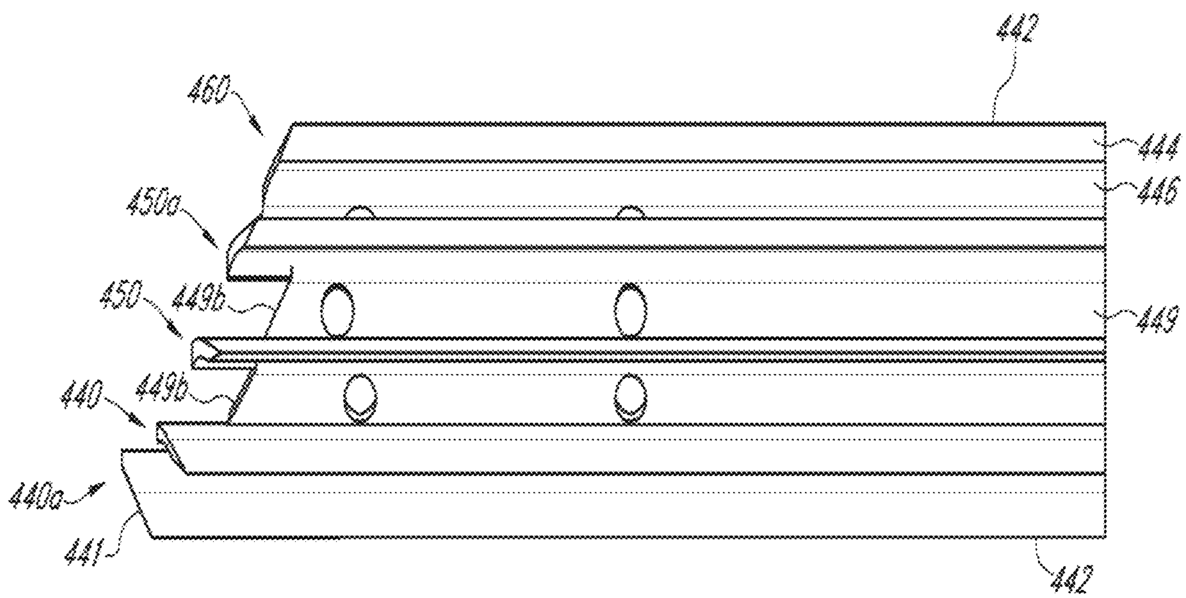
FIG. 26G is a side view of the illustrative embodiment of an arrangement of flutes shown in FIG. 26F.

An illustrative embodiment of a short flute 460 is shown in perspective view in FIG. 26E. The short flute 460 may be positioned adjacent a second reduced flute 450*a* in the illustrative embodiments of stalk rolls 400 shown in FIGS. 24A-25C, 27A, and 27B, and in which embodiments the short flute 460 may be shorter in length than the second reduced flute 450*a*. The illustrative embodiment of a short flute 460 may include a trailing wall 447 and trailing surface 445 that may be integral and linear, but which may have other configurations in other embodiments of the stalk roll 400. The short flute 460 may also include a leading wall 446 and a leading surface 444. As shown, the leading and trailing walls 446, 447 may extend beyond the flute base 449, such that a portion of the leading and trailing walls 446, 447 may be positioned over the exterior surface of the sleeve 414 and/or other portion of the nose cone 410 and/or stalk roll 400. The entire flute edge 442 of the short flute 460 may be formed as a sharp, knife edge. Alternatively, the short flute 460 may be formed with a portion that includes a blunt flute edge 442 and another portion that includes a sharp flute edge 442 as previously described for the hybrid flute 440*a*. As shown, all or some of the flutes 440, 440*a*, 450, 450*a*, 460 may be formed with an axial face 441 that is angled with respect to the flute edge 442 at an angle greater than 90 degrees to reduce the likelihood of stalk shear or degradation upon first contact with a flute 440, 440*a*, 450, 450*a*, 460. It is contemplated that in one embodiment this axial face 441 may be angled at 120 degrees with respect to the flute edge 442.

Although the illustrative embodiments shown in FIGS. 24A-25C, 27A, and 27B depict stalk rolls 400 having two hybrid flutes 440*a*, two full flutes 440, two reduced flutes 450, two second reduced flutes 450a, and two short flutes 460, other numbers, configurations, and/or orientations of flutes 440, 440a, 450, 450a, 460 may be used without limitation. For example, in some embodiments of a stalk roll 400 according to the present disclosure it is contemplated that the full flutes 440 may be configured as having a portion configured with a blunt flute edge 442 and a portion configured with a sharp flute edge 442.

In the illustrative embodiments of stalk rolls 400 shown in FIGS. 24A-25C, 27A, and 27B, another hybrid flute 440a may be positioned adjacent a short flute 460, such that each hybrid flute 440a is positioned between a short flute 460 and a full flute 440 and so on to configure a stalk roll 400 with ten flutes 440, 440a, 450, 450a, 460. However, other configurations, orientations, and/or relative positions and/or dimensions of the flutes 440, 440a, 450, 450a, 460 may be used without departing from the spirit and scope of the stalk roll 400 as disclosed and claimed herein. As shown, the configuration of illustrative embodiments of flutes 440, 440a, 450, 450a, 460 may create a stair-stepped window. Additionally, the fighting 412 on the nose cone 410 may cooperate with the flutes 440, 440a, 450, 450a, 460 such that the flighting/flute interface leads to an open area in the stalk roll 400 to facilitate entry of a stalk into the ear separation chamber 140 with minimal interference from any flutes 440, 440a, 450, 450a, 460. This may be accomplished by placing the forward facing axial face 441 of the most forward-extending flute 440, 440a, 450, 450a, 460 (which in this illustrative embodiment is the hybrid flute 440a) as rotationally aligned as possible with the rearward end of the fighting 412. In the illustrative embodiment of a stalk roll 400 shown in FIG. 24A, the hybrid flute 440a and the rearward end of the fighting 412 may have little to no rotational offset therebetween.

Because the illustrative embodiment of a pair of stalk rolls 400 shown in FIGS. 27A and 27B are configured to be intermeshed, the illustrative embodiment of a stalk roll 400 shown in FIGS. 25A-25C may require that there is a certain amount of rotational offset between the rearward end of the fighting 412 and the hybrid flute 440a to prevent interference between nose cones 410 and/or flutes 440, 440a, 450, 450a, 460 of opposing stalk rolls 400 cooperating as a pair. Accordingly, the embodiment of a stalk roll 400 shown in FIGS. 25A-25C may be configured such that the rearward end of the fighting 412 is positioned so that it does not feed a stalk directly into a flute 440, 440a, 450, 450a, 460, which may result in the rearward end of the flighting 412 to approximately rotationally aligned with a second reduced flute 450a. However, in other embodiments it is possible that both stalk rolls 400 of a cooperating pair may have little to no rotational offset between most forward-extending flute 440, 440a, 450, 450a, 460 and the rearward end of the fighting 412. In still other embodiments, the rearward end of the fighting 412 may be approximately rotationally aligned with a different flute 440, 440a, 450, 450a, 460, such as a short flute 460 or reduced flute 450 without limitation. Accordingly, the specific and/or relative rotational positions of the fighting 412 and various flutes 440, 440a, 450, 450a, 460 in no way limit the scope of the stalk roll 400 as disclosed and claimed herein.

Referring now to FIGS. 26A-26G, each flute base 449 may include a base bevel 449b. The base bevel 449b may be configured to facilitate movement of a stalk from an area adjacent a recess 420 to the ear separation chamber 140. Configuring a stalk roll 400 with flutes 440, 440a, 450, 450a, 460 shown in FIGS. 26A-26G may allow for a recess 420 in the stalk roll 400 of varying length depending on the rotational position on the stalk roll 400 (which may also affect the depth of a stalk engagement gap 25, as described in detail below). For example, in the illustrative embodiment of a configuration of flutes 440, 440a, 450, 450a, 460 shown in FIG. 26G, the portion of the leading and trailing walls 446, 447 extending forward beyond the flute base 449 of a first flute 440, 440a, 450, 450a, 460 may cooperate with the portion of the leading and trailing walls 446, 447 extending forward beyond the flute base 449 of a second, adjacent flute 440, 440a, 450, 450a, 460 such that a portion of the recess 420 resides between the two flutes 440, 440a, 450, 450a, 460 in the space absent any flute base 449. This configuration allows for a recess 420 that extends further backward along the length of the stalk roll 400 from the longest flute 440, 440a, 450, 450a, 460 to the shortest flute 440, 440a, 450, 450a, 460 (which happens to be from the hybrid flute 440a to the short flute 460 in the illustrative embodiments). That is, in the illustrative embodiments of a stalk roll 400 the recess 420 may extend further backward along the length of the stalk roll 400 between the second reduced flute 450a and reduced flute 450 than the recess 420 extends between the reduced flute 450 and full flute 440. Additionally, the recess 420 may extend further backward along the length of the stalk roll 400 between the reduced flute 450 and full flute 440 than the recess 420 extends between the full flute 440 and hybrid flute 440a. However, other configurations of flutes 440, 440a, 450, 450a, 460, flute bases 449, nose cones 410, and/or hub assemblies 470 may be used to manipulate the configuration and/or orientation of the recess 420 without limitation.

As with other embodiments of the stalk roll 400, the diameter of the recess 420 generally may be less than the outside diameter of either the general cylinder formed by adjacent flute bases 449 or the rearward end of the nose cone 410. The length of the recess 420 may vary from one embodiment of the stalk roll 400 to the next and may vary on a given stalk roll 400 depending on the rotational position about the stalk roll 400 as described above. Accordingly, the specific dimensions of the recess 420 are in no way limiting to the scope of the present disclosure.

One or more flute bases 449 may be formed with various apertures 449a therein to allow for access to a key pin (not shown), retainer 432, and/or other structures. One or more flute bases 449 may also be formed with a tapped hole, such that a retainer 432 may pass through an aperture 449a and engage the tapped hole. Tightening the retainer 432 may cause the area between a notch 462 (shown formed in the hybrid flute 440a of the illustrative embodiment pictured in FIGS. 24A-27B) and an adjacent flute base 449 to constrict, which in turn may cause the slot 476 to constrict around the stalk roll drive shaft 29, thereby securing a portion of the stalk roll 400 to the stalk roll drive shaft 29. Of course, those of ordinary skill in the art will appreciate that the specific mounting method and/or structures used to engage a stalk roll 400 will a stalk roll drive shaft 29 will vary from one application to the next, and is therefore in no way limiting to the scope of the present disclosure.

In this embodiments pictured in FIGS. 24A-27B, the configuration and orientation of the flutes 440, 440a, 450, 450a, 460 may provide a stalk engagement gap 25 with dynamic geometry. As two cooperating stalk rolls 400 rotate, the hybrid flutes 440a eventually become present within stalk slot 7. Continuing to rotate the stalk rolls 400 causes the full flutes 440 (or a portion thereof) to become present in the stalk slot 7, such that a portion of the full flutes 440 and a portion of the hybrid flutes 440a may be simultaneously present in the stalk slot 7.

Continuing to rotate the stalk rolls 400 causes the reduced flutes 450 (or a portion thereof) to become present in the stalk slot 7, such that a portion of the reduced flutes 450 and a portion of the full flutes 440 may be simultaneously present in the stalk slot 7. Additional rotation causes the second reduced flutes 450*a* (or a portion thereof) to become present in the stalk slot 7, such that a portion of the reduced flutes 450 and second reduced flutes 450*a* may be simultaneously present in the stalk slot 7. Finally, rotating the stalk rolls 400 further causes the short flutes 460 (or a portion thereof) to become present in the stalk slot 7, such that a portion of the short flutes 460 and a portion of the second reduced flutes 450*a* may be simultaneously present in the stalk slot 7.

As this rotation occurs, it will be apparent to those of ordinary skill in the art that the stalk engagement gap 25 may first appear (at a moment approximately when the hybrid flutes 440*a* exit the stalk slot 7) and may have a constant width (which width may be approximately equal to the horizontal distance between the sleeves 414 of opposing nose cones 410). However, the depth of the stalk engagement gap 25 may progressively increase as the rotation above occurs.

That is, the depth of the stalk engagement gap 25 at a moment in time when the short flutes 460 and second reduced flutes 450*a* are present in the stalk slot 7 may be greater than the depth of the stalk engagement gap 25 at a moment in time when the full flutes 440 and reduced flutes 450 are present in the stalk slot 7. The base bevels 449*b*, bevel positions on the axial faces 441, lengths of flute bases 449, lengths of flutes 440, 440*a*, 450, 450*a*, 460, and/or distance that the leading and trailing walls 446, 447 extend beyond the corresponding flute bases 449 may be configured to provide a relatively smooth transition from one depth of a stalk engagement gap 25 (or length of recess 420) to the next, which is clearly shown at least in FIG. 26G. Other arrangements of the various elements described herein may be used without departing from the spirit and scope of the stalk roll 400 as disclosed and claimed herein. It is contemplated that this configuration may facilitate the positioning of a stalk 320 between the blunt flute edges 442 of hybrid flutes 440*a* on opposing stalk rolls 440, which may ensure that stalks 320 will move rearward along the length of the stalk rolls 400 during harvesting rather than stalling at the front of the stalk rolls 400 or being pushed forward to the nose cone 410.

In other embodiments the width of the stalk engagement gap 25 may vary with the rotational position of the opposing stalk rolls 400. For example, one or more flutes 440, 440*a*, 450, 450*a*, 460 may be configured with a flute base 449 extending forward beyond the leading and trailing walls 4446, 447 to create a bladeless area adjacent that portion of the flute base 449. The difference in the diameter of the stalk roll 400 at the recess 420 as compared to the diameter at the bladeless area 422 may create a stalk engagement gap 25 having two or more distinct widths, wherein the stalk engagement gap 25 has a first width along a generally horizontal line drawn from the recess 420 on a first stalk roll 400 to the recess 420 on the opposing stalk roll 400 and a second width along a generally horizontal line drawn from the bladeless area on the first stalk roll 40 to the bladeless area 422 on the opposing stalk roll 400. In one embodiment the width of the stalk engagement gap 25 between opposite recesses 420 may be 1.25 inches and the width of the window between opposite bladeless areas 422 may be ⅞ inch, but such dimensions are in no way limiting. It is contemplated that in some embodiments the width of the stalk engagement gap 25 between opposite recesses 420 may be equal to the shortest distance between opposite nose cones 410.

Figure 28A:
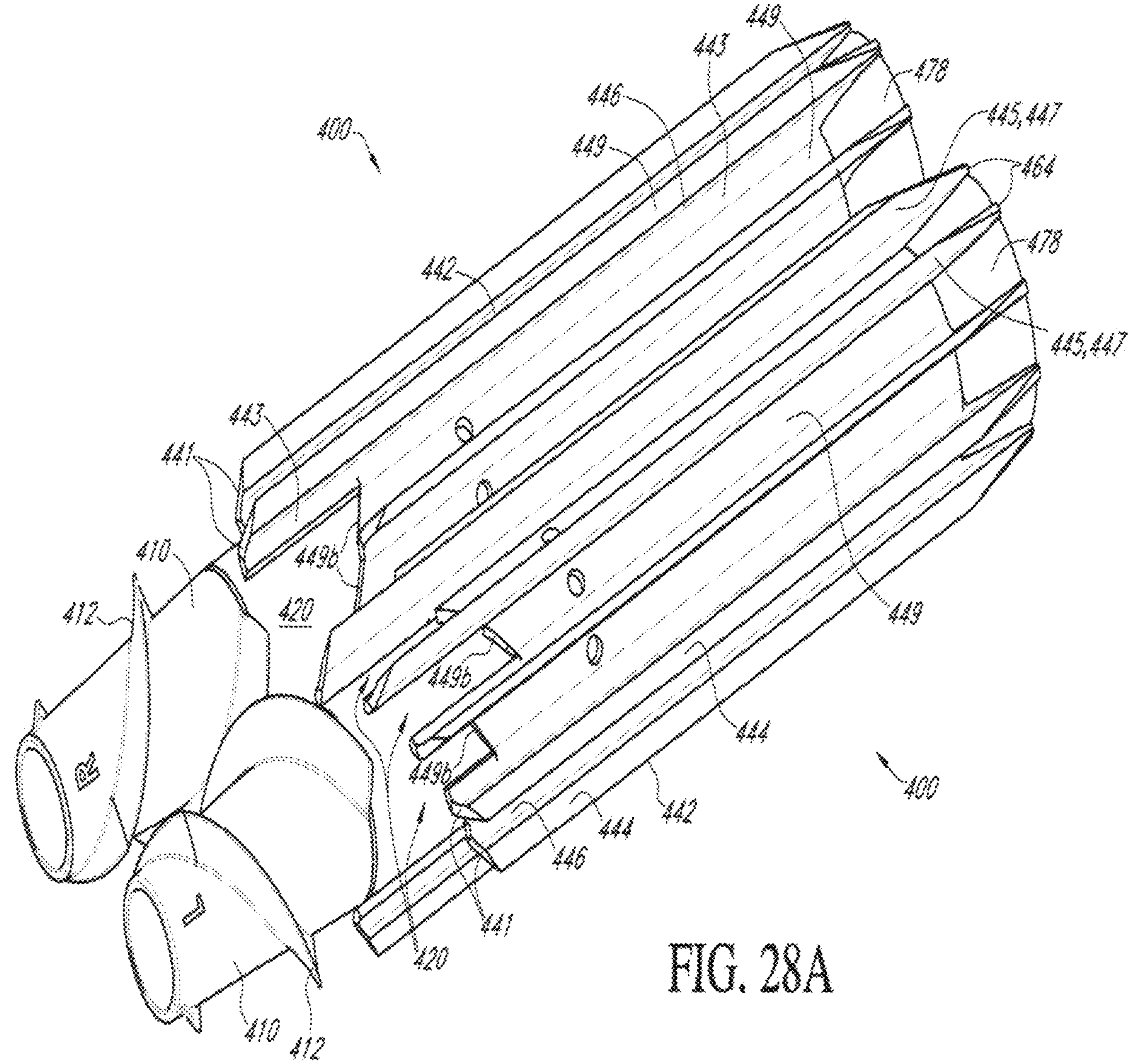
FIG. 28A is a perspective view of another illustrative embodiment of a pair of stalk rolls according to the present disclosure.
Figure 28B:
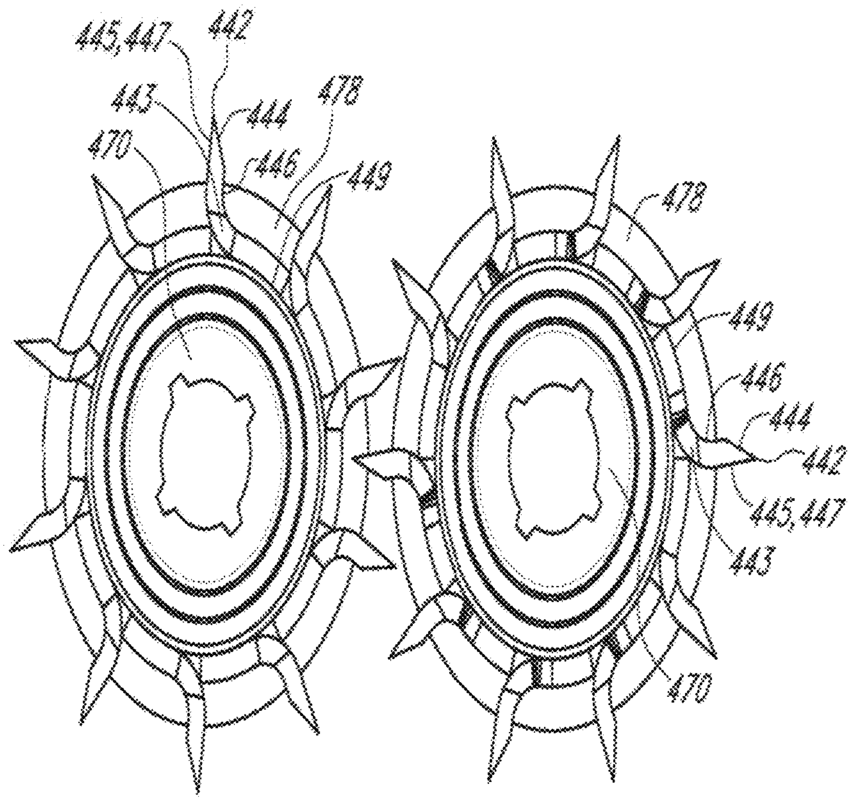
FIG. 28B is an end view of the illustrative embodiment of a pair of stalk rolls shown in FIG. 28A
Figure 28C:
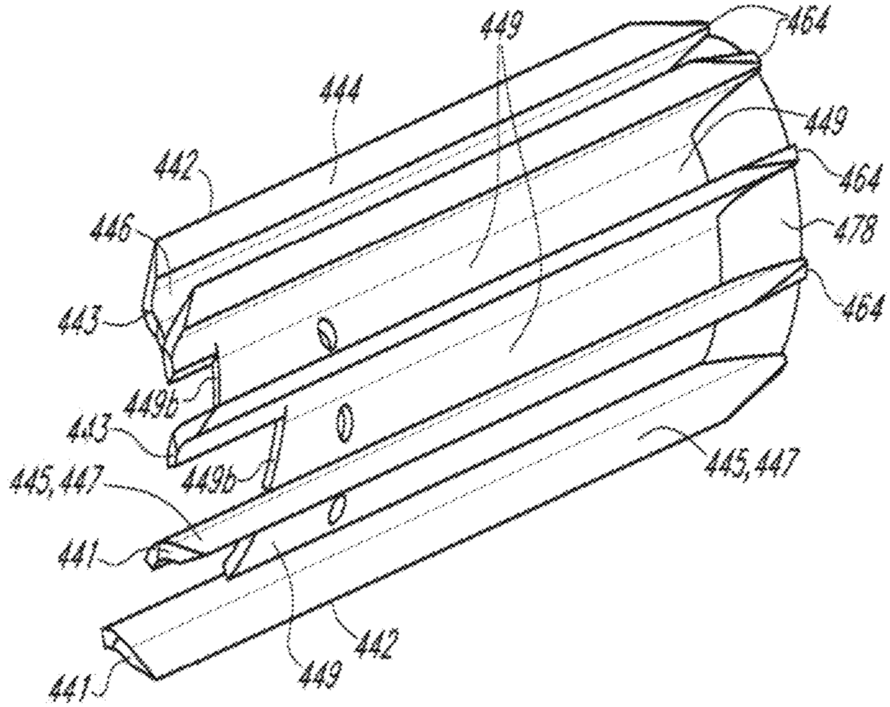
FIG. 28C is a perspective view of a five adjacent flutes of the right stalk roll of the illustrative embodiment of a pair of stalk rolls shown in FIG. 28A.

Another illustrative embodiment of stalk rolls 400 according to the present disclosure is shown in FIGS. 28A & 28B. It is contemplated that this embodiment of stalk rolls 400 may be specifically configured for use on John Deere brand Series 600 corn heads. However, the specific make, model, and/or configuration of corn head with which any stalk roll 400 according to the present disclosure is engaged in no way limits the scope of the stalk roll 400 as disclosed and claimed herein. This embodiment may include hybrid blades 440*a* as previously disclosed for other embodiments, or it may be configured with no flutes 440, 440*a*, 450, 450*a*, 460 having a blunt flute edge 442 without limitation. As may be seen in FIG. 28B, a hub assembly 470 engaged with the illustrative embodiment of the stalk rolls 400 shown in FIGS. 28A & 28B may be formed with a central bore 475 having one or more coupler sections 475*a* (which may be formed as four keyways offset by 90 degrees from one another) therein. The coupler sections 475*a* may serve to engage and/or secure at least the rotational position of the stalk roll 400 with respect to the stalk roll drive shaft 29.

As shown, the stalk rolls 400 in FIGS. 28A & 28B may have a nose cone 410 that is slightly longer than the nose cone 410 on the stalk rolls 400 shown in FIGS. 27A & 27B. The pitch and depth of the fighting 412 on any of the nose cones 410 pictured herein is for illustrative purposes only, and therefore is in no way limiting to the scope of the present disclosure. It is contemplated that in one embodiment, the pitch of the fighting 412 will be configured such that when the stalk rolls 400 are spinning at operating speed, a corn stalk engaged with the fighting 412 may travel at approximately 6 miles per hour in the generally horizontal dimension. Other nose cones 410 may be used without limitation. If formed separately from the hub assembly 470, the nose cone 410 may be later secured to the hub assembly 470, which may be done using any structure and/or method now known to those skilled in the art or later developed, including but not limited to welding, mechanical fasteners, chemical adhesives, and/or combinations thereof. It is contemplated that the optimal rotational position of the nose cone 410 may be determined by the configuration of the fighting 412 and the position of the key pin, but such considerations are in no way limiting to the present disclosure.

The flutes 440, 440*a*, 450, 450*a*, 460 on the embodiment of the stalk roll 400 shown in FIGS. 28A & 28B may have a rearward axial point 464, which may be accomplished via removing the flute base 449 from that portion and removing both a top and bottom portion of the leading and trailing walls 446, 447. This configuration of the rearward axial end of the flutes 440, 440*a*, 450, 450*a*, 460 may allow the flutes 440, 440*a*, 450, 450*a*, 460 to engage an end ring 478 adjacent the most rearward end of the flutes 440, 440*a*, 450, 450*a*, 460 for structural integrity and proper mounting and/or positioning of the stalk rolls 400 on the corn head. However, other configurations of the rearward axial end of the flutes 440, 440*a*, 450, 450*a*, 460 and/or end ring 478 may be used without departing from the spirit and scope of the stalk roll 400 as disclosed and claimed herein. As with the embodiments shown in FIGS. 27A & 27B, the stalk rolls 400 shown in FIGS. 28A & 28B may be configured such that a stalk engagement gap 25 forms at least once during a full revolution of the stalk rolls 400, as best described in U.S. Pat. Nos. 7,886,510 and 8,220,237, which are incorporated by reference herein in their entireties.

As with other embodiments of stalk rolls 400 disclosed herein, the embodiment shown in FIGS. 28A & 28B, the configuration of flutes 440, 440*a*, 450, 450*a*, 460 may provide a stair-stepped stalk engagement gap 25. A first boundary to the depth this stalk engagement gap 25 may be formed at the rear end of the fighting 412 at a flighting/flute interface. Although not shown for the pictured embodiment, in other embodiments of the stalk roll 400 the axial face 441 of one of the full flutes 440 (or whatever flute 440, 440*a*, 450, 450*a*, 460 extends forward the furthest) may be engaged with the fighting 412 such that during rotation of the stalk roll 400, a stalk 320 may easily travel from the nose cone 410 to the recess 420 (or stalk engagement gap 25) and along the length of the stalk roll 400.

Figure 29A:
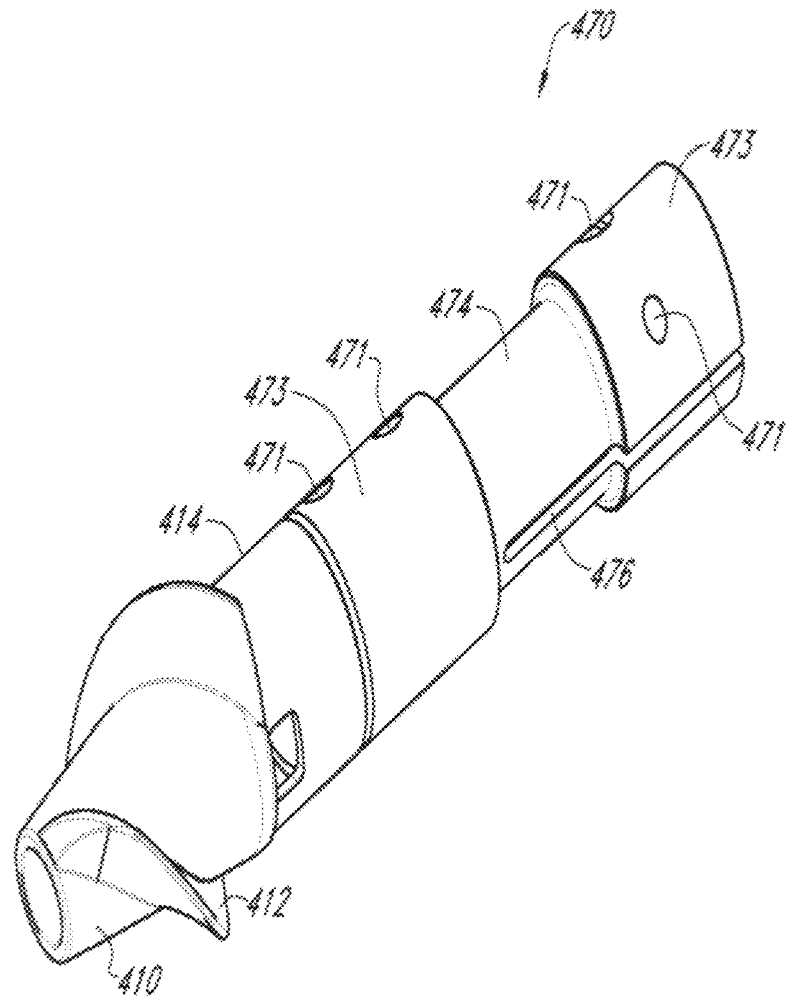
FIG. 29A is a perspective view of an illustrative embodiment of a hub assembly and nose cone that may be used with certain illustrative embodiments of the stalk roll.
Figure 29B:
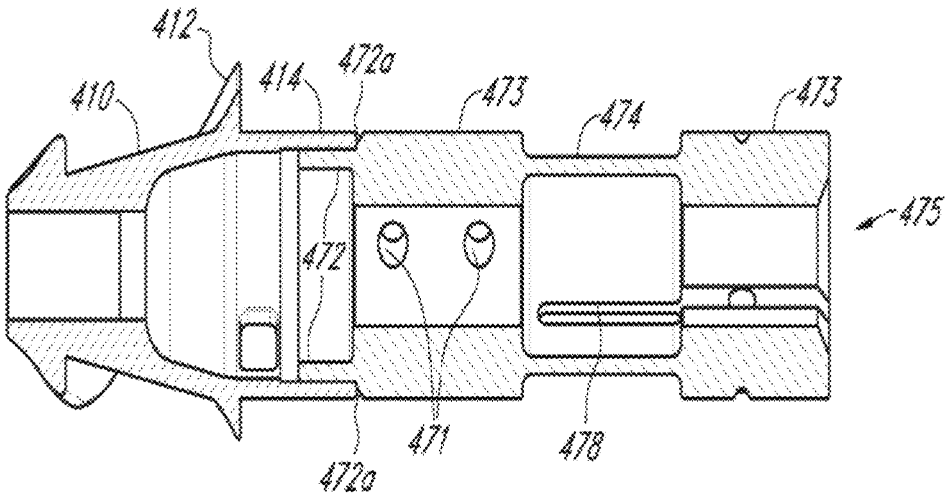
FIG. 29B is a cross-sectional view of the illustrative embodiment of a hub assembly and nose cone shown in FIG. 29A.

A first illustrative embodiment of a hub assembly 470 that may be used to couple the stalk roll 400 to a stalk roll drive shaft 29 is shown in perspective in FIG. 29A an in axial cross-section in FIG. 29B. This illustrative embodiment may be specifically adapted for engaging a stalk roll 400 with a stalk roll drive shaft 29 of a John Deere brand Series 40-90 corn head. It is contemplated that the nose cone 410, hub assembly 470, and flutes 440, 440*a*, 450, 450*a*, 460 may be formed separately and later engaged with one another. However, in other embodiments all or some of those elements may be formed integrally with one another via any suitable fabrication and/or manufacturing method now known or later developed. Accordingly, the specific method of manufacture in no way limits the scope of the present disclosure.

The hub assembly 470 may be formed with a central bore 475 along the longitudinal axis thereof for receiving a stalk roll drive shaft 29. The hub assembly may also include at least one key pin that may be configured to pass through the hub assembly 470 and corresponding apertures formed in the stalk roll drive shaft 29 and apertures 471 formed in the hub assembly 470 so as to secure at least the rotational position of the hub assembly 470 with respect to the stalk roll drive shaft 29 such that the hub assembly 470 rotates therewith. The key pin may also serve to secure the axial position of the hub assembly 470 with respect to the stalk roll drive shaft 29.

A flange 472 may be formed at the front end of the hub assembly 470 to fit within the nose cone 410 and engage the interior surface of the sleeve 414, which is shown in FIG. 29B. An engagement surface 473 may be positioned on either side of a recessed surface 474. The engagement surface(s) 473 may be configured to engage one or more flute bases 449 via any engagement and/or securement methods and/or structures now known or later developed. A slot 476 may be formed along the longitudinal axis of the hub assembly 470 on the end thereof opposite the flange 472. The hub assembly 470 may be formed with a shelf 472*a* adjacent the proximal end of the flange 472 to provide an engagement point for the distal end of the sleeve 414 of the nose cone 410.

One or more flutes 440, 440*a*, 450, 450*a*, 460 may be secured to the hub assembly 470 if they are not integrally formed therewith. This may be done using any structure and/or method known to those skilled in the art or later developed, including but not limited to welding, mechanical fasteners, chemical adhesives, and/or combinations thereof. For example, it is contemplated that the flute base 449 may be welded to the engagement surfaces 473 of the hub assembly 470. The flute base 449 of one or more flutes 440, 440*a*, 450, 450*a*, 460 may be formed with a notch 462 therein (such as shown in a hybrid flute 440*a* in FIG. 26A), which notch 462 may be adjacent an aperture 449*a* through which a retainer 432 may pass. The notch 462 may extend along a specific length of the flute 440, 440*a*, 450, 450*a*, 460 and inward toward the leading and trailing walls 446, 447 by a specific amount. One or more flute bases 449 may be formed with various apertures 449*a* therein to allow for access to a key pin, retainer 432, and/or other structures. One or more flute bases 449 may also be formed with a tapped hole, such that a retainer 432 may pass through an aperture 449*a* and engage the tapped hole. Tightening the retainer 432 may cause the area between a notch 462 and an adjacent flute base 449 to constrict, which in turn may cause the slot 476 to constrict around the stalk roll drive shaft 29, thereby securing a portion of the stalk roll 400 to the stalk roll drive shaft 29. However, any suitable method and/or structure now know or later developed may be used to adequately secure and/or engage a stalk roll 400 with a stalk roll drive shaft 29 without limitation.

Figure 30A:
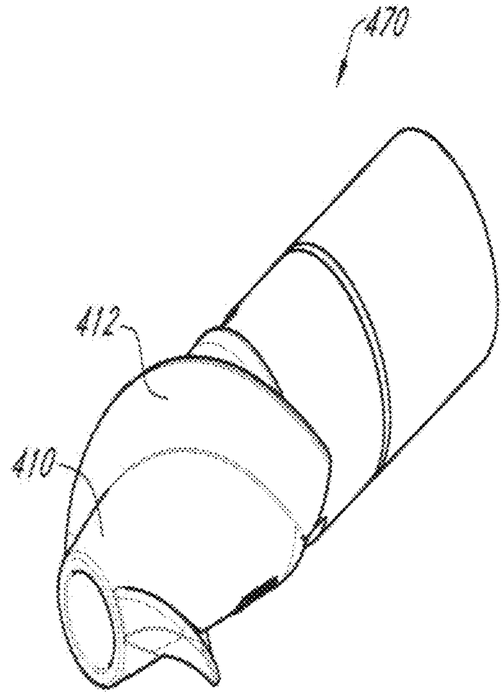
FIG. 30A is a perspective view of another illustrative embodiment of a hub assembly and nose cone that may be used with certain illustrative embodiments of the stalk roll.
Figure 30B:
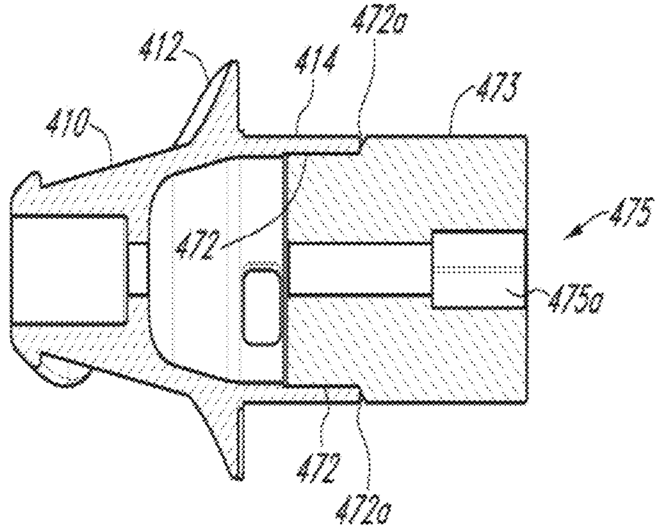
FIG. 30B is a cross-sectional view of the illustrative embodiment of a hub assembly and nose cone shown in FIG. 30A.

Another illustrative embodiment of a hub assembly 470 that may be used to couple the stalk roll 400 to a stalk roll drive shaft 29 is shown in perspective in FIG. 30A an in axial cross-section in FIG. 30B. This illustrative embodiment may be specifically adapted for engaging a stalk roll 400 with a stalk roll drive shaft 29 of a Case-IH brand 2200 or 2400 series corn head. It is contemplated that the nose cone 410, hub assembly 470, and flutes 440, 440*a*, 450, 450*a*, 460 may be formed separately and later engaged with one another. However, in other embodiments all or some of those elements may be formed integrally with one another via any suitable fabrication and/or manufacturing method now known or later developed. Accordingly, the specific method of manufacture in no way limits the scope of the present disclosure.

The hub assembly 470 may be formed with a central bore 475 along the longitudinal axis thereof for receiving a stalk roll drive shaft 29. The central bore 475 may include a coupler section 475*a* along a specific length thereof having a different cross-sectional shape than the remainder of the central bore 475. For example, in the illustrative embodiment of a hub assembly 470 shown in FIGS. 30A & 30B, the coupler section 475*a* may be formed with a substantially oval cross-sectional shape and the remainder of the central bore 475 may be formed with a substantially circular cross-sectional shape. The stalk roll drive shaft 29 configured to engage such an embodiment of a hub assembly 470 may have corresponding sections of differing cross-sectional shapes so as to secure at least the rotational position of the hub assembly 470 with respect to the stalk roll drive shaft 29 such that the hub assembly 470 rotates therewith.

A flange 472 may be formed at the front end of the hub assembly 470 to fit within the nose cone 410 and engage the interior surface of the sleeve 414, which is shown in FIG. 30B. An engagement surface 473 may be positioned adjacent the flange 472. The engagement surface(s) 473 may be configured to engage one or more flute bases 449 via any engagement and/or securement methods and/or structures now known or later developed.

One or more flutes 440, 440*a*, 450, 450*a*, 460 may be secured to the hub assembly 470 if they are not integrally formed therewith. This may be done using any structure and/or method known to those skilled in the art or later developed, including but not limited to welding, mechanical fasteners, chemical adhesives, and/or combinations thereof. For example, it is contemplated that the flute base 449 may be welded to the engagement surfaces 473 of the hub assembly 470. The flute base 449 of one or more flutes 440, 440*a*, 450, 450*a*, 460 may be formed with a notch 462 therein (such as shown in a hybrid flute 440*a* in FIG. 26A), which notch 462 may be adjacent an aperture 449*a* through which a retainer 432 may pass. The notch 462 may extend along a specific length of the flute 440, 440*a*, 450, 450*a*, 460 and inward toward the leading and trailing walls 446, 447 by a specific amount. One or more flute bases 449 may be formed with various apertures 449*a* therein to allow for access to a key pin, retainer 432, and/or other structures. One or more flute bases 449 may also be formed with a tapped hole, such that a retainer 432 may pass through an aperture 449*a* and engage the tapped hole. However, any suitable method and/or structure now know or later developed may be used to adequately secure and/or engage a stalk roll 400 with a stalk roll drive shaft 29 without limitation.

It is contemplated that the embodiments of stalk rolls 400 shown in FIGS. 27A-28B may effectively remove ears 300 from a stalk 320 and also cut the stalk 320 upon ejection from the stalk rolls 400 in a variety of harvesting conditions. This may be achieved through the simultaneous grasp and control of the stalk 320 by a first pair of flutes 440, 440*a*, 450, 450*a*, 460 while a second flute 440, 440*a*, 450, 450*a*, 460 below the first pair cuts the stalk 320. The first pair of flutes 440, 440*a*, 450, 450*a*, 460 may secure the stalk 320 by engaging at it first and second grasp points 322, 323. This grasp and control of the stalk 320 may allow another flute 440, 440*a*, 450, 450*a*, 460 positioned below but adjacent the second grasp point 323 to produce a stalk cut point 324. This functionality may require a plurality of flutes 440, 440*a*, 450, 450*a*, 460 spaced less than sixty degrees from adjacent flutes 440, 440*a*, 450, 450*a*, 460 about the circumference of the stalk roll 400. That is, at least seven flutes 440, 440*a*, 450, 450*a*, 460 may be required for such functionality.

The cutting function at the stalk cut point 324 may be enhanced by the secure engagement of the stalk 320 at the first and second grasp points 322, 323 and the forward slope of the leading surface 444. Instead of slipping past the flute edge 442 at the stalk cut point 324, the stalk 320 may be secured by the first and second grasp points 322, 323 so that the flute edge 442 at the stalk cut point 324 may fully penetrate the stalk 320. This may allow the stalk rolls 400 to eject a plurality of stalk pieces 326 that resemble confetti, which is shown schematically in FIG. 22B for one snapshot in time during the rotation of the stalk rolls 400.

It is also contemplated that the embodiments of stalk rolls 400 as shown in FIGS. 27A-28B will decrease the amount of MOTE produced during harvesting compared to otherwise-identical six-flute stalk rolls. Moreover, it is contemplated that the embodiments of stalk rolls 400 as shown in FIGS. 27A-28B may operate consistently in multiple conditions, including high moisture (e.g., early morning or late evening harvesting), low moisture, and various varieties of corn plants than other stalk rolls. Because the outer diameter of each flute edge 442 with respect to the rotational axis of each stalk roll 400 may be equal, and because the rotational speed of each stalk roll 400 may be equal, the linear velocity of each flute edge 442 may be equal. However, the relative angular and/or linear speeds thereof may be different as experienced by various stalks 320 depending on the position of the stalk 320 relative to the stalk rolls 400 and the degree of processing that the stalk 320 has experienced from the stalk rolls 400 (e.g., cutting, shearing, etc.).

7. Additional Aspects of Stalk Rolls and Elements Thereof

In another aspect of a stalk roll 15, 16, 190, 192, 400, 400', a stalk roll 15, 16, 190, 192, 400, 400' may be configured for engagement with a stalk roll drive shaft 29 having a generally square or rectangular cross-sectional shape. Without limitation or restriction unless so indicated in the following claims, common models of corn heads having stalk roll drive shafts 29 with a generally square cross-sectional shape include but are not limited to Case-IH 1000, 2000, 3000, 4000 Series row units, Drago row units, Lexion row units, Gleaner units, and various New Holland row units. In most cases, corn head row units employing a stalk roll drive shaft 29 with a square cross-sectional shape employ a nose bearing toward the front of the stalk rolls. However, the specific type of corn head for which a stalk roll 400' is adapted or whether the corn head employs nose bearings in no way limits the scope of the present disclosure unless so indicated in the following claims. Accordingly, the various features and/or aspects of the stalk roll 400' may be employed on a stalk roll 400' configured for engagement with any corn head, whether currently existing for later developed, without limitation unless so indicated in the following claims.

Referring now to FIGS. 31A-31D (which provide various views of a pair of cooperating stalk rolls 400' that may be configured for engagement with a stalk roll drive shaft 29 having a generally square cross-sectional shape) and FIGS. 32A-33B (which provide various views of each stalk roll 400' of the pair from FIGS. 31A-31D), a stalk roll 400' may have a plurality of flutes 440', 440*a*', 450', 450*a*', 460' positioned along the length of the stalk roll 400'. Each flute 440', 440*a*', 450', 450*a*', 460' may be generally parallel with the longitudinal axis of the stalk roll 400'. Each flute 440', 440*a*', 450', 450*a*', 460' may extend in a radially outward direction from a main cylinder 430' (and/or taper 434'). The flute 440', 440*a*', 450', 450*a*', 460' may engage the main cylinder 430' (and/or taper 434') at a base of the flute 440', 440*a*', 450', 450*a*', 460' and a flute 440', 440*a*', 450', 450*a*', 460' may terminate at the distal end of the flute 440', 440*a*', 450', 450*a*', 460' at a flute edge 442'.

In FIGS. 31A-33B the nose cones 410 of the stalk rolls 400' have been removed for purposes of clarity, but may be configured such that the fighting 412 on the nose cone 410 is configured so that a smooth transition of the stalk of a corn plant from the nose cone 410 to the fluted area of the stalk roll 400' may occur as described in further detail below. Additionally, when referring to a stalk roll 400' and/or component thereof shown in FIGS. 31A-33B and 34A-36D, the directions "left" and "right" are meant to be interpreted as relative to the vantage of an operator positioned in the harvesting machine with which the stalk roll 400' is engaged. This convention for referring to "right" and/or "left" stalk rolls 400' is used when referring to FIGS. 31A-33B and 34A-36D unless indicated otherwise. Furthermore, the relative rotational positions for both the left stalk roll 400' and right stalk roll 400' is constant throughout FIGS. 31A-33B and 34A-36D except for FIGS. 32B, 33B, 35D, and 36D.

The designation of a stalk roll 400' as a "left" or "right" stalk roll 400' is not limiting unless so indicated in the following claims, and that designation is simply used to provide a relative positions of an aspect of the stalk roll 400' in at least one application. The flutes 440', 440*a*', 450', 450*a*', 460' and/or other elements of the stalk roll 400' may be configured and/or arranged in any manner as previously described for other stalk rolls 15, 16, 190, 192, 400 disclosed herein, or they may be differently configured and/or arranged without limitation unless so indicated in the following claims. Additionally, the specific relative orientation, configuration, etc. of a stalk roll 400' and/or pair thereof in no way limits the scope of the present disclosure unless so indicated in the following claims.

Figure 31A:
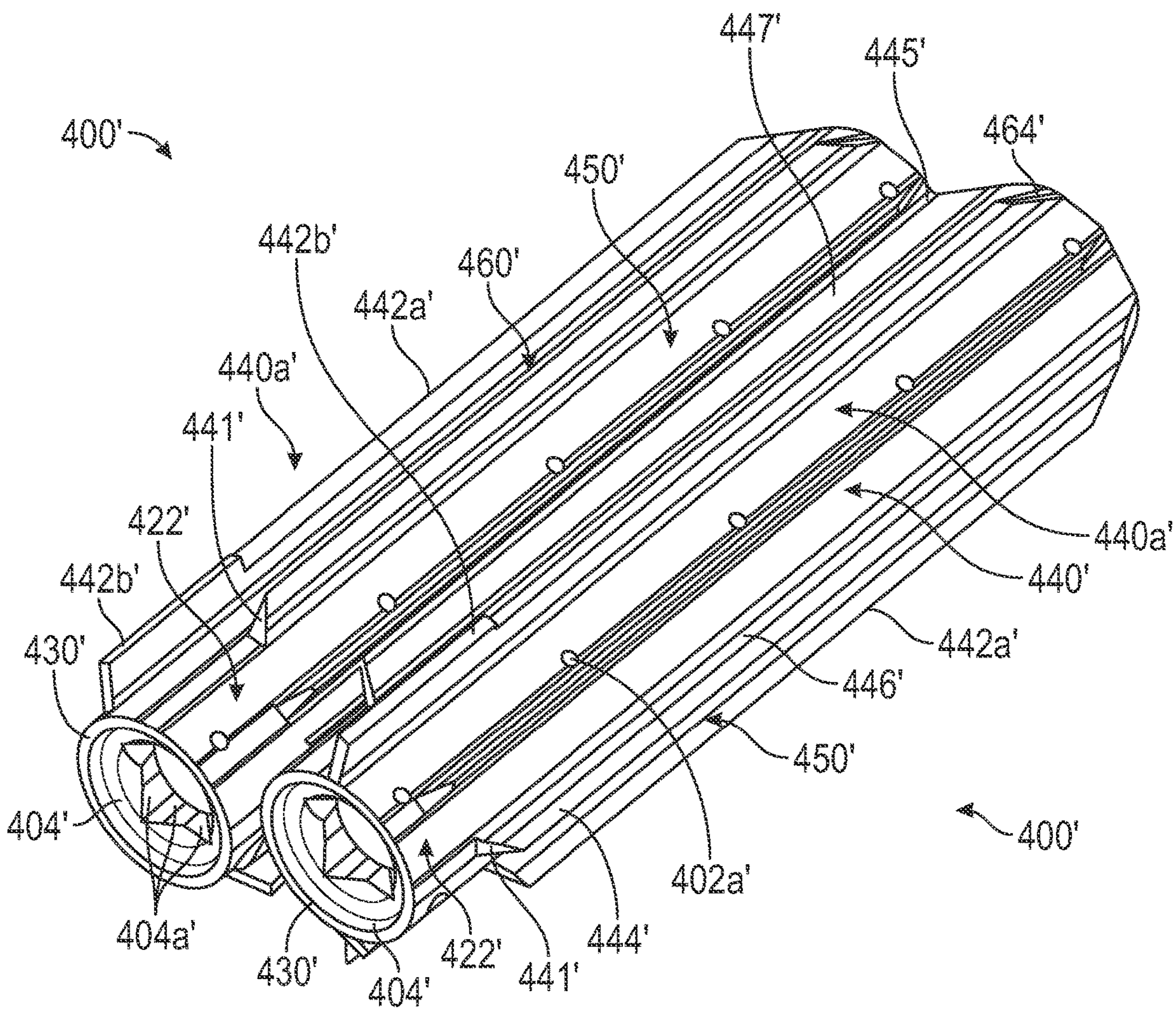
FIG. 31A is a top perspective view showing various aspects of a pair of stalk rolls that may be configured for use with certain stalk roll drive shafts.
Figure 31B:
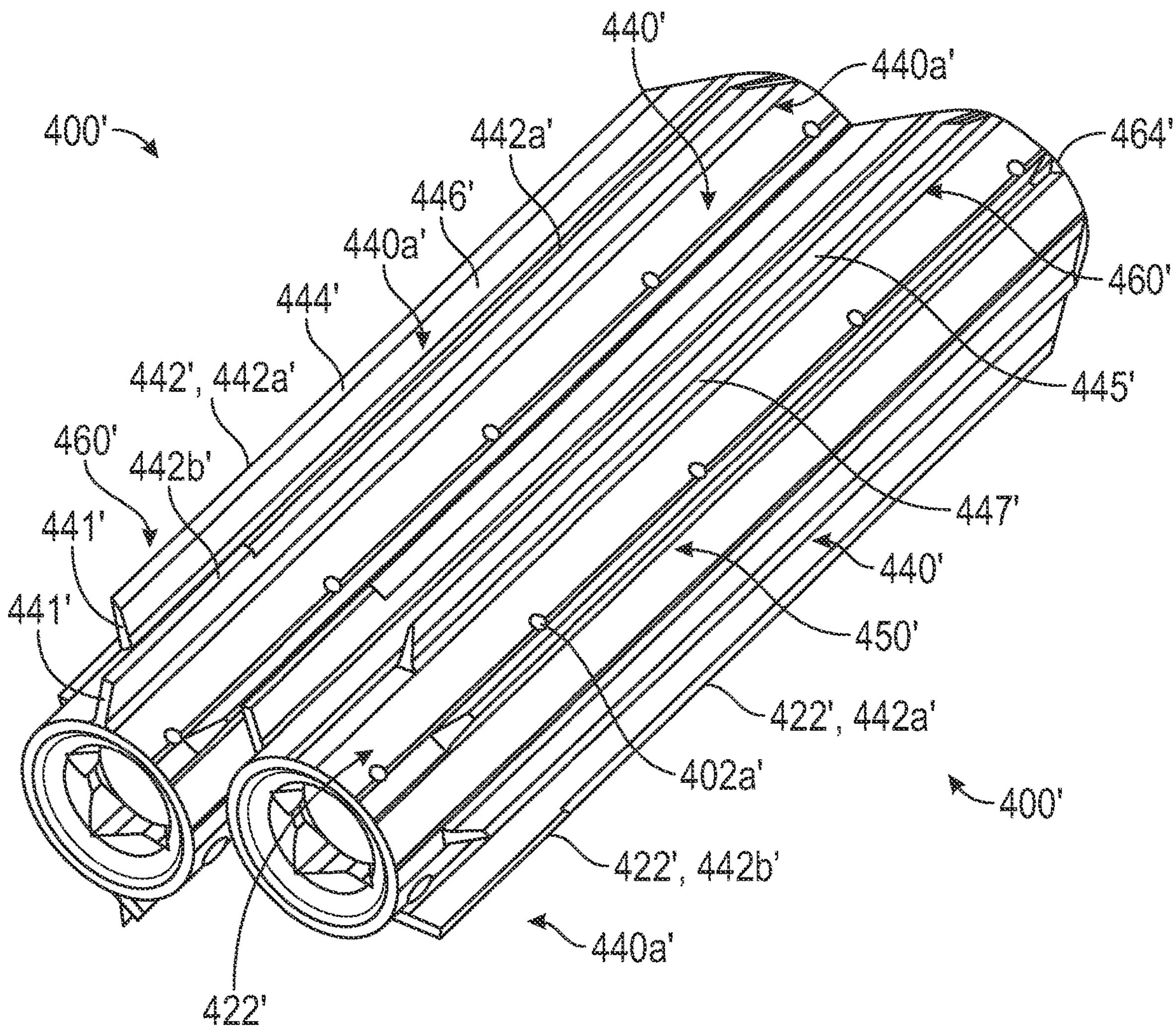
FIG. 31B is a bottom perspective view of the pair of stalk rolls from FIG. 31A.
Figure 31C:
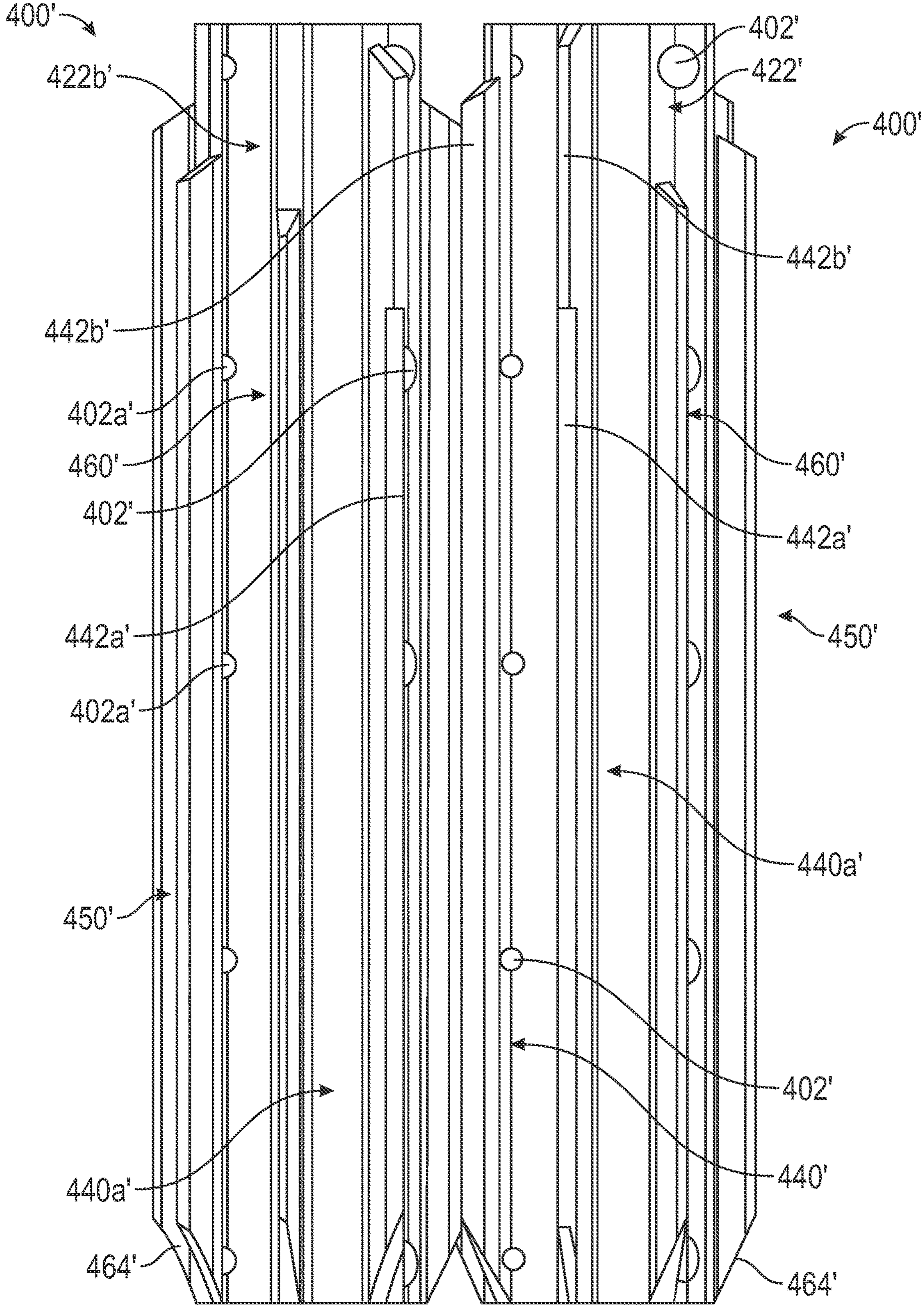
FIG. 31C is a bottom view of the pair of stalk rolls from FIGS. 31A & 31B.
Figure 31D:
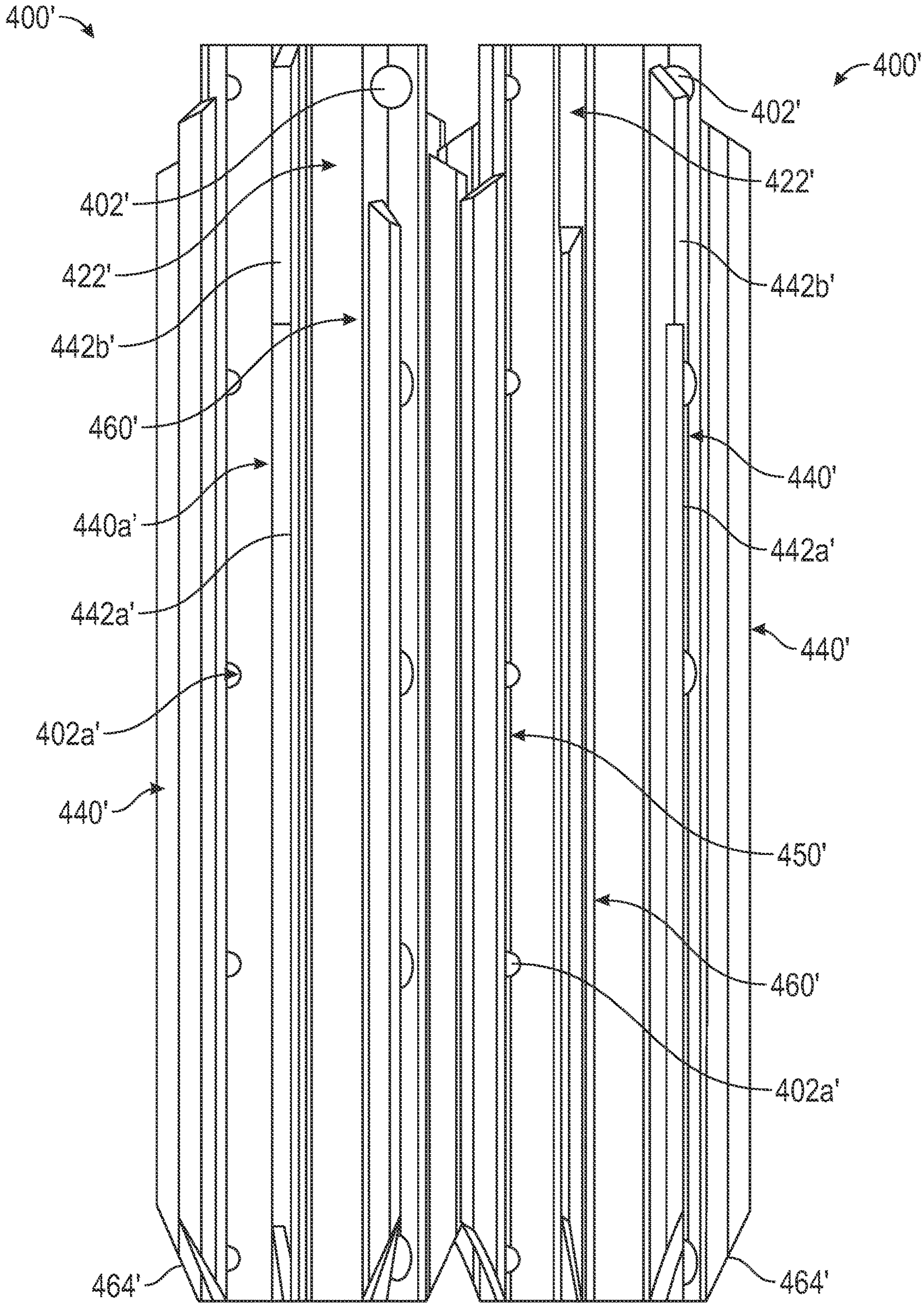
FIG. 31D is a top view of the pair of stalk rolls shown in FIGS. 31A-31C.

As shown at least in FIG. 31D, in one aspect a stalk roll 400' may be configured such that it includes eight flutes 440', 440*a*', 450', 450*a*', 460' comprising two full flutes 440', two hybrid flutes 440a', two reduced flutes 450', and two short flutes 460'. The flutes 440', 440a', 450', 450a', 460' may be evenly spaced about the periphery of a main cylinder 430' (and/or taper 434') such that the distance between adjacent flutes 440', 440a', 450', 450a', 460' may be generally equal for any given flute 440', 440a', 450', 450a', 460'. Additionally, corresponding flutes 440', 440a', 450', 450a', 460' may be positioned 180 degrees from one another, such that one full flute 400' is rotationally offset by 180 degrees from the second full flute 400', one hybrid flute 440a' is rotationally offset by 180 degrees from the second hybrid flute 440a', etc. However, in other aspects of a stalk roll 400' the stalk roll 400' may include more or fewer flutes 440', 440a', 450', 450a', 460', different relative numbers of various flutes 440', 440a', 450', 450a', 460', and/or different spacing between flutes 440', 440a', 450', 450a', 460' without limitation unless so indicated in the following claims.

The optimal diameter of the main cylinder 430' (and/or taper 434') may vary from one application of the stalk roll 400' to the next, as may the radial dimension of the flutes 440', 440a', 450', 450a', 460', width of the flutes 440', 440a', 450', 450a', 460' at the base, flute edge 442', and/or therebetween, and/or the ratio of main cylinder 430' (and/or taper 434') diameter to the radial dimension of the flutes 440', 440a', 450', 450a', 460'. These various dimensions and/or design considerations may be manipulated to configured stalk rolls 400' for various corn head units having certain design constraints (e.g., distance between axes of rotation for stalk roll drive shafts, the proximity row unit frame members to the stalk rolls 400', etc.). Accordingly, although the stalk rolls 400' and components thereof shown in FIGS. 31A-33B and 34A-36D are depicted as having accurate relative dimensions and being depicted in accurate scale for at least one application of the stalk roll 400', those dimensions and scale are in no way limiting to the scope of the present disclosure unless so indicated in the following claims.

In an aspect, the radial dimension of a flute 440', 440a', 450', 450a', 460', the outer diameter of the main cylinder 430', and/or the distance between stalk roll drive shafts for a cooperating pair may be manipulated such that the distance between the distal tip of a flute 440', 440a', 450', 450a', 460' and the outer diameter of the adjacent main cylinder 430' at the closest point (i.e., when the tip of the flute 440', 440a', 450', 450a', 460' is perpendicular to a vertical line tangent to the surface of the opposing main cylinder 430' facing the tip) may be as little as 0.05 inches or as large as 0.6 inches. It is contemplated that the optimal distance may vary from one application to the next, and be dependent at least upon the amount of nose deflection the stalk rolls 400' experience during use. Furthermore, the distance may vary along the length of a given flute 440', 440a', 450', 450a', 460' such that the distance is more at a front portion of a pair of stalk rolls 400' and less at a rear portion thereof or vice versa. Varying this distance may be accomplished at least by manipulating the amount by which a flute 440', 440a', 450', 450a', 460' radially extends from the main cylinder 430', by manipulating the outer diameter of the main cylinder 430', or a combination thereof. Accordingly, this distance in no way limits the scope of the present disclosure unless so indicated in the following claims.

As used herein, "deflection" of a stalk roll 400' may be in the form of any change in the relative position of a front portion of a stalk roll 400' with respect to a rear portion thereof, and often occurs when the front portions of two opposing stalk rolls 400' are urged outward from one another due to engagement of a corn plant between the stalk rolls 400'. Generally, stalk rolls 400' without nose bearings may experience greater deflection during use, such that a relatively closer spacing may be required for proper operation. Stalk rolls 400' with nose bearings may experience relatively less deflection, such that a relatively larger spacing may be advantageous. Accordingly, the radial dimension of a flute 440', 440a', 450', 450a', 460', the outer diameter of the main cylinder 430', and the distance between stalk roll drive shafts in no way limit the scope of the present disclosure unless so indicated in the following claims.

Referring generally at least to FIGS. 31A-31D, a pair of stalk rolls 400' may be configured such that the stalk rolls 400' rotate in a specified direction (which specified direction may be clockwise for the stalk roll 400' on the left side of FIG. 31D and counter-clockwise for the stalk roll 400' on the right side thereof as indicated by the curved arrows), a stalk engagement gap 25 may be formed, and the stalk engagement gap 25 may grow progressively deeper (along the length of the stalk rolls 400' in a direction toward the harvester) until the stalk engagement gap 25 closes due to one or more flutes 440', 440a', 450', 450a', 460' of either stalk roll 400' positioned in the stalk engagement gap 25.

In an aspect, the bladeless area 422' on a stalk roll 400' may be configured such that if the stalk roll 400' were flattened, the bladeless area 422' may appear to have a shape similar or equivalent to a right triangle. In such a configuration the base of the triangle may be the interface between the main cylinder 430' (and/or taper 434') and a nose cone 410 between two hybrid flutes 440a, the height may be a line along a hybrid flute 440a from the most-forwardly positioned end of the hybrid flute 440a to an area adjacent an axial face 441 of a short flute 460', and the hypotenuse may be a line connecting the base and the height drawn along the axial faces 441' of the flutes 440', 450, 450a, 460' positioned between the hybrid flutes 440a'. In such a configuration, as the stalk roll 400' rotates, a corn plant may move along the length of the stalk roll 400' toward the harvesting machine generally unencumbered by any flutes 440', 440a', 450', 450a', 460' until the corn plant reaches the maximum depth of the stalk engagement gap 25 (which may be positioned adjacent an axial face 441' of a short flute 460'). However, differently configured bladeless areas 422' may be used with the stalk rolls 400' without limitation unless so indicated in the following claims.

A nose cone 410 may be engaged with the front of the stalk roll 400'. Although the stalk rolls 400' in FIGS. 31A-36D are shown without nose cones 410, and suitable nose cone 410 may be used with the stalk rolls 400' (including but not limited to the nose cones 410 or nose cones 410 similar to those shown in FIGS. 21A-22A, 24A, 24B, 25A, 25B, 27A, and 28A) without limitation unless so indicated in the following claims. It is contemplated that it may be advantageous for nose cones 410 configured to work with the stalk rolls 400' to have the rear-most portion of the fighting 412 terminate adjacent an axial face 441' of the longest flute 440a', 440', 450, 450a, 460' on the stalk roll 400', which may be a hybrid flute 440a'. However, differently configured nose cones 410 may be used without limitation unless so indicated in the following claims.

In an aspect of the stalk rolls 400' shown in FIGS. 31A-36D, a hybrid flute 440a' may close the stalk engagement gap 25, and the stalk rolls 400' may be configured such that two stalk engagement gaps 25 are present per revolution. Further, a stalk engagement gap 25 may be closed after the stalk engagement gap 25 has reached a maximum depth along the longitudinal length of the stalk roll 400'. Generally, the width of the stalk engagement gap 25 may be defined by the distance between the bladeless areas 422' of a pair of opposing stalk rolls 400'.

In an aspect, the width of the stalk engagement gap 25 may be increased by forming a recess 420 in the main cylinder 430' (and/or taper 434') of one or more stalk rolls 400' of an opposing pair. In such a configuration, the depth of the recess 420 may vary along the length of the stalk roll 400' or it may be constant.

Figure 31E:
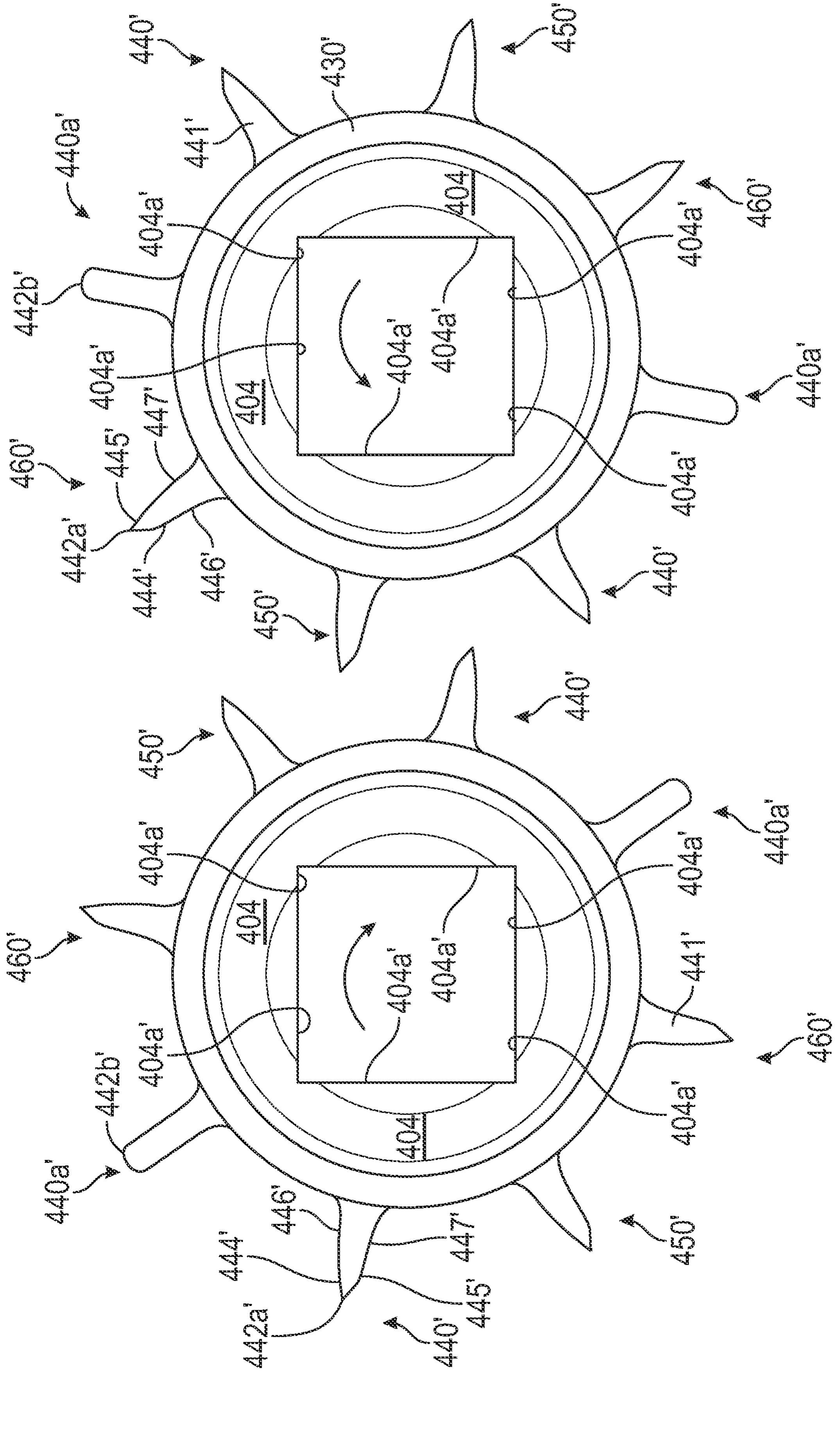
FIG. 31E is a front end view of the pair of stalk rolls shown in FIGS. 31A-31D.

With reference to FIG. 31E, a pair of opposing stalk rolls 400' may be configured such that corresponding flutes 440', 440*a*', 450', 450*a*', 460' on each stalk roll 400' may be positioned in relative proximity to one another in at least one moment in time per revolution of the stalk rolls 400'. As the stalk rolls 400' rotate, the flutes 440', 440*a*', 450', 450*a*', 460' may be configured such that a corn plant between the stalk rolls 400' generally may first encounter a hybrid flute(s) 440*a*', followed by a full flute(s) 440', followed by a reduced flute(s) 450', followed by a short flute(s) 460'. However, it should be evident at least from FIG. 31E that multiple flutes 440', 440*a*', 450', 450*a*', 460' on one or more stalk rolls 400' may simultaneously engage a corn plant positioned between opposing stalk rolls 400' without limitation unless so indicated in the following claims.

Generally speaking, holding the other design considerations constant, the amount of intermesh between flutes 440', 440*a*', 450', 450*a*', 460', and therefore, the number of flutes 440', 440*a*', 450', 450*a*', 460' on a given stalk roll 400' affect the amount of destruction the stalk rolls 400' inflict on a corn plant. More specifically, in an aspect the number of flutes 440', 440*a*', 450', 450*a*', 460' may affect the amount and/or number of times that a pair of stalk rolls 400' cut, sever, or chop a given corn plant. Generally, a pair of stalk rolls 400' with ten flutes 440', 440*a*', 450', 450*a*', 460' may cut, sever, or chop a given corn plant a relatively large number of times, such that the corn plant is processed into multiple pieces, which pieces may have an average length of less than three inches. All else equal, a pair of stalk rolls 400' with eight flutes 440', 440*a*', 450', 450*a*', 460' may cut, sever, or chop a given corn plant less than that of the stalk rolls 400' with ten flutes 440', 440*a*', 450', 450*a*', 460'. All else equal, a pair of stalk rolls 400' with six flutes 440', 440*a*', 450', 450*a*', 460' may cut, sever, or chop a given corn plant less than that of the stalk rolls 400' with eight flutes 440', 440*a*', 450', 450*a*', 460' (and may not cut, sever, or chop a corn plant at all, but instead crimp or crush the corn plant).

The optimal amount of cutting, severing, chopping, crimping, and/or crushing of a corn plant during harvesting may vary from one application to the next and may be dependent at least on the variety of corn. Accordingly, the scope of the present disclosure is in no way limited by the amount of cutting, severing, chopping, crimping, and/or crushing of a corn plant achieved by any configuration of a pair of opposing stalk rolls 400' unless so indicated in the following claims.

As mentioned previously, a hybrid flute 440*a*' may close the stalk engagement gap 25. In an aspect, the hybrid flute 440*a*' of the left stalk roll 400' of an opposing pair may close the stalk engagement gap 25. In an aspect, the hybrid flute 440*a*' on the right stalk roll 400' of an opposing pair may follow the hybrid flute 440*a*' on the left stalk roll 400', and may be slightly shorter (along the longitudinal axis of the stalk roll 400') than the hybrid flute 440*a*' on the left stalk roll 400'. This configuration may allow the stalk engagement gap 25 to open by a depth approximately equal to the difference in length between the hybrid flutes 440*a*' on the left and right stalk rolls 400'. In an aspect, this difference in length between the hybrid flutes 440*a*' may be as little as 0.1 inches or as great as 1.5 inches, however, it is contemplated that in certain applications a difference of approximately 0.375 inch may be beneficial.

In an aspect, a full flute 440' on the left stalk roll 400' may follow the hybrid flute 440*a*' on the right stalk roll 400', and may be slightly shorter than the hybrid flute 440*a*' on the right stalk roll 400'. This configuration may allow the stalk engagement gap 25 to increase in depth approximately equal to the difference in length between the hybrid flute 440*a*' on the right stalk roll 400' and the full flute 440' on the left stalk roll 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*' and full flutes 440' on the stalk rolls 400' such that this difference is approximately equal to the difference in length between the hybrid flutes 440*a*' to provide a relatively smooth transition as a corn plant moves in a direction toward the harvester.

In an aspect, a full flute 440' on the right stalk roll 400' may follow the full flute 440' on the left stalk roll 400', and may be slightly shorter than the full flute 440' on the left stalk roll 400'. This configuration may allow the stalk engagement gap 25 to increase in depth approximately equal to the difference in length between the full flutes 440' on the right and left stalk rolls 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*' and full flutes 440' on the stalk rolls 400' such that this difference is approximately equal to both the difference in length between the hybrid flutes 440*a*' and the difference in length between the hybrid flute 440*a*' on the right stalk roll 400' and the full flute 440' on the left stalk roll 400' to provide a relatively smooth transition as a corn plant moves in a direction toward the harvester.

In an aspect, a reduced flute 450' on the left stalk roll 400' may follow the full flute 440' on the right stalk roll 400', and may be slightly shorter than the full flute 440' on the right stalk roll 400'. This configuration may allow the stalk engagement gap 25 to increase in depth approximately equal to the difference in length between the full flute 440' on the right stalk roll 400' and the reduced flute 450' on the left stalk roll 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*', full flutes 440', and reduced flutes 450' on the stalk rolls 400' such that this difference is approximately equal to the difference in length between the full flutes 440', the difference in length between the hybrid flutes 440*a*', and the difference in length between the hybrid flute 440*a*' on the right stalk roll 400' and the full flute 440' on the left stalk roll 400' to provide a relatively smooth transition as a corn plant moves in a direction toward the harvester.

In an aspect, a reduced flute 450' on the right stalk roll 400' may follow the reduced flute 450' on the left stalk roll 400', and may be slightly shorter than the reduced flute 450' on the left stalk roll 400'. This configuration may allow the stalk engagement gap 25 to increase in depth approximately equal to the difference in length between the reduced flutes 450' on the right and left stalk rolls 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*', full flutes 440', and reduced flutes 450' on the stalk rolls 400' such that this difference is approximately equal to the difference in length between the full flute 440' on the right stalk roll 400' and the reduced flute 450' on the left stalk roll 400', the difference in length between the full flutes 440', the difference in length between the hybrid flutes 440*a*', and the difference in length between the hybrid flute 440*a*' on the right stalk roll 400' and the full flute 440' on the left stalk roll 400' to provide a relatively smooth transition as a corn plant moves in a direction toward the harvester.

In an aspect, a short flute 460' on the left stalk roll 400' may follow the reduced flute 450' on the right stalk roll 400', and may be slightly shorter than the reduced flute 450' on the right stalk roll 400'. This configuration may allow the stalk engagement gap 25 to increase in depth approximately equal to the difference in length between the reduced flute 450' on the right stalk roll 400' and the short flute 460' on the left stalk roll 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*', full flutes 440', reduced flutes 450', and short flutes 460' on the stalk rolls 400' such that this difference is approximately equal to the difference in length between the full flute 440' on the right stalk roll 400' and the reduced flute 450' on the left stalk roll 400', the difference in length between the reduced flutes 450' on the right and left stalk rolls 400', the difference in length between the full flutes 440', the difference in length between the hybrid flutes 440*a*', and the difference in length between the hybrid flute 440*a*' on the right stalk roll 400' and the full flute 440' on the left stalk roll 400' to provide a relatively smooth transition as a corn plant moves in a direction toward the harvester.

In an aspect, a short flute 460' on the right stalk roll 400' may follow the short flute 460' on the left stalk roll 400', and may be slightly shorter than the short flute 460' on the left stalk roll 400'. This configuration may allow the stalk engagement gap 25 to increase in depth approximately equal to the difference in length between the short flutes 450' on the right and left stalk rolls 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*', full flutes 440', reduced flutes 450', and short flutes 460' on the stalk rolls 400' such that this difference is approximately equal to the difference in length between the reduced flute 450' on the right stalk roll 400' and the short flute 460' on the left stalk roll 400', the difference in length between the full flute 440' on the right stalk roll 400' and the reduced flute 450' on the left stalk roll 400', the difference in length between the reduced flutes 450' on the right and left stalk rolls 400', the difference in length between the full flutes 440', the difference in length between the hybrid flutes 440*a*', and the difference in length between the hybrid flute 440*a*' on the right stalk roll 400' and the full flute 440' on the left stalk roll 400' to provide a relatively smooth transition as a corn plant moves in a direction toward the harvester.

In an aspect, a hybrid flute 440*a*' from the left stalk roll 400' may follow a short flute 460' on the right stalk roll 400', which may again close the stalk engagement gap 25. From the preceding description, it will be apparent that each flute 440', 440*a*', 450', 450*a*', 460' on a given stalk roll 400' may be different in length than the corresponding flute 440', 440*a*', 450', 450*a*', 460' on a cooperating stalk roll 400' of an opposing pair. Further, this difference in length may be related to the difference in lengths between adjacent flutes 440', 440*a*', 450', 450*a*', 460' on a single stalk roll 400' such that the depth of the stalk engagement gap 25 may gradually and uniformly increase during operation. However, any advantageous configuration of varying the depth, shape, or other characteristic of the stalk engagement gap 25, bladeless area 422', and/or the length of flutes 440', 440*a*', 450', 450*a*', 460' on a single stalk roll 400' and/or on a pair of stalk rolls 400' may be used without departing from the scope of the present disclosure unless so indicated in the following claims. Accordingly, the above-mentioned dimensions are not meant to limit the scope of the present disclosure unless so indicated in the following claims.

A hybrid flute 440*a*' may be configured such that at least one portion of the flute edge 442' is formed as a blunt edge 442*b*' and at least another portion of the flute edge 442' is formed as a sharp edge 442*a*'. In an aspect shown in FIGS. 31A-33B, a forward portion of the flute edge 442' may be formed as a blunt edge 442*b*', and the remainder of the flute edge 442' may be formed as a sharp edge 442*a*'. In an aspect, it is contemplated that the blunt edge 442*b*' on the forward portion of a flute edge 442 may be between 2 and 6 inches in length.

In an aspect shown in FIGS. 34A-36D, both a forward portion and a rearward portion of the flute edge 442' may be formed as a blunt edge 442*b*', and a portion of the flute edge 442' therebetween may be formed as a sharp edge 442*a*'. In an aspect, the blunt edge 442*b*' on the rearward portion of the flute edge 442' may be between 0.5 and 6 inches in length. In such a configuration, the rearward blunt edge 442*b*' may provide additional gripping surface for the flute edge 442' at a relatively higher portion of the corn plant (which portion of the corn plant may generally have a smaller diameter than that of a lower portion of the corn plant). However, the optimal length, number, configuration, positioning (e.g., forward or rearward portion), etc. of a blunt edge 442*b*' and sharp edge 442*a*' on a hybrid flute 440*a*' may vary from one application to the next, and may depend at least on the corn plant conditions during harvesting. Accordingly, such variables are in no way limiting to the scope of the present disclosure unless so indicated in the following claims.

The transition of a flute edge 442' from a blunt edge 442*b*' to a sharp edge 442*a*' and vice versa may be gradual. For example, in an aspect the radial dimension of a hybrid flute 440*a*' may gradually increase from the forward-most portion thereof to the position on the flute edge 442' that forms the interface between the blunt edge 442*b*' and the sharp edge 442*a*'. This configuration may provide various benefits for certain types of manufacturing methods of the stalk roll 400', including but not limited to decreasing the chance of damaging a sharp edge 442*a*' when welding material on an adjacent blunt edge 442*b*', and/or preventing a sharp edge 442*a*' from inadvertently becoming brittle during a heat-treat process. Accordingly, the specific length, number, configuration, positioning, etc. of a blunt edge 442*b*' and sharp edge 442*a*' on a hybrid flute 440*a*' in no way limit the scope of the present disclosure unless so indicated in the following claims.

A flute edge 442' (both sharp edges 442*a*' and blunt edges 442*b*') may be formed from a hardened material, including but not limited to a welded material deposited on the flute edge 442' for increased hardness, heat treating a portion of a flute 440', 440*a*', 450', 450*a*', 460' for increased hardness, chemically infusing a portion of a flute 440', **440*a*', 450', 450*a*', 460' with a specific material for increased hardness, and/or any other method and/or apparatus for increasing the hardness and/or preventing or mitigating wear of a flute edge 442' may be used without limitation unless so indicated in the following claims. It is contemplated that configuring a hybrid flute 440*a*' with a blunt edge 442*b*' in a front portion thereof may allow the stalk roll 400' to operate longer at a desired capacity, as a blunt edge 442*b*' may resist wear better than a sharp edge 442*a*'**.

A sharp edge **442*a*' may be formed by the intersection of a leading surface 444' and a trailing surface 445'. The leading surface 444' may be positioned adjacent a leading wall 446' extending radially outward from the main cylinder 430' (and/or taper 434'). The trailing surface 445' may be positioned adjacent a trailing wall 447' extending radially outward from the main cylinder 430' (and/or taper 434'). In an aspect, the leading wall 446' and trailing walls 447' may be generally parallel with respect to one another and the leading surface 444' and trailing surface 445'** may be generally angled with respect to one another.

It is contemplated that the optimal angle between the leading surface 444' and trailing surface 445', and/or between the trailing wall 447' and leading surface 444' may vary from one application to the next. Accordingly, the scope of the present disclosure is not limited by those angles unless so indicated in the following claims. Additionally, the presence of a trailing surface 445' may not be required for certain applications, and may be dependent on the manufacturing method used for the stalk roll 400' or flute 440', **440*a*', 450', 450*a*', 460'. For example, it is contemplated that if the stalk roll 400' and/or flute 440', 440*a*', 450', 450*a*', 460' is manufactured via a casting method, it may be advantageous to form a trailing surface 445 in a distal portion of the trailing wall 447'. However, if the stalk roll 400' and/or flute 440', 440*a*', 450', 450*a*', 460' is not manufactured via a casting method, the trailing wall 447' may extend all the way to the sharp edge 442*a*' without need for a trailing surface 445'. Accordingly, the specific configuration of a trailing wall 447', the presence of a trailing surface 445'** and/or the specific configuration thereof in no way limits the scope of the present disclosure unless so indicated in the following claims.

A blunt edge **442*b*' may be formed by extending the leading wall 446' and trailing wall 447' to a radial distance from the main cylinder 430' (and/or taper 434') by an amount approximately equal to the radial distance from a sharp edge 442*a*' to the main cylinder 430' (and/or taper 434'). A radially distal surface, which may be generally perpendicular to both the leading wall 446' and trailing wall 447', may connect the leading wall 446' and trailing wall 447'. In an aspect, a blunt edge 442*b*' may be retained by not forming a leading surface 444' and trailing surface 445' in a flute 440', 440*a*', 450', 450*a*', 460'. The cross-sectional width of a flute 440', 440*a*', 450', 450*a*', 460' may vary along its radial length. Referring to FIG. 31E, the cross-sectional width of a flute 440', 440*a*', 450', 450*a*', 460' may be greatest adjacent to the main cylinder 430' (and/or taper 434'). However, the cross-sectional width of a flute 440', 440*a*', 450', 450*a*', 460' may be constant along a portion of its radial length, as generally shown at least for a hybrid flute 440*a*'. Accordingly, the specific cross-sectional profile of a flute 440', 440*a*', 450', 450*a*', 460'** in no way limits the scope of the present disclosure unless so indicated in the following claims.

In an aspect, the axial face 441' of one or more flutes 440', **440*a*', 450', 450*a*', 460' may be angled backward from the proximal end of the flute 440', 440*a*', 450', 450*a*', 460' (i.e., the portion of the flute 440', 440*a*', 450', 450*a*', 460' immediately adjacent the main cylinder 430' and/or taper 434') to the distal end thereof (i.e., the flute edge 442') with respect to the direction of travel of a harvesting machine during operation. It is contemplated that this configuration of a flute 440', 440*a*', 450', 450*a*', 460' may ease entry of a corn plant into an area between opposing stalk rolls 400' under certain conditions. The optimal angle of an axial face 441' of a flute 440', 440*a*', 450', 450*a*', 460' may vary from one application to the next and depend at least upon the angle of a stalk roll 400' with respect to a corn plant stalk during operation, but it is contemplated that an angle between ten and 50 degrees may be advantageous for certain applications. However, other angles for an axial face 441' with the stalk roll 400', and the optimal angle and configuration of an axial face 441'** in no way limits the scope of the present disclosure unless so indicated in the following claims.

The rear portion of one or more flutes 440', **440*a*', 450', 450*a*', 460' may be formed with an axial point 464' thereon. It is contemplated that removing a portion of a flute 440', 440*a*', 450', 450*a*', 460' to create an axial point 464' may provide additional clearance between the flute edge 442' and other machinery of the row unit and/or harvesting machine at the rearward portion of the stalk roll 400'. However, any suitable angles for an axial point 464' may be used with the stalk roll 400', and the optimal angle, length, and configuration of an axial point 464' may vary from one application of the stalk roll 400'** to the next, and is therefore in no way limiting to the scope of the present disclosure unless so indicated in the following claims.

As previously described, in an aspect of the stalk rolls 400' shown in FIGS. 31A-33B and 34A-36D, the stalk rolls 400' may be configured for engagement with a stalk roll drive shaft having a square cross-sectional shape (not shown). It is contemplated that a stalk roll 400' may be split along a plane bisecting the stalk roll 400' along the longitudinal axis thereof, such that the stalk roll 400' may be formed as two portions, each portion constituting one half of the stalk roll 400' (e.g., a main cylinder 430' and/or taper 434' comprised of two portions having a cross-sectional shape of a half circle). The two portions may then be engaged with a stalk roll drive shaft as described in further detail below. In an aspect, it is contemplated that each half of a stalk roll 400' may be manufactured by casting. However, the scope of the present disclosure is not limited by the method used to manufacture the stalk roll 400' and/or component thereof unless so indicated in the following claims.

Generally, the optimal rotational position at which a stalk roll 400' may be bisected (along a plane passing through its axis of rotation) may vary from one application of the stalk roll 400' to the next. Accordingly, the scope of the present disclosure is in no way limited by where the stalk roll 400' is bisected to create each half. In an aspect, it is contemplated that the stalk roll 400' be bisected such that when the stalk roll 400' is mounted to the stalk roll drive shaft (not shown), the rear-most portion of the fighting 412 on the nose cone 410 terminates adjacent an axial face 441' of the longest flute **440*a*', 440', 450, 450*a*, 460' on the stalk roll 400' half, which may be a hybrid flute 440*a*'. In a corn head row unit employing nose bearings, these considerations may be optimized for the nose cone 410 already present on the corn head row unit. However, differently configured halves of stalk rolls 400'** may be employed without limitation unless so indicated in the following claims.

Figure 32A:
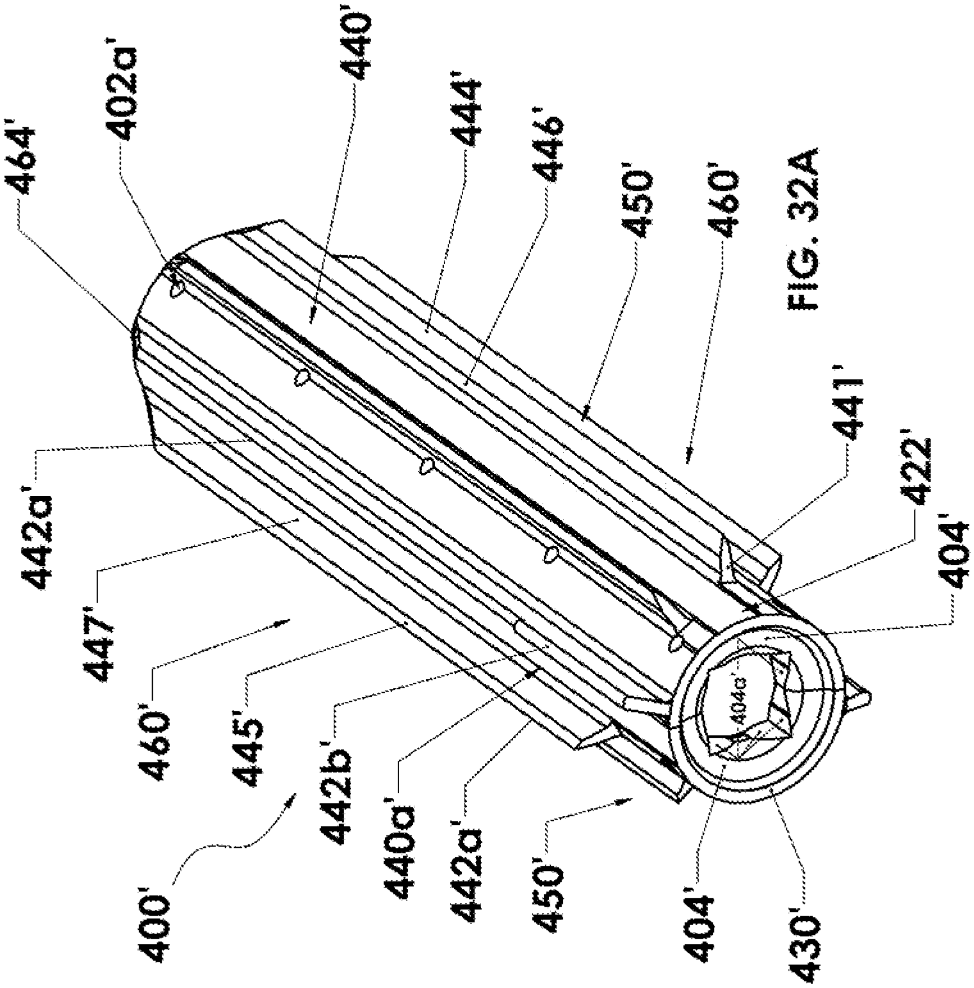
FIG. 32A is a perspective view of the left stalk roll shown in FIGS. 31A-31D.
Figure 32B:
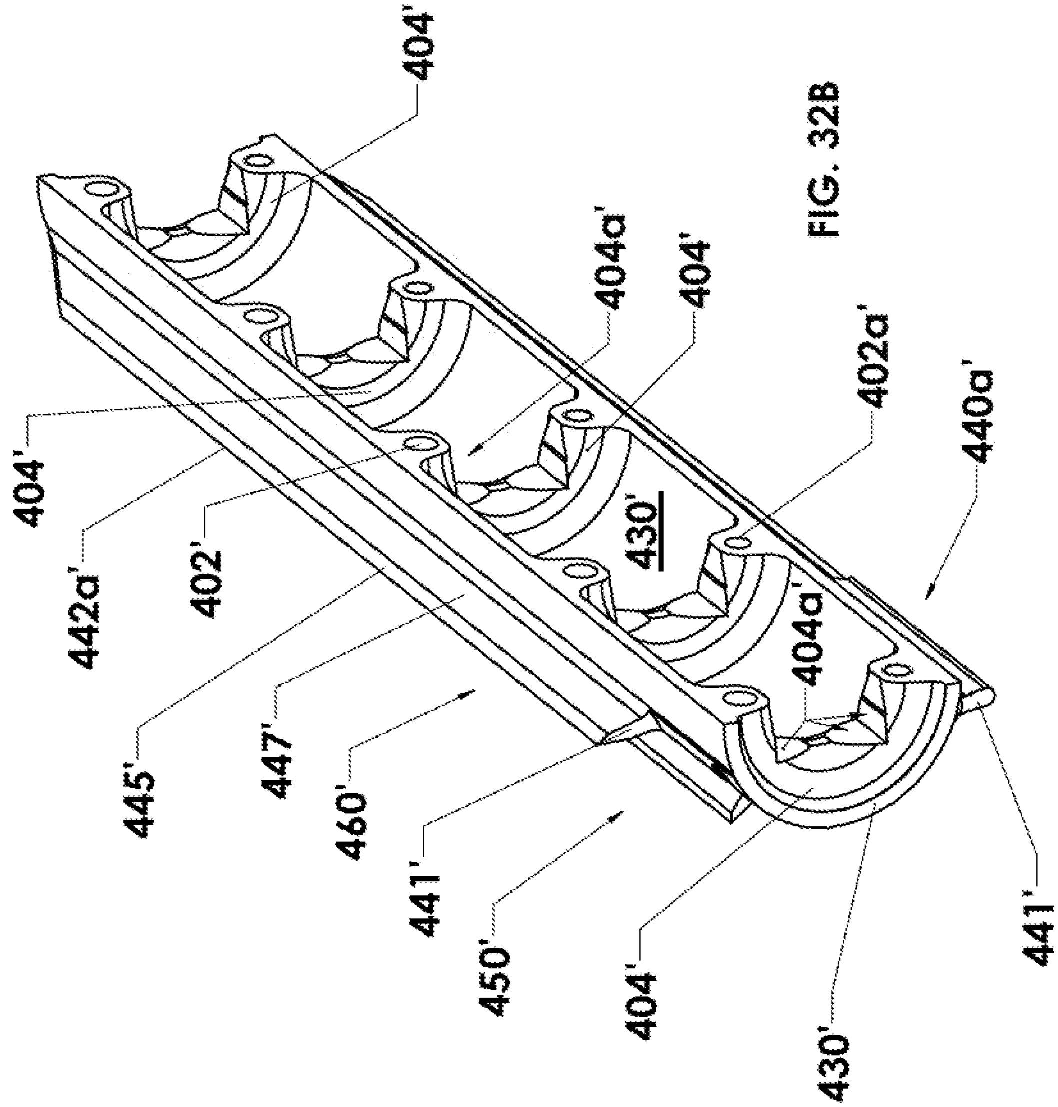
FIG. 32B is a longitudinal cross-sectional view of the stalk roll shown in FIG. 32A
Figure 33A:
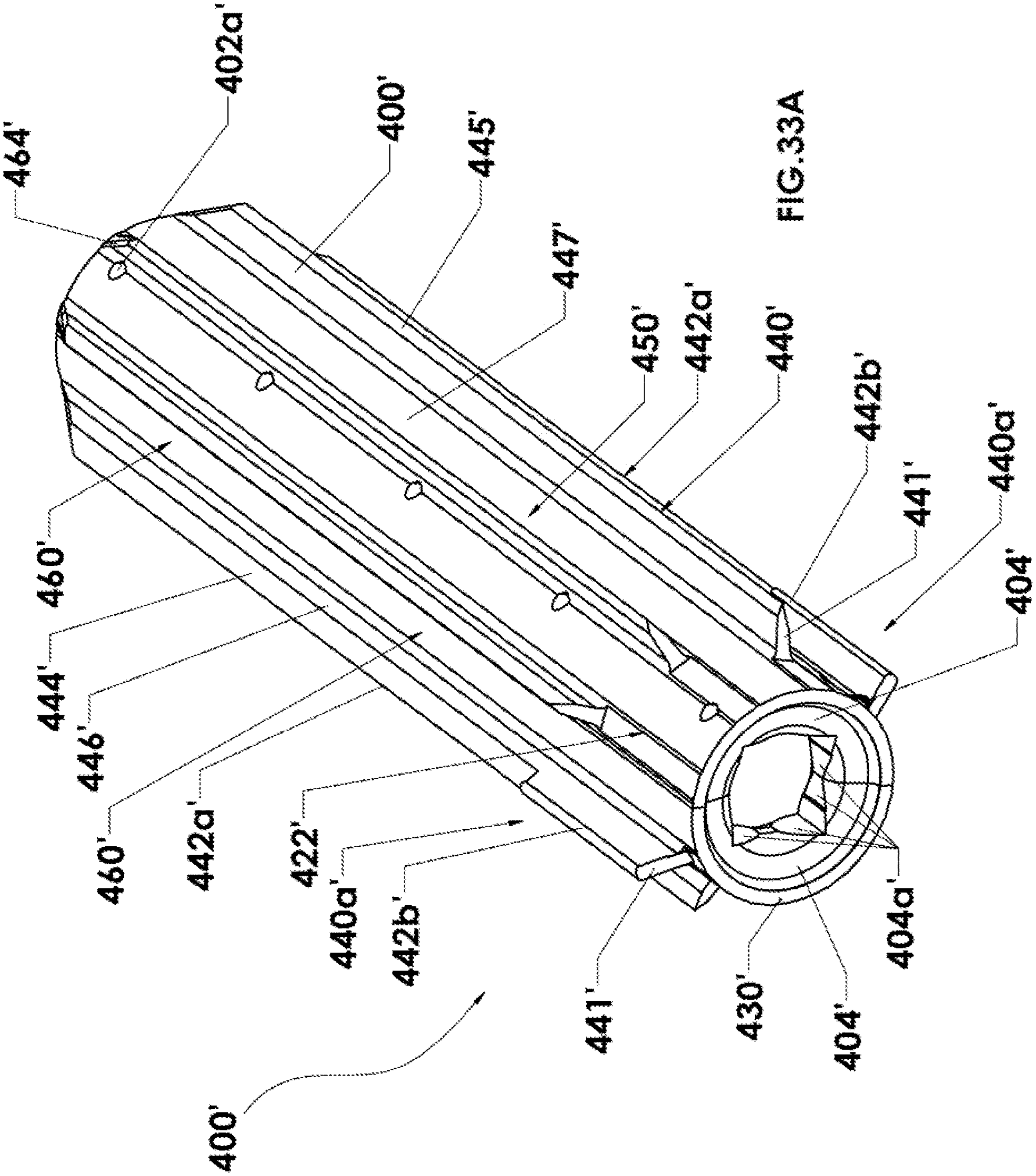
FIG. 33A is a perspective view of the right stalk roll shown in FIGS. 31A-31D.
Figure 33B:
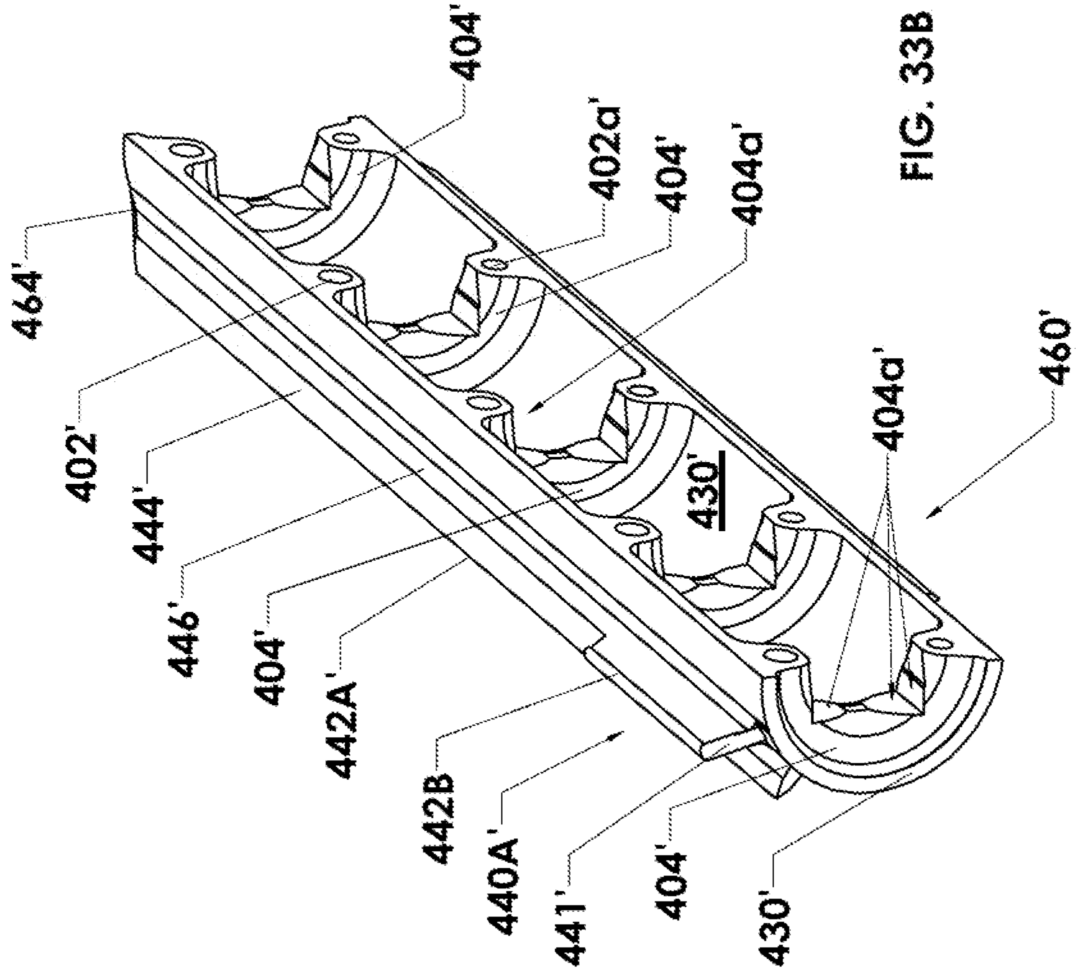
FIG. 33B is a longitudinal cross-sectional view of the stalk roll shown in FIG. 33A

Referring specifically to FIGS. 32B and 33B, the stalk roll 400' may be formed with one or more support members 404' on an interior surface of the main cylinder 430' (and/or taper 434'). The optimal number of support members 404' may vary from one application of the stalk roll 400' to the next, and may be dependent at least on the length of the stalk roll 400'. Accordingly, even though the stalk rolls 400' shown in FIGS. 31A-33B may employ five support members 404' generally equally spaced along the length of the stalk roll 400', other numbers, configurations, spacing, etc. of support members 404' may be used without limitation unless so indicated in the following claims.

An interior surface of a support member 404' may be configured as a generally planar surface 404*a*'. It is contemplated that one or more generally planar surfaces 404*a*' of a stalk roll 400' may directly engage the outer surface of a stalk roll drive shaft when the stalk roll 400' is engaged therewith. The optimal configuration of the generally planar surfaces 404*a*' may vary from one application of the stalk roll 400' to the next, and may be dependent at least on the manufacturing and/or machining tolerances of the stalk roll drive shaft for which the stalk roll 400' is designed. In an aspect, when two stalk roll 400' halves are engaged with a given stalk roll drive shaft, eight generally planar surfaces 404*a*' (four one each half) may engage the outer surface of the stalk roll drive shaft at each support member 404'.

In an aspect a given support member 404' on one half of a stalk roll 400' may be formed with four generally planar surfaces 404*a* thereon, wherein each generally planar surface 404*a*' may be grouped in two pairs forming right-angled surfaces. It is contemplated that one corner of the stalk roll drive shaft may seat in each of these right-angled surfaces, such that when the stalk roll drive shaft rotates, the stalk roll 400' engaged therewith also rotates. The surface area of a generally planar surface 404*a*' may increase in a direction toward the right-angle corner at the interface between two adjacent generally planar surfaces 404*a*' cooperating to form a right-angled surface.

Referring to FIGS. 32B, 33B, 35D, & 36D, in an aspect it is contemplated that during manufacturing, the support members 404' may generally be in the shape of a half circle. In an aspect with specific reference to FIGS. 32B and 33B, the diametric cross-section of the support member 404' may decrease in a radially inward direction from the interface between the main cylinder 430' (and/or taper 434') and the support member 404'. The generally planar surfaces 404*a*' may be cut into the semi-circular support member 404', which due to the configuration of the support members 404', may result in the length of a generally planar surface 404*a*' (in a direction parallel to the longitudinal axis of the stalk roll 400') being greater at a corner intersection of two adjacent generally planar surfaces 404*a*' than at an interface of two generally planar surfaces 404*a*' on opposite halves of the stalk roll 400'. In such a configuration, the shape of a generally planar surface 404*a*' may be similar to a parabola. However, in another aspect, the generally planar surfaces 404*a*' may be manufactured in the support member 404' directly, and may be manufactured with a small amount of extra material adjacent the generally planar surfaces 404*a*' to allow for finer machining and/or better tolerances of the generally planar surfaces 404*a*'

Figure 35A:
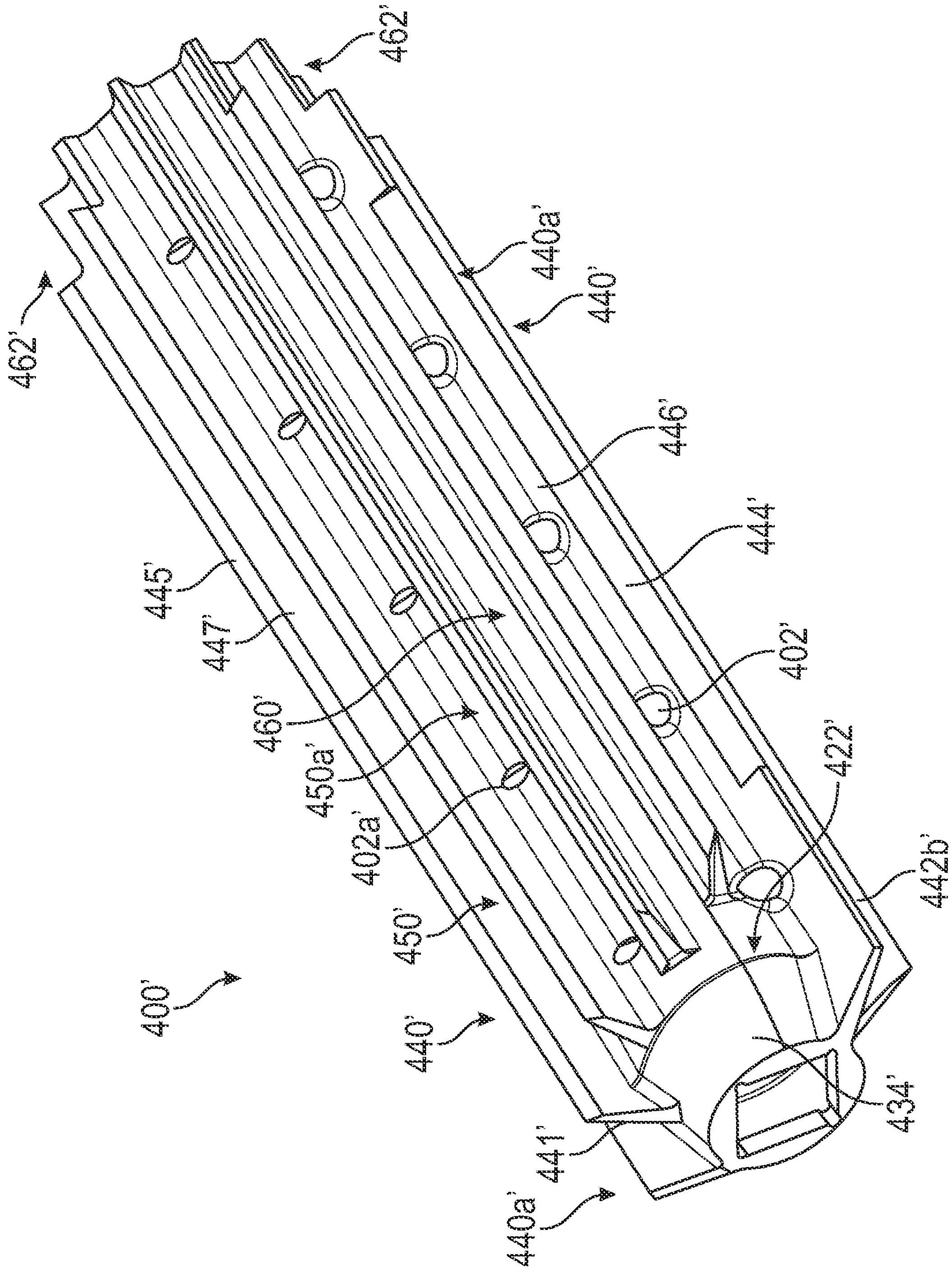
FIG. 35A is a perspective view of the left stalk roll shown in FIGS. 34A-34E.
Figure 35B:
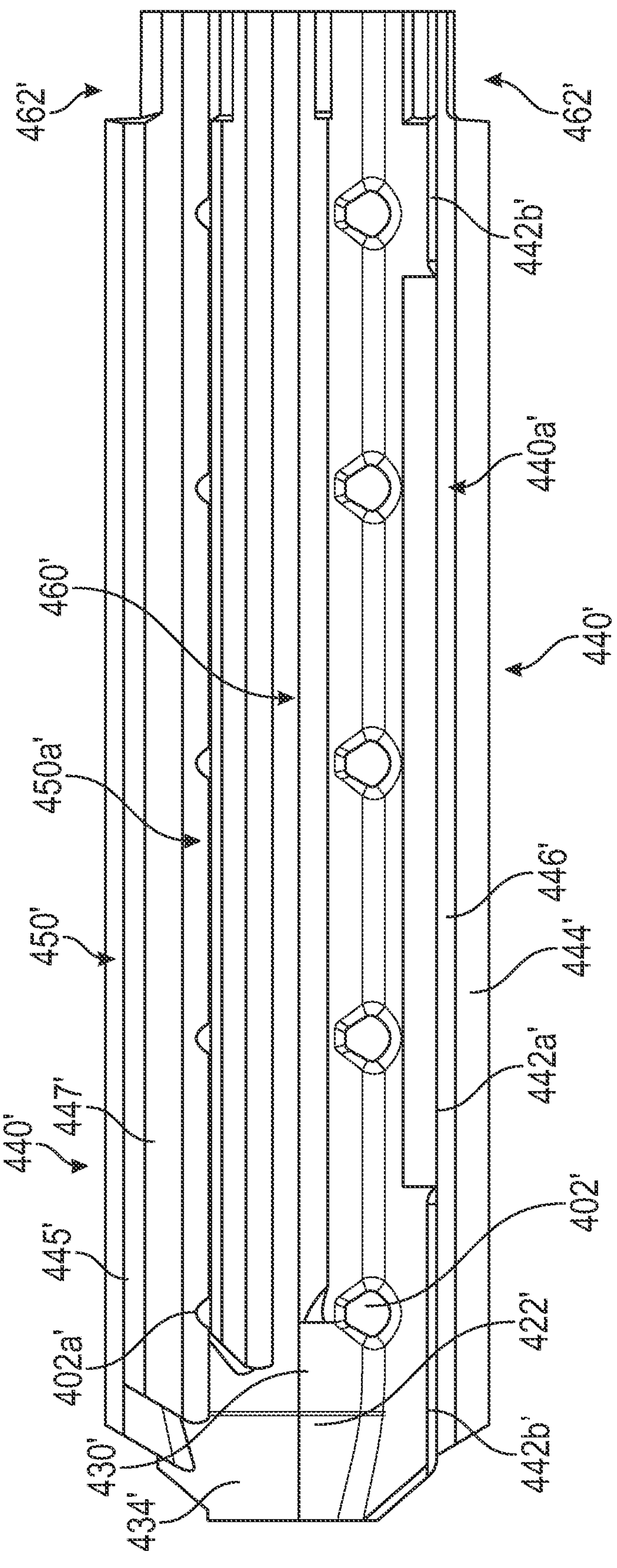
FIG. 35B is a side view of the stalk roll shown in FIG. 35A, which side may be facing the right stalk roll of the pair shown in FIGS. 34A-34E.
Figure 35C:
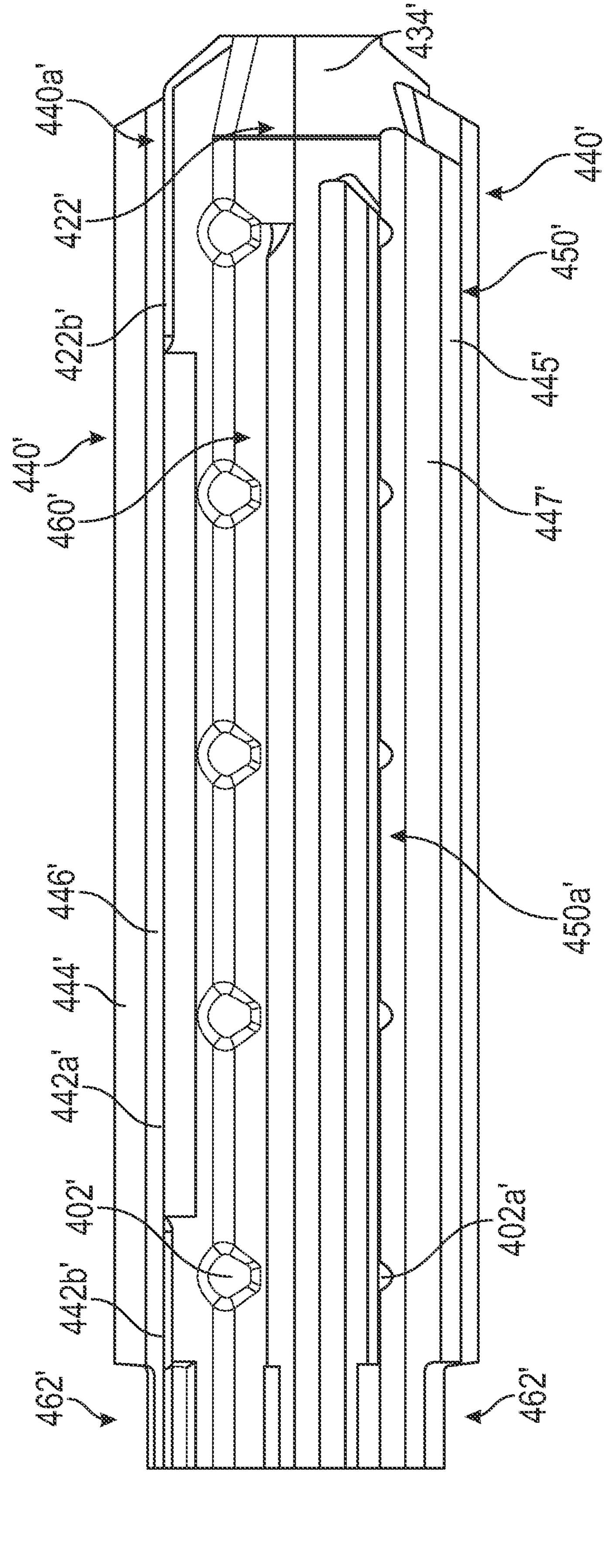
FIG. 35C is an opposite side view of the stalk roll shown in FIGS. 35A and 35B.
Figure 35D:
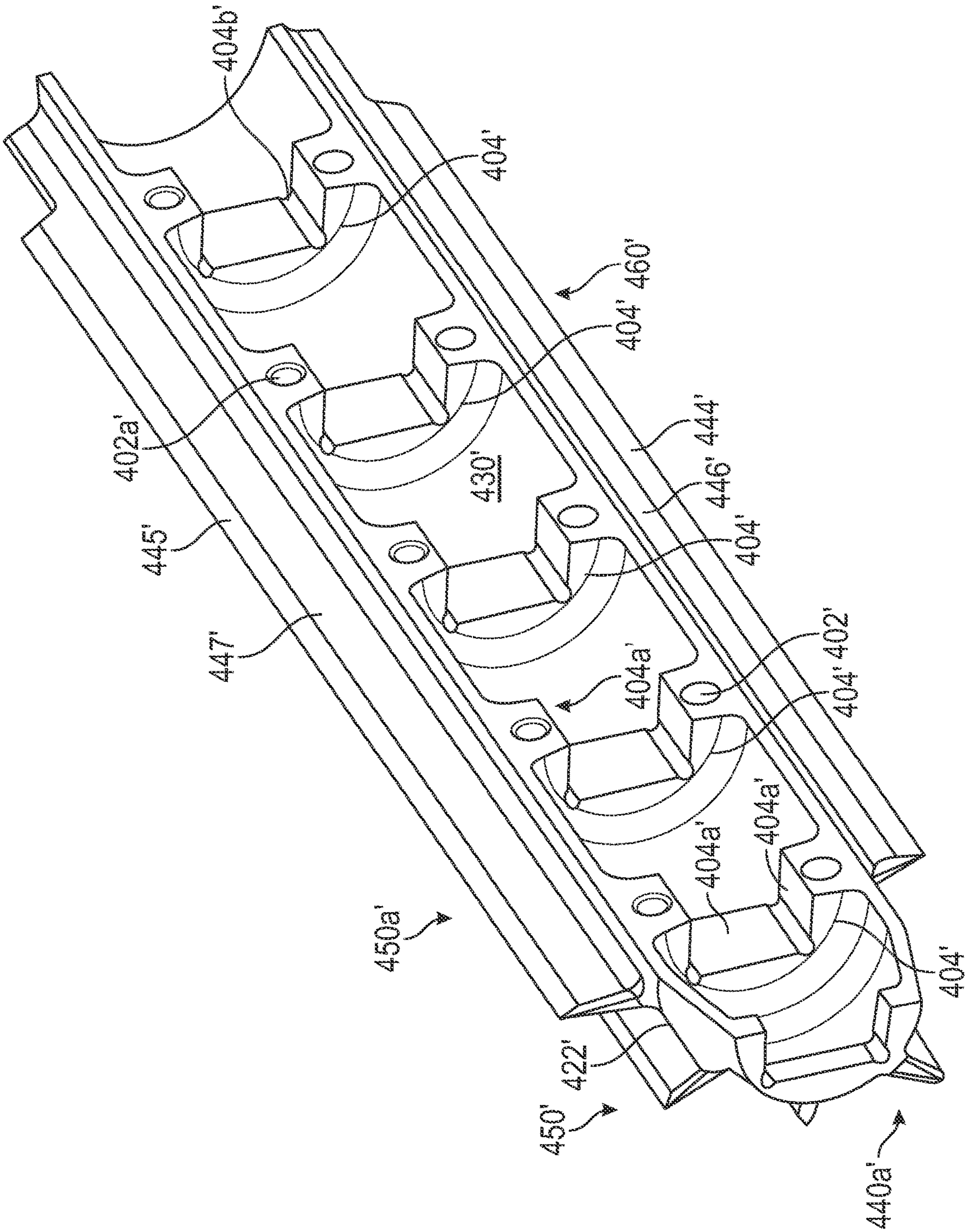
FIG. 35D is a longitudinal cross-sectional view of the stalk roll shown in FIGS. 35A-35C.
Figure 36A:
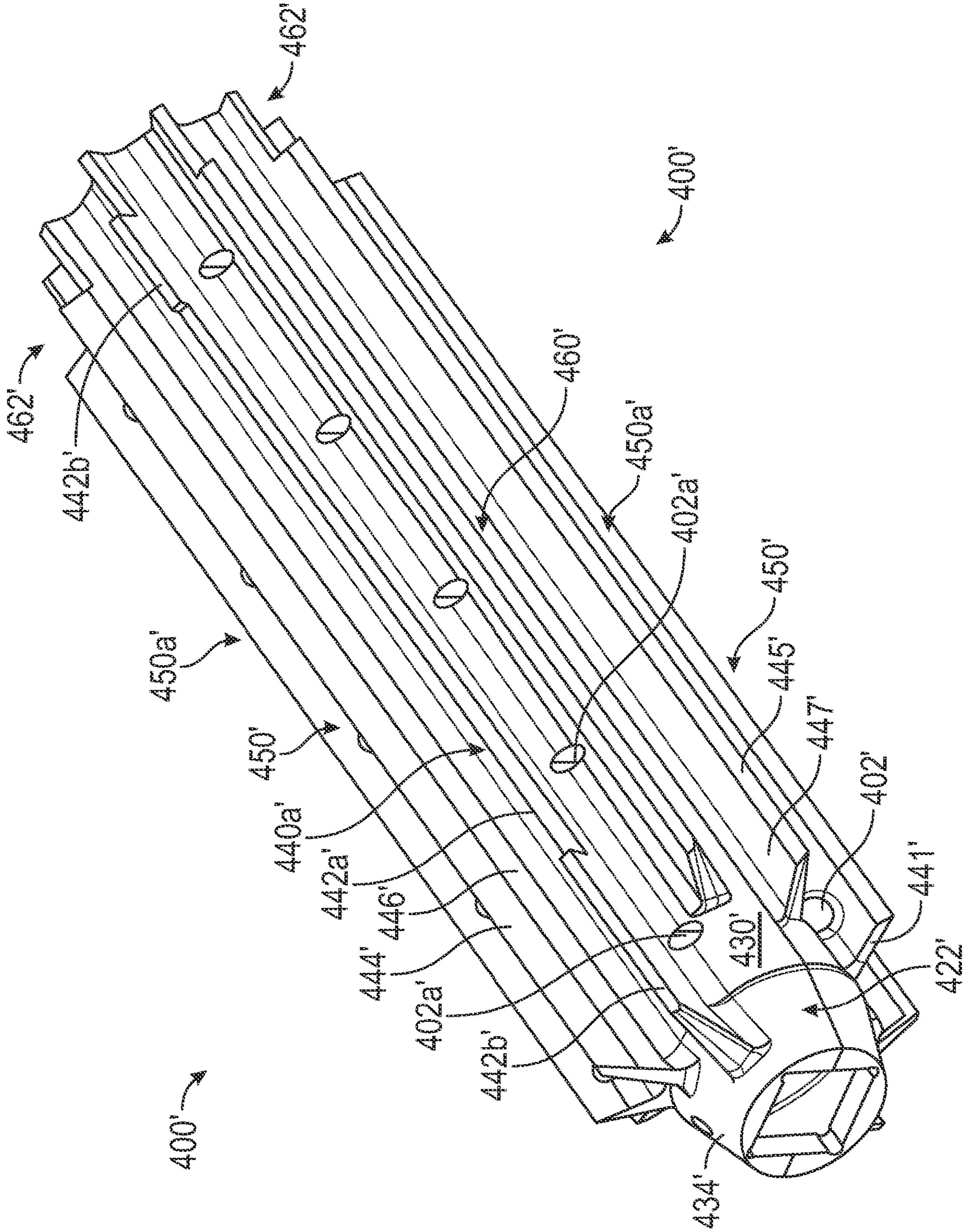
FIG. 36A is a perspective view of the right stalk roll shown in FIGS. 34A-34E.
Figure 36B:
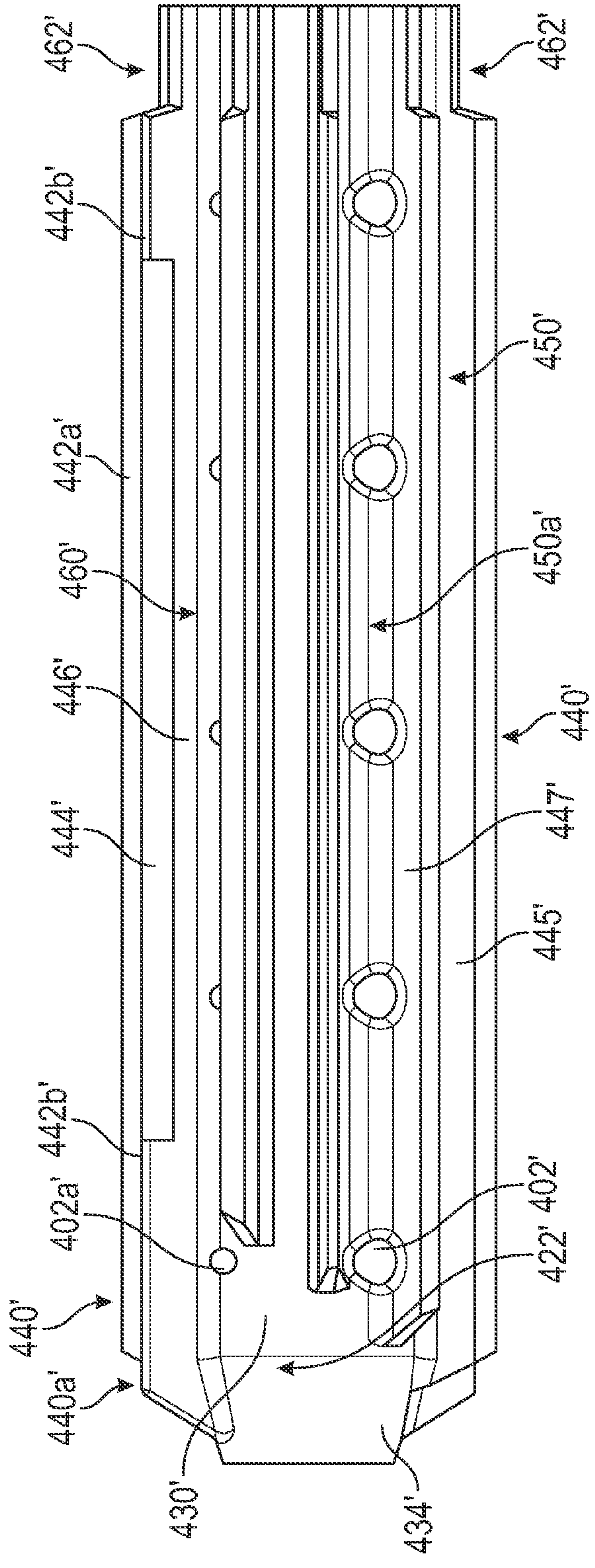
FIG. 36B is a side view of the stalk roll shown in FIG. 36A, which side may be facing the left stalk roll of the pair shown in FIGS. 34A-34E.
Figure 36C:
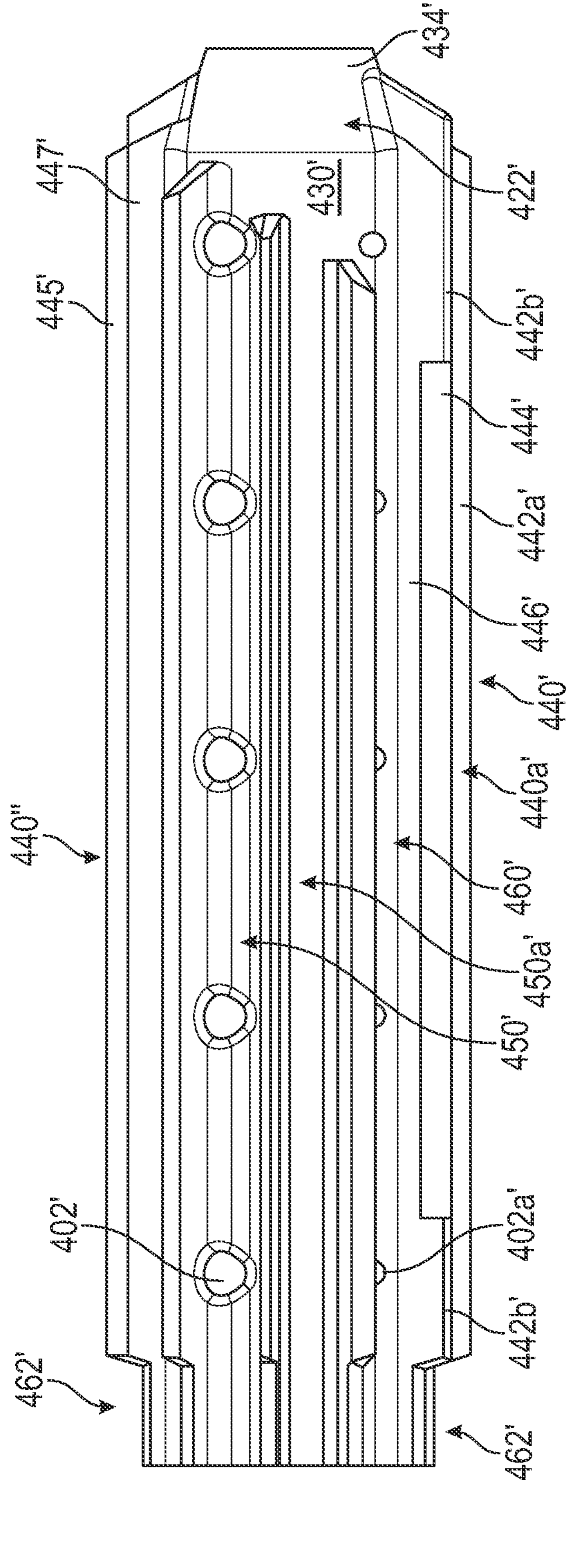
FIG. 36C is an opposite side view of the stalk roll shown in FIGS. 36A and 36B.
Figure 36D:
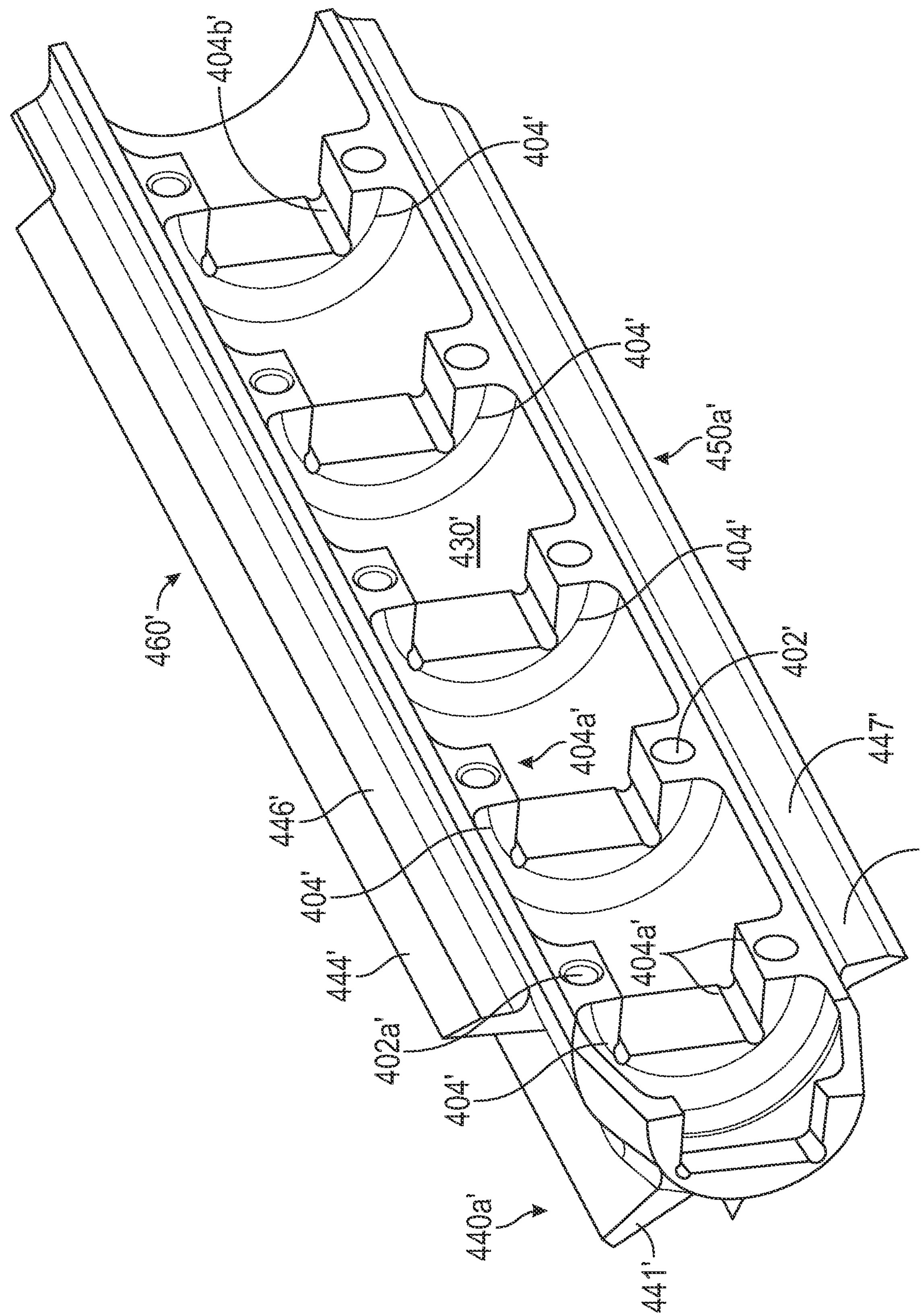
FIG. 36D is a longitudinal cross-sectional view of the stalk roll shown in FIGS. 36A-36C.
Figure 37:
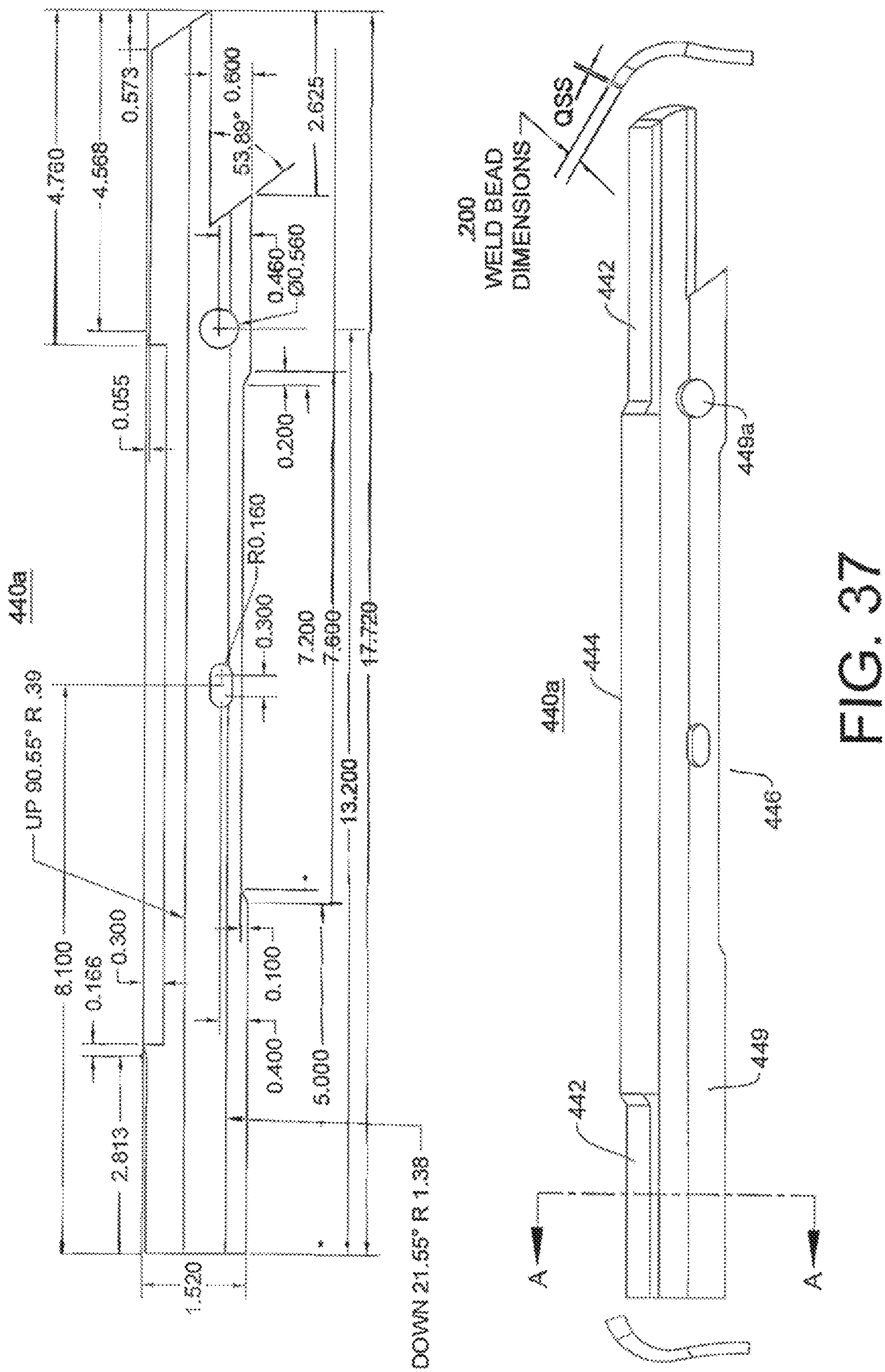
FIG. 37 provides several views of various aspects of a hybrid flute that may be positioned on a left stalk roll of a cooperating pair of stalk rolls.
Figure 38A:
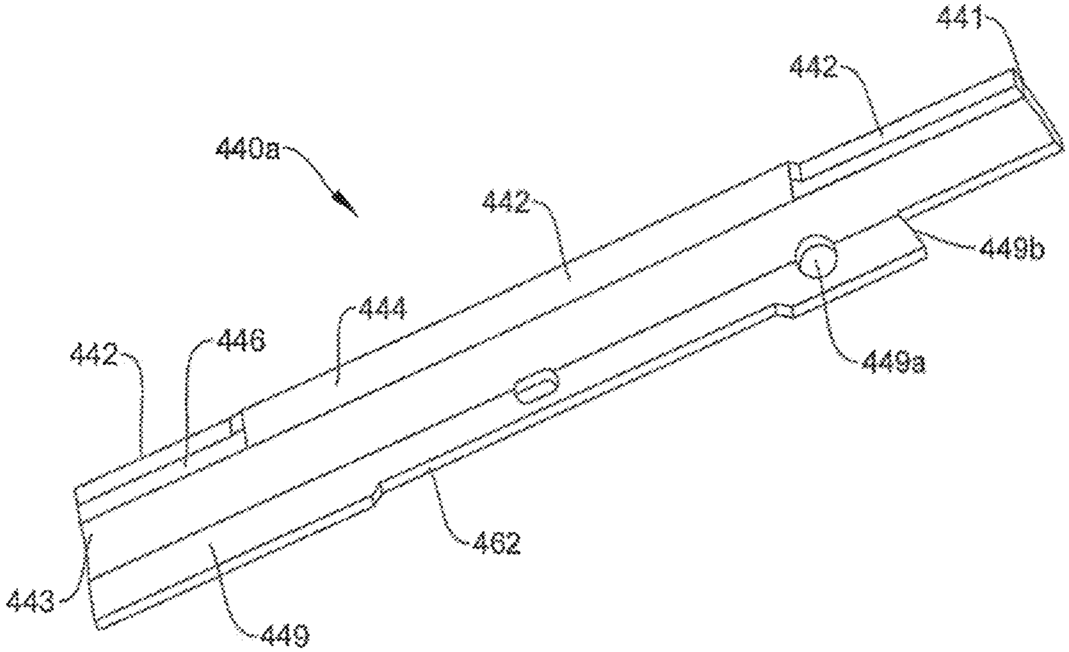
FIG. 38A provides a perspective view of the hybrid flute shown in FIG. 37.
Figure 38B:
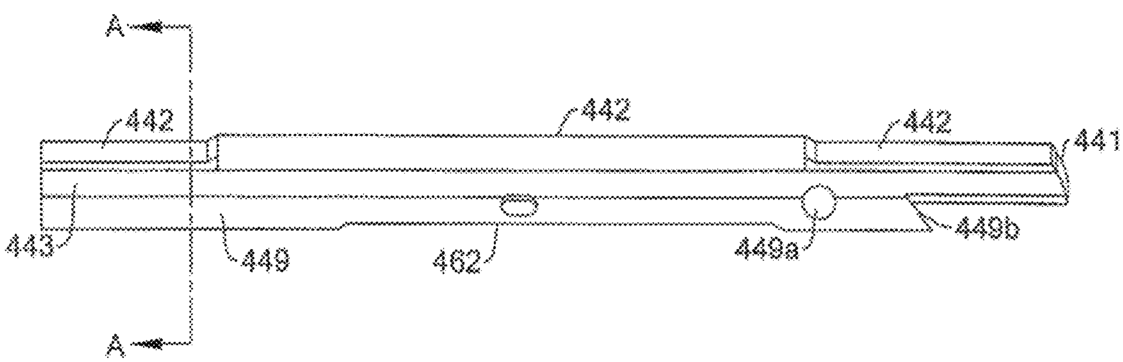
FIG. 38B provides a top view of the hybrid flute shown in FIGS. 37 & 38A.
Figure 39A:
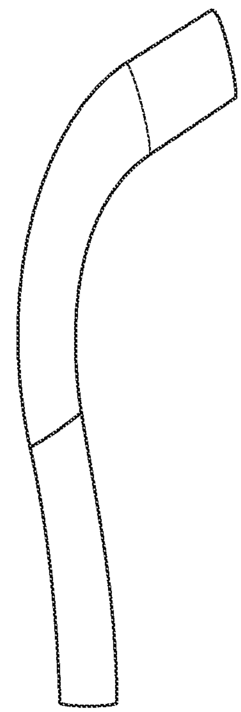
FIG. 39A provides a back end view of the hybrid flute shown in FIGS. 37-38B.
Figure 39B:
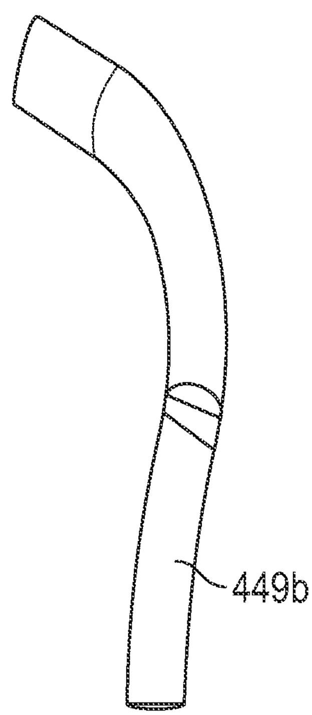
FIG. 39B provides a front end view of the hybrid flute shown in FIGS. 37-39A.
Figure 39C:
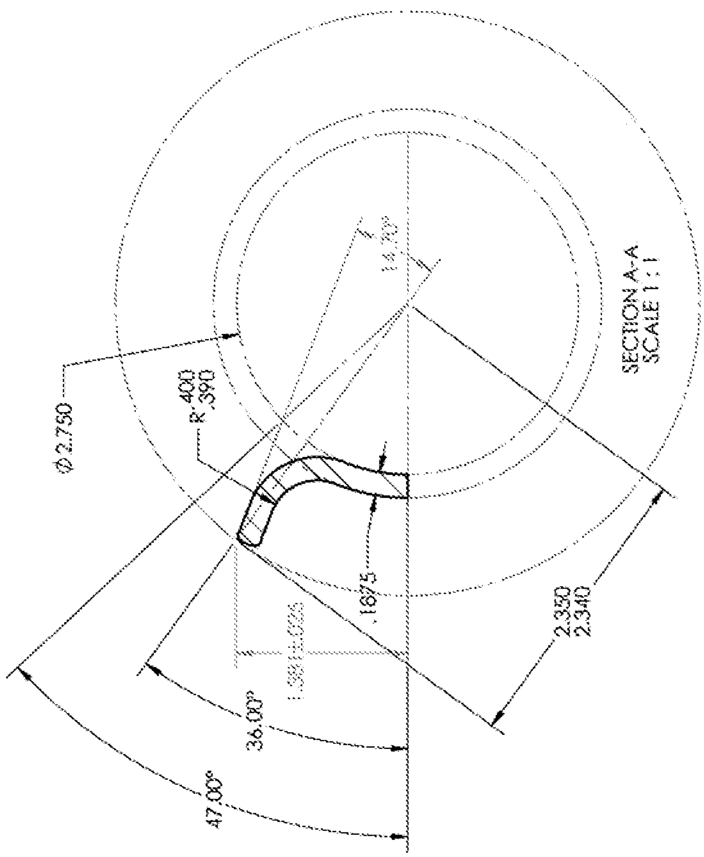
FIG. 39C provides a cross-sectional view of the hybrid flute shown in FIG. 38B along line A-A and an illustrative configuration of a corresponding stalk roll.
Figure 40:
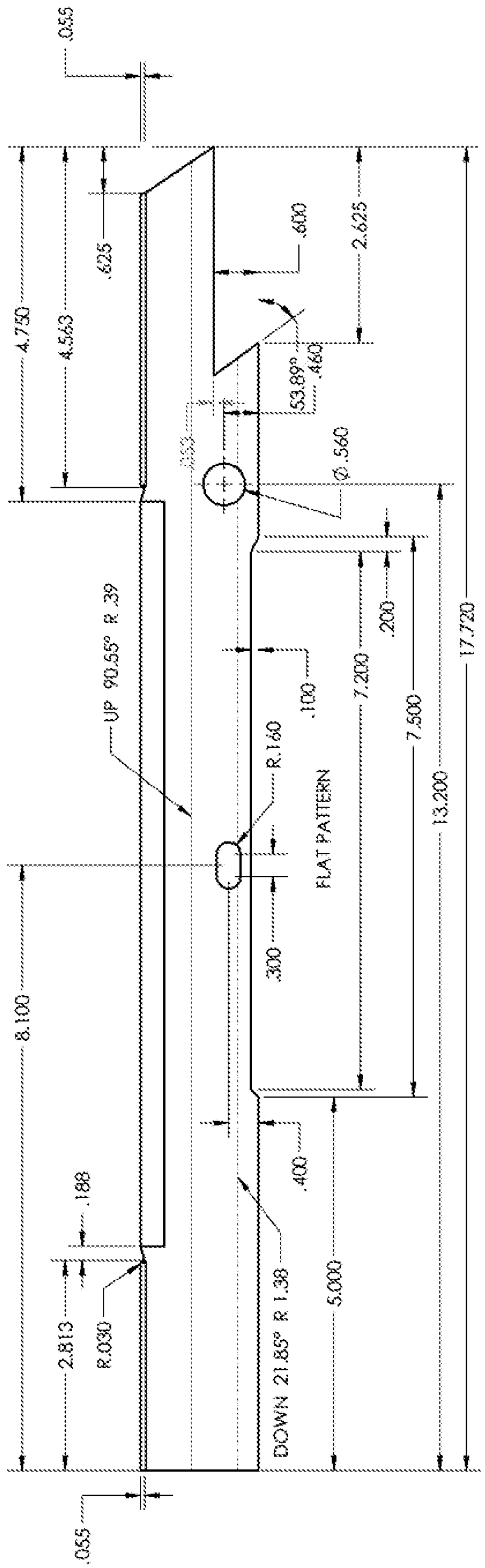
FIG. 40 provides a flattened view of the hybrid flute shown in FIGS. 37-39C with various illustrative dimensions.
Figure 41:
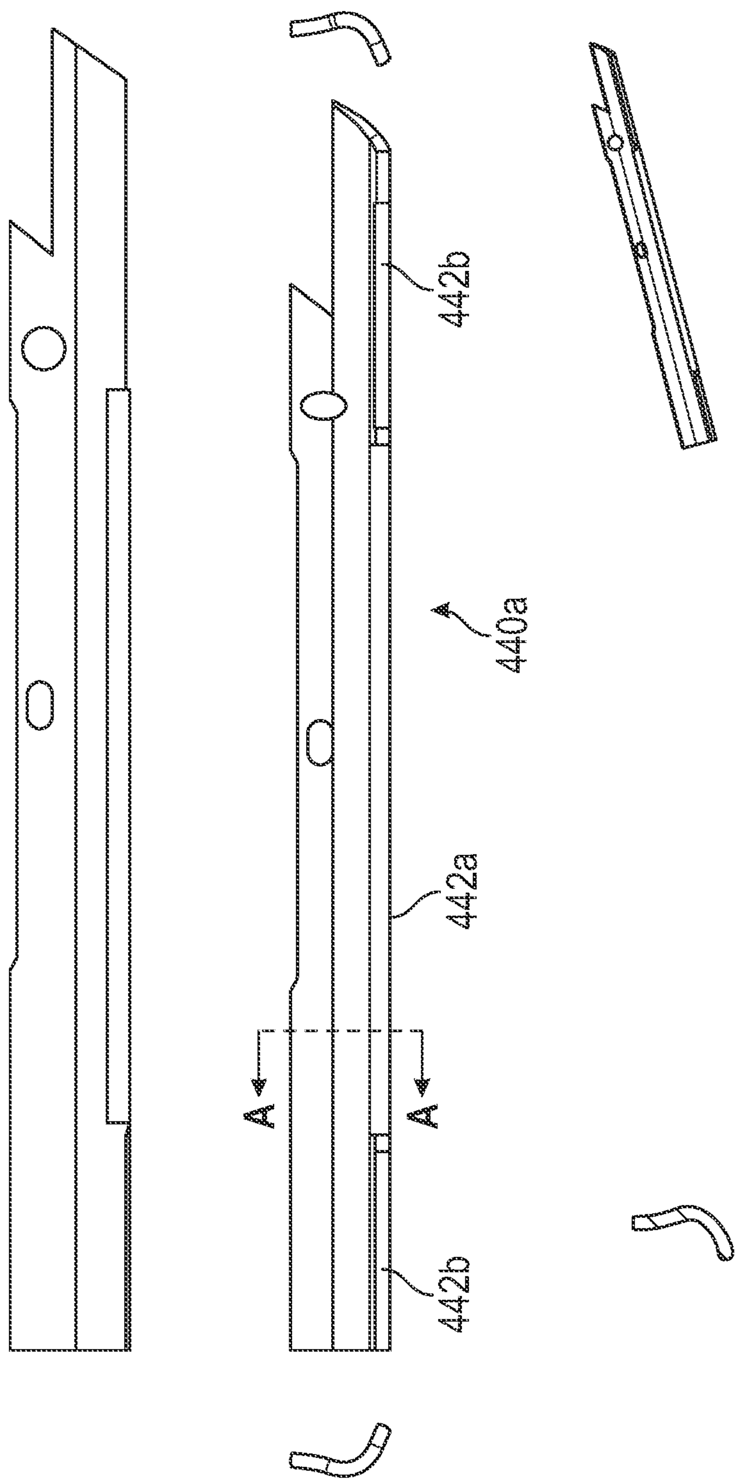
FIG. 41 provides several views of various aspects of a hybrid flute that may be positioned on a right stalk roll of a cooperating pair of stalk rolls.
Figure 42A:
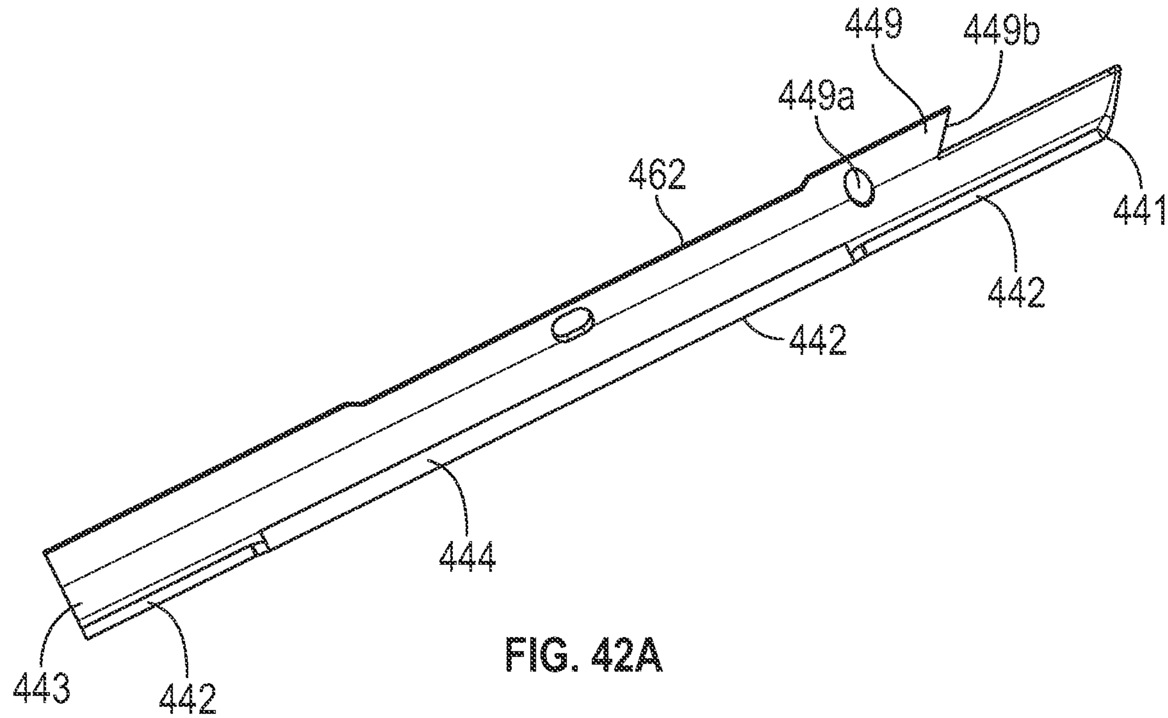
FIG. 42A provides a perspective view of the hybrid flute shown in FIG. 41.
Figure 42B:
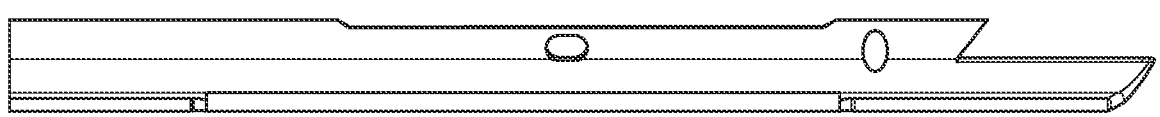
FIG. 42B provides a top view of the hybrid flute shown in FIGS. 41 & 42A.
Figure 43B:
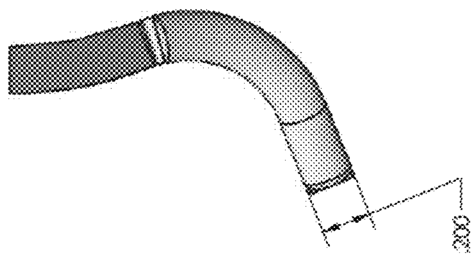
FIG. 43B provides a front end view of the hybrid flute shown in FIGS. 41-43A.
Figure 43A:
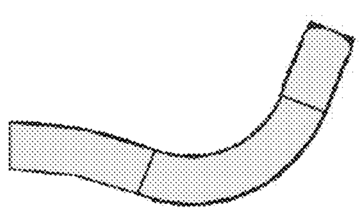
FIG. 43A provides a back end view of the hybrid flute shown in FIGS. 41-42B.
Figure 43C:
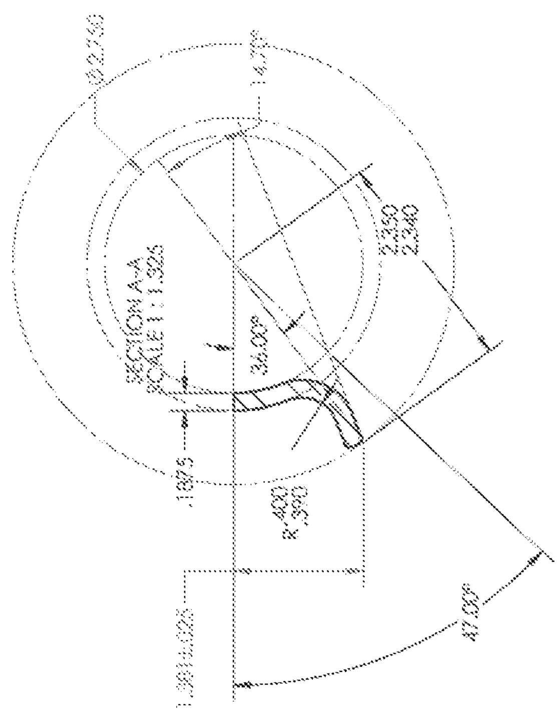
FIG. 43C provides a cross-sectional view of the hybrid flute shown in FIG. 42B along line A-A and an illustrative configuration of a corresponding stalk roll.
Figure 44:
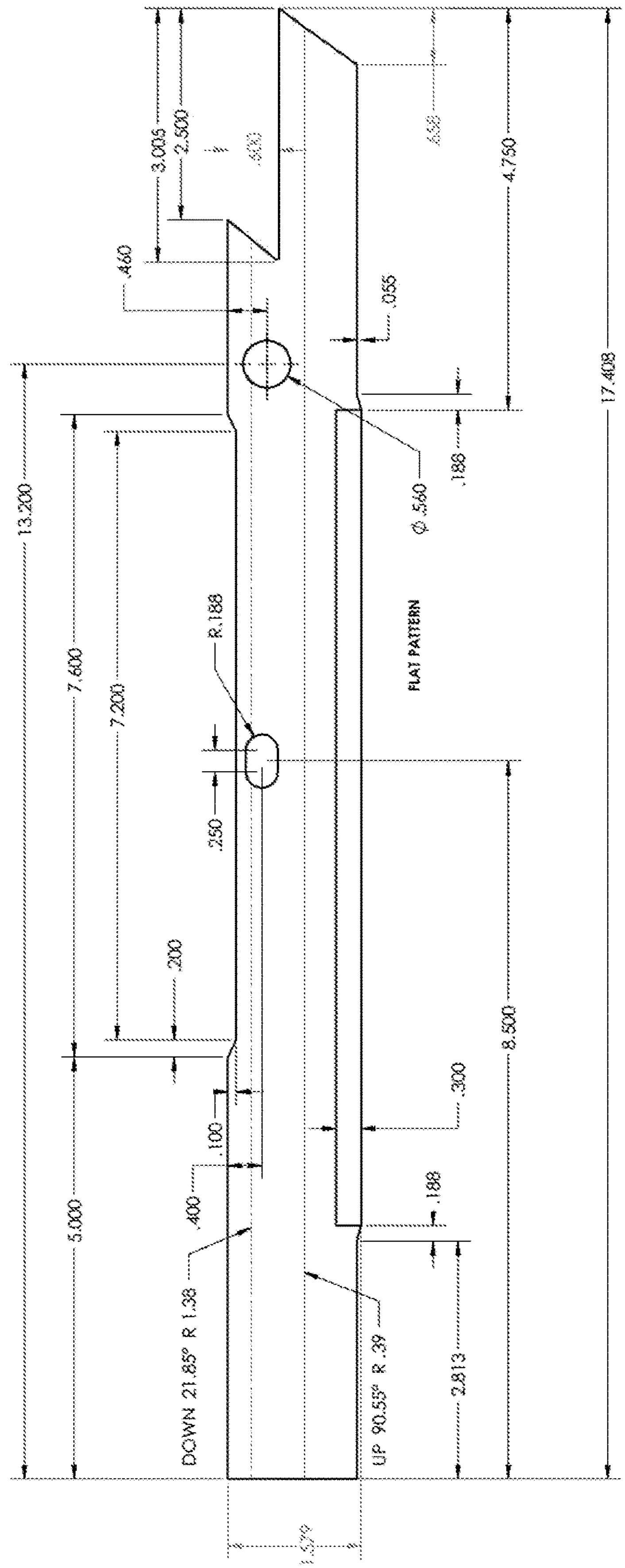
FIG. 44 provides a flattened view of the hybrid flute shown in FIGS. 37-39C with various illustrative dimensions.

In an aspect shown at least in FIGS. 35D and 36D, the corner intersection of two adjacent generally planar surfaces 404*a*' may be formed with a relief 404*b*' therein. It is contemplated that a relief 404*b*' may prevent unwanted stress and/or damage (e.g., cracking) of a stalk roll 400' or half thereof when engaged with a stalk roll drive shaft. However, other structures and/or methods may be used to prevent unwanted stress and/or damage to a stalk roll 400' without limitation unless so indicated in the following claims.

Even though the stalk rolls 400' shown in FIGS. 31A-33B may employ four generally planar surfaces 404*a*' on a given support member 404' on each half of a stalk roll 400' (wherein two generally planar surfaces 404*a*' may reside in a common first plane and two other generally planar surfaces 404*a*' may reside in separate second and third planes that may be parallel with respect to one another but perpendicular with respect to the first plane), other numbers, configurations, sizes, shapes, spacing, etc. of generally planar surfaces 404*a*' may be used without limitation unless so indicated in the following claims.

Each portion may be formed with one or more apertures 402' and/or corresponding anchors 402*a*', which apertures 402' and/or anchors 402*a*' may be formed in a portion of a support structure 404'. In an aspect, the anchors 402*a*' may be formed as tapped holes such that a bolt may pass through an aperture 402' and engage a corresponding anchor 402*a*', whereby tightening the bolt causes the two halves of the stalk roll 400' to clamp onto the stalk roll drive shaft. In an aspect, one half of a stalk roll 400' may be configured with a row of apertures 402' and a row of anchors 402', such that half of the bolts (or other fasteners) engaging corresponding apertures 402' and anchors 402*a*' are oriented in one direction and the other half are oriented in the opposite direction.

Although the stalk rolls 400' in FIGS. 31A-33B are shown with five apertures 402' and five corresponding anchors 402*a*', any suitable number of anchors 402*a*' and/or apertures 402' may be used without limitation unless so indicated in the following claims. Additionally, the scope of the stalk roll 400' disclosed and claimed herein is not limited by the structure and/or method used to secure the two halves of a stalk roll 400' together, and any suitable method and/or structure for securely positioning one half of a stalk roll 400' with respect to the corresponding half of the stalk roll 400' may be used without limitation unless so indicated in the following claims.

Generally referring now to FIGS. 34A-36D, in another aspect of a stalk roll 400' configured for engagement with a stalk roll drive shaft having a square or rectangular cross-sectional shape, the stalk roll 400' may be configured with a total of ten flutes 440', 440*a*', 450', 450*a*', 460' engaged with a main cylinder 430' and/or taper 434' in a general configuration similar to that described for the stalk rolls 400' shown in FIGS. 31A-33B. However, the stalk rolls 400' shown in FIGS. 34A-36D may be configured with ten flutes 440', 440*a*', 450', 450*a*', 460' rather than eight, the main cylinder 430' may include a taper 434' on a front portion thereof, and one or more flutes 440', 440*a*', 450', 450*a*', 460' may include a notch 462' on a rear portion thereof, all of which are described in further detail below.

The main cylinder 430' may include a taper 434' toward the front end of the main cylinder 430'. Generally, the taper 434' may be configured such that the outer diameter thereof gradually and constantly lessens in a direction along the longitudinal axis of the stalk roll 400' toward a nose cone 410 (not shown), such that the taper 434' may be generally formed as a frustum. The optimal length and angle of the taper 434' may vary from one application of the stalk roll 400' to the next, as may the ratio of the length and angle of the taper 434' as a ratio of various dimensions of the main cylinder 430' and/or any flutes 440', 440*a*', 450', 450*a*', 460'. Accordingly, the specific size and configuration of the taper 434' in no way limits the scope of the present disclosure unless so indicated in the following claims.

It is contemplated that a taper 434' may provide a smooth transition from a nose cone (not shown) to the stalk roll 400' for nose cones with a certain outer diameter. If the difference between the maximum diameter of a nose cone and the outer diameter of the main cylinder 430' is within a certain range, a taper 434' may not be required for proper operation. However, if the difference between those values is outside a certain range, a taper 434' may be required for proper operation. Accordingly, the presence or absence of a taper 434' on the main cylinder 430' of a stalk roll 400' may depend at least on the dimensions of the nose cone with which the stalk roll 400' is used. Therefore, the presence, absence, configuration, etc. of a taper 434' in no way limits the scope of the present disclosure unless so indicated in the following claims.

One or more flutes 440', **440*a*', 450', 450*a*', 460' may extend along the length of the main cylinder 430' into the taper 434'. In an aspect, at least two hybrid flutes 440*a*' and two full flutes 440' may extend into the taper 434', and at least two reduced flutes 450' may terminate at an axial face 441' thereof adjacent the rearward-most portion of the taper 434'. In an aspect, the radial dimension of the flutes 440', 440*a*', 450', 450*a*', 460' extending into the taper 434' may vary such that the flute edge 442' may be generally linear and generally parallel to the rotational axis of the stalk roll 400'. To maintain a linear, parallel configuration of the flute edge 442', the radial dimension of the flute 440', 440*a*', 450', 450*a*', 460' may be gradually increased along the length of the taper 434' by an amount that correlates to the diameter decrease of the taper 434'. However, in other aspects of a stalk roll 400' and/or component thereof, the flute edge 442' of flutes 440', 440*a*', 450', 450*a*', 460' extending into a taper 434'** may be differently configured without limitation unless so indicated in the following claims.

One or more flutes 440', **440*a*', 450', 450*a*', 460' may be formed with a notch 462' on a generally reward portion thereof. In an aspect, it is contemplated that removing a portion of a flute 440', 440*a*', 450', 450*a*', 460' to create a notch 462' may provide additional clearance between the flute edge 442' and other machinery of the row unit and/or harvesting machine at the rearward portion of the stalk roll 400'. Accordingly, the optimal dimensions and configuration of the notch 462' may vary from may vary from one application of the stalk roll 400'** to the next, and is therefore in no way limiting to the scope of the present disclosure unless so indicated in the following claims.

Figure 34A:
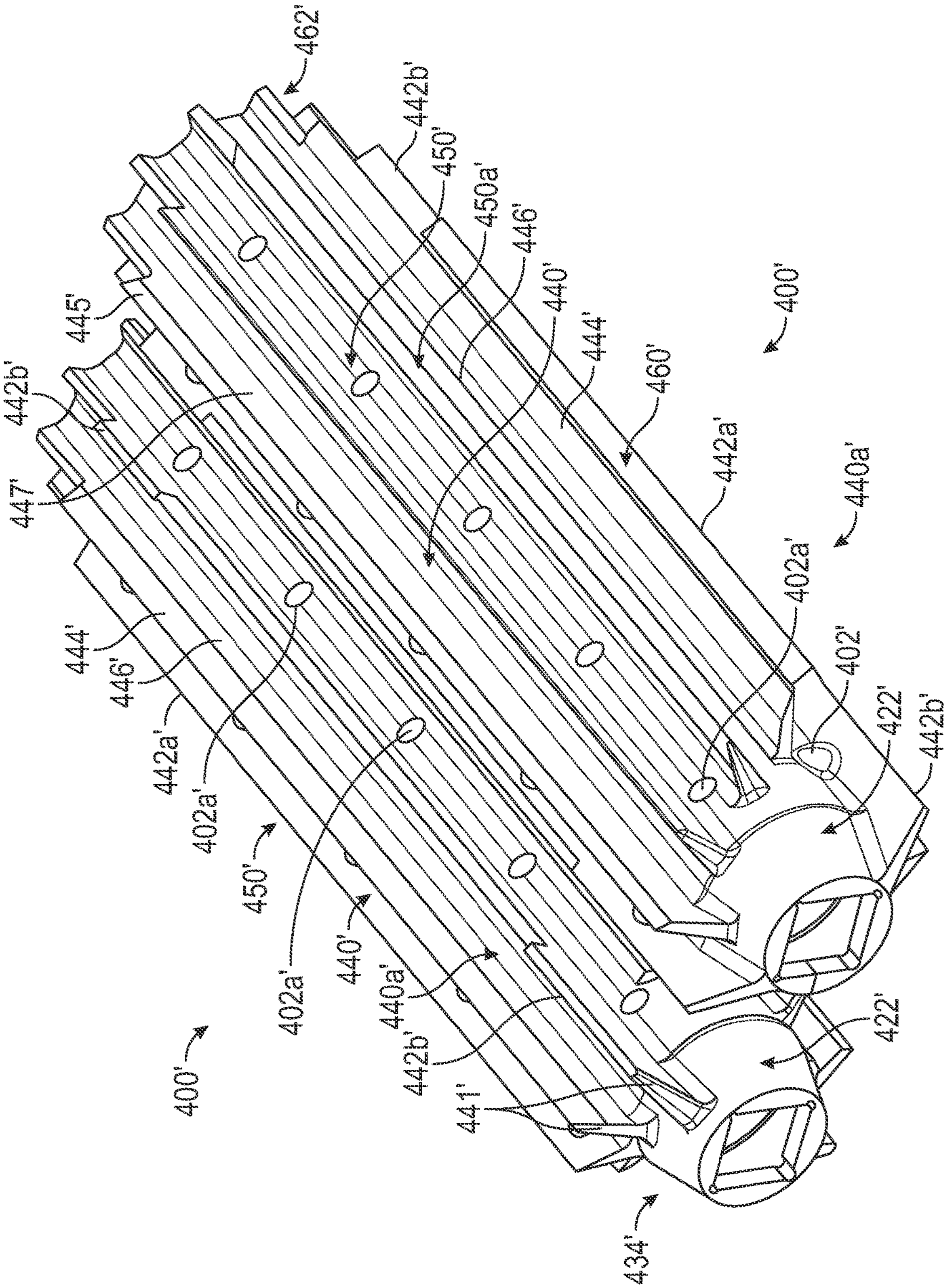
FIG. 34A is a top perspective view showing additional aspects of a pair of stalk rolls that may be configured for use with certain stalk roll drive shafts.
Figure 34B:
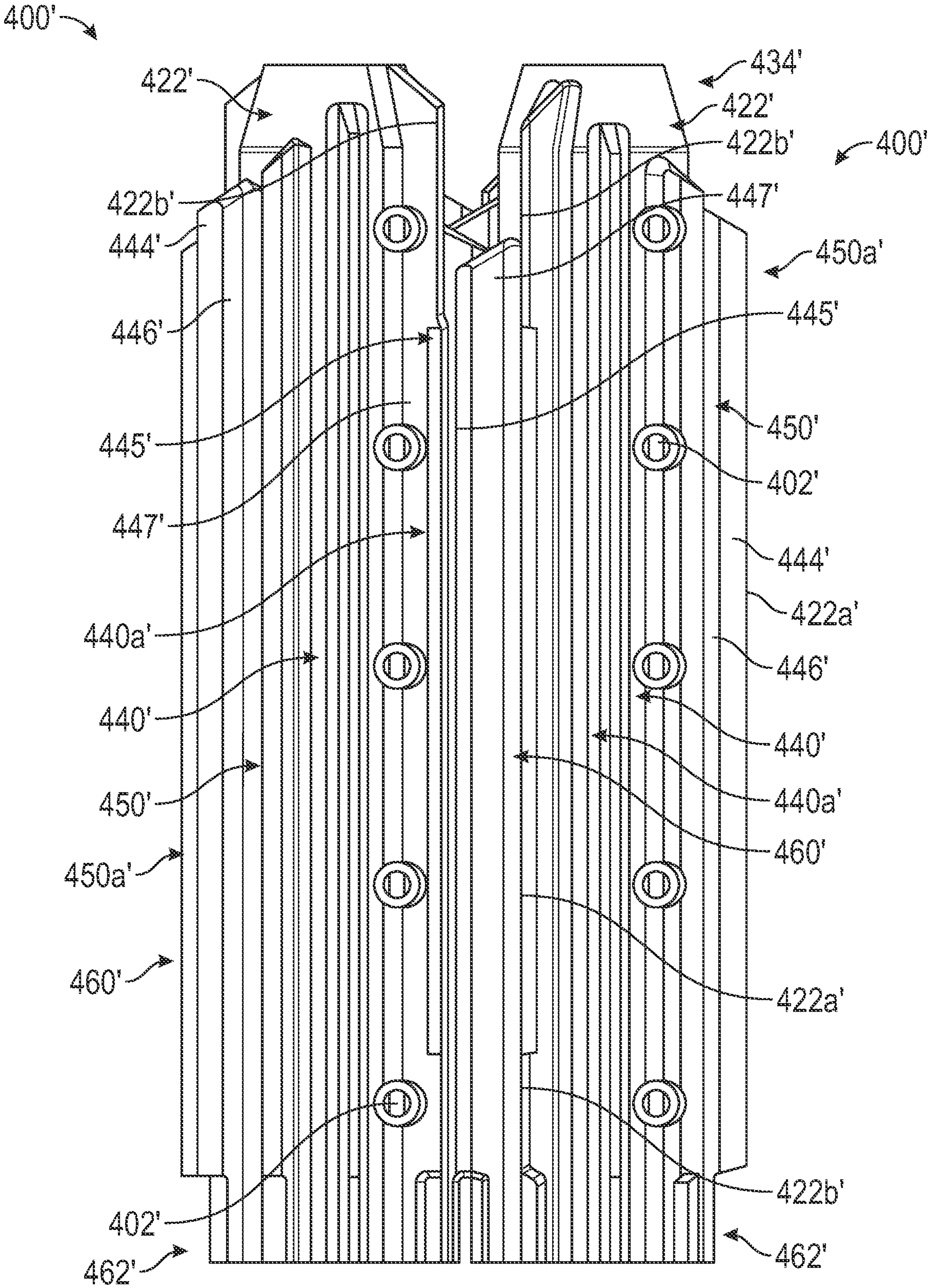
FIG. 34B is a top view of the pair of stalk rolls from FIG. 34A.
Figure 34C:
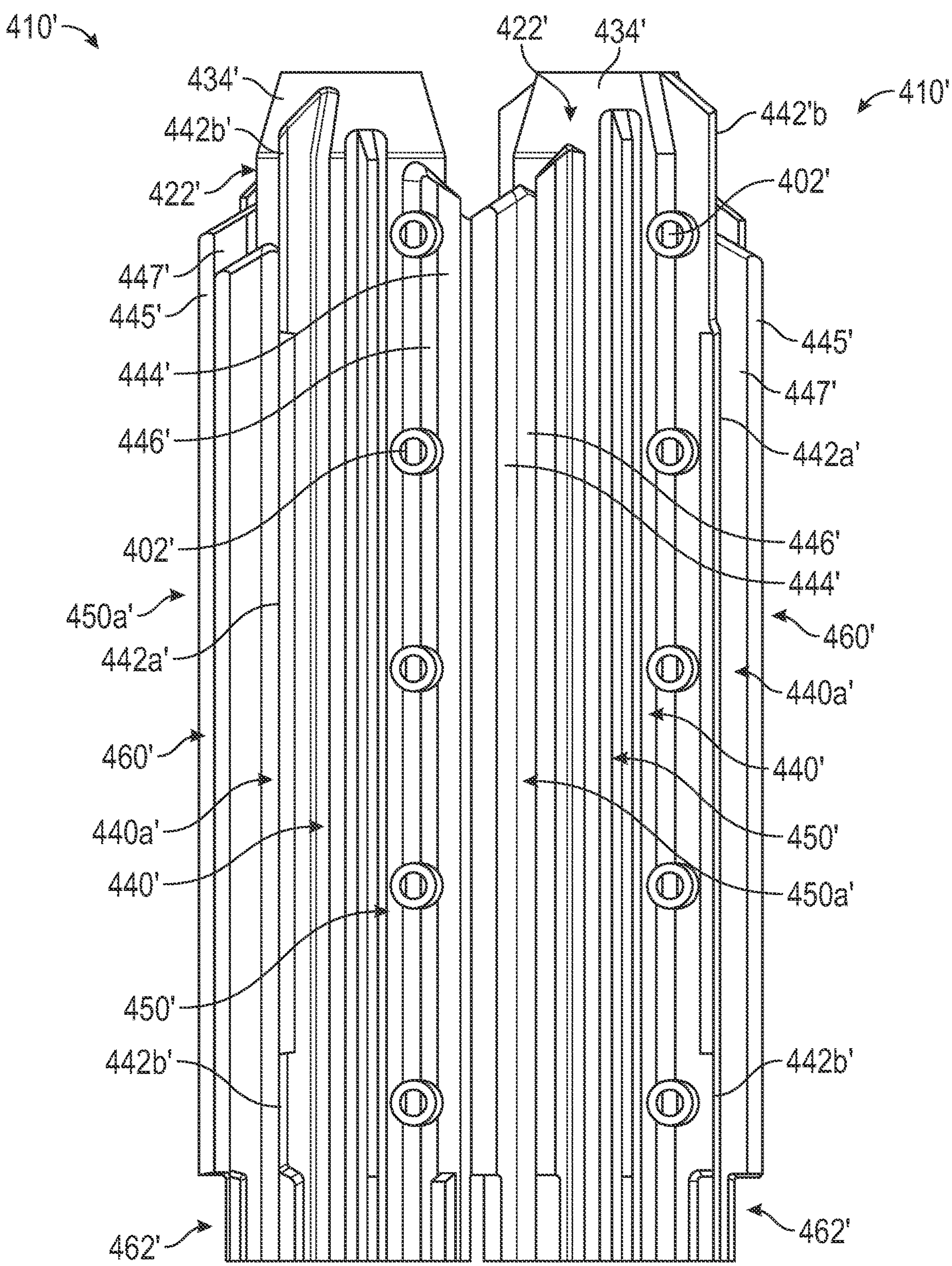
FIG. 34C is a bottom view of the pair of stalk rolls shown in FIGS. 34A & 34B.
Figure 34D:
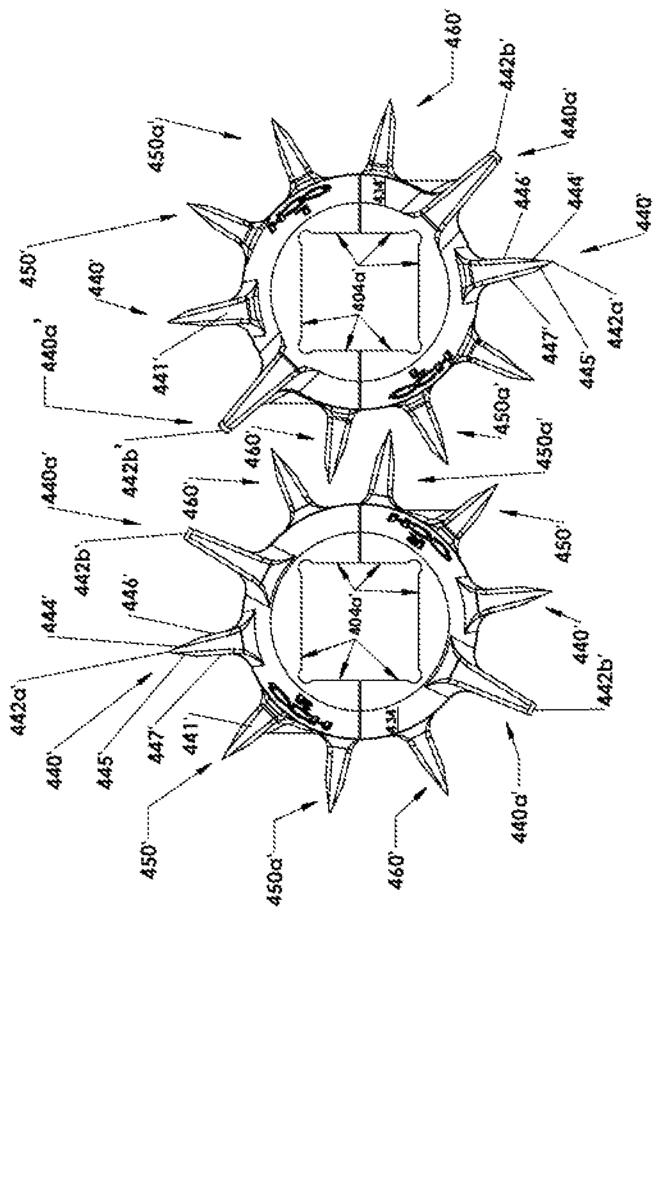
FIG. 34D is a front end view of the pair of stalk rolls shown in FIGS. 34A-34C.
Figure 34E:
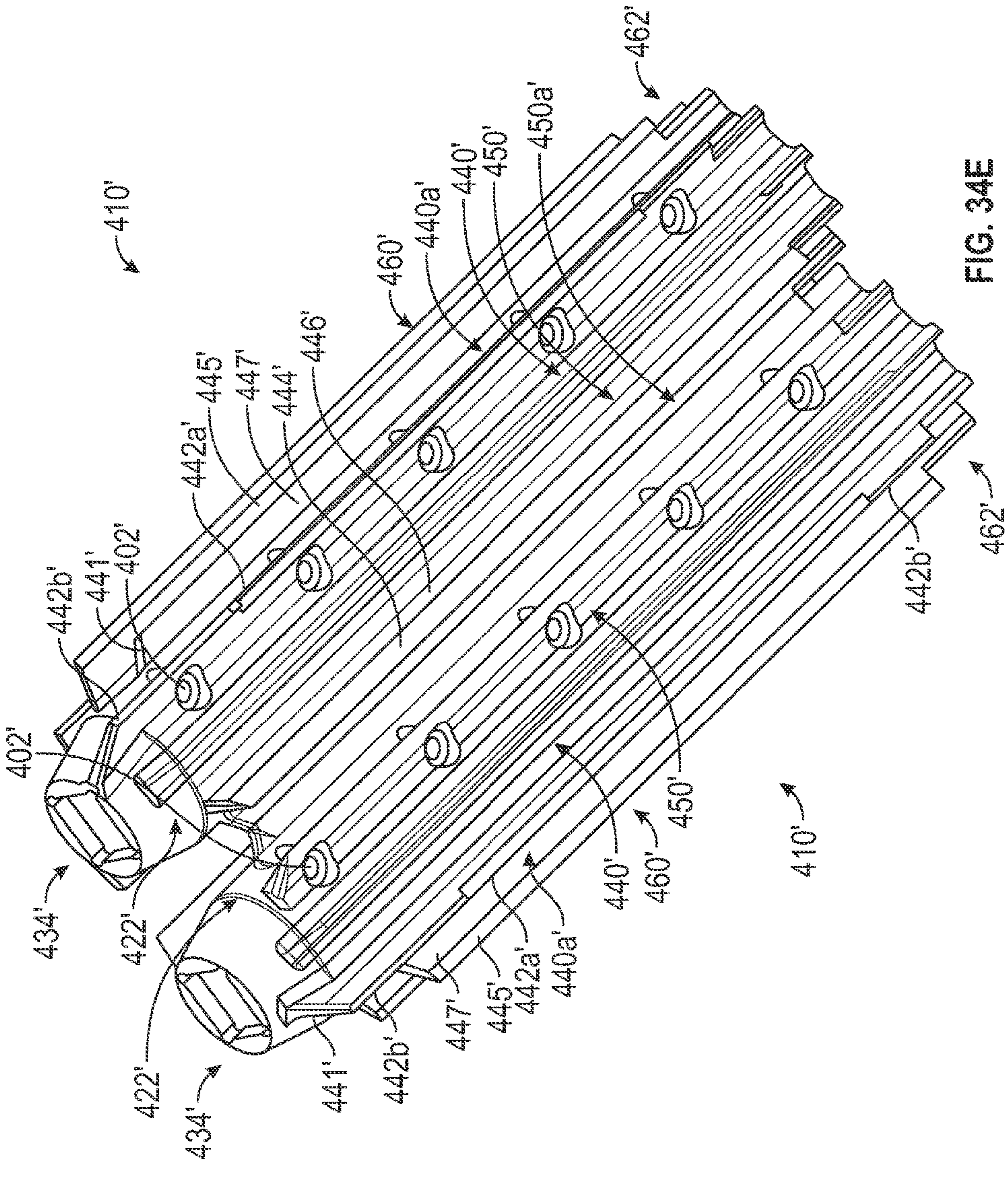
FIG. 34E is a bottom perspective view of the pair of stalk rolls shown in FIGS. 34A-34D.

With reference to FIG. 34D, a pair of opposing stalk rolls 400' may be configured such that corresponding flutes 440', **440*a*', 450', 450*a*', 460' on each stalk roll 400' may be positioned in relative proximity to one another in at least one moment in time per revolution of the stalk rolls 400'. As the stalk rolls 400' rotate, the flutes 440', 440*a*', 450', 450*a*', 460' may be configured such that a corn plant between the stalk rolls 400' generally may first encounter a hybrid flute(s) 440*a*', followed by a full flute(s) 440', followed by a reduced flute(s) 450', followed by a second reduced flute(s) 450*a*', followed by a short flute(s) 460'. However, it should be evident at least from FIG. 34D that multiple flutes 440', 440*a*', 450', 450*a*', 460' on one or more stalk rolls 400' may simultaneously engage a corn plant positioned between opposing stalk rolls 400'** without limitation unless so indicated in the following claims.

As described in detail above, each flute 440', **440*a*', 450', 450*a*', 460' on a given stalk roll 400' may be different in length than the corresponding flute 440', 440*a*', 450', 450*a*', 460' on a cooperating stalk roll 400' of an opposing pair. Further, this difference in length may be related to the difference in lengths between adjacent flutes 440', 440*a*', 450', 450*a*', 460' on a single stalk roll 400' such that the depth of the stalk engagement gap 25** may gradually and uniformly increase during operation.

In a manner similar to that described above for the stalk rolls shown in FIGS. 31A-33B, the stalk rolls 400' shown in FIGS. 34A-36D may be configured such that a hybrid flute **440*a*' of the left stalk roll 400' of an opposing pair may close the stalk engagement gap 25. Further, and as previously described in detail, a hybrid flute 440*a*' on the right stalk roll 400' of an opposing pair may follow the hybrid flute 440*a*' on the left stalk roll 400', a full flute 440' of a left stalk roll 400' may follow the hybrid flute 440*a*' of the right stalk roll 400', a full flute 440' of a right stalk roll 400' may follow the full flute 440' of the left stalk roll, a reduced flute 450' on the left stalk roll 400' may fallow the full flute 440' on the right stalk roll 400', and a reduced flute 450' on the right stalk roll 400' may follow the reduced flute 450' on the left stalk roll 400'. The differences in relative lengths among the various flutes 440', 440*a*', 450', 450*a*', 460' may vary one a given stalk roll 400' or on two stalk rolls 400'** of an opposing pair as previously described.

Referring to the stalk rolls 400' shown in FIGS. 34A-36D (with specific attention to FIG. 34D), a second reduced flute **450*a*' on the left stalk roll 400' may follow the reduced flute 450' on the right stalk roll 400', and may be slightly shorter than the reduced flute 450' on the right stalk roll 400'. This configuration may allow the stalk engagement gap 25 to increase in depth approximately equal to the difference in length between the reduced flute 450' on the right stalk roll 400' and the second reduced flute 450*a*' on the left stalk roll 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*', full flutes 440', reduced flutes 450', and second reduced flutes 450*a*' on the stalk rolls 400' such that this difference is approximately equal the difference in length between the full flute 440' on the right stalk roll 400' and the reduced flute 450' on the left stalk roll 400', to the difference in length between the full flutes 440', the difference in length between the hybrid flutes 440*a*', and the difference in length between the hybrid flute 440*a*' on the right stalk roll 400' and the full flute 440' on the left stalk roll 400'** to provide a relatively smooth transition as a corn plant moves in a direction toward the harvester.

In an aspect, a second reduced flute **450*a*' on the right stalk roll 400' may follow the second reduced flute 450*a*' on the left stalk roll 400', and may be slightly shorter than the second reduced flute 450*a*' on the left stalk roll 400'. This configuration may allow the stalk engagement gap 25 to increase in depth approximately equal to the difference in length between the second reduced flutes 450*a*' on the right and left stalk rolls 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440*a*', full flutes 440', reduced flutes 450', and second reduced flutes 450*a*' on the stalk rolls 400' such that this difference is approximately equal to the difference in length between the reduced flute 450' on the right stalk roll 400' and the second reduced flute 450*a*' on the left stalk roll 400', the difference in length between the full flute 440' on the right stalk roll 400' and the reduced flute 450' on the left stalk roll 400', the difference in length between the full flutes 440', the difference in length between the hybrid flutes 440$a$', and the difference in length between the hybrid flute 440$a$' on the right stalk roll 400' and the full flute 440' on the left stalk roll 400'** to provide a relatively smooth transition as a corn plant moves in a direction toward the harvester.

In an aspect, a short flute 460' on the left stalk roll 400' may follow the second reduced flute 450$a$' on the right stalk roll 400', and may be slightly shorter than the second reduced flute 450$a$' on the right stalk roll 400'. This configuration may allow the stalk engagement gap 25 to increase in depth approximately equal to the difference in length between the second reduced flute 450' on the right stalk roll 400' and the short flute 460' on the left stalk roll 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440$a$', full flutes 440', reduced flutes 450', second reduced flutes 450$a$, and short flutes 460' on the stalk rolls 400' such that this difference is approximately equal to the difference in length between the second reduced flutes 450$a$', the difference in length between the reduced flute 450' on the right stalk roll 400' and the second reduced flute 450$a$' on the left stalk roll 400', the difference in length between the full flute 440' on the right stalk roll 400' and the reduced flute 450' on the left stalk roll 400', the difference in length between the full flutes 440', the difference in length between the hybrid flutes 440$a$', and the difference in length between the hybrid flute 440$a$' on the right stalk roll 400' and the full flute 440' on the left stalk roll 400' to provide a relatively smooth transition as a corn plant moves in a direction toward the harvester In an aspect, a short flute 460' on the right stalk roll 400' may follow the short flute 460' on the left stalk roll 400', and may be slightly shorter than the short flute 460' on the left stalk roll 400'. This configuration may allow the stalk engagement gap 25 to increase in depth approximately equal to the difference in length between the short flutes 450' on the right and left stalk rolls 400'. In an aspect, this difference in length may be as little as 0.1 inches or as great as 1.5 inches, however, it is contemplated that in certain applications a difference of approximately 0.375 inch may be beneficial. Further, it may be advantageous to configure the hybrid flutes 440$a$', full flutes 440', reduced flutes 450', second reduced flutes 450$a$, and short flutes 460' on the stalk rolls 400' such that this difference is approximately equal to the difference in length between the second reduced flute 450' on the right stalk roll 400' and the short flute 460' on the left stalk roll 400', the difference in length between the second reduced flutes 450$a$', the difference in length between the reduced flute 450' on the right stalk roll 400' and the second reduced flute 450$a$' on the left stalk roll 400', the difference in length between the full flute 440' on the right stalk roll 400' and the reduced flute 450' on the left stalk roll 400', the difference in length between the full flutes 440', the difference in length between the hybrid flutes 440$a$', and the difference in length between the hybrid flute 440$a$' on the right stalk roll 400' and the full flute 440' on the left stalk roll 400' to provide a relatively smooth transition as a corn plant moves in a direction toward the harvester In an aspect, a hybrid flute 440$a$' from the left stalk roll 400' may follow a short flute 460' on the right stalk roll 400', which may again close the stalk engagement gap 25. From the preceding description, it will be apparent that each flute 440', 440$a$', 450', 450$a$', 460' on a given stalk roll 400' may be different in length than the corresponding flute 440', 440$a$', 450', 450$a$', 460' on a cooperating stalk roll 400' of an opposing pair. Further, this difference in length may be related to the difference in lengths between adjacent flutes 440', 440$a$', 450', 450$a$', 460' on a single stalk roll 400' such that the depth of the stalk engagement gap 25 may gradually and uniformly increase during operation. However, any advantageous configuration of varying the depth, shape, or other characteristic of the stalk engagement gap 25, bladeless area 422', and/or the length of flutes 440', 440$a$', 450', 450$a$', 460' on a single stalk roll 400' and/or on a pair of stalk rolls 400' may be used without departing from the scope of the present disclosure unless so indicated in the following claims. Accordingly, the above-mentioned dimensions are not meant to limit the scope of the present disclosure unless so indicated in the following claims.

As previously described in detail for certain aspects of a stalk roll 400', the stalk rolls 400' may be configured for engagement with a stalk roll drive shaft having a square cross-sectional shape (not shown), and that a stalk roll 400' may be formed as two portions, each portion constituting one half of the stalk roll 400'. Referring specifically to FIGS. 35D and 36D, the stalk roll 400' may be formed with one or more support members 404' on an interior surface of the main cylinder 430' (and/or taper 434'). The optimal number of support members 404' may vary from one application of the stalk roll 400' to the next, and may be dependent at least on the length of the stalk roll 400'. Accordingly, even though the stalk rolls 400' shown in FIGS. 34A-36D may employ five support members 404' generally equally spaced along the length of the stalk roll 400', other numbers, configurations, spacing, etc. of support members 404' may be used without limitation unless so indicated in the following claims.

An interior surface of a support member 404' may be configured as a generally planar surface 404$a$'. It is contemplated that one or more generally planar surfaces 404$a$' of a stalk roll 400' may directly engage the outer surface of a stalk roll drive shaft when the stalk roll 400' is engaged therewith. The optimal configuration of the generally planar surfaces 404$a$' may vary from one application of the stalk roll 400' to the next, and may be dependent at least on the manufacturing and/or machining tolerances of the stalk roll drive shaft for which the stalk roll 400' is designed. In an aspect, when two stalk roll 400' halves are engaged with a given stalk roll drive shaft, eight generally planar surfaces 404$a$' (four one each half) may engage the outer surface of the stalk roll drive shaft at each support member 404'.

In an aspect a given support member 404' on one half of a stalk roll 400' may be formed with four generally planar surfaces 404$a$ thereon, wherein each generally planar surface 404$a$' may be grouped in two pairs forming right-angled surfaces. It is contemplated that one corner of the stalk roll drive shaft may seat in each of these right-angled surfaces, such that when the stalk roll drive shaft rotates, the stalk roll 400' engaged therewith also rotates. The surface area of a generally planar surface 404$a$' may be relatively constant and rectangular or square in shape.

Referring to FIGS. 35D & 36D, in an aspect it is contemplated that during manufacturing, the support members 404' may generally be in the shape of a half circle. In an aspect, the diametric cross-section of the support member 404' may be approximately constant such that the interior of the various support members 404' generally may form half of a cylinder. The generally planar surfaces 404$a$' may be cut into the semi-circular support member 404', which due to the configuration of the support members 404', may result in the surface area of a generally planar surface 404$a$' to be approximately constant in a dimension parallel to the longitudinal axis of the stalk roll 400'. The interior surface of the taper 434' on the main cylinder 430' may be configured to engage the outer surface of a stalk roll drive shaft having generally the same size and shape as that for which the generally planar surfaces **404*a*'** are configured without limitation unless so indicated in the following claims.

Even though the stalk rolls 400' shown in FIGS. 34A-36D may employ four generally planar surfaces **404*a*' (having a generally rectangular shape) on a given support member 404' on each half of a stalk roll 400' (wherein two generally planar surfaces 404*a*' may reside in a common first plane and two other generally planar surfaces 404*a*' may reside in separate second and third planes that may be parallel with respect to one another but perpendicular with respect to the first plane), other numbers, configurations, sizes, shapes, spacing, etc. of generally planar surfaces 404*a*'** may be used without limitation unless so indicated in the following claims.

Each portion may be formed with one or more apertures 402' and/or corresponding anchors **402*a*', which apertures 402' and/or anchors 402*a*' may be formed in a portion of a support structure 404'. In an aspect, the anchors 402*a*' may be formed as tapped holes such that a bolt may pass through an aperture 402' and engage a corresponding anchor 402*a*', whereby tightening the bolt causes the two halves of the stalk roll 400' to clamp onto the stalk roll drive shaft. In an aspect, one half of a stalk roll 400' may be configured with a row of apertures 402' and a row of anchors 402', such that half of the bolts (or other fasteners) engaging corresponding apertures 402' and anchors 402*a*'** are oriented in one direction and the other half are oriented in the opposite direction.

Although the stalk rolls 400' in FIGS. 34A-36D are shown with five apertures 402' and five corresponding anchors **402*a*', any suitable number of anchors 402*a*' and/or apertures 402' may be used without limitation unless so indicated in the following claims. Additionally, the scope of the stalk roll 400' disclosed and claimed herein is not limited by the structure and/or method used to secure the two halves of a stalk roll 400' together, and any suitable method and/or structure for securely positioning one half of a stalk roll 400' with respect to the corresponding half of the stalk roll 400'** may be used without limitation unless so indicated in the following claims.

Other stalk rolls 15, 16, 190, 192, 400, 400' that may employ a hybrid flute **440*a*, 440*a*', bladeless area 422, and/or other aspects of stalk rolls 15, 16, 190, 192, 400, 400' previously described and/or disclosed herein are shown in FIGS. 47A-52C. In an aspect, it is contemplated that the pair of stalk rolls 400 shown in FIGS. 47A-47E and the single stalk rolls 400 shown in FIGS. 48A-49C may be configured for use with a John Deere Series 600 corn head and/or corn head row unit thereof without limitation unless so indicated in the following claims. Accordingly, in an aspect the internal components and nose cone 410 of the stalk roll(s) 400 shown in those figures may be configured in a manner similar to that previously described herein and as related to FIGS. 29A-30B. However, other internal components, mounting components, and/or nose cones 410 may be used with any stalk roll 15, 16, 190, 192, 400, 400'** disclosed herein without limitation unless so indicated in the following claims.

The stalk rolls 400 shown in FIGS. 47A-49C may be configured with a total of ten flutes 440, **440*a*, 450, 450*a*, 460 on each stalk roll 400, wherein the flutes 440, 440*a*, 450, 450*a*, 460 may be positioned with respect to one another in a manner similar to, and have relative dimensions with respect to one another in a correlative manner to the configurations previously described for the stalk rolls 400, 400' shown in FIGS. 34A-36D (which also are shown with a total of ten flutes 440, 440*a*, 450, 450*a*, 460 on each stalk roll 400'). However, the scope of the present disclose is not so limited, and the optimal number of flutes 440, 440*a*, 450, 450*a*, 460 may vary from one application to the next. Accordingly, the scope of the present disclosure is not limited by the number of flutes 440, 440*a*, 450, 450*a*, 460** unless so indicated in the following claims.

In an aspect, it is contemplated that the pair of stalk rolls 400 shown in FIGS. 50A-50E and the single stalk rolls 400 shown in FIGS. 51A-52C may be configured for use with a Gleaner Hugger brand corn head and/or corn head row unit thereof without limitation unless so indicated in the following claims. In an aspect, the stalk roll(s) 400 shown in FIGS. 50A-52C may be constructed in a manner similar to the stalk rolls 400, 400' shown in FIGS. FIGS. 31A-33B and 34A-36D. However, in an aspect the stalk rolls 400 shown in FIGS. 50A-52C may be configured to engage a stalk roll drive shaft having a circular and/or nonlinear cross-sectional shape without limitation unless so indicated in the following claims.

The stalk rolls 400 shown in FIGS. 50A-52C may be configured with a total of eight flutes 440, **440*a*, 450, 450*a*, 460 on each stalk roll 400, wherein the flutes 440, 440*a*, 450, 450*a*, 460 may be positioned with respect to one another in a manner similar to, and have relative dimensions with respect to one another in a correlative manner to the configurations previously described for the stalk rolls 400, 400' shown in FIGS. 31A-33B (which also are shown with a total of eight flutes 440, 440*a*, 450, 450*a*, 460 on each stalk roll 400'). However, the scope of the present disclose is not so limited, and the optimal number of flutes 440, 440*a*, 450, 450*a*, 460 may vary from one application to the next. Accordingly, the scope of the present disclosure is not limited by the number of flutes 440, 440*a*, 450, 450*a*, 460** unless so indicated in the following claims.

8. Alternative Aspects of Flutes

Various other aspects of a flute that may be used with any suitable stalk roll are shown in FIGS. 37-44, wherein FIGS. 37-40 provide views of a flute that may be positioned on a left stalk roll of a corresponding pair and FIGS. 41-44 provide views of a flute that may be positioned on a right stalk roll. Generally, the flutes shown in FIGS. 37-44 may be configured as hybrid flutes **440*a*. As such, those hybrid flutes 440*a* may be configured in a manner similar to other hybrid flutes 440*a* disclosed herein (including but not limited to those shown in FIGS. 26A, 27A, & 27B). In an aspect, it is contemplated that the flat flute edge 442 on the front of the hybrid flutes 440*a* shown in FIGS. 37-44 may be lengthened compared to that flute edge 442 on the hybrid flute 440*a* shown in FIG. 26A. The amount by which that flute edge 442 may be lengthened in no way limits the scope of the present disclosure unless so indicated in the following claims, but it is contemplated that for several applications the relative proportions of the aspects of a hybrid flute 440*a* may be as shown in FIGS. 37-44. Additionally, the transitional area between the flat flute edge 442 and the sharpened flute edge 442 may be configured with a ramp, which ramp may ease transition of a stalk from an area adjacent the flat flute edge 442 and the sharpened flute edge 442. It is contemplated that a flat flute edge 442 may be configured with hard facing thereon and/or other structures and/or methods designed to increase the longevity and/or hardness of the flute edge 442**. Such hard facing may be accomplished via welding, but the scope of the present disclosure is not so limited unless so indicated in the following claims.

In an aspect, a rear portion of the hybrid flutes 440*a* shown in FIGS. 37-44 may be configured with a flat flute edge 442. As with flat flute edges 442 positioned adjacent the front of the hybrid flute 440*a*, those positioned adjacent the rear thereof may be configured with hard facing thereon and/or other structures and/or methods designed to increase the longevity and/or hardness of the flute edge 442. Such hard facing may be accomplished via welding, but the scope of the present disclosure is not so limited unless so indicated in the following claims. As with the flat flute edge 442 positioned adjacent the front of the hybrid flute 440*a*, a rearward flat flute edge 442 may be configured with a transitional area between the flat flute edge 442 and the sharpened flute edge 442. In an aspect, this transitional area may be configured with a ramp, which ramp may ease transition of a stalk from an area adjacent the flat flute edge 442 and the sharpened flute edge 442.

Figure 45:
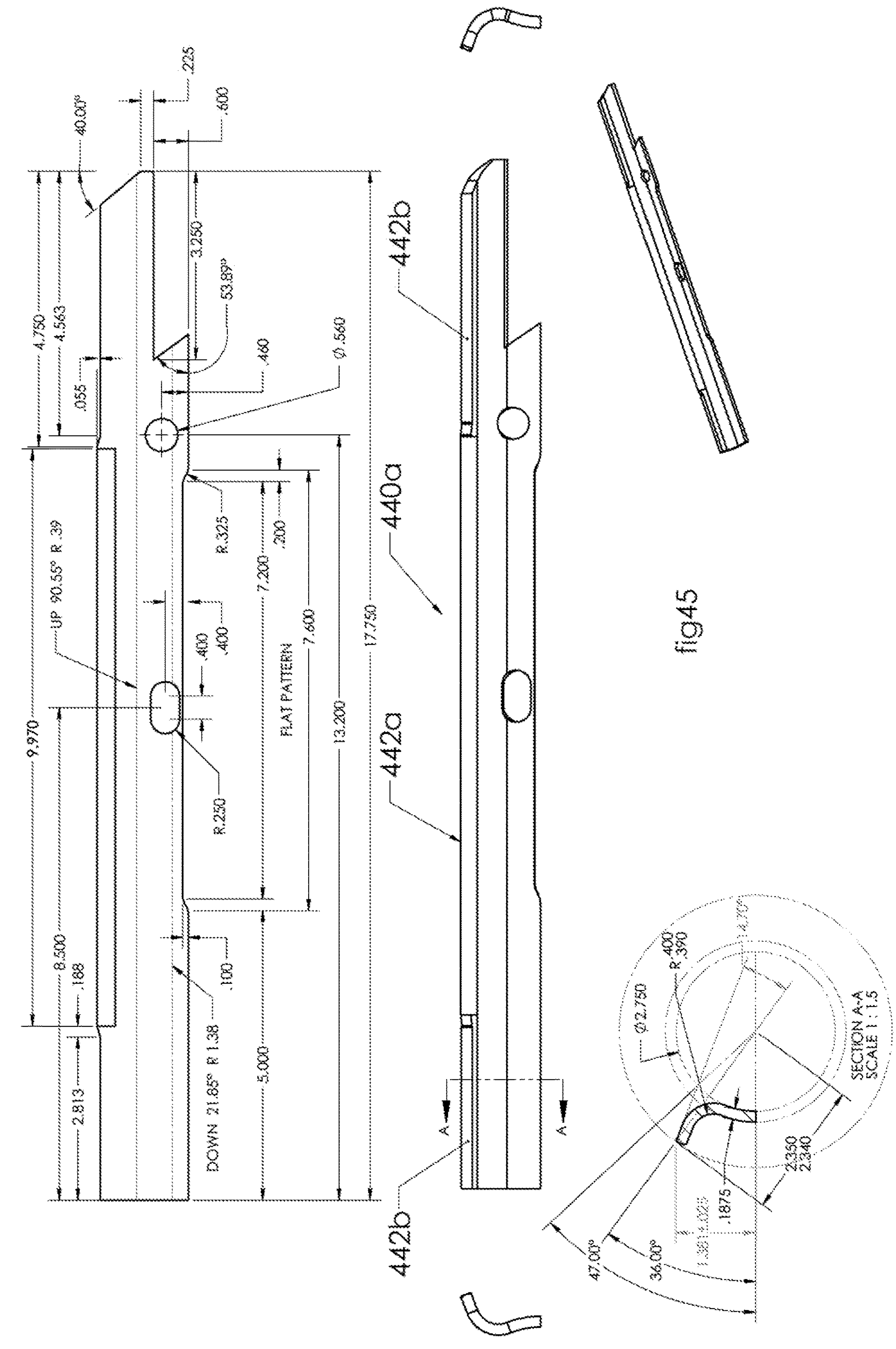
FIG. 45 provides several views of various aspects of a hybrid flute that may be positioned on one stalk roll of a cooperating pair of stalk rolls.
Figure 46:
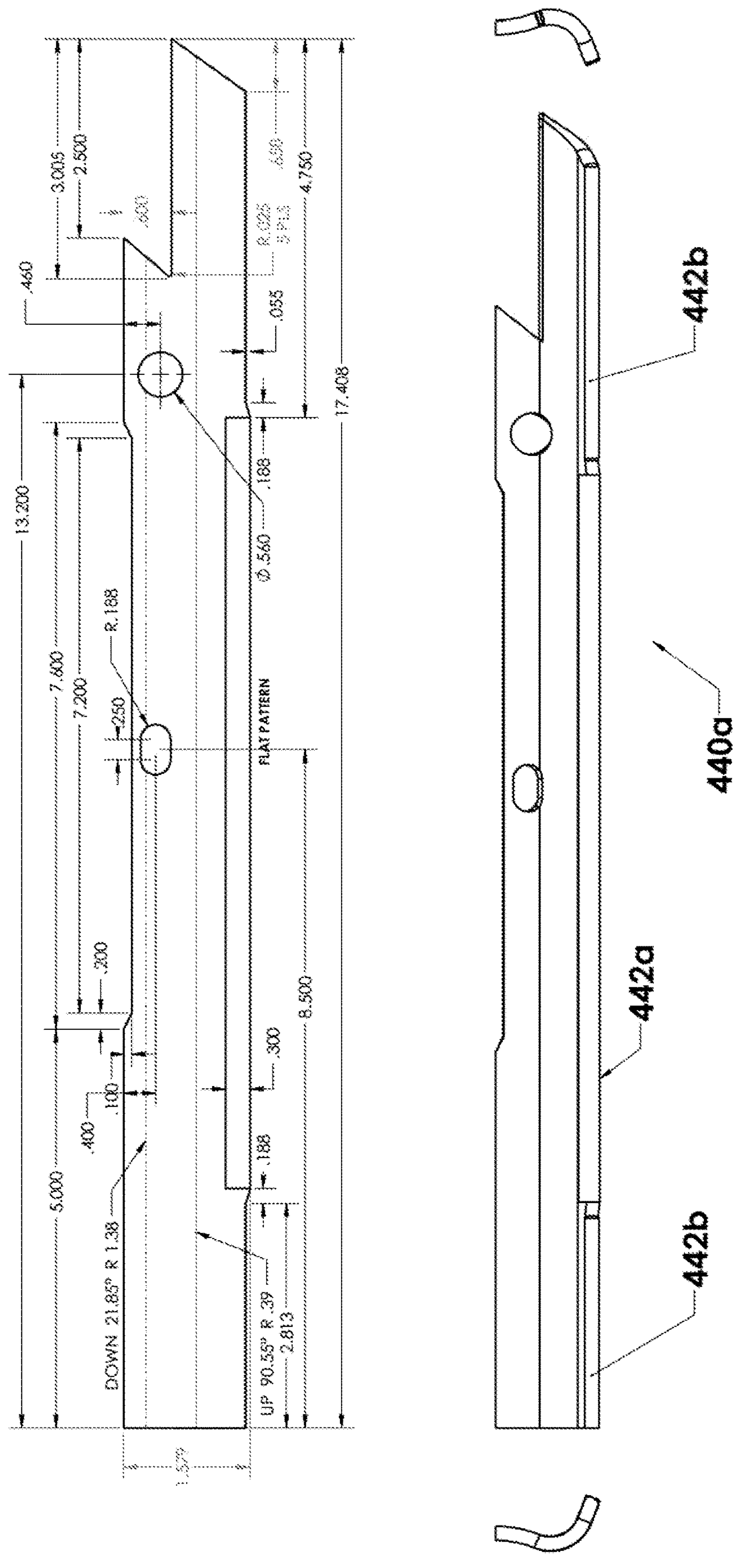
FIG. 46 provides several views of various aspects of a hybrid flute that may be positioned on one stalk roll of a cooperating pair of stalk rolls.
Figure 47A:
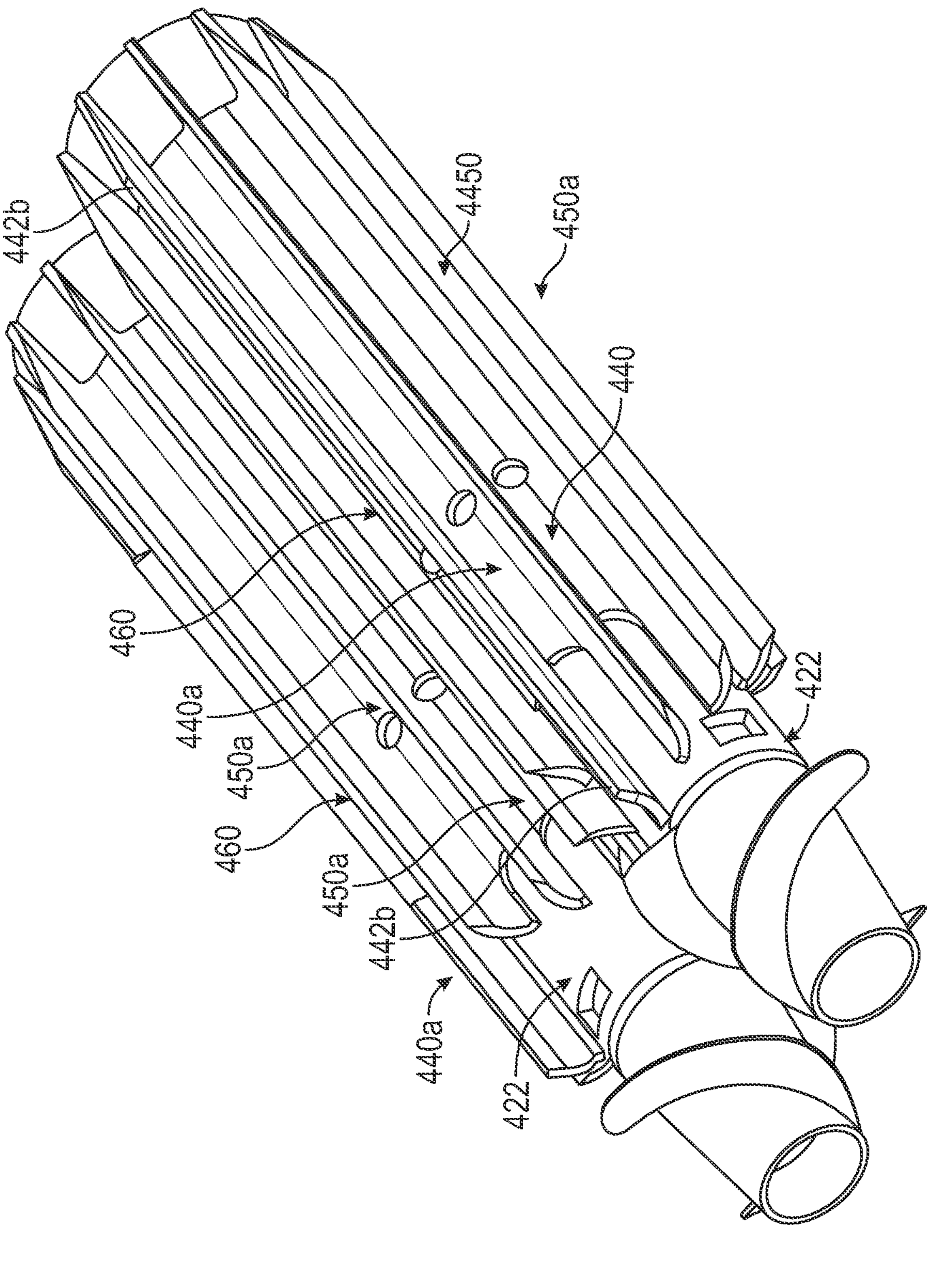
FIG. 47A is a top perspective view showing additional aspects of a pair of stalk rolls that may be configured for use with certain stalk roll drive shafts.
Figure 47B:
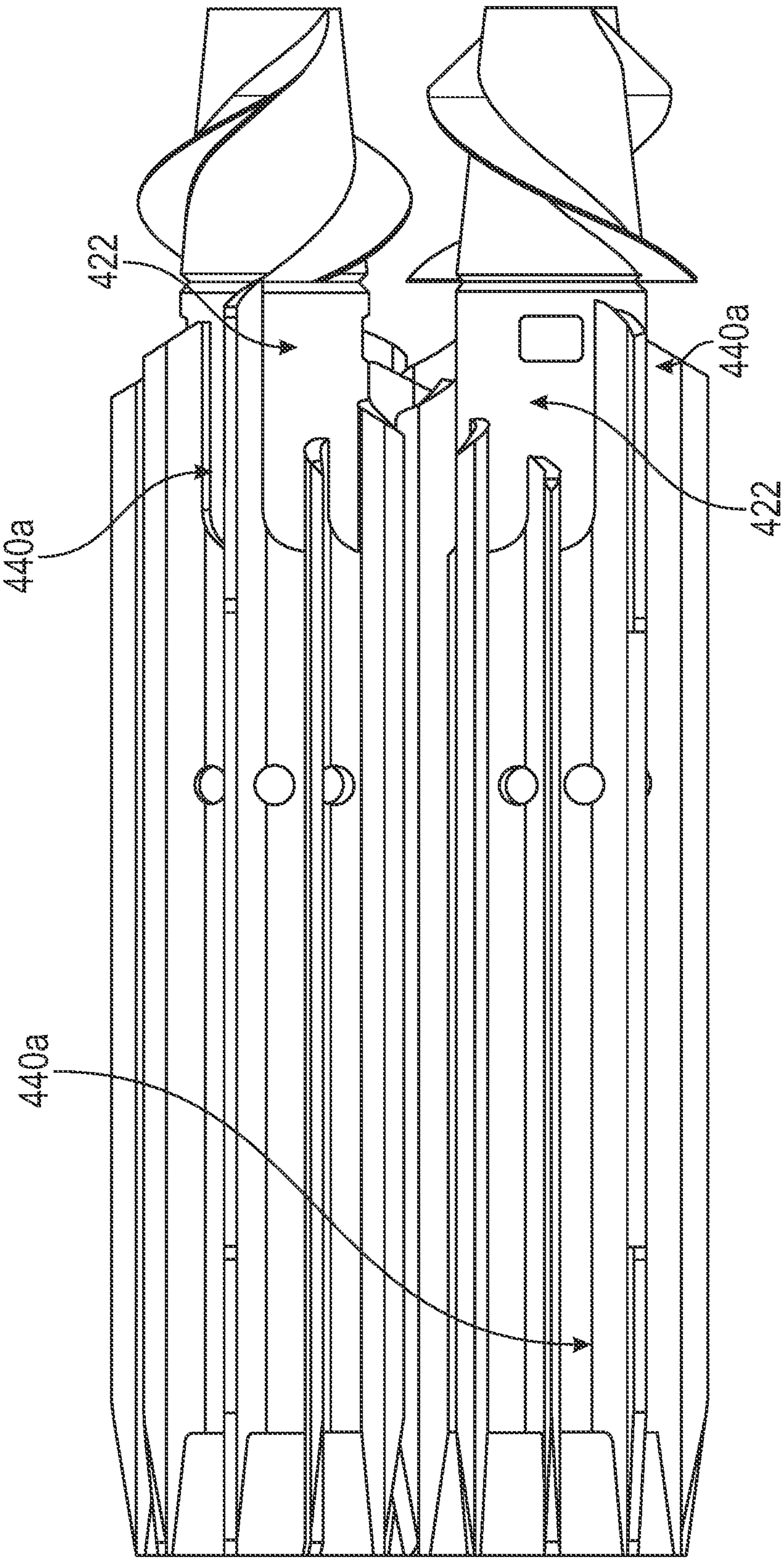
FIG. 47B is a top view of the pair of stalk rolls from FIG. 47A.
Figure 47C:
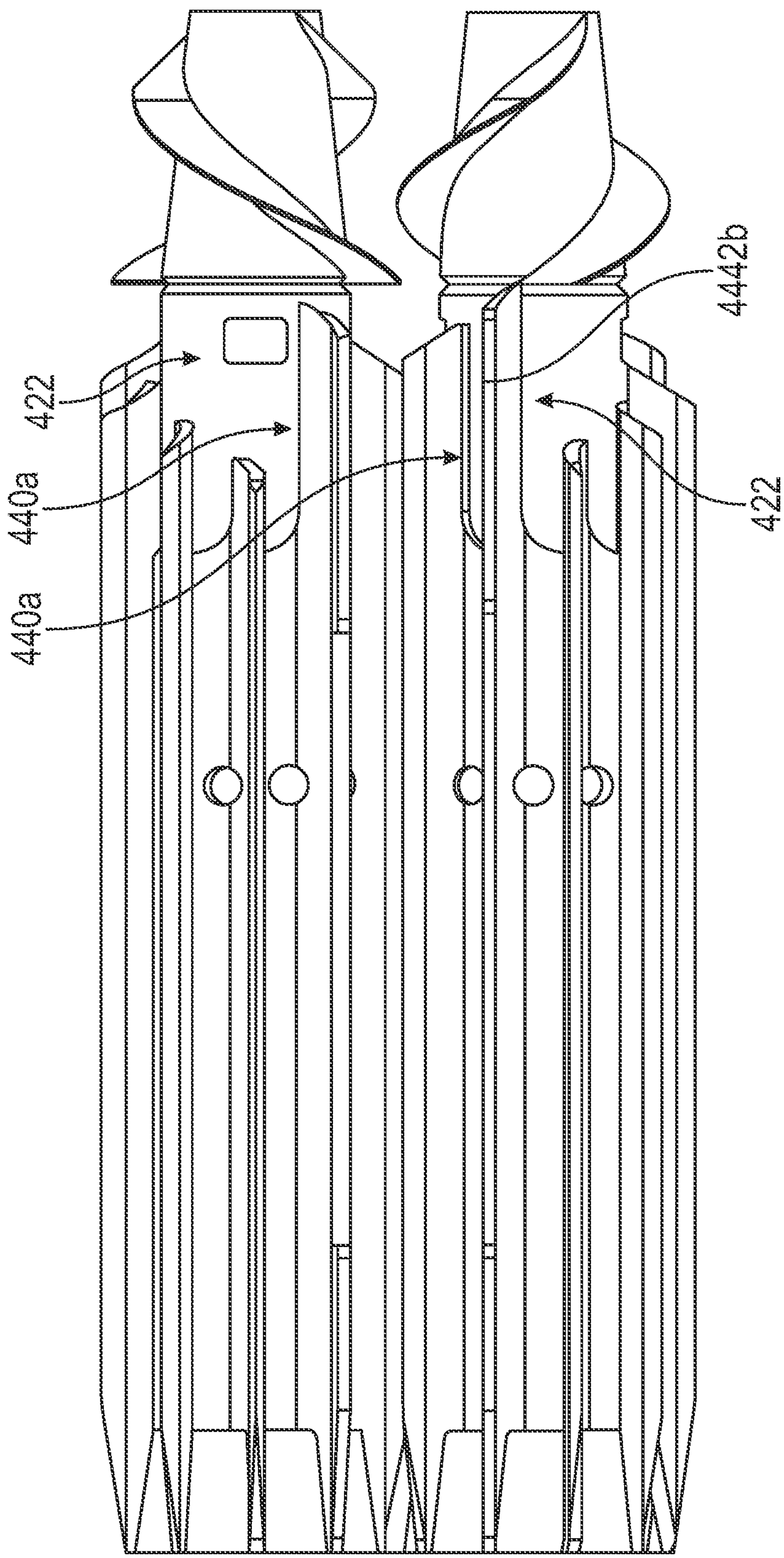
FIG. 47C is a bottom view of the pair of stalk rolls shown in FIGS. 47A & 47B.
Figure 47D:
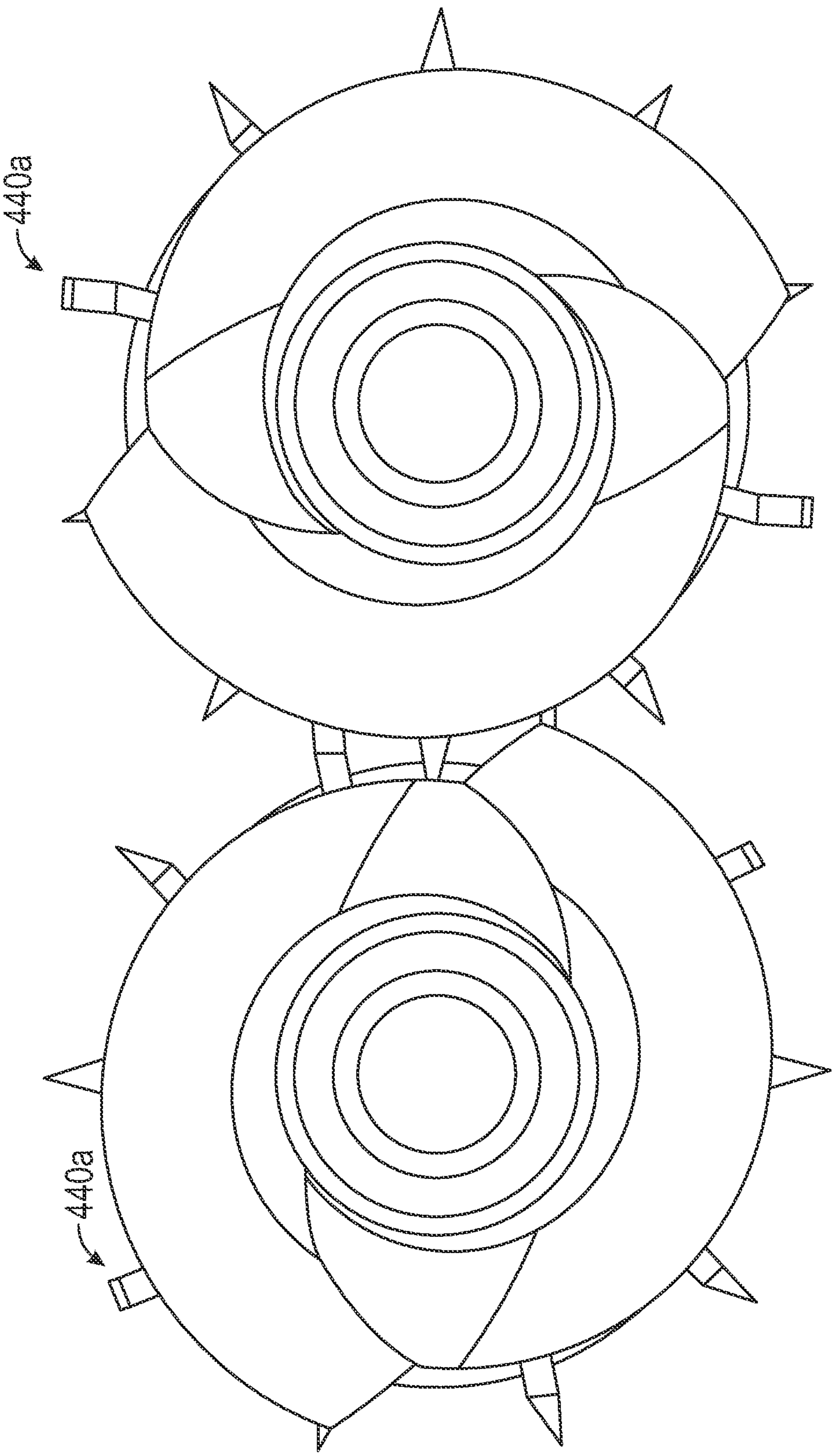
FIG. 47D is a front end view of the pair of stalk rolls shown in FIGS. 47A-47C.
Figure 47E:
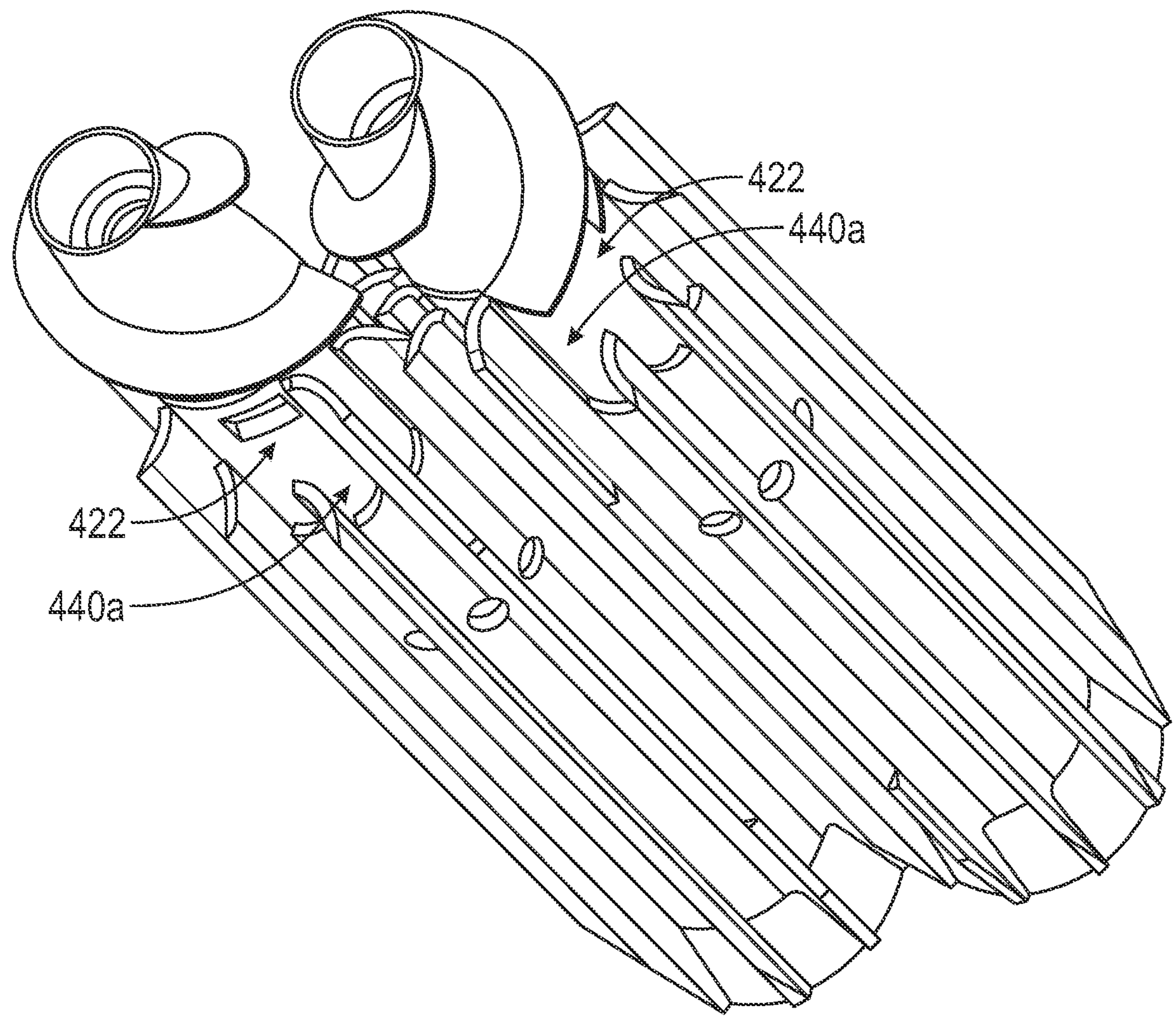
FIG. 47E is a bottom perspective view of the pair of stalk rolls shown in FIGS. 47A-47D.
Figure 48A:
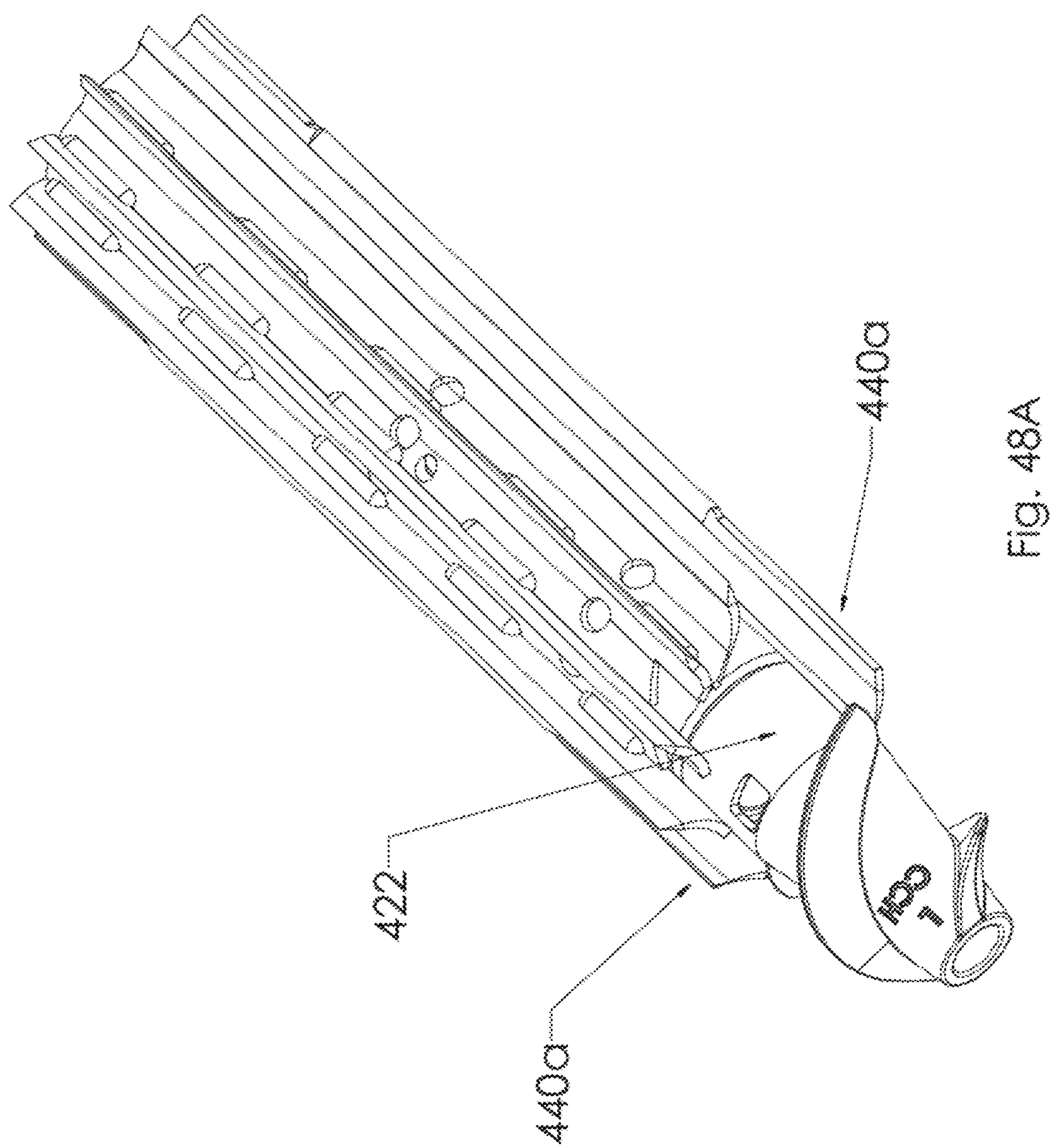
FIG. 48A is a perspective view of the left stalk roll shown in FIGS. 47A-47E.
Figure 48B:
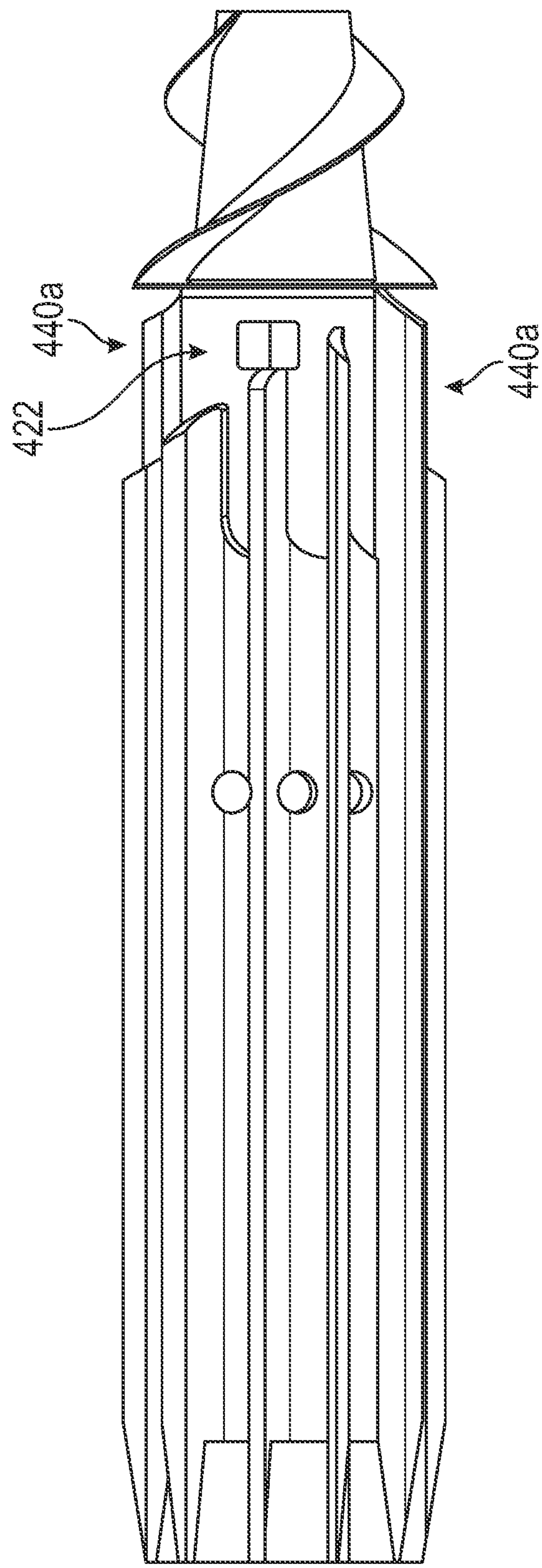
FIG. 48B is a side view of the stalk roll shown in FIG. 48A.
Figure 48C:
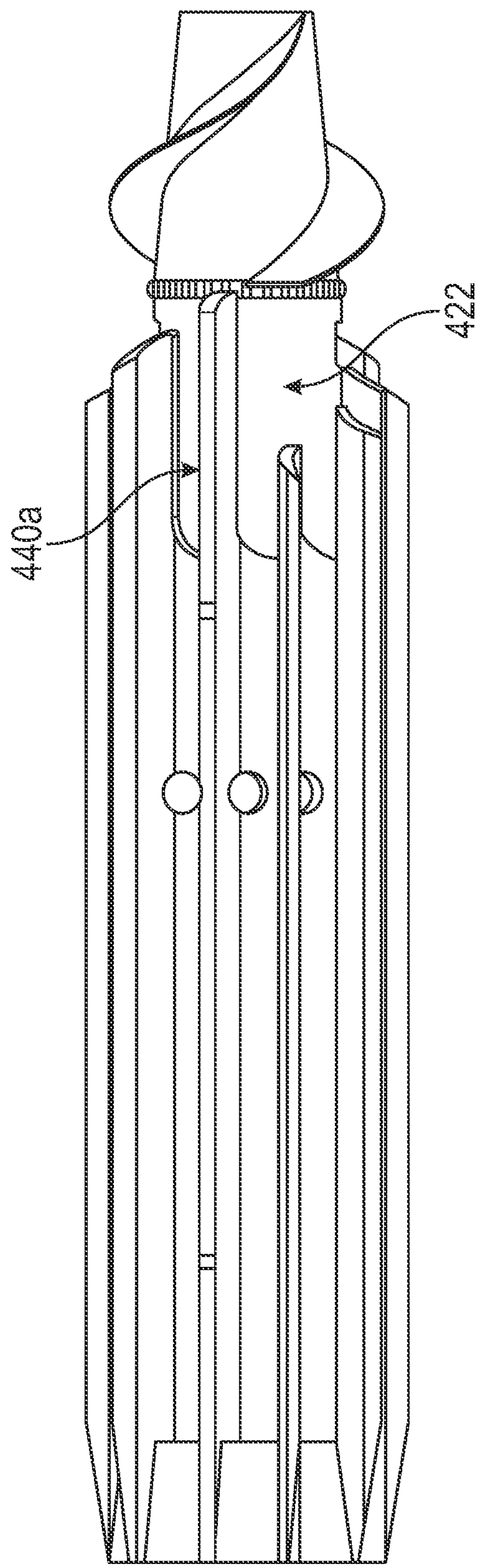
FIG. 48C is top view of the stalk roll shown in FIGS. 48A and 48B.
Figure 49A:
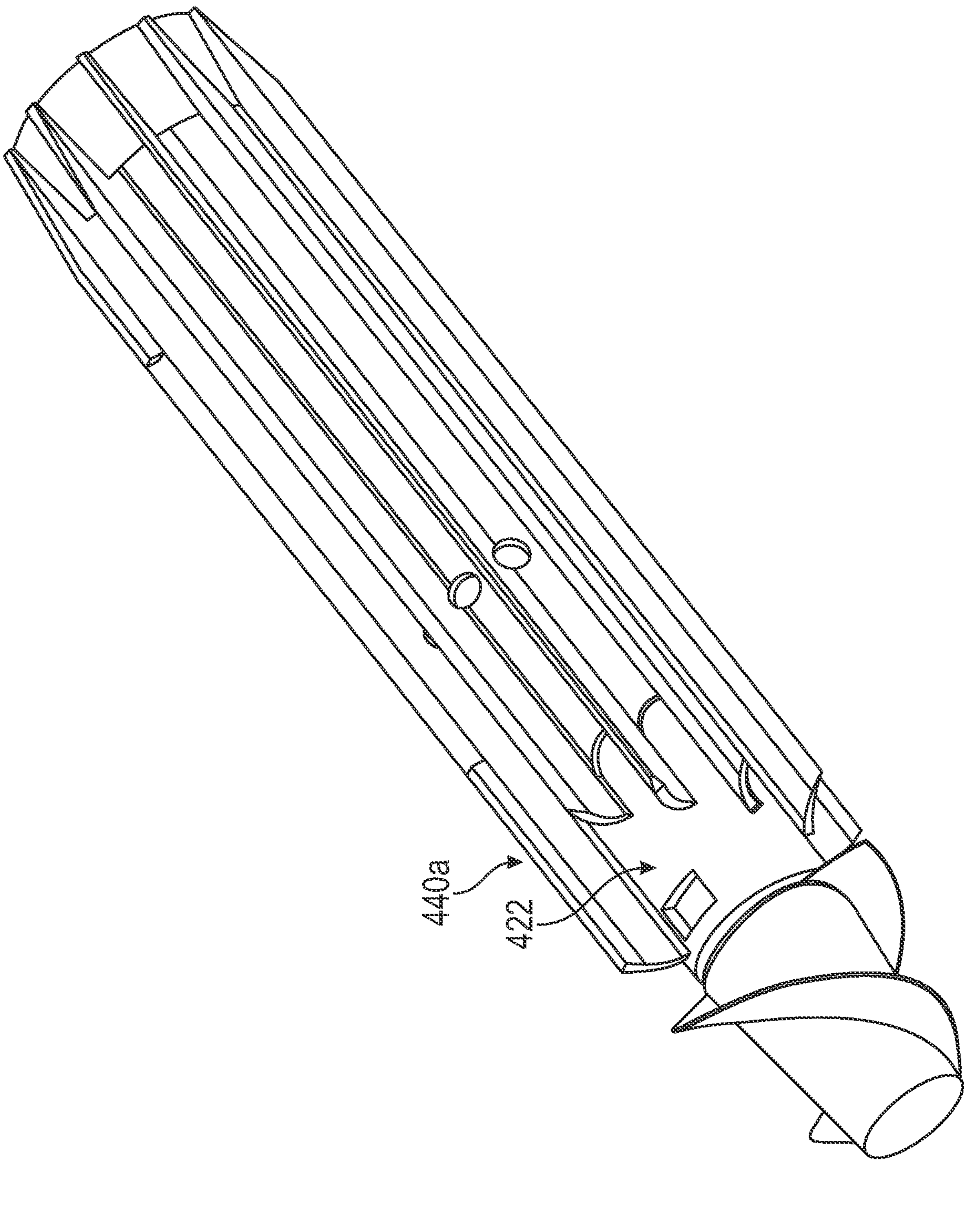
FIG. 49A is a perspective view of the right stalk roll shown in FIGS. 47A-47E.
Figure 49B:
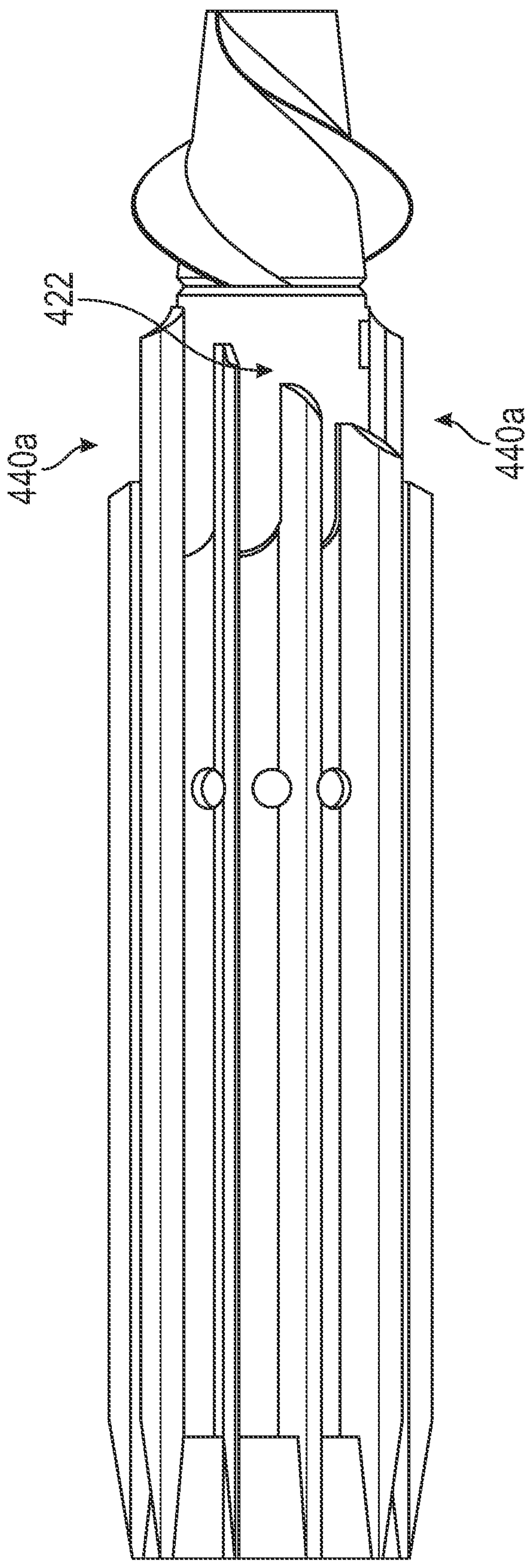
FIG. 49B is a side view of the stalk roll shown in FIG. 49A.
Figure 49C:
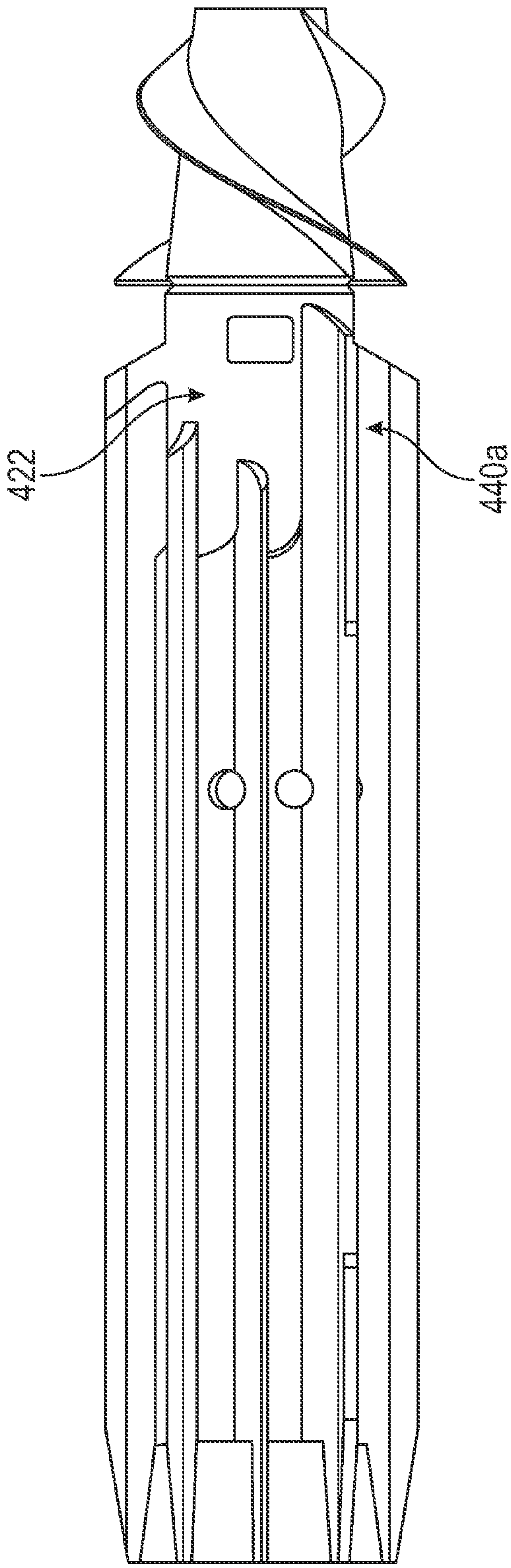
FIG. 49C is top view of the stalk roll shown in FIGS. 49A and 49B.
Figure 50A:
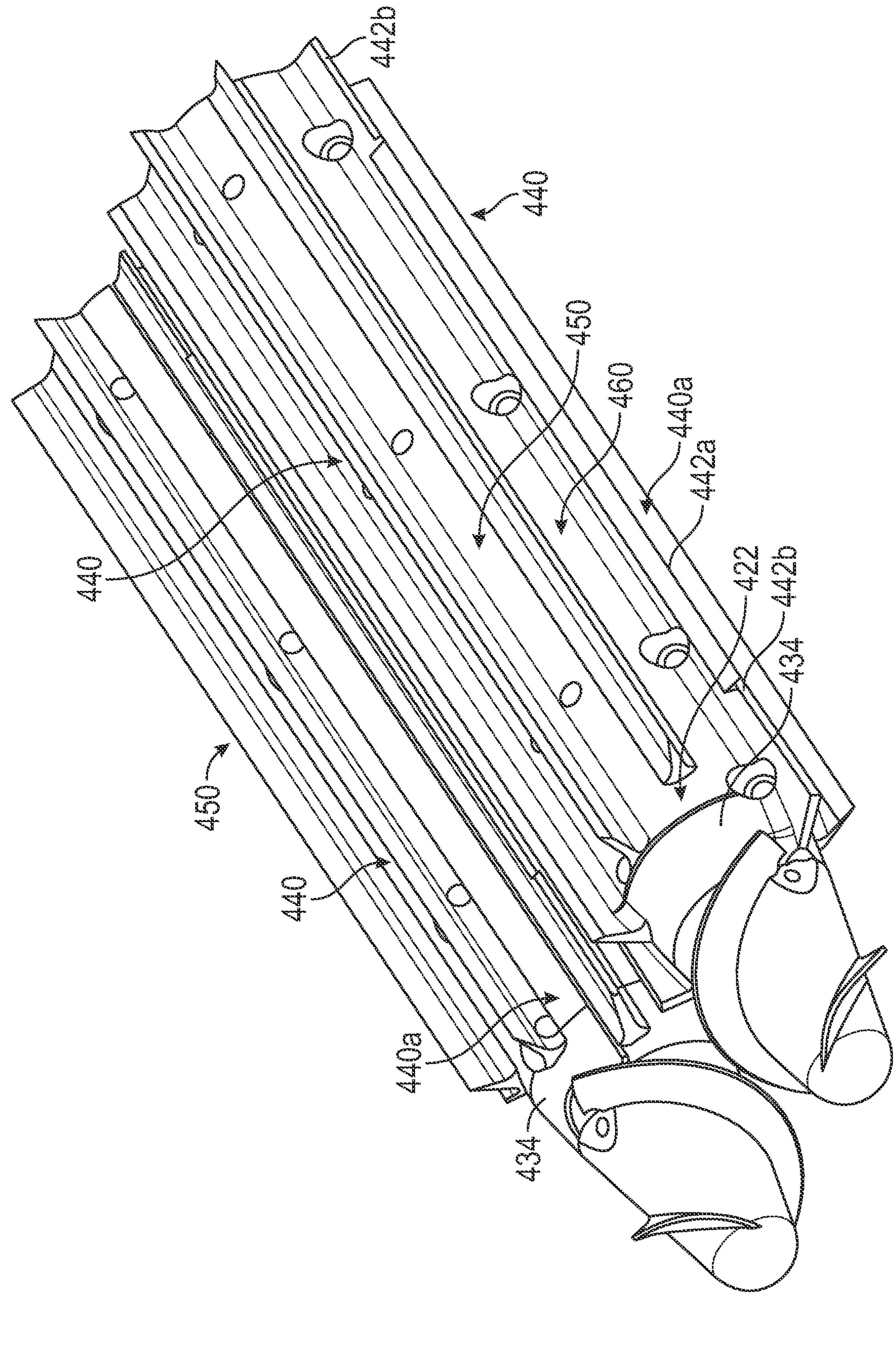
FIG. 50A is a top perspective view showing additional aspects of a pair of stalk rolls that may be configured for use with certain stalk roll drive shafts.
Figure 50B:
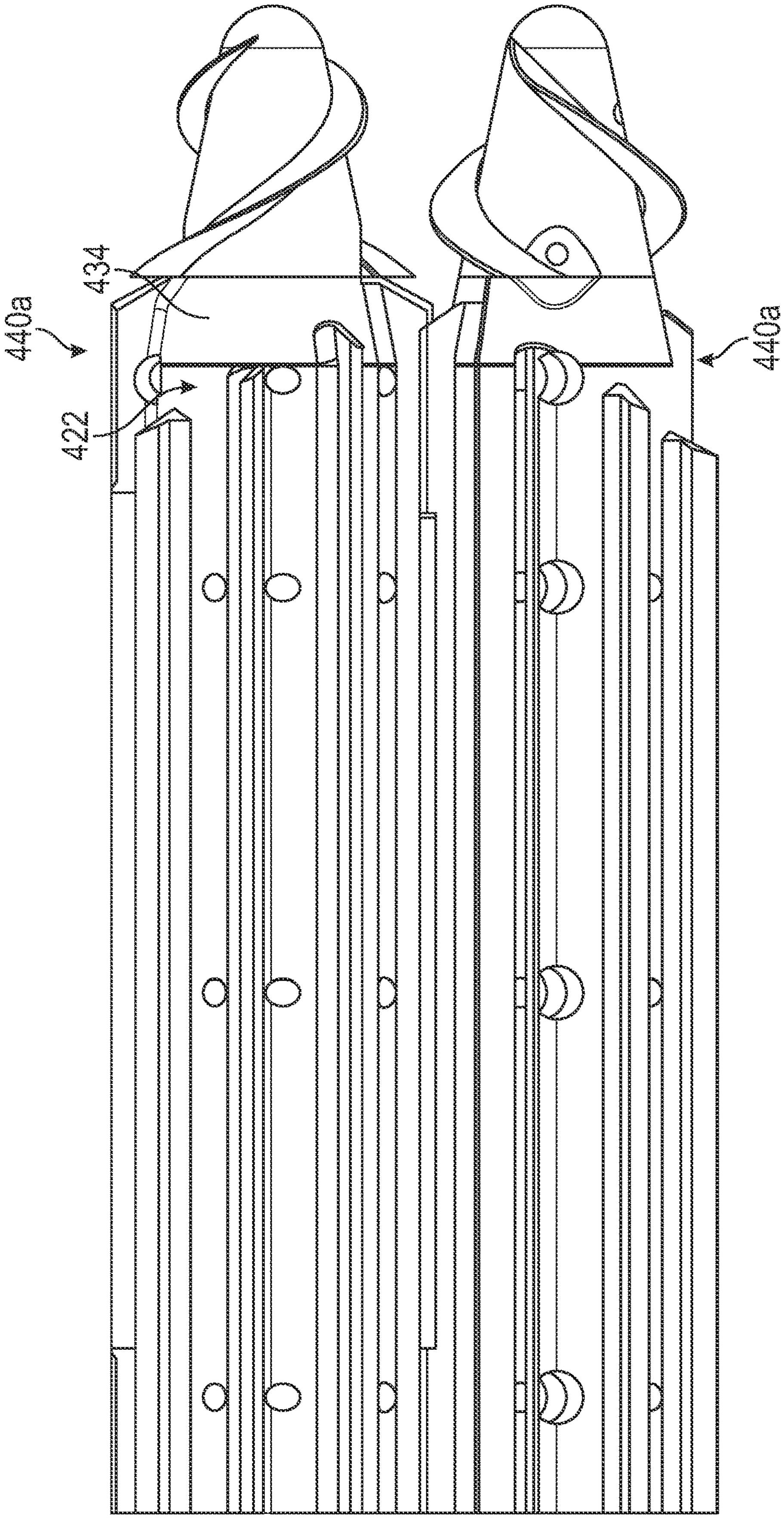
FIG. 50B is a top view of the pair of stalk rolls from FIG. 50A.
Figure 50C:
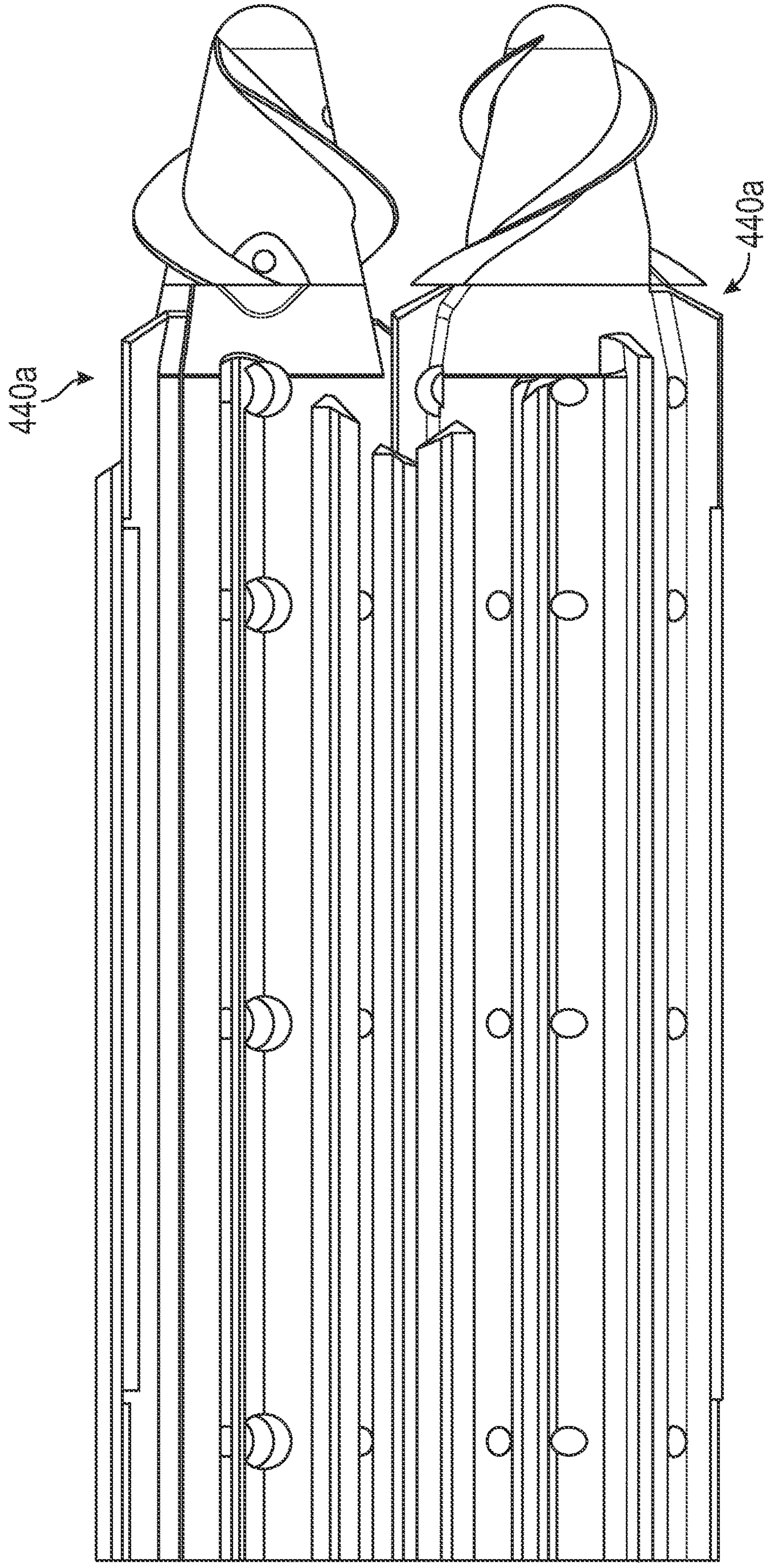
FIG. 50C is a bottom view of the pair of stalk rolls shown in FIGS. 50A & 50B.
Figure 50D:
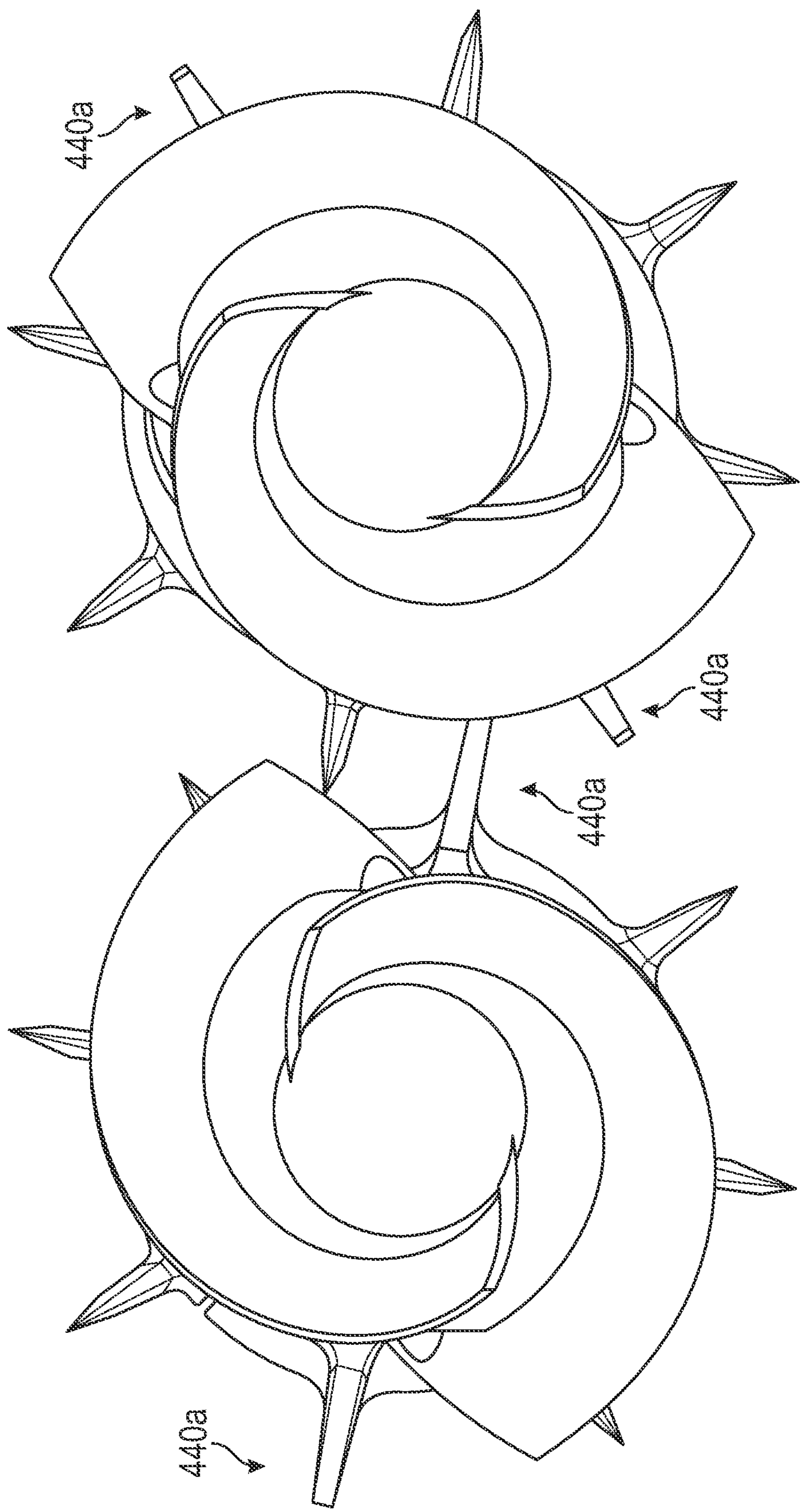
FIG. 50D is a front end view of the pair of stalk rolls shown in FIGS. 50A-50C.
Figure 50E:
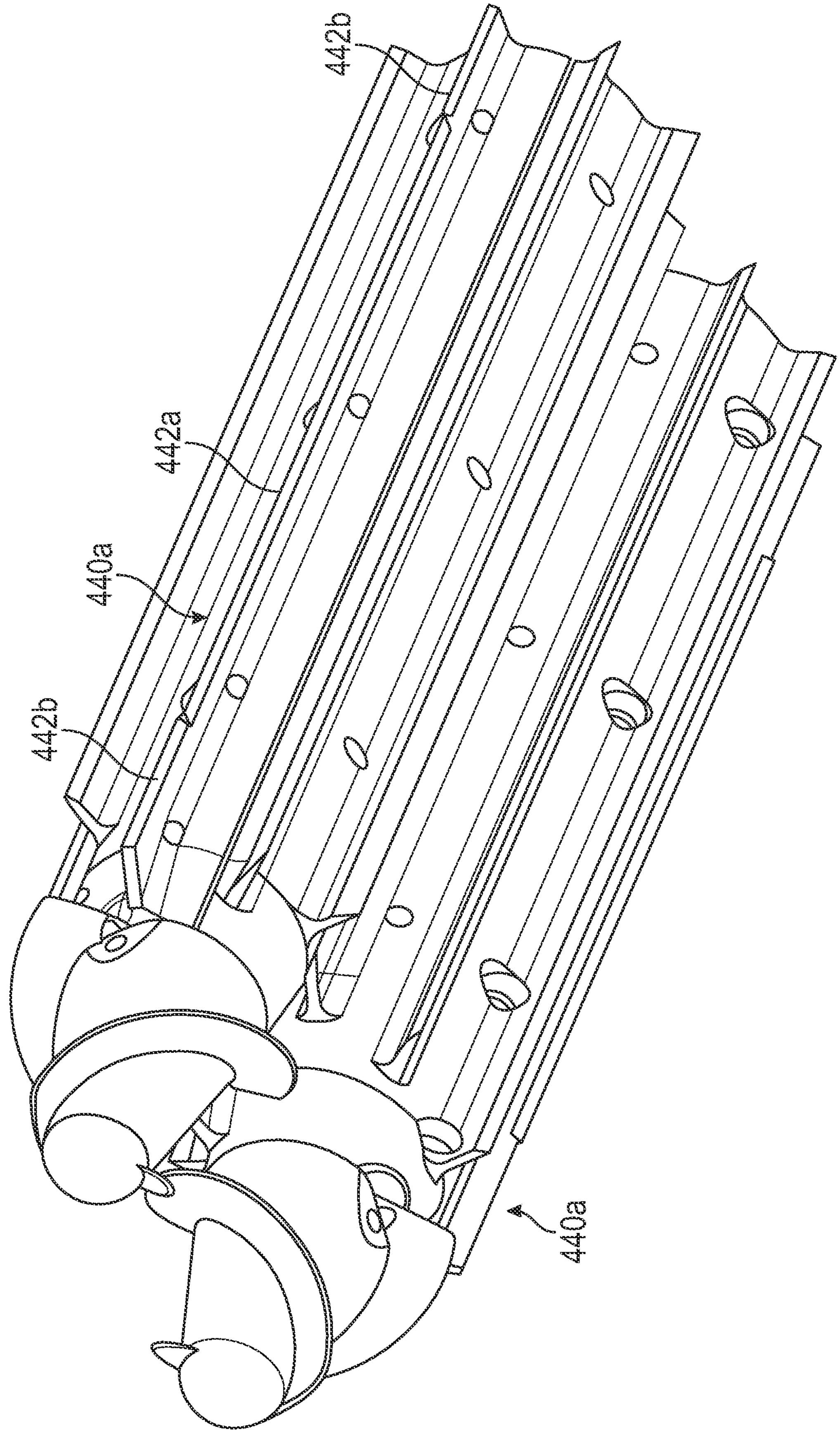
FIG. 50E is a bottom perspective view of the pair of stalk rolls shown in FIGS. 50A-50D.
Figure 51A:
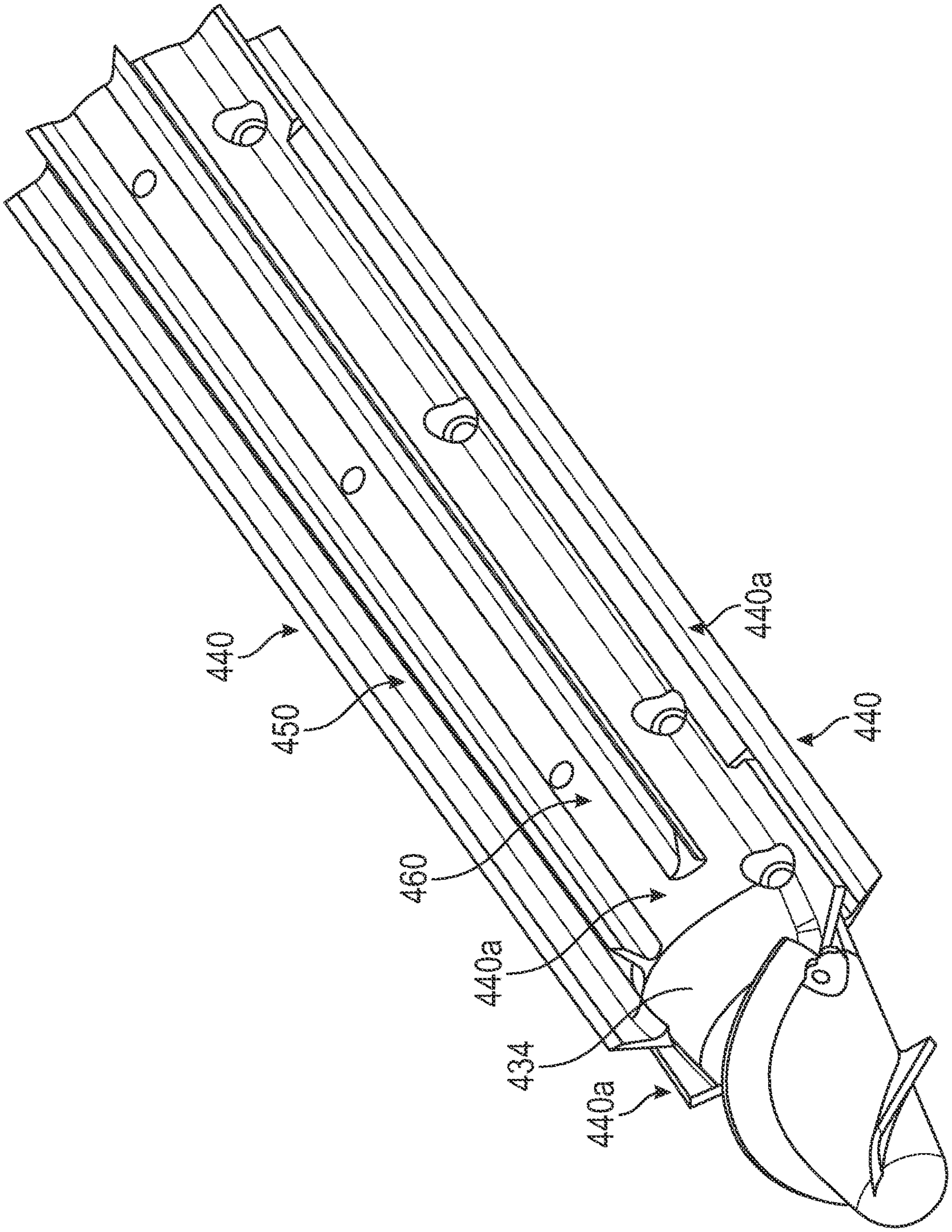
FIG. 51A is a perspective view of the left stalk roll shown in FIGS. 50A-50E.
Figure 51B:
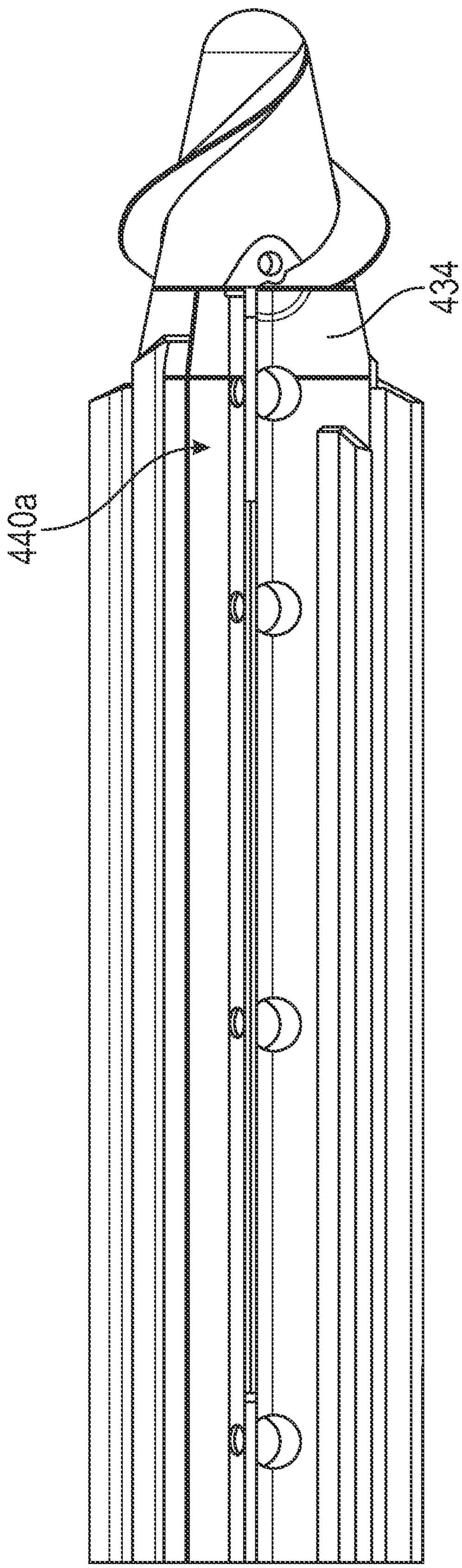
Figure 51C:
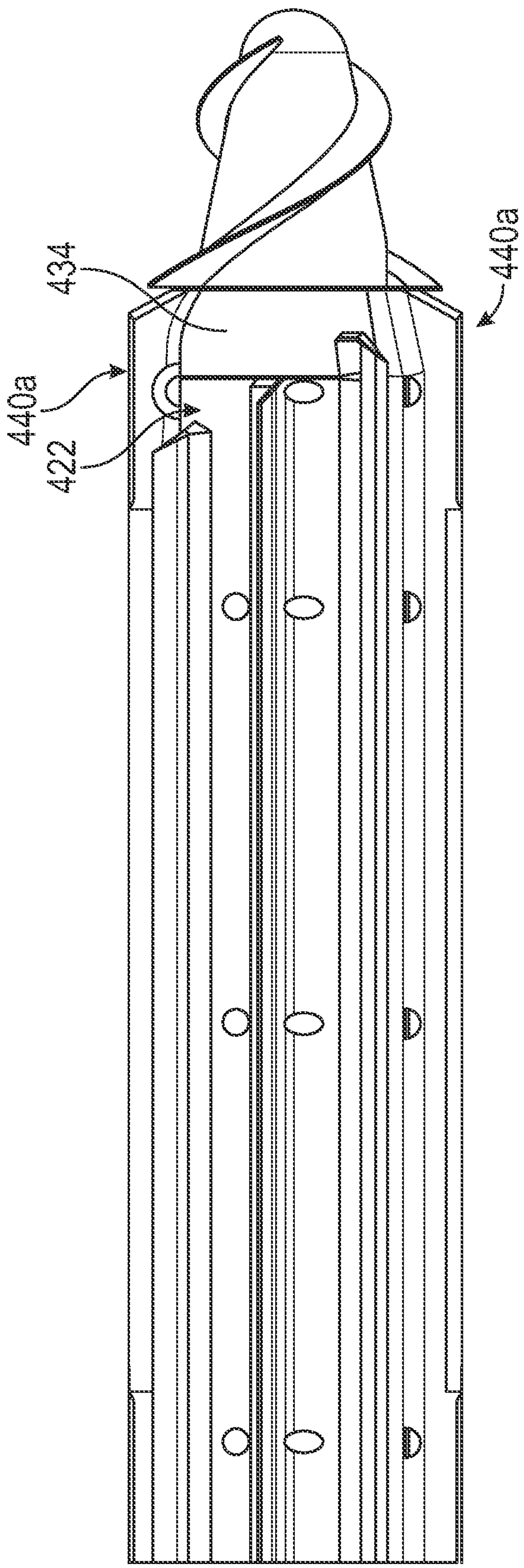
Figure 51D:
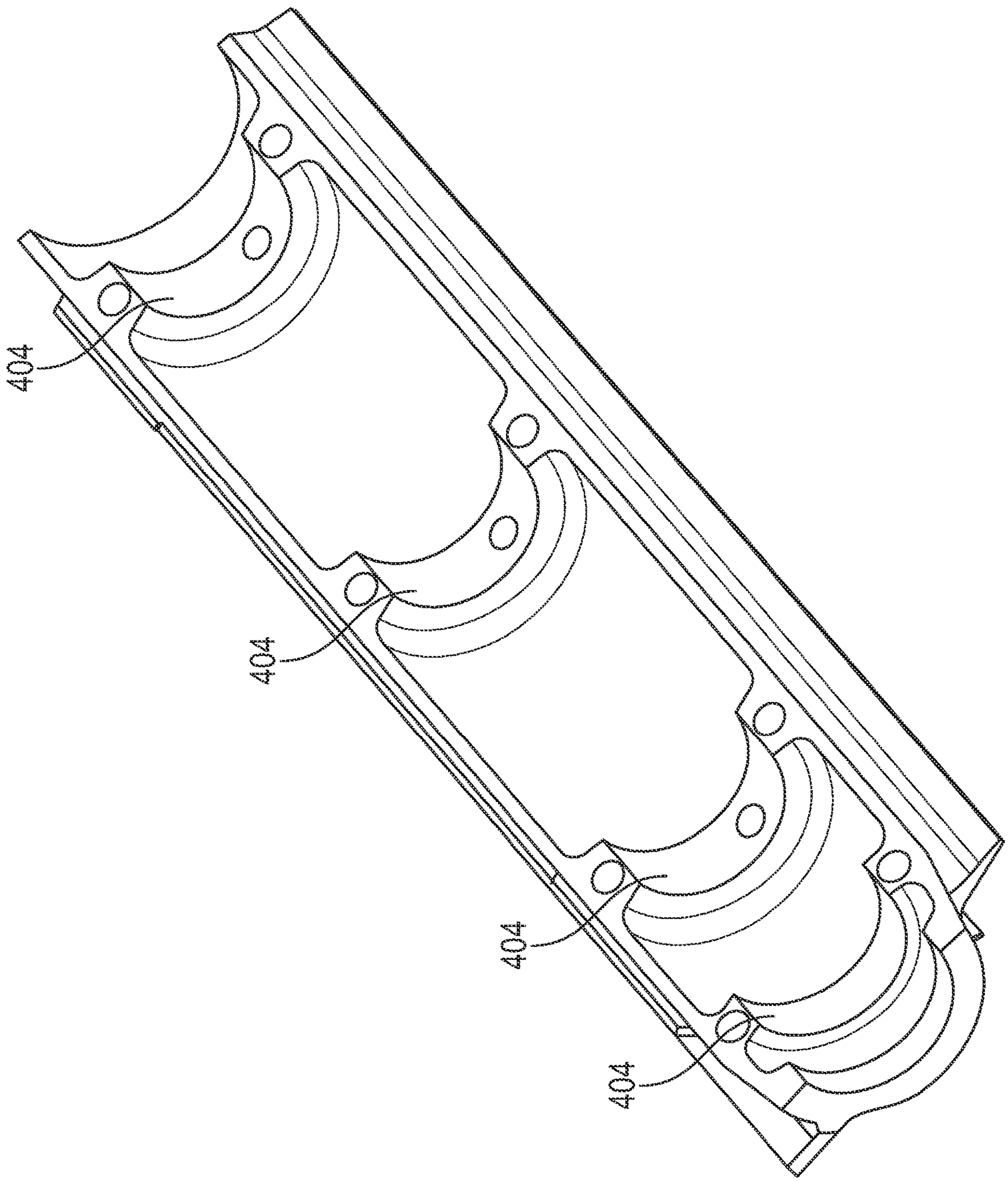
Figure 52A:
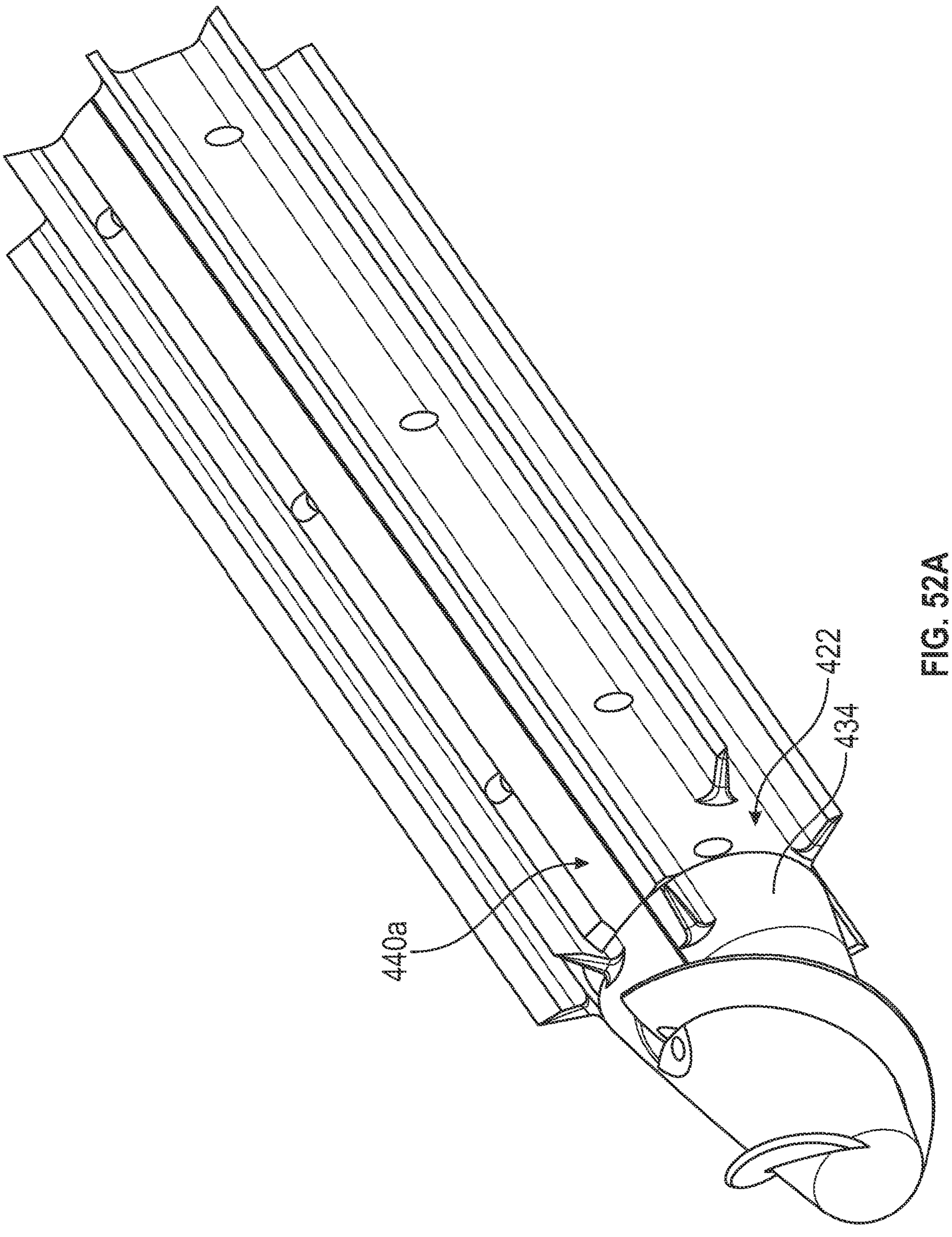
Figure 52B:
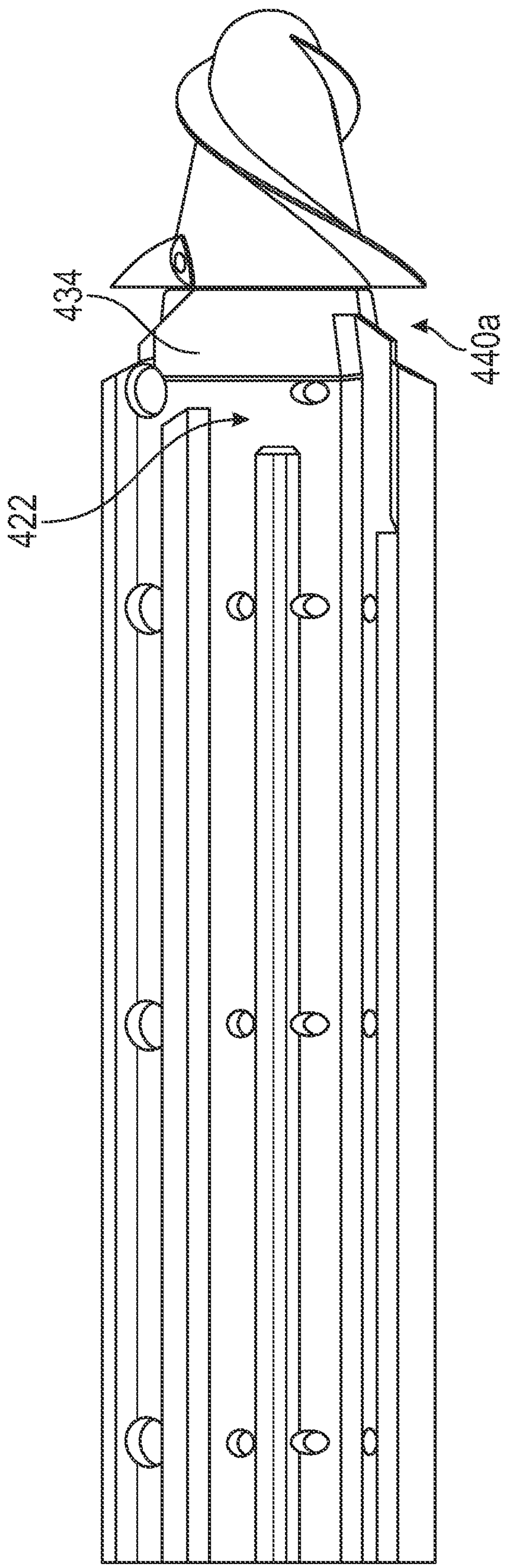
Figure 52C:
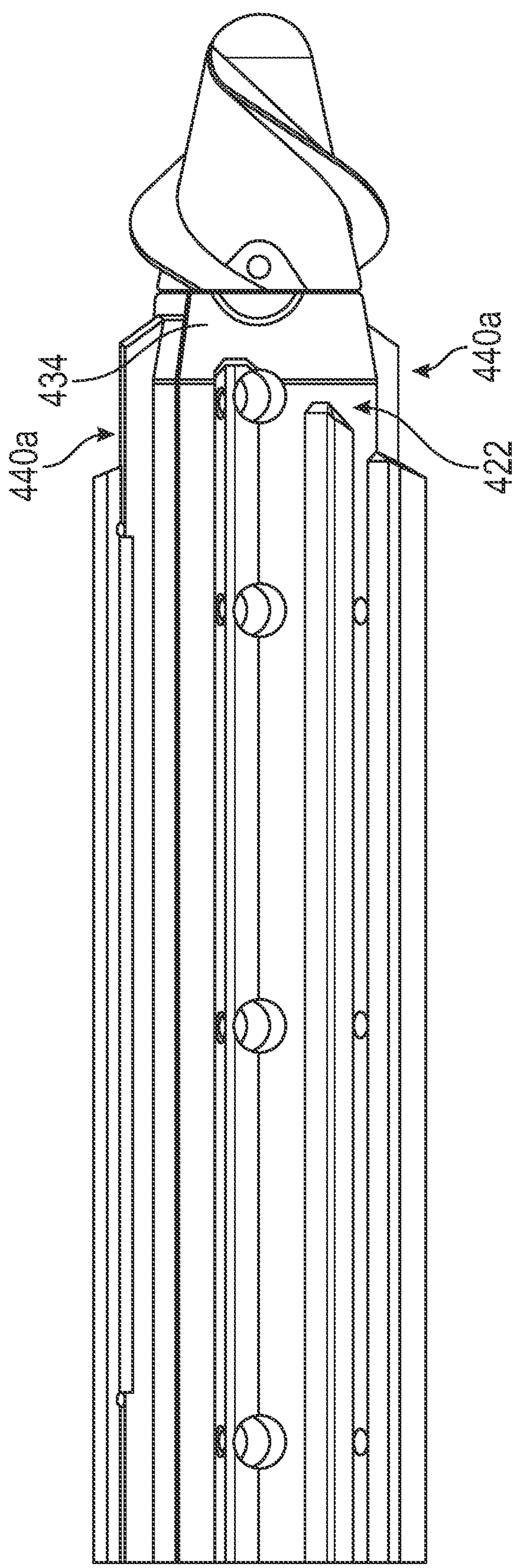

Other aspects of a hybrid flute 440*a* are shown in FIGS. 45 and 46, which provide various views of another hybrid flute 440*a*. In an aspect, the hybrid flute 440*a* shown in FIG. 45 may be especially useful if positioned on a LEFT Stalk roll 15, 16, 190, 192, 400, 400' of a cooperating pair. In another aspect, the hybrid flute 440*a* shown in FIG. 46 may be especially useful if positioned on a RIGHT stalk roll 15, 16, 190, 192, 400, 400' of the cooperating pair. However, the hybrid flutes 440*a* disclosed and claimed herein may be differently positioned on a stalk roll 15, 16, 190, 192, 400, 400' that cooperates with an adjacent stalk roll 15, 16, 190, 192, 400, 400' and/or other structure without limitation unless so indicated in the following claims.

The aspects and configurations of stalk rolls 15, 16, 190, 192, 400, 400', flutes 440, 440*a*, 450, 450*a*, 460, 440', 440*a*', 450', 450*a*', 460' and/or components thereof may vary in the number of flutes and/or dimensions and/or configurations thereof, main cylinder 430' outer diameter, inner diameter, and length, as required for a particular application. In an aspect, those various features may be manipulated to vary the amount of corn plant engagement or destruction desired/required. For example, and without limitation unless so indicated in the following claims, in an aspect a relatively extreme destruction and a relatively fine chop of a corn plant may be accomplished with ten flutes 440, 440*a*, 450, 450*a*, 460, 440', 440*a*', 450', 450*a*', 460'; and relatively less destruction and a relatively coarser chop may be accomplished with eight flutes 440, 440*a*, 450, 450*a*, 460, 440', 440*a*', 450', 450*a*', 460'. Finally, in an aspect a stalk roll 15, 16, 190, 192, 400, 400' utilizing six flutes 440, 440*a*, 450, 450*a*, 460, 440', 440*a*', 450', 450*a*', 460' may not sever a corn plant in many locations and result instead of a crimping and/or crushing of a corn plant and/or corn plant stalk.

Other aspects of stalk rolls 15, 16, 190, 192, 400, 400' may incorporate a recess 420 and/or be configured to provide a stalk engagement gap 25, which stalk rolls 15, 16, 190, 192, 400, 400' may have additional or fewer flutes 440, 440*a*, 450, 450*a*, 460, 440', 440*a*', 450', 450*a*', 460' extending other distances along the length of the stalk roll 15, 16, 190, 192, 400, 400' and/or radially from the axis of rotation of the stalk roll 15, 16, 190, 192, 400, 400'. Additionally, any considerations, designs, and/or orientations previously discussed for other stalk rolls 15, 16, 190, 192 may be incorporated with stalk rolls 400, 400' having a recess 420 and/or stalk engagement gap 25 depending on the specific compatibility. For example, intermediate flutes 182, tapered flutes 181, and/or long flutes 183 may be positioned on the stalk roll 400, 400' at various positions thereof. Additionally, the considerations of the various zones described in detail above may be incorporated into the design of any aspects of the stalk rolls 400, 400' if such considerations are compatible. The various features and/or aspects disclosed herein may be used alone or in combination with one another depending on compatibility. Additionally, some of the features disclosed herein may be especially useful to moving stalk 320 from the nose cone 410 to an area between two opposing stalk rolls 400, 400' with minimal risk of shearing the stalk 320 or otherwise damaging it in an unwanted fashion.

Any of the stalk rolls 15, 16, 190, 192, 400, 400' may be mounted either in a cantilevered or non-cantilevered manner, with or without nose bearings without limitation unless so indicated in the following claims. Additionally, any of the stalk rolls 15, 16, 190, 192, 400 may be oriented in opposing, knife-to-knife configurations or intermeshed and/or interleaved configurations without limitation unless so indicated in the following claims. As previously mentioned, non-meshing and horizontally opposite configured flutes 180, 181, 182, 183 may cause the flute edges to pinch the stalk 320 simultaneously as they rotate, which may result in equal forces being applied to both sides of the engaged stalk 320 so as to mitigate stalk 320 whip. This may keep the stalk 320 generally perpendicular to the ground surface and may reduce any whipping action that may prematurely dislodge ears 300 from the stalk 320 or snap the stalk 320 at the stalk node 330. The remaining flutes 180, 181, 182, 183 of stalk roll 190 may then further pinch the stalk 320 pulling it down and rearward so that the ears 300 are removed from the stalks 320 as they come into contact with the stripper plates 130 in the Ear Separation Zone.

In any of the embodiments of stalk rolls 15, 16, 190, 192, 400, 400' the various flutes 18, 19, 20, 21, 26, 33, 180, 181, 182, 183, 440, 440*a*, 450, 450*a*, 460, 440', 440*a*', 450', 450*a*', 460' may be self-sharpening, or may have a work hardened knife/flute edge 22, 442, 442', sharp edges 442*a*', and/or blunt edges 442*b*'. Furthermore, any of the knife/flute edges 22, 442, 442', sharp edges 442*a*', and/or blunt edges 442*b*' disclosed herein may be coated with various materials, such as chrome, tungsten carbide, or any other materials that may suitable for the specific application. Additionally or alternatively, any of the knife/flute edges 22, 442, 442', sharp edges 442*a*', and/or blunt edges 442*b*' may be processed in such a manner that the knife/flute edge 22, 442, 442', sharp edge 442*a*', and/or blunt edge 442*b*' is more wear-resistant than without such processing without limitation unless so indicated in the following claims.

The materials used to construct the stalk rolls 15, 16, 190, 192, 400, 400' and various elements and/or components thereof will vary depending on the specific application thereof, but it is contemplated that polymers, metals, metal alloys, natural materials, and/or combinations thereof may be especially useful for the stalk roll 15, 16, 190, 192, 400, 400' in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various methods and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the stalk rolls 15, 16, 190, 192, 400, 400' and/or components thereof are not limited to the specific embodiments pictured and described herein, but are intended to apply to all similar apparatuses and methods for harvesting a plant. Modifications and alterations from the described embodiments will occur to those skilled in the art without departure from the spirit and scope of the present disclosure.

Any of the various features, components, functionalities, advantages, aspects, configurations, etc. for the stalk roll 15, 16, 190, 192, 400, 400' and/or components thereof may be used alone or in combination with one another depending on the compatibility of the features, components, functionalities, advantages, aspects, configurations, etc. Accordingly, an infinite number of variations of the present disclosure exist. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the stalk rolls 15, 16, 190, 192, 400, 400', flutes 440, **440*a*, 450, 450*a*, 460, 440', 440*a*', 450', 450*a*', 460'**, corn row units and methods of using same have been described in connection with preferred aspects and specific examples, it is not intended that the scope be limited to the particular embodiments and/or aspects set forth, as the embodiments and/or aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A stalk roll having multiple flutes comprising:

a. a main cylinder;

b. a full flute engaged with said main cylinder and having a length along a longitudinal axis of said main cylinder, wherein said full flute extends outward from said main cylinder, wherein said full flute includes a sharp edge;

c. a full flute engaged with said main cylinder and having a length along a longitudinal axis of said main cylinder, wherein said full flute extends outward from said main cylinder, wherein said full flute includes a flat edge;

d. a reduced flute engaged with said main cylinder having a length along said longitudinal axis of said main cylinder, wherein said reduced flute extends outward from said main cylinder, wherein the length of said full flute with the sharp edge is greater than said length of said reduced flute;

e. a support member positioned on an interior surface of said main cylinder, wherein said support member includes a first planar surface and a second planar surface that are oriented perpendicularly with respect to one another;

f. a second support member positioned on said interior surface of said main cylinder and axially spaced from said support member, wherein said second support member includes a first planar surface and a second planar surface that are oriented perpendicularly to one another, and wherein said first planar surface of said first support member is coplanar with said first planar surface of said second support member.

2. A stalk roll having multiple flutes comprising:

a. a main cylinder;

b. a full flute engaged with said main cylinder and having a length along a longitudinal axis of said main cylinder, wherein said full flute extends outward from said main cylinder, wherein said full flute includes a sharp edge;

c. a full flute engaged with said main cylinder and having a length along a longitudinal axis of said main cylinder, wherein said full flute extends outward from said main cylinder, wherein said full flute includes a flat edge;

d. a reduced flute engaged with said main cylinder having a length along said longitudinal axis of said main cylinder, wherein said reduced flute extends outward from said main cylinder, wherein the length of said full flute with the sharp edge is greater than said length of said reduced flute;

wherein the stalk roll is characterized by six flutes positioned equally around the main cylinder in the configuration whereby a full flute having a sharp edge is located opposite a full flute having a flat edge, a reduced flute positioned on each side of said full flutes.

3. A stalk roll having multiple flutes comprising:

a. a main cylinder;

b. at least two full sharp flutes engaged with said main cylinder and having a length along a longitudinal axis of said main cylinder, wherein said at least two full sharp flutes extend outward from said main cylinder, wherein said at least two full sharp flutes each include a sharp edge;

c. at least two full flat flutes engaged with said main cylinder and having a length along a longitudinal axis of said main cylinder, wherein said full flat flute extend outward from said main cylinder, wherein said at least two full flutes each includes a flat edge;

d. at least four reduced flutes equally interspersed between the at least two full sharp flutes and the at least two full flat flutes, each of the at least four reduced flutes engaged with said main cylinder having a length along said longitudinal axis of said main cylinder, wherein the at least four reduced flutes extend outward from said main cylinder, wherein a length of each of the four reduced flutes is less than the length of at least one of the two full sharp flutes and the length of at least one of the full flat flutes;

wherein two of the at least two sharp flutes are positioned on the cylinder opposite each other, and two of the at least two flat flutes are positioned on the cylinder opposite each other.

* * * * *